(12) United States Patent
Lapp

(10) Patent No.: US 10,852,937 B2
(45) Date of Patent: *Dec. 1, 2020

(54) CALIBRATED FINGER-MAPPED GESTURE SYSTEMS

(71) Applicant: Joseph T. Lapp, Austin, TX (US)

(72) Inventor: Joseph T. Lapp, Austin, TX (US)

( * ) Notice: Subject to any disclaimer, the term of this patent is extended or adjusted under 35 U.S.C. 154(b) by 178 days.

This patent is subject to a terminal disclaimer.

(21) Appl. No.: 16/037,077

(22) Filed: Jul. 17, 2018

(65) Prior Publication Data

US 2018/0321841 A1 Nov. 8, 2018

Related U.S. Application Data

(62) Division of application No. 14/272,736, filed as application No. PCT/US2012/064563 on Nov. 9, 2012, now Pat. No. 10,082,950.

(Continued)

(51) Int. Cl.
*G06F 3/0481* (2013.01)
*G06F 3/0488* (2013.01)

(52) U.S. Cl.
CPC ...... *G06F 3/04883* (2013.01); *G06F 3/04886* (2013.01)

(58) Field of Classification Search
CPC ............ G06F 3/04883; G06F 3/04886; G06F 3/0481; G06F 3/0488
See application file for complete search history.

(56) References Cited

U.S. PATENT DOCUMENTS

| 4,891,786 A | * | 1/1990 | Goldwasser | .......... G06F 40/174 715/257 |
| 5,252,951 A | * | 10/1993 | Tannenbaum | .......... G06F 3/023 345/156 |

(Continued)

FOREIGN PATENT DOCUMENTS

| EP | 2474890 A1 | 7/2012 |
| WO | 2012/091574 A1 | 7/2012 |

OTHER PUBLICATIONS

David Goldberg and Cate Richardson, Touch-Typing with a Stylus—Interchi '93: ACM INTERCHI Conference on Human factors in Computing Systems, Amsterdam, The Netherlands, Apr. 24-29, 1993, pp. 80-87.

(Continued)

*Primary Examiner* — Phenuel S Salomon

(57) ABSTRACT

A finger-mapped gesture system is a user interface method and apparatus for rapid data input on a touch-sensitive surface. The user gestures by holding the hand stationary relative to the surface and moving the fingers primarily by extension and flexion on the surface. Each finger gestures on a gesturing area instead of selecting among keys. Individual gestures are constructed from finger actions that each independently parameterize the gesture. In combination, the particular fingers gesturing and the parameters that the fingers gesture indicate the input that the user intends. On devices that do not directly identify fingers, fingers are identified via a finger map that, after calibration to a person's hand, associates each finger with a gesturing area. Gestures are otherwise independent of where they are performed, freeing users from having to look at their fingers to target visual elements. The system is optimized for rapid character data entry.

38 Claims, 63 Drawing Sheets

Related U.S. Application Data

(60) Provisional application No. 61/943,675, filed on Feb. 24, 2014, provisional application No. 61/823,909, filed on May 15, 2013, provisional application No. 61/821,224, filed on May 8, 2013, provisional application No. 61/557,570, filed on Nov. 9, 2011.

(56) References Cited

U.S. PATENT DOCUMENTS

| | | | |
|---|---|---|---|
| 5,341,133 A | 8/1994 | Savoy et al. | |
| 5,434,929 A * | 7/1995 | Beernink | G06F 3/04883 382/187 |
| 5,483,261 A * | 1/1996 | Yasutake | G06F 3/0425 178/18.03 |
| 5,521,986 A * | 5/1996 | Curtin, II | G06F 3/0233 315/169.1 |
| 5,825,232 A * | 10/1998 | Kimura | G06G 7/164 327/356 |
| 5,880,411 A * | 3/1999 | Gillespie | G06F 3/03547 178/18.01 |
| 6,031,469 A * | 2/2000 | Dodd | G06F 3/0219 341/20 |
| 6,104,317 A | 8/2000 | Panagrossi | |
| 6,229,502 B1 * | 5/2001 | Schwab | G06F 15/0291 345/1.1 |
| 6,570,557 B1 * | 5/2003 | Westerman | G06F 3/04883 341/22 |
| 6,844,885 B2 * | 1/2005 | Anderson | G06F 3/0481 345/650 |
| 6,856,259 B1 * | 2/2005 | Sharp | G06F 3/0488 178/18.01 |
| 7,030,861 B1 * | 4/2006 | Westerman | G06F 3/04883 345/173 |
| 7,057,607 B2 | 6/2006 | Mayoraz et al. | |
| 7,453,439 B1 * | 11/2008 | Kushler | G06F 3/0237 345/168 |
| 7,694,231 B2 | 4/2010 | Kocienda et al. | |
| 7,790,972 B2 * | 9/2010 | Stewart | G10H 1/342 84/423 B |
| 8,359,543 B2 | 1/2013 | Sengupta | |
| 8,525,799 B1 * | 9/2013 | Grivna | G06F 3/044 345/173 |
| 2002/0136371 A1 | 9/2002 | Bozorgui-Nesbat | |
| 2004/0263487 A1 * | 12/2004 | Mayoraz | G06F 3/0481 345/173 |
| 2005/0169503 A1 * | 8/2005 | Howell | G06K 9/00013 382/115 |
| 2006/0077179 A1 | 4/2006 | Hsu et al. | |
| 2007/0286663 A1 * | 12/2007 | Kinney | G06F 1/1616 400/489 |
| 2008/0036743 A1 * | 2/2008 | Westerman | G06F 3/038 345/173 |
| 2008/0165255 A1 * | 7/2008 | Christie | G06F 3/04883 348/207.99 |
| 2008/0211766 A1 * | 9/2008 | Westerman | G06F 3/04883 345/156 |
| 2009/0237361 A1 | 9/2009 | Mosby et al. | |
| 2009/0249258 A1 * | 10/2009 | Tang | G06F 3/04883 715/863 |
| 2011/0260892 A1 * | 10/2011 | Tysowski | G06F 3/0237 341/22 |
| 2013/0004016 A1 * | 1/2013 | Karakotsios | G06K 9/00355 382/103 |
| 2013/0113714 A1 | 5/2013 | Mao | |

OTHER PUBLICATIONS

I. Scott Mackenzie and Shawn X. Zhang, "The Design and Evaluation of a High-Performance Soft Keyboard", CHI 99:ACM SIGCHI Conference on Human Factors in Computing Systems, Pittsburgh, PA May 15-20, 1999, pp. 25-31.

Ken Perlin, "Quikwriting: Continuous Stylus-based Text Entry", UIST98 Eleventh Annual Symposium on User Interface Software and Technology, San Francisco CA, Nov. 1-4, 1998, pp. 215-216.

Matthew Bonner et al, No-Look Notes: Accessible Eyes-Free Multi Touch Text Entry, pp. 1-18 May 17-20, 2010.

Wikpedia—Letter Frequency—Aug. 28, 2013.

Bonner et al., No-Look Notes: Accessible Eyes-Free Multi-Touch Text Entry, May 17-20, pp. 1-18.

* cited by examiner

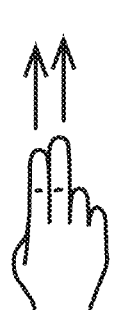 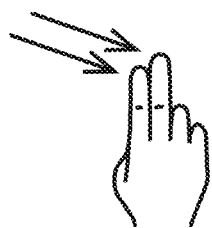 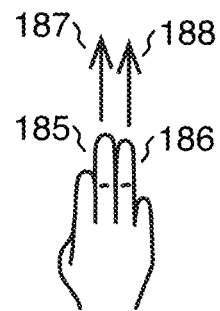 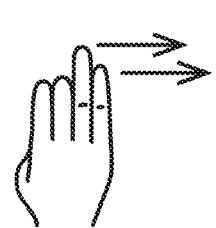
FIG. 14A    FIG. 14B    FIG. 14C    FIG. 14D
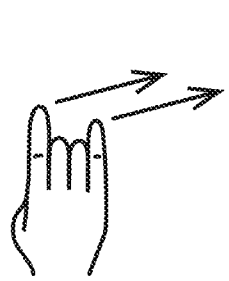 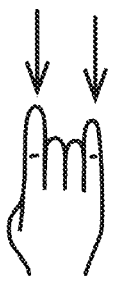  
FIG. 14E    FIG. 14F    FIG. 14G    FIG. 14H
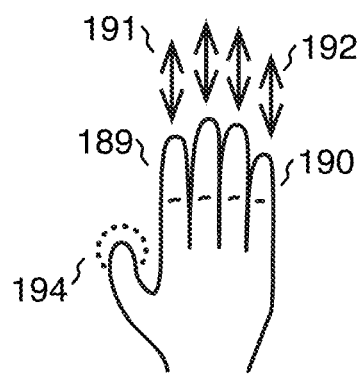 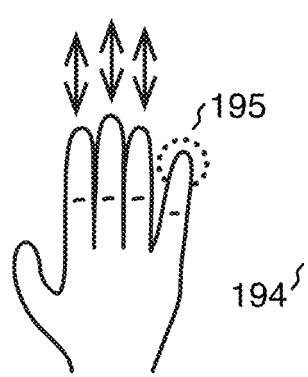 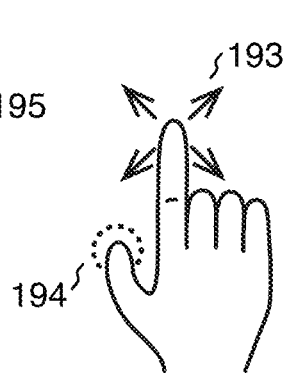
FIG. 15A    FIG. 15B    FIG. 15C

| A | BL0 <(D) | BL1 <(E) | BL2 >(E) |
|---|---|---|---|
| GL3 >(C) | 'G' | 'H' | 'I' |
| GL2 <(C) | 'D' | 'E' | 'F' |
| GL1 <(B) | 'A' | 'B' | 'C' |
| GL0 <(A) | — | — | — |

| B | BL0 <(I) | BL1 <(J) | BL2 >(J) |
|---|---|---|---|
| GL3 >(H) | 'P' | 'Q' | 'R' |
| GL2 <(H) | 'M' | 'N' | 'O' |
| GL1 <(G) | 'J' | 'K' | 'L' |
| GL0 <(F) | — | — | — |

| A&B | BL0 <(D/I) | BL1 <(E/J) | BL2 >(E/J) |
|---|---|---|---|
| GL3 >(C/H) | 'Y' | 'Z' | '&' |
| GL2 <(C/H) | 'V' | 'W' | 'X' |
| GL1 <(B/G) | 'S' | 'T' | 'U' |
| GL0 <(A/F) | — | — | — |

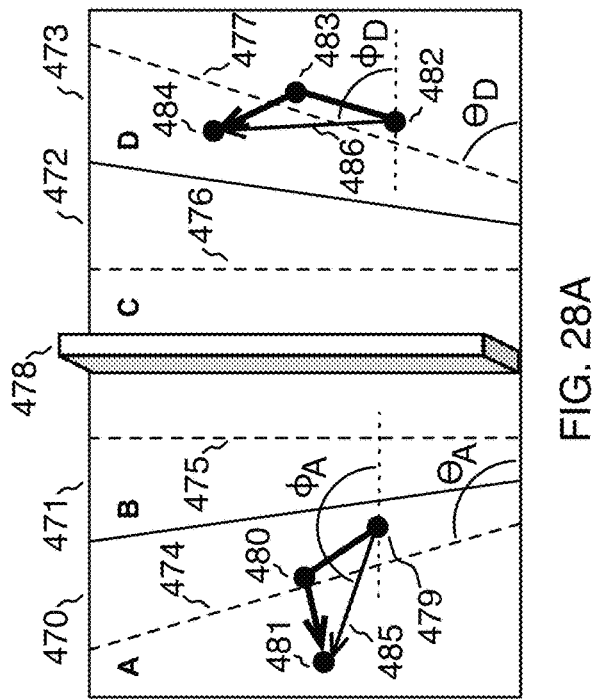
FIG. 28A
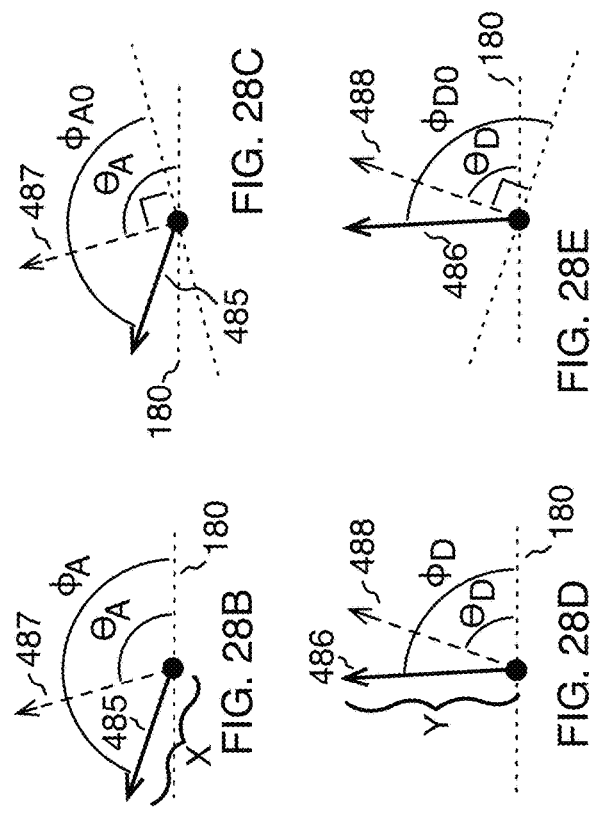
FIG. 28B
FIG. 28C
FIG. 28D
FIG. 28E
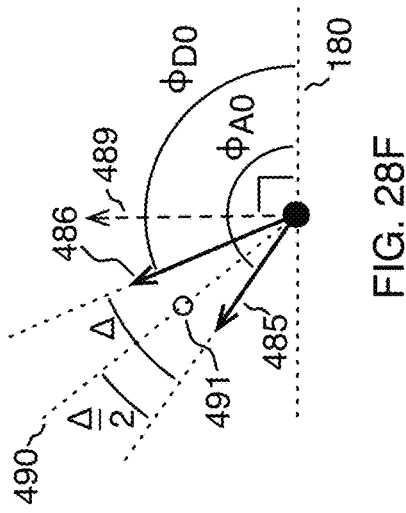
FIG. 28F
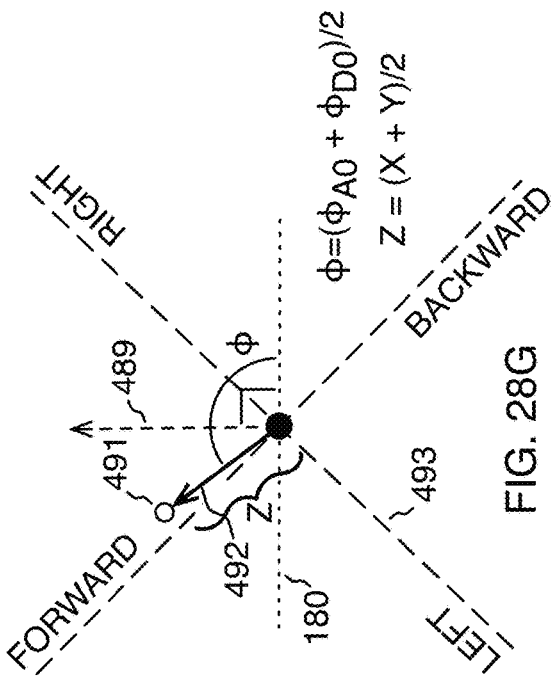
FIG. 28G

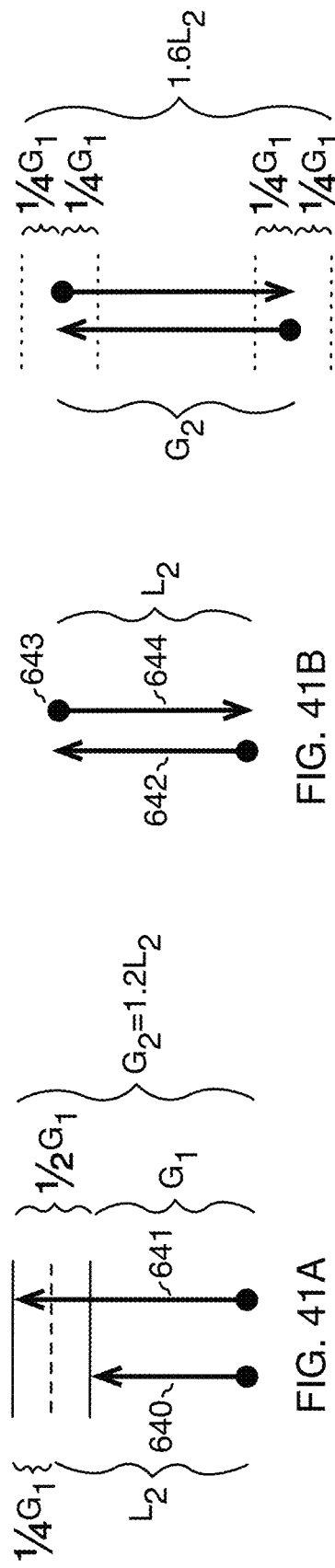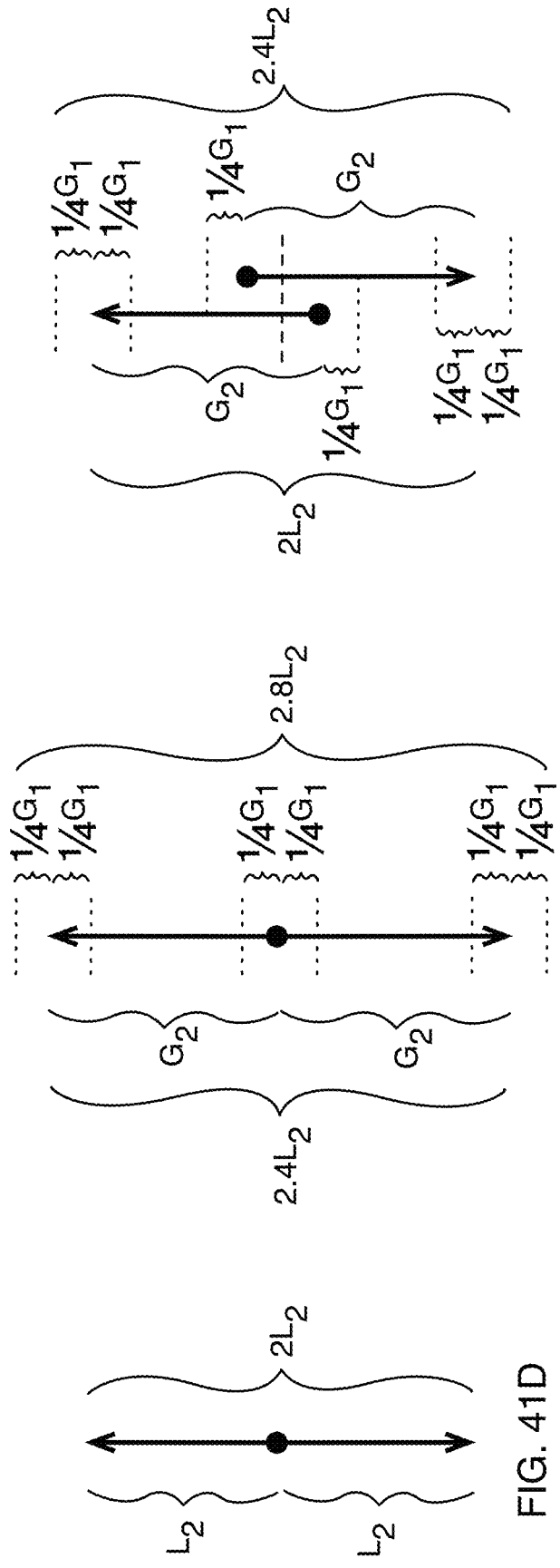

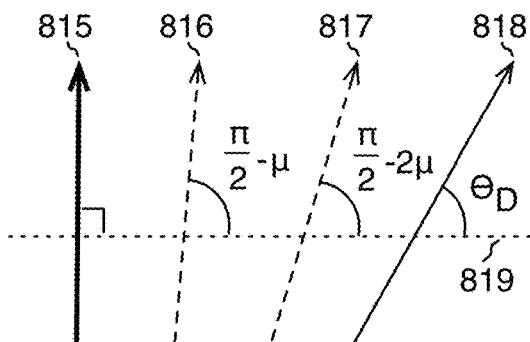
FIG. 47A  $\mu = (\frac{\pi}{2} - \Theta_D)/3$
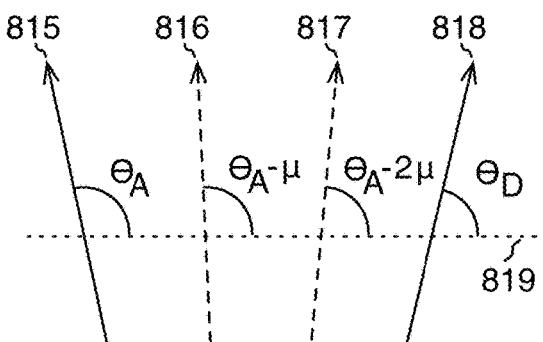
FIG. 47B  $\mu = (\Theta_A - \Theta_D)/3$
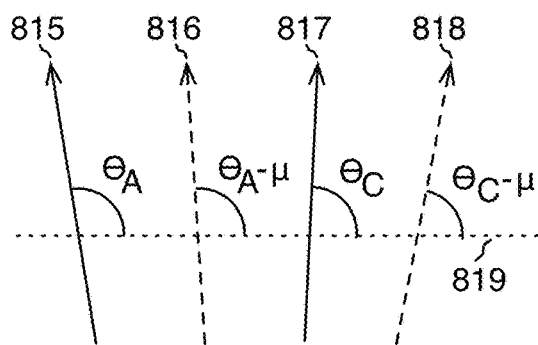
FIG. 47C  $\mu = (\Theta_A - \Theta_C)/2$
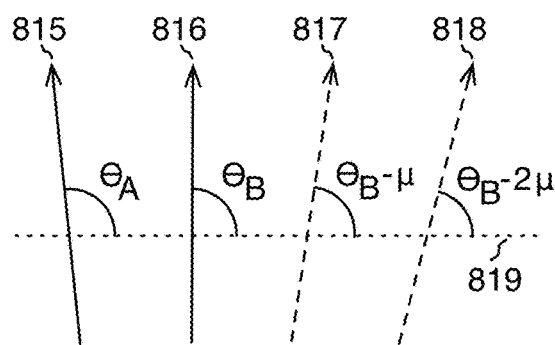
FIG. 47D  $\mu = (\Theta_A - \Theta_B)$
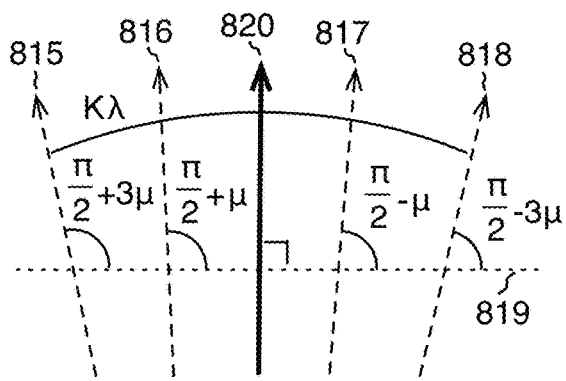
FIG. 47E  $\mu = K\lambda/6$
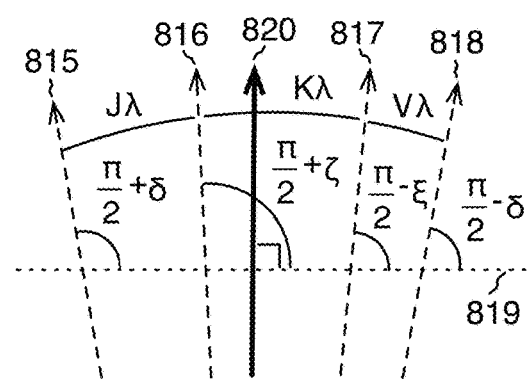
FIG. 47F  $\delta = (J\lambda + K\lambda + V\lambda)/2$
$\zeta = \delta - J\lambda$
$\xi = \delta - V\lambda$

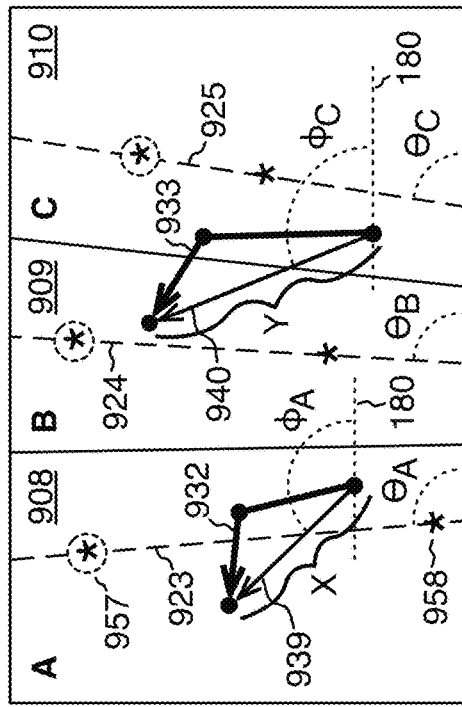
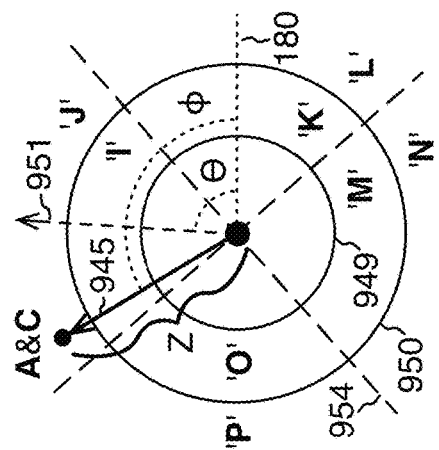
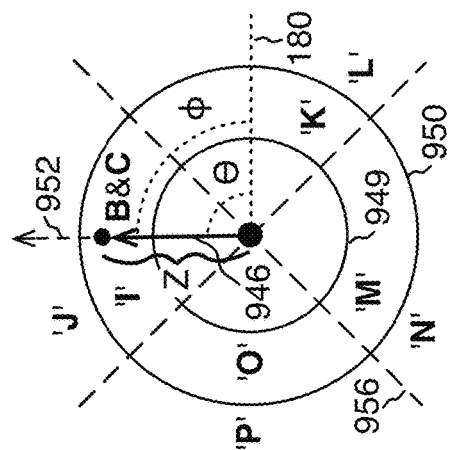
FIG. 56A
FIG. 56B
FIG. 56C
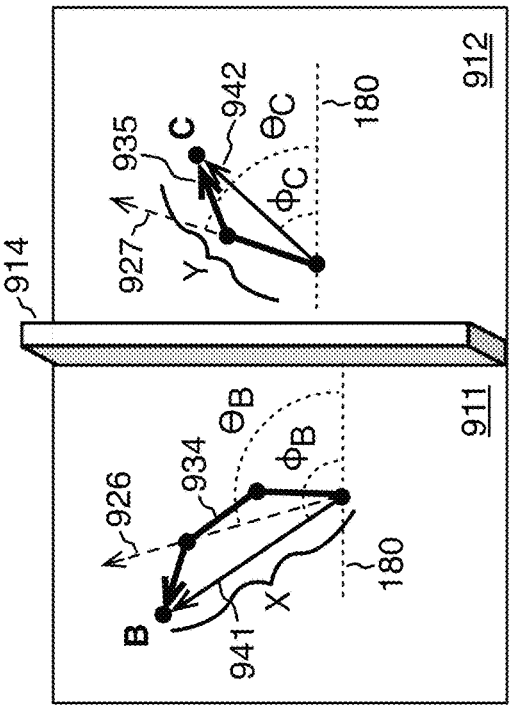
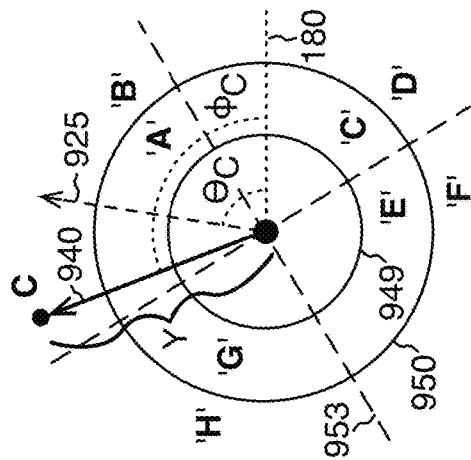
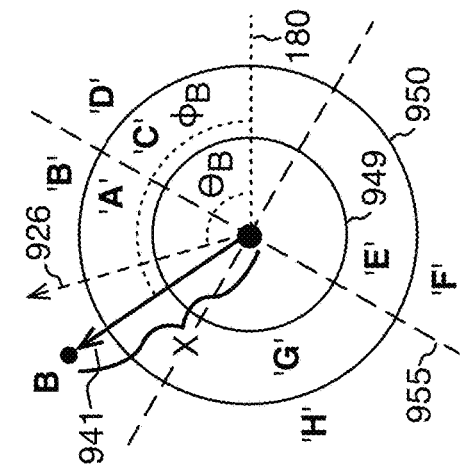
FIG. 57A
FIG. 57B
FIG. 57C

CALIBRATED FINGER-MAPPED GESTURE SYSTEMS

1 CROSS REFERENCE TO RELATED APPLICATIONS

This application is a Divisional of U.S. application Ser. No. 14/272,736 filed May 8, 2014, which is a Continuation-in-Part of PCT/US2012/064563 filed Nov. 9, 2012, now published as WO 2013/071198, which claims benefit of U.S. Provisional Application No. 61/557,570 filed Nov. 9, 2011, and this application further claims benefit of U.S. Provisional Application No. 61/821,224 filed May 8, 2013, U.S. Provisional Application No. 61/823,909 filed May 15, 2013, U.S. Provisional Application No. 61/943,675 filed Feb. 24, 2014, and U.S. application Ser. No. 14/272,736 filed May 8, 2014, the disclosures of all of the above applications being incorporated by reference herein.

2 FIELD OF THE INVENTION

The present invention is a user interface technology. It characterizes computer devices and processes that receive input from a user. The technology interprets user actions of fingers touching one or more surfaces as individual user requests. The surfaces can be physical or virtual, including purely spatial or mathematical surfaces. The actions of fingers touching surfaces can be direct or indirect, including fingers only touching surfaces by proxy. The invention is particularly adapted for inputting characters and text operations and for replacing computer keyboards.

3 BACKGROUND ART

Touchscreen devices appear to promise a future of completely portable computing, but it has been a challenge to find an effective alternative to the conventional keyboard. Many portable devices include small keyboards, but it is difficult or impossible to touch-type on these keyboards, so data entry remains slow and cumbersome. Serious data entry still requires propping a desktop or laptop on a surface and touch-typing on a conventional keyboard with both hands. The conventional keyboard is too big to be portable, and the method for rapid data entry on a conventional keyboard is not conducive to the circumstances of portability.

The acuteness of the problem has led to a broad variety of methods for inputting into a touchscreen device. The most prevalent is a virtual software keyboard that emulates a physical keyboard in look and function. Apple iOS and Android OS devices come standard with virtual keyboards. Alternative virtual keyboards are also available that arrange the keyboard keys differently in efforts to improve the rate of user input. For example, a number of virtual keyboards arrange keys to allow for faster input using both thumbs at once. MacKenzie & Zhang (1999) describe a virtual keyboard optimized through an analytic analysis of English. The "Swype" keyboard by Nuance Communications, Inc., also has a keyboard layout, but it does not require that the user lift fingers between selecting characters, thus increasing the rate of character entry. However, input on virtual keyboards remains slow because the entire hand moves when selecting characters and because the user must take some care to position fingers on the touchscreen for each character. In recognition of how error-prone it is to require that users carefully place fingers at specific locations, most virtual keyboards include some form of autocorrection, allowing the user to type at a rate faster than is required for accuracy.

To further improve the rate of input, virtual keyboards usually also include a form of autocompletion. Even so, autocorrection and autocompletion themselves introduce errors requiring correction, limiting the rate of input.

Numerous approaches have been explored for reducing error rates, reducing interface size requirements, and increasing the rate of input. Consider handwriting recognition systems. Many such systems been implemented on touchscreens, including a shorthand system that Goldberg & Richardson (1993) developed to minimize the gesturing required. The Graffiti system by Palm, Inc., is a famous example of such a system. These systems generally allow users more latitude for error than a virtual keyboard does, but they are no faster than handwriting. Efficient solutions appear to reside with coded input, such as by selecting keys.

Small portable devices must balance providing enough keys to be useful with providing keys large enough for fingers to accurately target. A common approach to providing character input with few keys is to associate different characters with different sequences of key presses, as done on twelve-key phones. In US 2002/0136371-A1, Bozorgui-Nasbat improves on the traditional twelve-key phone system with a system that only requires two key presses for every character. Frequently occurring characters are input by pressing the same key twice. Less frequently occurring characters are input by pressing a key and an adjacent key. This approach leverages combinatorics to reduce the number of key presses required, but such series entry solutions require that the user carefully target keys one after another. Chorded keyboards address this problem by assigning simultaneous combinations of key presses to different characters. A single pressing of multiple keys inputs a particular character. However, chorded keyboards require the user to learn to move fingers independently, as on a piano, and also to memorize a great variety of correspondences between finger combinations and characters, making chorded keyboards beyond the skill of most.

The ideal solution appears to reside with combinatorics and coded input, provided that gesturing skill and memorization requirements can be minimized. There are other approaches to inputting characters with combinations of coded input. One approach is to initiate a gesture on a first region of the device interface and end the gesture on a second region. The combination of the first and second regions then indicates the character input. In PCT/US2012/064563, Bonner et al. describe a system in which the user touches a region of the touchscreen to select a set of characters. The system then presents those characters in a list and allows the user to drag the finger, without first lifting, to a second region, which corresponds to the character that the user wants to select, whereupon lifting the finger selects the character. In U.S. Pat. No. 5,521,986, Curtin et al. describes a similar approach, where regions are selected in combinations to form characters on a simulated LED by lighting appropriate segments. These multi-region selection approaches have the user carefully positioning both where the finger starts and where the finger ends, thus requiring the user to employ feedback from the system, such as visual or audible feedback, to ensure that accurate selections are made. Perlin (1998) ameliorates the targeting problem a little by establishing all of the regions around the position where the user first places a stylus. The user can then select the first region simply by going in the appropriate direction a sufficient distance. Even so, the user must still carefully target the second region for each character entered, keeping the user's focus on the user interface while inputting characters, sacrificing speed for accuracy.

The systems described so far employ combinations of the same class of input, that class being the selecting of keys or regions. More combinations become available by combining different classes of input. In U.S. Pat. No. 5,341,133, Savoy et al. describe a system of keys that can each be pressed not only downward but also in various directions. The key pressed and the direction in which it is moved together select a character to input. Direction is therefore another possible class of input. Savoy et al. also allows simply pressing a key downward to indicate a character. Twelve keys each supporting four directions of movement and direct pressing can together indicate 12*(4+1) or 60 distinct characters, each requiring only a single user action, which is the pressing of a key a particular direction. In U.S. Pat. No. 5,521,986, Curtin et al. apply this to regions on a touch-sensitive surface. They describe the combination of touching a region and moving a stylus or finger in a particular direction as indicating a particular character, without requiring the gesture to end in a target region. In U.S. Pat. No. 6,104,317, Panagrossi also describes a user indicating a character by touching a region and moving in a direction on a touch-sensitive surface, but further allows the user to simply touch a region to indicate a character, as done with a conventional keyboard, thus providing an analogue of U.S. Pat. No. 5,341,133 for touch-sensitive surfaces. In U.S. Pat. No. 7,694,231 B2, Kocienda et al. also describe selecting characters according to whether the user taps or gestures from a region and according to the direction gestured.

Each independent class of input available to a gesture can be thought of as a parameter of the gesture. The region or key selected is one parameter, and the direction indicated is another. In U.S. Pat. No. 7,057,607 B2, Mayoraz et al. describe several more possible parameters, including how far the finger moves, how fast the finger moves, and whether the finger goes "back" after moving in a direction. Mayoraz et al. have these parameters complementing parameters for region and direction in order to select characters for input. With so many variations available for each region, fewer regions are needed to provide the user with direct access to a full character set. Given the space limitations of portable devices, when there are fewer regions, the regions can be larger, further reducing the probability of user error. However, even with a variety of gesture parameters, all of the combinatorial systems mentioned so far, other than the chorded keyboard, have the user repeatedly moving a hand as a unit to target a finger to a particular key or region. This is analogous to fingers typing by "hunt and peck" on a conventional keyboard, and it is slow. Users can improve their rate of input by developing strategies for where they hover their fingers and for when a particular finger is used, as people do when hunting and pecking, but the user can benefit more when the system itself is specifically designed to accommodate a particular strategy of input.

Ideally, the hand would remain stationary as the fingers gesture, as done when a user touch-types on a conventional keyboard. With the hands stationary, only the fingers need move to gesture, presumably increasing the rate of input. Several patent applications describe this approach. In US20060077179 A1, Chang et al. describe calibrating a virtual keyboard according to the maximal extents of a person's hand on a touchscreen device, producing a virtual keyboard on the device appropriately sized to the hand, with the keys appropriately spaced. In US 20090237361 A1, Mosby et al. describe calibrating the positions of virtual keyboards according to positions registered for fingers and palms, with each hand possibly employing its own virtual keyboard. In PCT/NL2011/050911, Vellinga describes a system that infers the identities of fingers according to their rest locations on a touch-sensitive surface. The system establishes either a user interface widget at each finger or a miniature keyboard surrounding each finger. The character indicated is a function of the identity of the widget or key selected. In US20130113714 A1, Mao describes a similar system that assigns a keypad to each finger. A finger either taps one of the keys assigned to it or simply moves in a direction of a key to select the key. Mao also allows for the system to monitor the directions of movements of the fingers to calculate "median directional angles" for each finger. Mao employs the median direction angles to orient each keypad to align its keys with the direction in which fingers flex and extend, making the keys easier for the fingers to touch.

Each of these hand-calibrated systems associates individual fingers with multiple keys, although Mao allows for a finger to indicate a key, and thus a character, simply by the direction of movement of a finger. Mao includes keyboards that associate some keys each with only one finger but suggests using "more keys per finger in order to cover the whole alphabet." Each of these systems has each finger of a hand moving independently in any direction. Any of these systems can be conceived in simple form selecting only from two keys along the direction of extension and flexion for a finger, but none is capable of selecting more than two characters per finger under this restriction. Three characters per finger are possible if tapping a key also inputs a character. In order for these systems to provide more than three characters to a finger moving only by extension and flexion on a stationary hand, multiple keys must be stacked along the finger's nearly linear path of extension and flexion. If multiple keys are stacked along a line, the user must accurately place fingers when touching or lifting from the surface, in order to select the proper key, forcing the user to carefully train each finger to target specific locations on the screen. Some users may be able to learn to gesture with such accuracy, but stacking keys probably leaves most users frequently making mistakes. None of these hand-calibrated systems, as described, provides an accurate and efficient means for rapid character input into a touchscreen.

A solution combining several of the above approaches helps to address some of the problems with any individual approach. In particular, extending the Vellinga and Mao combination by allowing a finger to input multiple gesture parameters during a gesture gives each finger access to many more characters without requiring the fingers to target specific regions. For example, the direction that a finger moves and the distance that a finger moves can together indicate a character. However, existing solutions that involve gesture parameterization and calibrating for a hand, including Mayoraz et al., have fingers selecting from among multiple keys or regions as part of the process of selecting a character. Additional insight is needed to realize that individual fingers do not need access to multiple keys or regions, that each finger can be assigned a single key or region and yet still provide access to all the characters of an alphabet and more. That is, each Vellinga or Mao keypad need only have a single region, and the user need only input gestures with a variety of gesture parameters; the user need not target individual fingers to multiple keys.

Suppose a solution combines one of these hand-calibrated systems with Mayoraz et al. using only one region per finger. Most of these hand-calibrated solutions place keys to the left and right of each finger, as well as farther from the hand and closer to the hand, and Mayoraz et al. has no concept of assigning keys to individual fingers. The combined Mayoraz et al. solution, given the non-obvious constraint of one region per finger, would supplant keys with directions, requiring each finger to move in any of four directions or more, as with the originally described hand-calibrated systems. Mao includes some fingers that are each associated with only one key, but Mao assigns a letter of the alphabet to each of four directions for each key, further suggesting that the most apparent solution to providing broad coverage of characters at one region per finger requires distributing frequently entered characters over four directions.

Moreover, in a combined hand-calibrated Mayoraz et al. solution, if each finger is restricted to only moving forward and backward in order to keep the user from having to realign the hand between characters, an additional problem arises. Consider the Mayoraz et al. gesture parameters that can be input at high speed: direction, length, and reversing direction. Users can readily be expected to learn to gesture at two gesture lengths, and three gesture lengths may also be possible, though probably with less accuracy. At two gesture lengths, with only two directions and an optional reversal of direction, four fingers can input 4*2*2*2 or 32 characters. At three gesture lengths the number of characters available is 4*3*2*2 or 48 characters. 32 characters are not sufficient to represent 26 letters and 10 digits. 48 characters approaches the number of keys on a keyboard, but it is at a cost of accuracy as users attempt to reliably select among three gesture lengths at high speed. Allowing taps to represent characters increases the count by 4, for four fingers. Mao describes the taps of adjacent fingers also indicating characters, but this only adds an additional 3 characters. Hence, it is not clear that restricting fingers to two directions of movement is feasible in even a hand calibrated Mayoraz et al. style system, further inclining developers to broadly distribute the characters over four or more directions per finger even in this combined system.

Still additional insight is needed. First, it must be understood that a user gestures most rapidly when the hand remains stationary even as the fingers move. Second, an additional gesture parameter is needed that satisfies this first constraint and yet still greatly increases the number of characters available. Because users do not remember combinations of fingers well, and because it takes effort to learn to use fingers independently, chorded keyboards are an unlikely source of inspiration for a solution. Yet chorded keyboards do suggest a solution: the combination of fingers gesturing can further select the character being input. For example, the index finger gesturing in a certain direction for a certain length would indicate one character, while both the index finger and the middle finger gesturing for a certain distance and length would indicate another character. The region that a finger initially touches would identify the finger, and multiple fingers could simultaneously touch multiple regions and simultaneously perform a gesture to input a particular character. The problems associated with chorded keyboards can be avoided by limiting the finger combinations that users must learn. Multi-finger gestures are easy to perform when all of the fingers of the gesture are adjacent, and adjacent multi-finger gestures can be sorted from left to right for a given number of participating fingers, facilitating the association of sets of gestures with sets of characters.

Prior art includes gesturing from combinations of regions to input combinations of characters. In U.S. patent application U.S. Pat. No. 8,359,543 B2, Sengupta describes multiple fingers selecting multiple regions and gesturing simultaneously to input a word. Each region corresponds to a character, and the combination of characters selected together indicates the word, usually selecting a word that includes the characters indicated. There are single character words, such as the words "a" and "I" in English, but U.S. Pat. No. 8,359,543 B2 appears to be directed at simplifying the entry of strings of characters, and it is not clear that the inventor contemplated selecting multiple regions and gesturing to input either single characters or single character words. Even if single character words were within the scope of U.S. Pat. No. 8,359,543 B2, it would not be clear that the invention would be able to input more than just a few characters, because most languages have few single-character words. Moreover, it may not be obvious that an efficient gesture system can actually depend on users gesturing numerous combinations of fingers for frequently entered characters such as letters, that multiple multi-valued gesture parameters can be reliably defined for multi-finger gestures, or that multi-finger gestures can be made more efficient by tailoring the system to the hand.

Finally, there is a fundamental difference between selecting keys and gesturing to input characters that none of these solutions accommodates. When a number of characters are associated with a particular region, the user selects the region to input one of the characters. If selecting a character entails gesturing a distance, as it does when inputting gesture parameters such as those of Mayoraz et al., the finger may move off of its starting region as it gestures. This need not affect the character indicated, but it does inconveniently place the finger for the next gesture, especially if the next gesture is to travel in the opposite direction. The finger must first locate the intended region again before inputting another character. If there is only one region per finger, this unnecessarily slows the user down and reduces user accuracy. Regions should instead be sized to accommodate the lengths of at least the frequently input gestures. That is, the ideal system does not provide each finger with a key (or with multiple keys) but rather with an area for gesturing.

4 SUMMARY OF THE INVENTION

The present invention is a system for rapid data input via gesturing. This specification refers to the system as a "finger-mapped gesture system," often referencing the system simply as the "gesture system." In its basic embodiment, a finger-mapped gesture system is a type of user interface for inputting data into a touch-sensitive surface. It is analogous to a virtual keyboard, and it is intended to replace the virtual keyboard in its most common application. Unlike a virtual keyboard, the gesture system has no buttons and requires no visual user interface elements. Instead of identifying inputs according to buttons pressed, a finger-mapped gesture system identifies inputs according to the particular fingers of a hand that gesture and according to the gestures that the fingers perform. The gestures are designed to allow the user to input with a hand maintaining a posture similar to the posture of a hand in home position while typing on a conventional keyboard. FIGS. 3A-3C illustrate this posture, which is called "finger mapping posture." Although the gesture system is optimized for text entry, its gestures can be used to indicate any sort of user request, such as requests to perform application functions or to perform musical notes. The invention encompasses not only finger-mapped gesture systems overall but also various embodiments of these gesture systems and inventive techniques for optimizing their performance.

A finger-mapped gesture system relies on determining the identities of gesturing fingers, which entails distinguishing the different fingers of a hand with some reliability. Either the input device provides the finger identities or the gesture system infers them. When the device does not provide identities, the gesture system divides an input area on the touchscreen into regions and associates each region with a different finger. This collection of regions is called a "finger map." The regions are analogous to buttons or keys, but because regions correspond to distinct fingers, there are far fewer of them than there are buttons in a normal character entry system. Moreover, the gesture system does not provide any one finger with more than one region to choose from, contrary to traditional systems that make multiple buttons available to a finger for inputting characters. The regions of a finger map are ideally adjacent and contiguous to optimize the space available to each finger. Each region provides a space for its associated finger to either gesture or touch and hold to perform a shift function. According to a simple embodiment of the invention, the region that a finger initially touches when gesturing provides the finger's identity. FIGS. 7A-7N depict a variety of possible finger maps.

To employ a finger map, the user positions a hand in finger mapping posture over the input area so that each finger is above its associated region. This position is called the "home position" for the hand. The physical keys on the home row of a conventional keyboard provide tactile feedback for properly placing the fingers, but a touch-sensitive surface normally cannot provide such feedback. Moreover, optimal gesturing with this system requires that the fingertips be roughly under the knuckles, preventing the user from spreading the fingers out to use a potentially larger one-size-fits-all finger map. The finger map should therefore be configured specifically for the particular hand of a particular person. The most important property of a finger map is the relative sizing and spacing of its regions. Regions should be aligned to the natural rest locations of a user's fingers when the user places the hand in finger mapping posture. The gesture system should calibrate the finger map to these rest locations prior to receiving gestures for user requests. There are various ways to accomplish this, including allowing the user to select from predefined finger maps and allowing the user to variably select the spacing of the regions. This specification defines several calibration gestures that a gesture system could allow a user to perform to specify a hand calibration. FIG. 38 illustrates some of the properties that may characterize a hand calibration.

Once the user has a finger map suitable for the user's hand, the user positions the hand over the finger map and gestures, allowing each finger to touch its associated region. The primary gestures are "strokes" and "sweeps." A "stroke" is a gesture in which a single finger touches the touchscreen, moves in a direction, and then lifts. A "sweep" is a gesture in which two or more fingers touch the touchscreen, move in a direction together for approximately the same distance, and then lift. FIGS. 14A-14H depict fingers in various combinations performing sweeps in various directions. The combination of finger identities used to perform the gesture and the direction in which the gesture moves together indicate a particular user request. The finger identities and the direction are gesture parameters of the gesture. The user request is a function of the values of the gesture parameters. Another useful gesture parameter is gesture level. Gesture level is an indication of the distance that the gesturing fingers move, with different ranges of distance selecting different gesture levels. For example, a gesture system with only two gesture levels has a single threshold distance below which one level is indicated and above which the other level is indicated. FIGS. 35A-35D and 36A-36D depict examples of gestures using these three gesture parameters to input letters for strokes and sweeps, respectively, where the letters appear in single quotes.

If the hand moves out of home position while gesturing, the hand must first move back to home position to properly align fingers with the finger map before gesturing again. This is inefficient. To maximize the rate of input, the hand should leave home position only infrequently. The gesture system accomplishes this in part by maximizing the number of user requests available to fingers that only extend and flex while in home position. Finger extension and flexion are more intuitively called "forward" and "backward" movement, respectively. Movement along this dimension is called "longitudinal" movement, and a path available to a finger performing longitudinal movement is called a "longitudinal path." Restricting each finger to two directions greatly reduces the number of gestures available to each finger. Multi-finger sweep gestures improve the situation by allowing users to select fingers combinatorially, but the chorded keyboard proved that users do not remember arbitrary combinations very well. Moreover, it is a skill to be able to move fingers independently for arbitrary combinations. Users do readily move series of adjacent fingers together as a unit, though, and for a given finger count, combinations of adjacent fingers can be ordered on the hand from left to right. For example, the index-middle finger combination is to the left of the middle-ring finger combination, which is to the left of the ring-pinky finger combination. These combinations can be assigned sequential letters of the alphabet, thus minimizing the skill required to perform the gesture while also making the combinatorial series memorable. The gesture system further improves the efficiency of data input by assigning the most commonly input characters, particularly letters, to longitudinal gestures.

Ideally, one hand would be able to hold a portable touchscreen device while the other performs rapid data entry on the device, particularly for inputting characters. This requires making as many characters as possible available to a single hand that is primarily gesturing longitudinally. The inventor has found that it is probably best to place characters at no more than two distinct gesture levels. Four fingers gesturing in two directions with at most two distinct gesture levels, either singly or in combinations of adjacent fingers, provides access to 40 user requests. This is not enough to represent a conventional keyboard. It is an option to provide a button that acts as a shift key, but it is more helpful to expand the gesture parameters that are available to gesturing fingers. As with direction and gesture level, it must be possible to input these additional gesture parameters by gesturing each finger along a single longitudinal path while the hand remains in home position. Gesture parameters that can select among multiple values while restricted to longitudinal paths are "longitudinally selectable" gesture parameters. FIGS. 8A and 8B illustrate the longitudinal selectability of gesture level and gesture direction for strokes and sweeps, respectively.

It is not sufficient for a gesture parameter to be longitudinally selectable. The primary purpose of finger-mapped gesture systems is to provide for the rapid input of data, and rapidly moving fingers cannot reliably target specific areas of the touchscreen during the gesture. It should therefore be possible for the user to perform a longitudinal gesture to select the same user request for the same actions of the same fingers, regardless of where the fingers start within the input area or their associated regions, and regardless of where the fingers end, subject to boundary constraints that may invalidate the gesture. Such a property would also allow the user to remain focused on the data being input and not have to look at the fingers to place them. That is, the gesture parameters of longitudinal gestures should be independent of their start and end locations except as needed to determine finger identities. This property is called "position independence." It is overly restrictive to require that gesture parameters be position-independent, however. There can be utility in treating gestures that end outside the input area differently from those that end inside the input area, provided that the input area is large enough to accommodate rapid input patterns of gesturing.

Gesture parameters can be further characterized by whether or not they are "path-dependent." A "path-dependent" gesture parameter is a function of a path of a gesturing finger, so that the gesture that the user performs actually influences the value of the gesture parameter. Each figure-mapped gesture includes at least one path-dependent gesture parameter, further distinguishing finger-mapped gesturing from gesturing on chorded keyboards. Gesture level and gesture direction are examples of path-dependent gesture parameters. "Backbrush level" is another path-dependent gesture parameter. Gestures have a backbrush level of zero by default, and the backbrush level is increased to one by reversing the direction of the gesture after having moved the fingers in a direction but prior to lifting the fingers. Higher backbrush levels may be indicated according to the length of the reversal leg of the gesture, analogously to indicating a gesture level by the length of the first leg of the gesture. Gesture level, gesture direction, and backbrush level can all be implemented longitudinally selectable and position-independent. For example, FIGS. 8A and 8B illustrate the use of gesture level and gesture direction to select characters. In these figures, it does not matter where any finger begins gesturing within a region. All that matters are the fingers that gesture, the direction in which they gesture, and how far they gesture forward or backward.

This specification defines two gesture parameters that can modify strictly longitudinal gestures without modifying the gestured paths. The first is the "touch count." By default, gestures have a touch count of one because the fingers have only touched the gesture surface once to perform the gesture. To increase the touch count, the fingers involved in the gesture tap the touch surface one or more times immediately prior to gesturing. To gesture with a touch count of two, the user taps the touchscreen with the fingers that will be gesturing, lifts the fingers, and then touches again to perform the gesture, all in rapid succession. The user can perform additional taps prior to gesturing to further increase the touch count. The number of touches parameterizes the gesture. The second gesture parameter is the "shift hold." Being similar to the state of the shift key on a keyboard, a shift hold has a default shift mode. A gesture system can readily provide shift buttons for fingers that are not gesturing, such as for the thumb if there is enough room on the touchscreen, but the gesturing fingers can also perform shifts. A finger that can gesture performs a shift simply by touching and remaining motionless while other fingers gesture. The combination of finger identities remaining motionless indicates the shift mode and serves as an additional gesture parameter.

Recall that gesturing solutions for inputting characters typically ensure that multiple keys are conveniently accessible to individual fingers. Were a finger-mapped gesture system to make multiple keys conveniently accessible to each finger, the user might accidentally select one of the keys during a session of rapid gesturing. So while it may be useful to place keys within reach of gesturing fingers, they are best placed at inconvenient distances. Consider that in order to maximize the rate at which a user can gesture, it should be possible for the user to perform a gesture in one direction, to briefly lift the finger, and then to place the finger back down on the gesture surface exactly where the finger just lifted in order to perform a gesture in the opposite direction. This observation quantifies both a region's ideal size and the minimum distance at which to place surrounding keys: a region should be at least as long, in the longitudinal dimension, as the longest gesture that the user is likely to perform. Ideally, a region should be as long as the longest available gesture. In a gesture system supporting gesture levels, this is at least as long as a second-level gesture. Recognizing that users tend to begin gesturing near the centers of minimally sized regions, it is better still for regions to be at least twice as long as a second-level gesture. After all, a region is not a key that a finger presses, but rather a surface for gesturing. These observations apply equally well to systems in which the host provides finger identities and there are no regions, as they still characterize the ideal minimum length of the input area in the longitudinal dimension.

The specification also describes generalized embodiments of finger-mapped gesture systems. The device can have multiple distinct gesture surfaces on which the user can simultaneously gesture, possibly one for each finger. Each of these surfaces is called a facet. Finger maps positioned on the facets can have additional properties that assist the user with gesturing, beyond just the relative spacing of regions. These properties include shaping the regions to accommodate the natural directions of movement of a user's individual fingers. The properties also include associating each finger with a distinct forward and backward direction, also according to what is most natural for finger. This latter feature is most useful when the gesture system also supports left and right finger movement and must accurately distinguish the left and right directions from the forward and backward directions for each finger. Calibration gestures provide convenient ways for users to specify calibrations for finger maps, enabling multiple users to gesture simultaneously into different input areas on the same surface. The gesture surface itself need not be a touchscreen, as finger-mapped gesture systems can be defined for any mathematical surface that distinguishes between touching and not touching. The specification attempts to capture the full scope of the space to which these gesture systems apply in a generic class of device called a "touch device."

The present invention is further directed to computer readable media carrying executable code for implementing all of the processes disclosed herein, and the present invention is further directed to systems for performing all of the processes disclosed herein.

5 BRIEF DESCRIPTIONS OF THE DRAWINGS

The drawings reflect the fact that finger-mapped gesture systems can accommodate gestures that a user inputs either by flexing and extending the fingers of a stationary hand or by moving the fingers side-to-side and thus also moving the hand. Even so, the invention is primarily directed at gestures that travel paths along which fingers may flex and extend. The paths of extension and flexion are relatively straight in comparison with their lengths, and depicting them as such would have diminished or even masked details and distinctions that are relevant to the drawings and their accompanying discussion. Most drawings of paths therefore also represent exaggerations of the possible properties of paths of flexion and extension for tutorial purposes. In any case, many of the illustrated techniques apply regardless of whether the fingers flex or extend.

All measurements and proportions depicted in the drawings are estimated and not necessarily exact. When symbols are present, the relevant measurements, proportions, and positions of elements in the drawings are indicated by the symbols and by relationships among them.

FIGS. 14A-14H depict a hand performing two-fingered sweeps and three-fingered sweeps in various directions.

FIGS. 15A-15C depict a hand performing holds with various fingers while gesturing with the remaining fingers.

FIGS. 28A-28G depict a process for determining a discrete direction for a two-fingered sweep in which each finger is on a separate facet.

FIGS. 41A-41F depict justifications for several gesture accommodation lengths.

FIGS. 47A-47F depict some ways to derive forward angles from partial hand calibrations.

FIGS. 56A-56C depict evaluations of a stroke and a sweep performed on a finger map derived from geometric elements, where each finger has its own forward direction.

FIGS. 57A-57C depict evaluations of a stroke and a sweep on a divided input area not having a finger map, where each finger has its own forward direction.

Figure 61A:
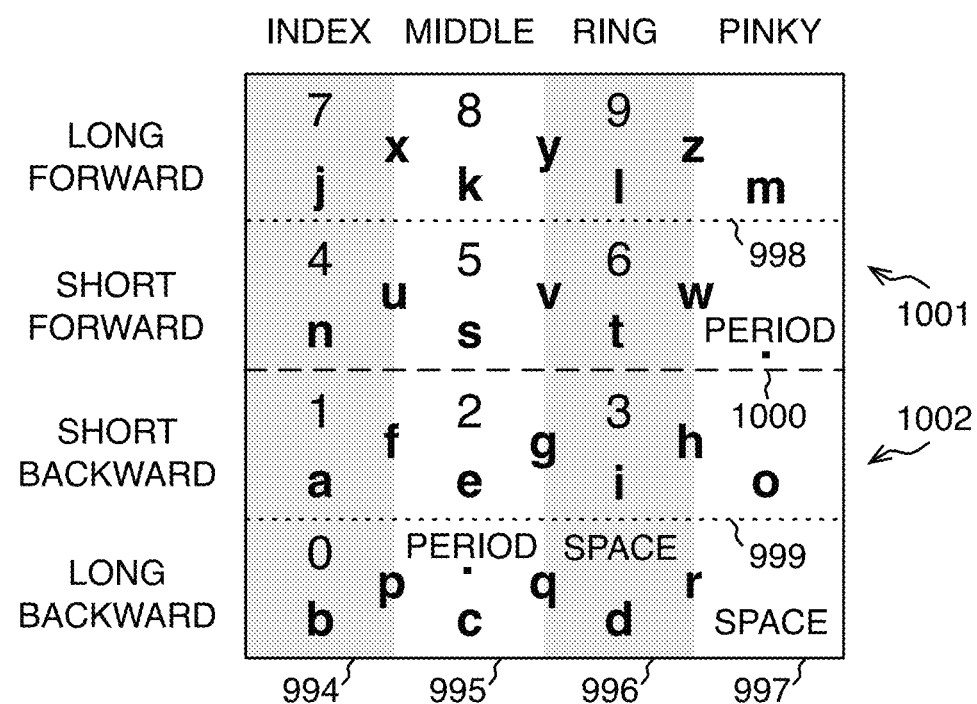
Figure 61B:
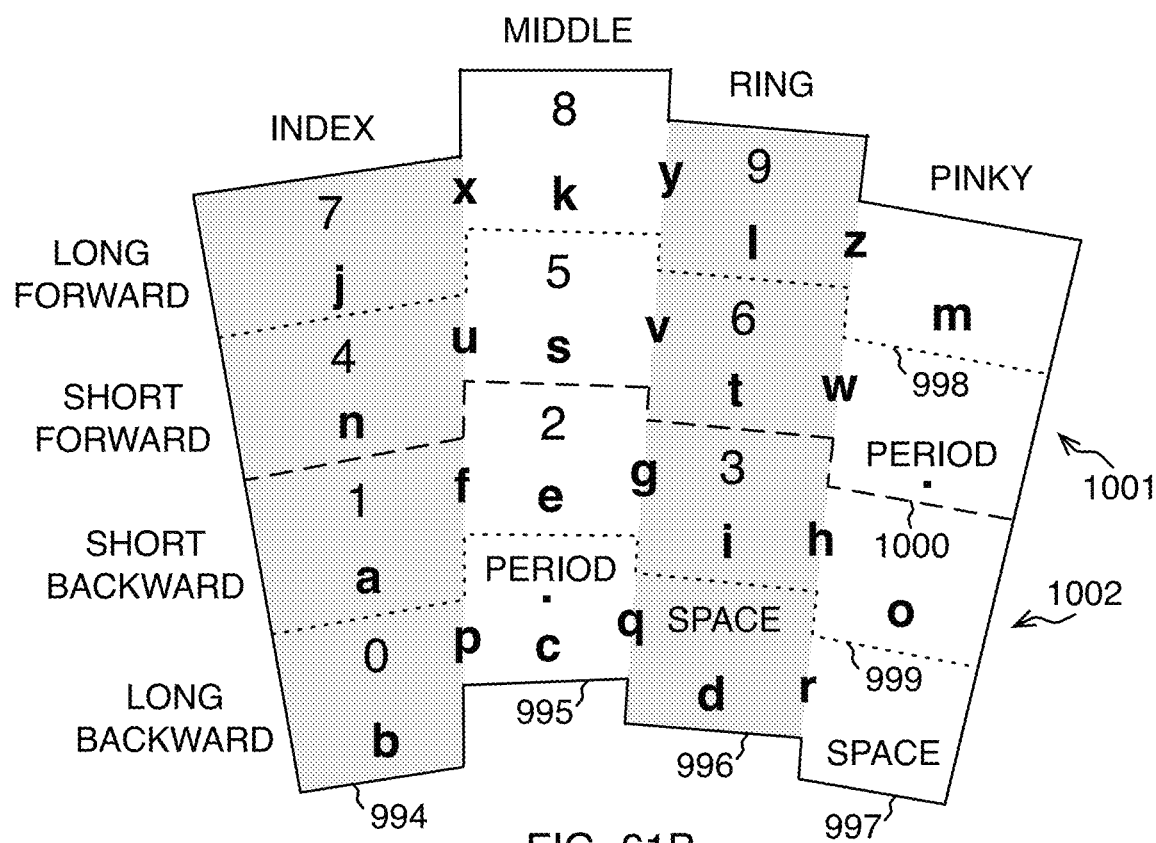

FIGS. 61A-61B each depict a mapping of gesture parameterizations to characters for the accompanying sample implementation.

Figures 62A, 62B:
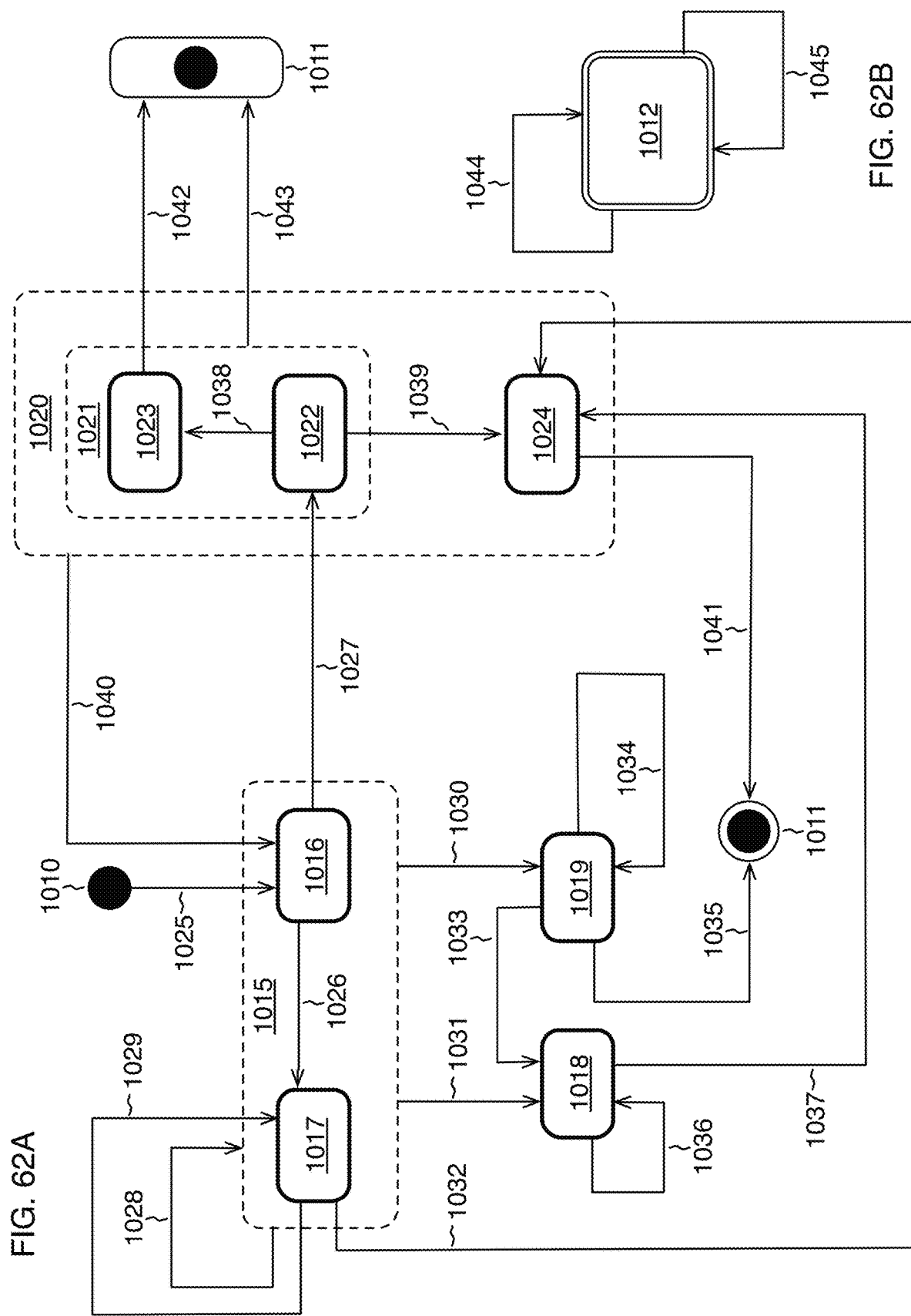

FIGS. 62A-62B depict the state machine of the sample implementation's finger tracker component.

Figure 63:
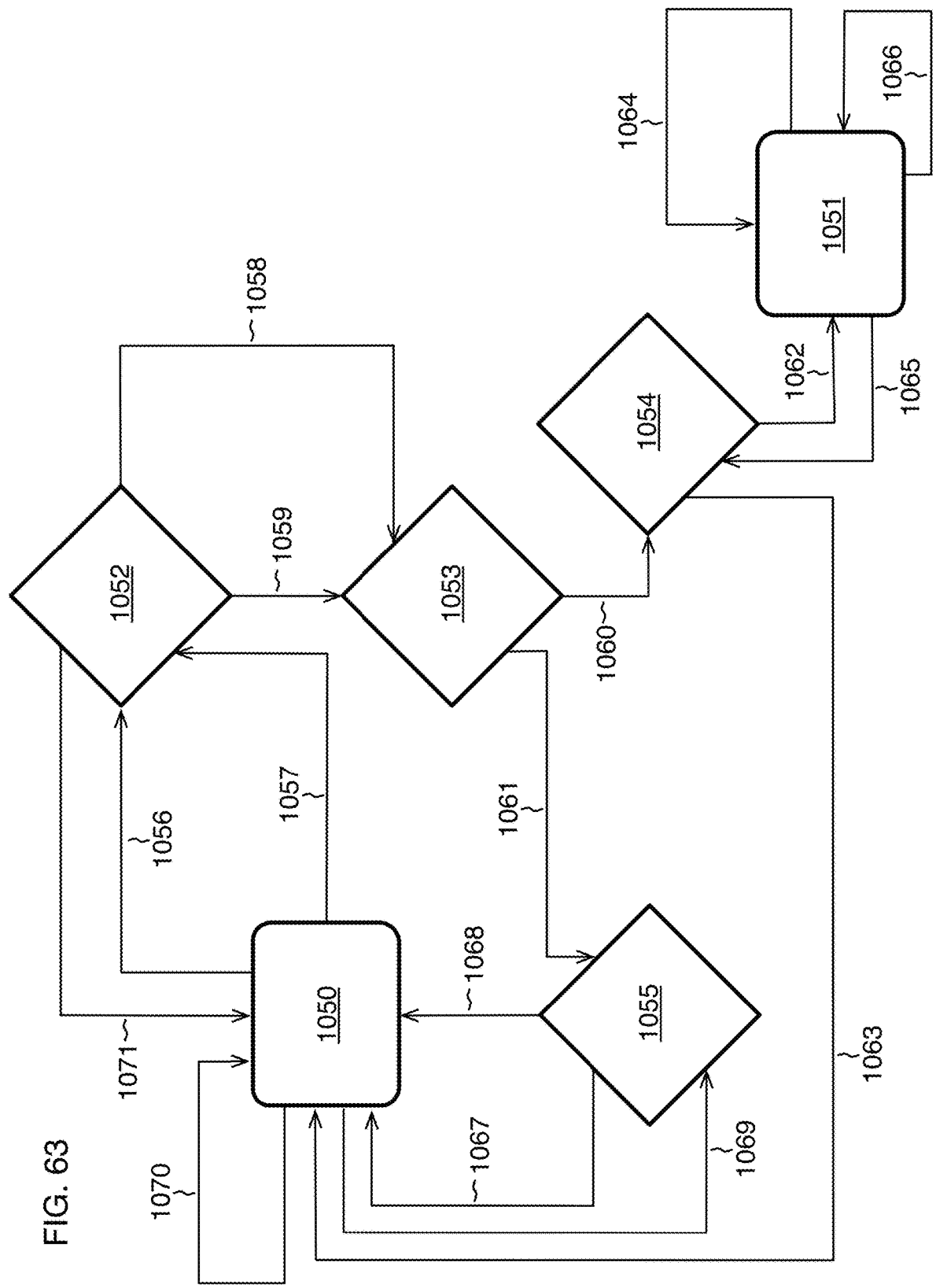

FIG. 63 depicts the state machine of the sample implementation's session engine component.

Figure 64:
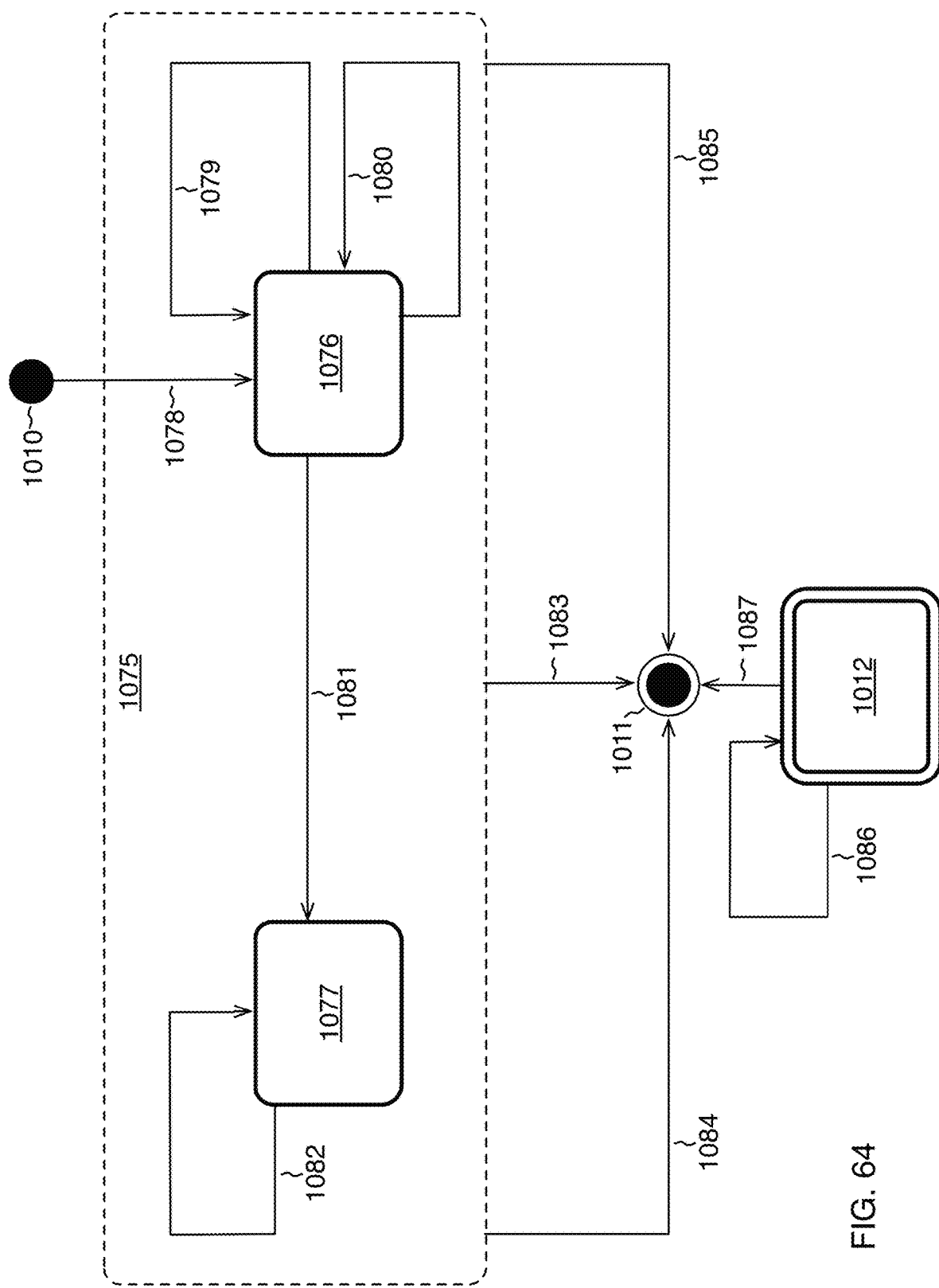

FIG. 64 depicts the state machine of the sample implementation's stroke detector component.

Figure 65A:
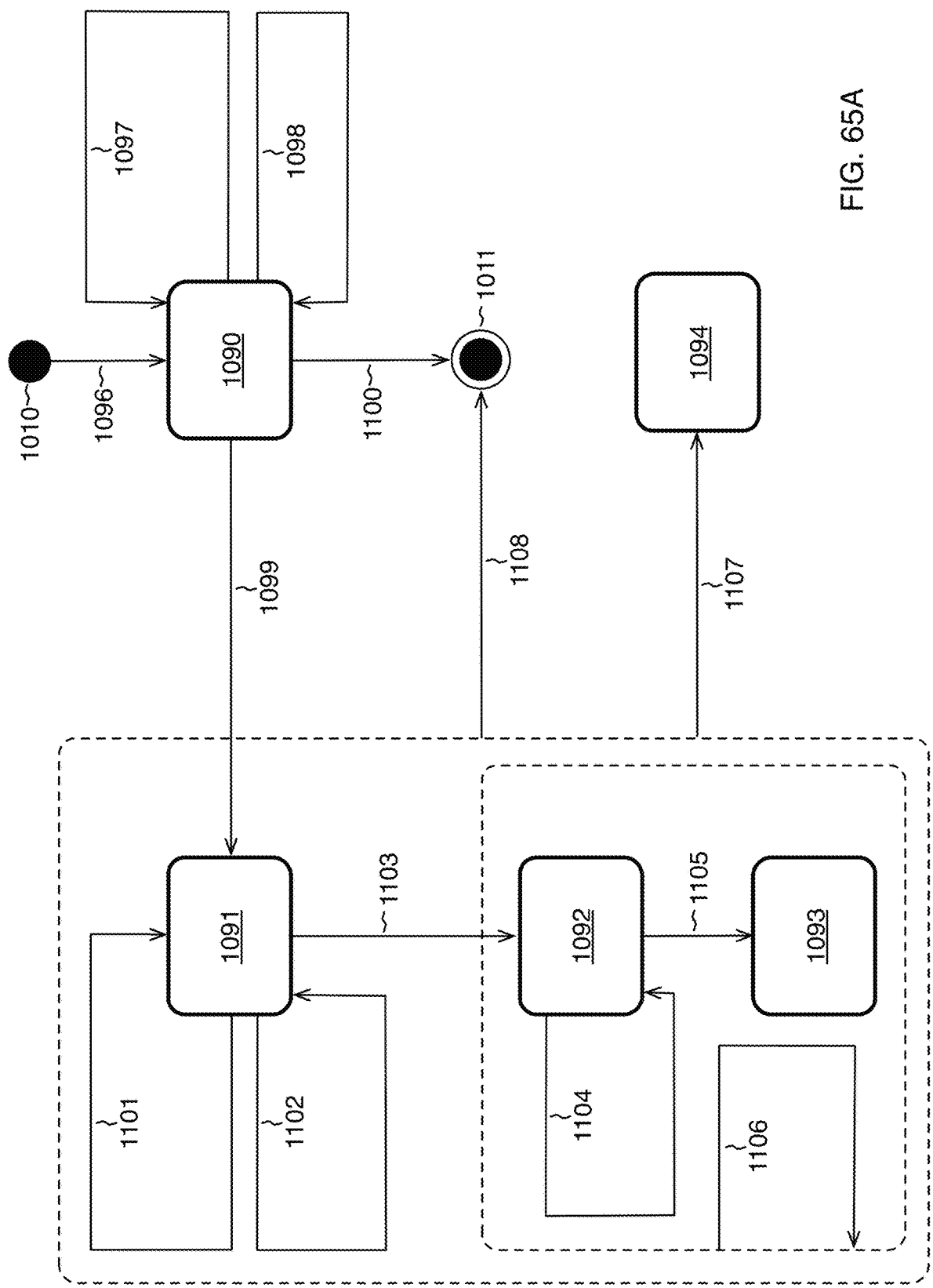
Figure 65B:
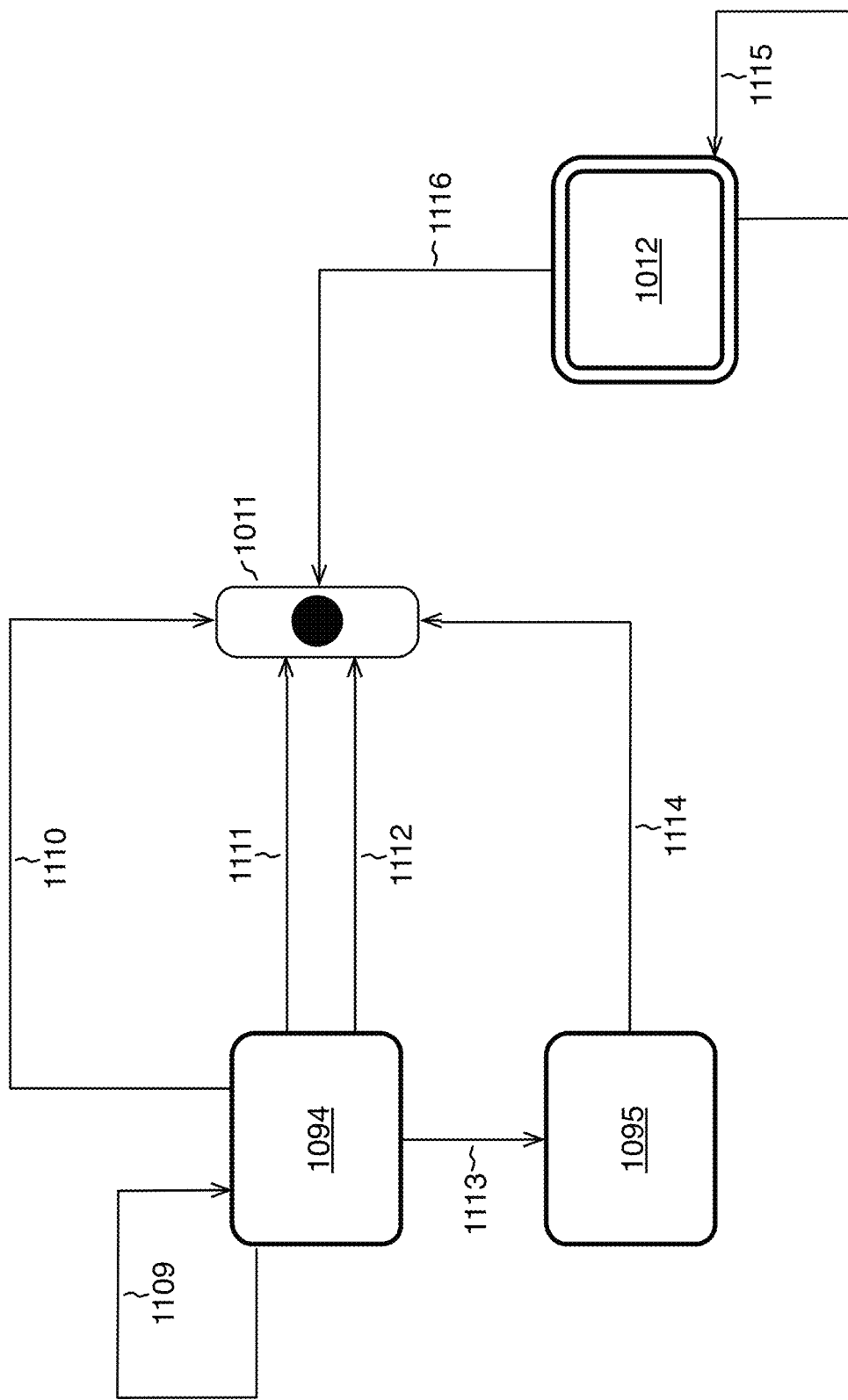

FIGS. 65A-65B depict the state machine of the sample implementation's two-fingered sweep detector component.

Figure 66A:
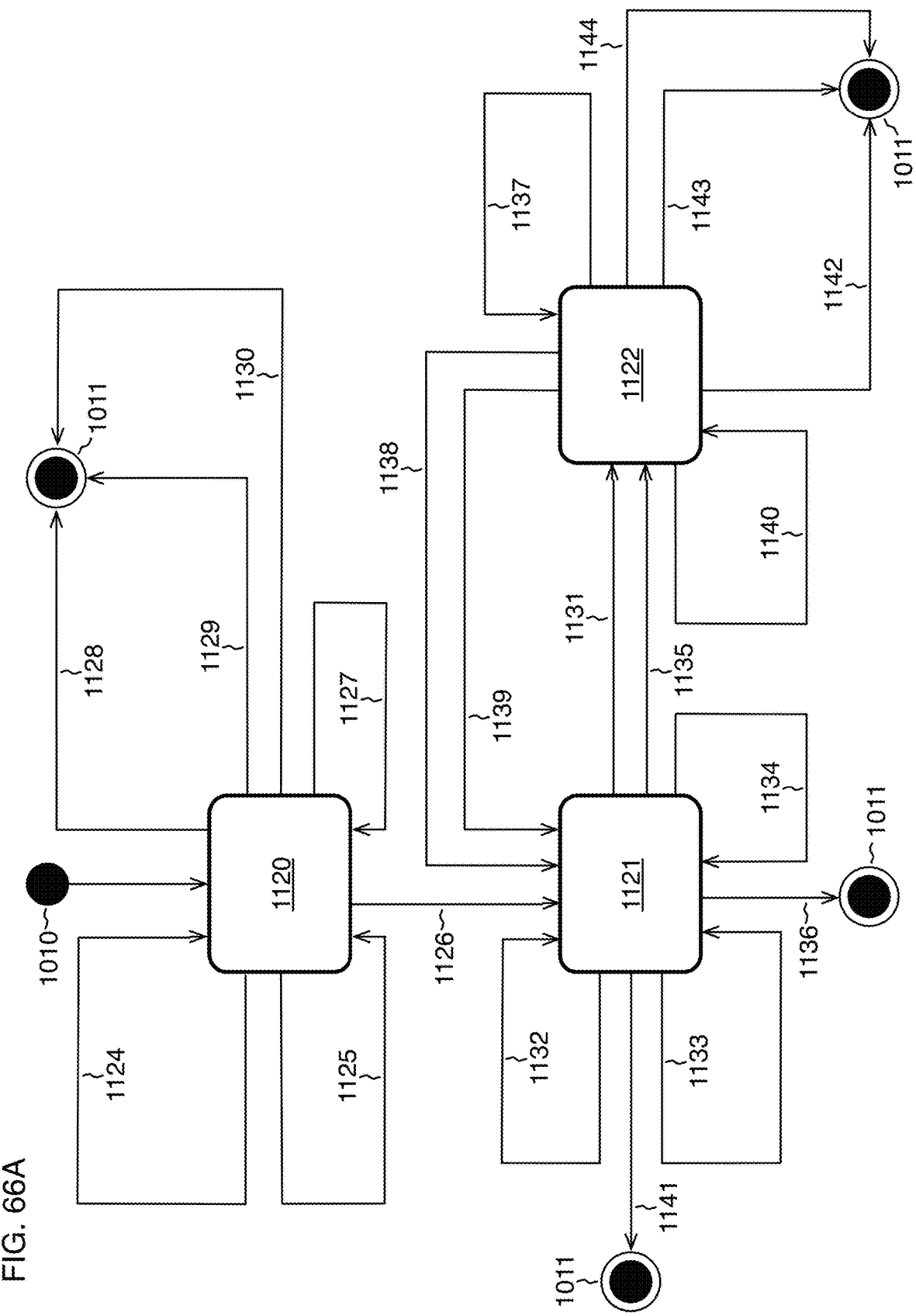
Figure 66B:
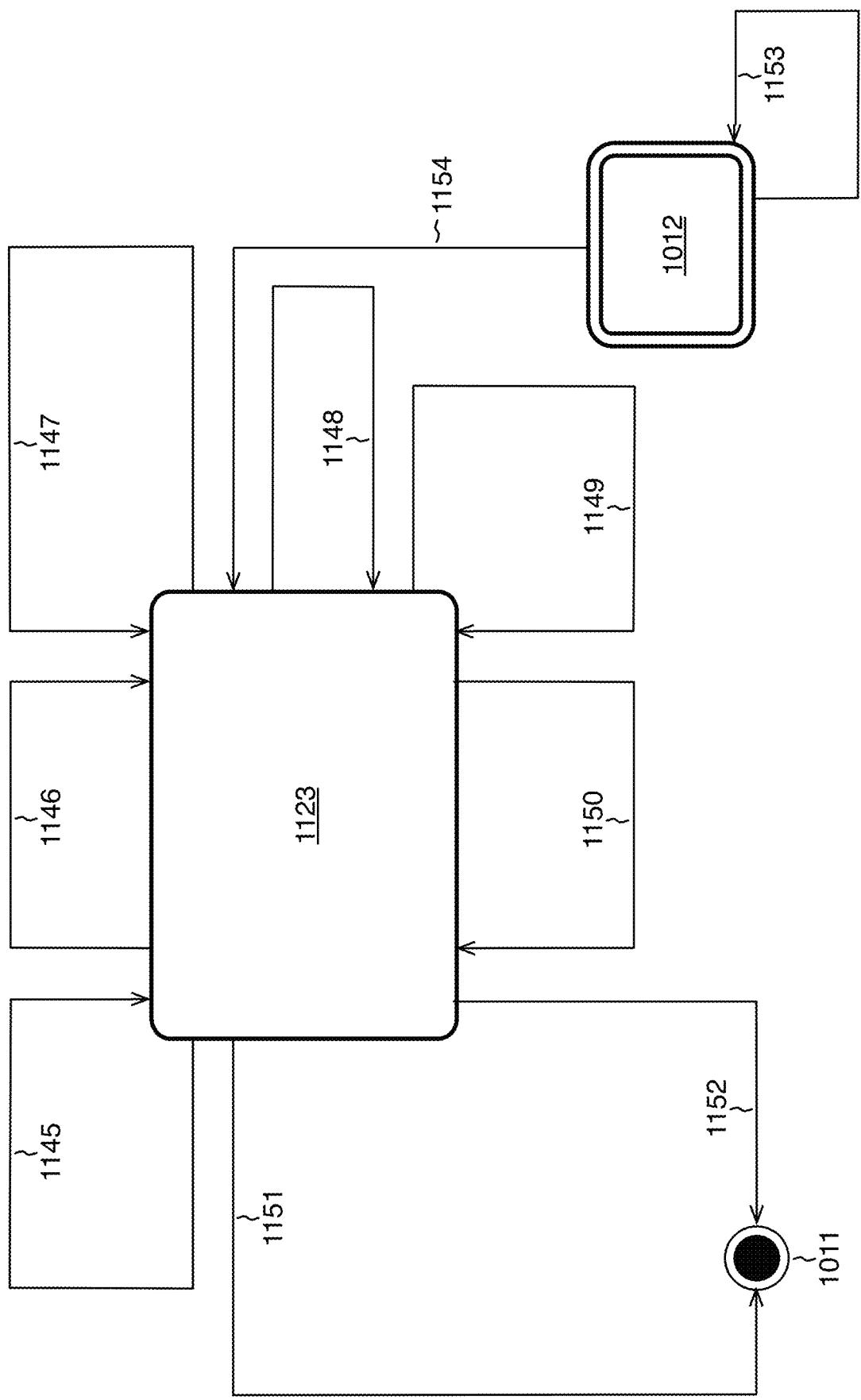

FIGS. 66A-66B depict the state machine of the sample implementation's calibration detector component.

6 REFERENCES CITED

Goldberg, David, & Richardson, Cate. (1993, Apr. 24-29). Touch-Typing With a Stylus. In Ashlund, S., et al. (Eds.), *Proceedings of the INTERCHI '93 Conference on Human Factors in Computing systems*. Paper presented at INTERCHI 93: ACM INTERCHI Conference on Human Factors in Computing Systems, Amsterdam, The Netherlands (pp. 80-87). Amsterdam, The Netherlands: IOS Press.

MacKenzie, Scott I., & Zhang, Shawn X. (1999, May 15-20). The Design and Evaluation of a High-Performance Soft Keyboard. In Williams, Marian G., & Altom, Mark W. (Eds.), *Proceedings of the SIGCHI conference on Human Factors in Computing Systems*. Paper presented at CHI 99: ACM SIGCHI Conference on Human Factors in Computing Systems, Pittsburgh, Pa. (pp. 25-31). New York, N.Y.: ACM.

Perlin, Ken. (1998, Nov. 1-4). Quikwriting: Continuous Stylus-based Text Entry. In Mynatt, Elizabeth, & Jacob, Robert J. K. (Eds.), *Proceedings of the 11th annual ACM symposium on User interface software and technology*. Paper presented at UIST98 Eleventh Annual Symposium on User Interface Software and Technology, San Francisco, Calif. (pp. 215-216). New York, N.Y.: ACM.

U.S. patent application US 2002/0136371-A1, Bozorgui-Nasbat

PCT/US2012/064563, Bonner et al.

U.S. Pat. No. 6,104,317, Panagrossi

U.S. Pat. No. 7,057,607 B2, Mayoraz et al.

U.S. Pat. No. 5,521,986, Curtin et al.

U.S. Pat. No. 5,341,133, Savoy et al.

US20060077179 A1, Chang et al.

US 20090237361 A1, Mosby et al.

PCT/NL2011/050911, Vellinga

U.S. Pat. No. 7,694,231 B2 Kocienda et al.

US20130113714 A1, Mao

U.S. Pat. No. 8,359,543 B2, Sengupta http://en.wikipedia.org/wiki/Letter_frequency (Aug. 28, 2013)

7 DETAILED DESCRIPTION OF THE INVENTION 7.1 System Architecture

A user inputs a finger-mapped gesture into a "touch device" that includes one or more surfaces that the user touches. Each of these surfaces is called a "facet." The facets may support multiple hands or they may operate together in a way that supports input across them by a single hand. It is sufficient for a touch device to have a single facet on which multiple fingers of a single hand may gesture. To simplify exposition, this specification maps the surfaces of all of the facets to a single mathematical surface called a "gesture surface," so that each facet occupies a portion of the gesture surface. One or more areas of the gesture surface—each encompassing portions of one or more facets—are designated for receiving finger-mapped gestures. Each of these areas is called an "input area" 8. A class of program called a "gesture system" 7 monitors each input area for gestures and translates the gestures into "users requests," which it sends to an external host system to act on.

7.1.1 Basic Terminology

A "gesture input device" is a hardware device that is capable of receiving gesture input from fingers. A "finger" is any finger of a user's hand, including the thumb. An "action" or "user action" is an activity that a user performs with one or more fingers while inputting a gesture into the device, such as touching the device at a certain location or moving a finger while touching the device. A user inputs a gesture to cause the device to produce an effect that is specific to the gesture.

A user gestures into a "gesture interface," which is a configuration of hardware and program logic that is capable of receiving gestures. A gesture input device may correspond to a single gesture interface, but a single input device may also support multiple logically distinct gesture interfaces. For example, multiple areas of a single touchscreen can each be a distinct gesture interface capable of receiving gestures. This allows different areas of the touchscreen to support different kinds of gestures, and it allows the meaning of any kind gesture to be a function of the area into which the gesture is input. It also allows the touchscreen to independently input from multiple hands at once.

Each gesture interface employs a gesture system. The "gesture system" 7 is the program logic that attempts to interpret finger actions as gestures. The gesture input device reports finger actions to the gesture system in the form of "input events." The device need not pass input events directly to the gesture system, as it could first report finger action information to an intervening operating system or application, which then packages the information in the form of input events and passes the input events to the gesture system. The gesture system processes individual series of input events, attempts to recognize specific types of gestures, and reports the results of the attempts as gesture outcomes. The gesture system need not report unrecognized gestures.

A "gesture outcome" is a characterization of an attempted gesture. Each is either a user request or an indication that no gesture was recognized. A "user request" is a specification for a behavior, particularly a specification indicating a behavior that a user appears to be asking a host to perform. A "behavior" is a specific function that the host can perform, such as inserting a character into text, deleting a character from text, moving the cursor, or invoking a menu item. For example, a user may input a gesture whose gesture outcome is a user request to insert text from the operating system clipboard. A user request either directly identifies the behavior, in which case the gesture interface has knowledge of the behaviors available, or it indirectly identifies the behavior via a characterization of the gesture, in which case the host takes responsibility for determining the intended behavior. For example, a user request might characterize a gesture as a long forward stroke of the index finger, which the host might interpret as a request to insert the letter 'f'.

The "host" 4 is the system external to the gesture system with which the gesture system communicates. The host includes the operating system or application to which a gesture system reports gesture outcomes and that responds to the gesture outcomes by performing behaviors. The host normally provides the gesture system with input events. However, in implementations where the device messages the gesture system directly, the host may also include the gesture input device. This general use of the word "host" helps to reduce the permutations of concern to this specification.

The specification only concerns itself with the kind of gesture input device that is capable of supporting finger-mapped gestures. This class of device is called a "touch device." Henceforth, all references to a "device" are references to a touch device. In addition, unless otherwise stated, a reference to a "gesture system" is a reference to a finger-mapped gesture system.

7.1.2 Touch Devices and Facets

A "touch device" is a gesture input device that receives input via one or more surfaces that users touch with their fingers. Each surface is called a "facet" of the device. Facets include touchpads that do not serve as displays, such as those included with laptop computers, and touchscreens that also serve as displays, such as those included with smartphones and tablets. Some emerging technologies detect touch on arbitrary surfaces, allowing nearly any surface to serve as a facet. The surface may even be curved if the curve is gentle enough to support finger-mapped gestures over short distances. The device need not require that fingers touch facets directly, as the device can instead monitor physical extensions of fingers or other proxies for fingers.

What it means for a finger to "touch" a facet depends on the specific kind of touch device. Examples of possible kinds of touching include the finger simply making contact with a facet, the finger pressing with a certain degree of pressure, or the finger passing through a facet that is permeable or that is only spatial or virtual in construct. Mechanisms for detecting touch include resistance sensing, capacitance sensing, and monitoring fingers by camera, laser, or even sonar. Ideally, the device provides the user with feedback indicating when a finger is touching a facet in order to help users become effectively at gesturing. A user's sense of touch provides this feedback when touching tangible surfaces.

The touch device must allow for input from at least two fingers of the same hand, though it is not required that the fingers be simultaneously touching. That is, it must be possible for a user to hold a hand stationary and touch either of two fingers to a facet of the device or to multiple facets of the device. The device must register a distinction between the fingers, such as by directly identifying that the fingers are different or by determining different positions on the facets for fingers touching at different positions. Distinguishing three or more fingers may require heuristic techniques.

A touch device reports positions for fingers that are touching or have touched facets. These reports indicate the facet touched, if necessary, and where on the facet the finger is touching. The device may also report the positions of fingers that are not touching facets, but for purposes of this specification, only reports of the positions of touching fingers are considered input events. To support finger-mapped gestures, a touch device need only report the position at which a finger initially touches the facet and the position at which the finger finally lifts from the facet. If the touch device reports the changing positions of a finger on a facet as the finger moves while touching the facet, the device need only report a sampling of the changing positions and not necessarily every detectable change of position, depending on the rate at which the device reports positions.

7.1.3 Host Context

A touch device that supports finger-mapped gesturing can be used as a replacement for a keyboard, a keypad, a touchpad, or a touchscreen. Any context suitable for using these devices is potentially suitable for using a finger-mapping touch device. This includes using touch devices to control computers, tablets, mobile phones, navigation systems, computerized office equipment, security access systems, and consumer electronics in general.

A finger-mapping touch device is also useful in ways that conventional keyboards are not. This is a consequence of allowing the user to enter a great variety of values on a small area using only one hand without having to look at the hand. Examples of such alternative uses include gesturing to control games, to perform taxonomic dissections, to perform surgery, or to control machines in real-time, such as industrial machines or mobile robots that require the user's attention be somewhere other than on the user's hands. Touch devices may even be useful in a car for allowing people to interact with complex automobile systems without having to take their eyes off of the road.

This invention was created in part to enable the rapid input of text under a variety of physical circumstances, enabling new levels of convenience for data input. For example, touch devices could be created to allow gesturing on arbitrary surfaces such as doors, safes, and dining tables. Perhaps the ultimate convenience in data entry would take the form of flexible touch pads woven into clothing to enable finger-mapped gesturing anywhere and at any time.

Figure 1:
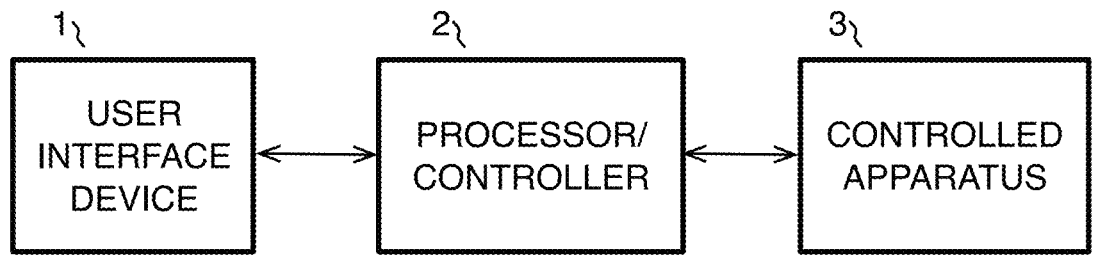
FIG. 1 depicts physical components that may comprise a touch device.

FIG. 1 depicts physical components, not necessarily distinct, that exist in the context of a touch device. The user interface device 1 is a hardware component that is capable of receiving finger-mapped gestures from a user. The processor/controller 2 is a component that receives user requests from the user interface device 1. The user requests are control signals or commands. The processor/controller 2 interprets the user requests for the controlled apparatus 3, translating them into the hardware-specific device protocol sequences that the controlled apparatus 3 is capable of interpreting. In response to the translations that the processor/controller 2 provides, the controlled apparatus 3 performs behaviors that interact with the physical world. Finger-mapped gestures input into the user interface 1 device therefore induce physical behavior in the controlled apparatus 3.

A touch device can be a user interface device 1, it can be a device that combines a user interface 1 with the processor/controller 2, or it can be a device that combines a user interface 1 with a processor/controller 2 and a controlled apparatus 3. Consider a few example scenarios. In the first scenario, a touch device communicates with a desktop computer, which sends radio wave control messages to drive a remote-controlled car. In the second scenario, a tablet computer operating as a touch device sends radio wave control messages to drive a remote controlled car. In the third scenario, the touch device is the car, and the car contains a built-in user interface device that directly issues control instructions to drive the car via device interfaces on the car.

7.1.4 The Gesture Surface

This specification associates each touch device with a "gesture surface." The gesture surface is a two-dimensional surface representing positions on the device's facets. Every position on the gesture surface is given by a coordinate pair, also simply called a "coordinate." Each position on a facet corresponds to a coordinate on the gesture surface, so that each facet is represented by a distinct area of the gesture surface, with the areas of no two facets overlapping. The gesture surface is purely a mathematical construct, so the extent of the gesture surface exceeds facet boundaries, encompassing the full range of coordinates available to the two-dimensional coordinate system. This allows the intermediate values of mathematical computations to represent valid positions on the surface; not all positions on the gesture surface need represent facet positions that a finger can touch.

The gesture surface is an imaginary construct, a tool for simplifying the language of this specification. It need not have representation within a touch device. This specification defines a mapping between facets and the gesture surface so that a reader of this specification can apply discussion expressed in terms of the gesture surface to the facet or facets underlying the gesture surface. In this way, for example, the specification can refer to an area of the gesture surface that encompasses a single facet on one touch device and multiple facets on another touch device and yet remain valid for both touch devices, because by referring to that area the specification is actually referring to whatever facets are in the area. As another example, consider that one device may uniquely associate a particular finger with a particular facet, while another device may identify a particular finger according to its position on a facet. The coordinate of the finger on the gesture surface is sufficient to identify the particular finger in both cases, because the gesture surface coordinate is unique to a facet; in both cases, the identity of the finger is simply a function of a gesture surface coordinate.

The mapping of facets to gesture surface is defined as follows. If the touch device has only one facet, the gesture surface contains the coordinate system of the facet, so that positions on the facet are also coordinates on the gesture surface. If multiple facets compose the touch device, either the touch device translates facet positions to a common facet-independent coordinate system before reporting them or it reports both the facet and a facet-specific position. If the touch device translates facet positions to a common coordinate system, the gesture surface simply contains this common coordinate system, as it would for a single-facet device. If the touch device reports facets and facet-specific positions, each facet maps to a distinct bounded area of the gesture surface, with no two bounded areas overlapping. The locations and orientations of the areas to which different facets map on the gesture surface can be arbitrary, because finger-mapped gestures can identify fingers by region of the gesture surface, and because each region can have its own indication for the forward direction of finger movement. Regardless of the number of facets, if any of the facets are curved surfaces, it may be necessary for the gesture surface to also be curved, so that the gesture system measures distances appropriately. Just as a two-dimensional mathematical surface need not be planar, the gesture surface need not be planar. For example, the surface of a sphere or a cylinder is two-dimensional and yet curved.

As part of the language simplification, the specification refers to fingers "touching" the gesture surface. Specifically, a finger is considered to be touching the gesture surface at a coordinate exactly when the finger is touching a facet—and a position on the facet—that maps to the coordinate. In addition, a gesture surface coordinate associated with an input event is considered to be part of the input event for purposes of reading the specification. This is only significant for multi-faceted devices that do not map positions on different facets to a common coordinate system before reporting them. For such devices, any reference in this specification to a gesture system coordinate is to be interpreted as a reference to the facet and facet-specific position that maps to the coordinate. This equivalence definition allows the specification to be expressed in terms of gesture system coordinates and ignore facet-specific positions. Within the context of this specification, locations detected for a finger are locations of the gesture surface that the finger has touched.

Figure 6:
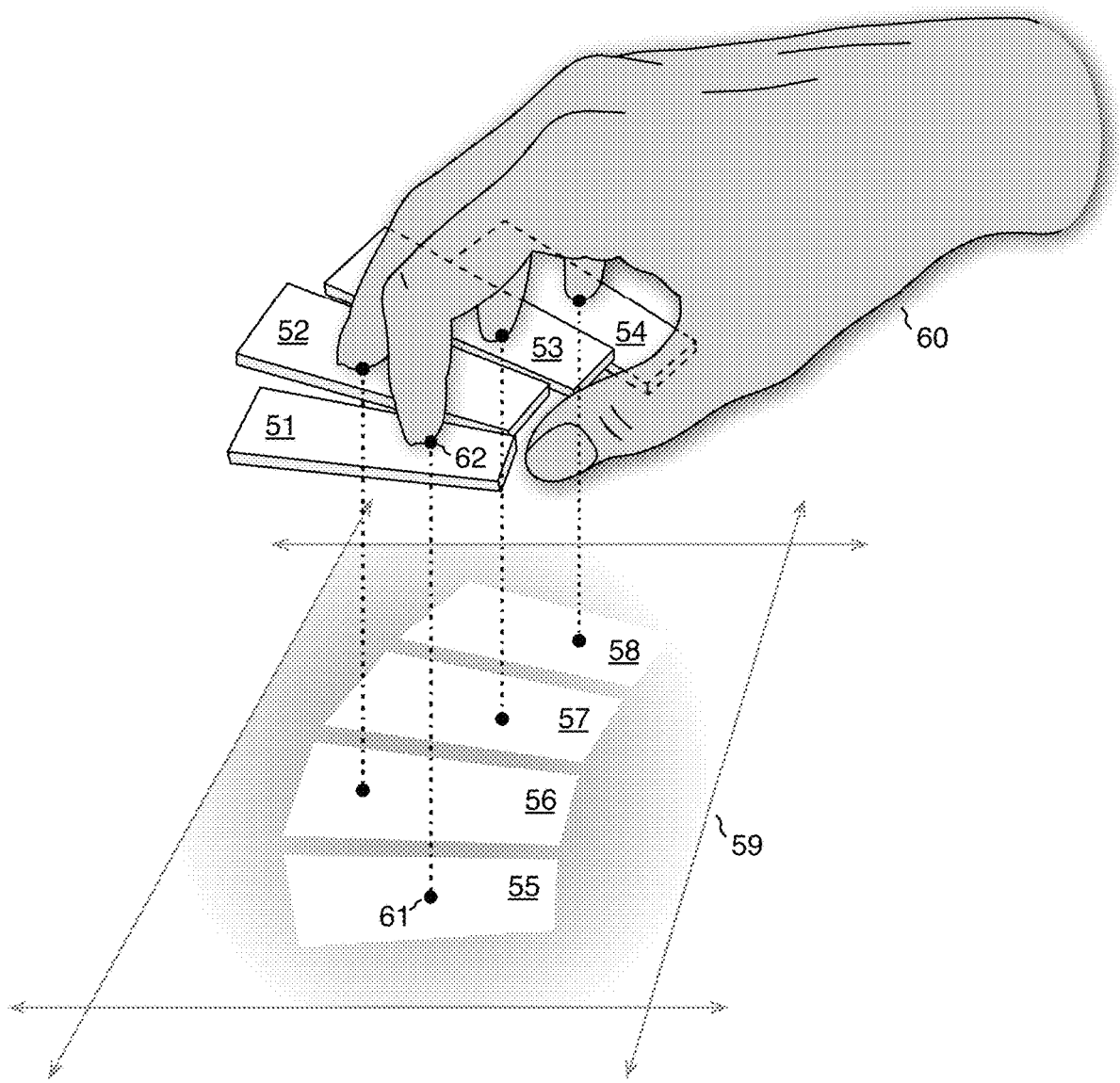
FIG. 6 depicts the role of facets in a multi-faceted touch device and exemplifies mapping multiple facets onto a single virtual gesture surface.

Consider a few examples. FIG. 6 depicts a touch device that constrains each finger to a separate lane 51-54 in order to prevent fingers from accidentally touching unintended regions. The device also puts each lane 51-54 at a different vertical level, particularly for increasing the comfort of the index and pinky fingers. This configuration allows the hand 60 to gesture more easily with the wrist bent. Each lane is a separate facet 51-54, and each facet maps to a distinct region 55-58 of the gesture surface 59. The device may report coordinate pairs for the position of a finger on a facet, but it need not. It could instead report a single number indicating the position of the finger along the length of the facet, in addition to indicating the facet. In this latter case, the facet positions map to non-overlapping line segments on the gesture surface 59. Each facet corresponds to a different finger, so indicating the facet also identifies the finger. However, a finger can also be identified given its coordinate on the gesture surface, because the coordinate occurs in one of the regions or line segments to which the facet positions map and that region or line segment is specific to the same finger as its corresponding facet. For example, in FIG. 6, a coordinate 61 in region 55 corresponds to a position 62 in facet 51 and hence to the index finger of the hand 60.

Also consider the examples in FIGS. 4A-4D. These figures together depict four devices 15-18. Each of these devices 15-18 has two surfaces 23-30 delimited by a physical barrier 19-22. The barrier 19-22 serves as a guide that both keeps the fingers from crossing to the other surface and helps the fingers immediately adjacent to the barrier 19-22 track along a particular line. Each of these devices 15-18 can be constructed with a single facet that just happens to have a physical barrier 19-22 lying on top of it. The devices depicted 15-18 can even all be the same kind of device with a mobile barrier shown in different positions. In either scenario, the device reports all fingers in the same coordinate system and need not report the facet. However, each of these devices 15-18 may also be constructed with two physically distinct facets. In this latter case, the device could employ a common coordinate system across the facets and treat them as if they belonged to the same surface. Alternatively, the device could treat the facets as distinct surfaces 23-30 with positions that must be reported alongside an indication for the facet. A facet that is only capable of receiving input from a particular finger would be treated as previously described for facets in FIG. 6. However, if some of the facets are capable of receiving input from multiple different fingers, the gesture system can identify these fingers partly as a function of their particular coordinates.

7.1.5 Input Areas and Sessions

The host manages the gesture surface and may assign different purposes to different areas of the gesture surface. Remember that portions of the gesture surface correspond to facets, so this is equivalent to the host assigning different purposes to different areas spanning all or parts of the facets. For example, the host may designate a portion of the gesture surface for gesture input and reserve the remaining portion for display only, indicating that some portions of facets are to receive gestures and some portions of facets capable of display are to be relegated exclusively to display. As another example, the host may designate distinct areas of the gesture surface for input by different hands, designating one or more facets or portions of different facets each to a different hand. Each area of the gesture surface that the host makes available to a finger-mapped gesture system is called a "surface allocation." The gesture system employs either all of the surface allocation or a portion of it for gesture input, possibly leaving the remainder for use by the host. The portion of a surface allocation that the gesture system employs is called an "input area" 8. Surface allocations and input areas only ever include coordinates that correspond to facet positions.

Figure 5A:
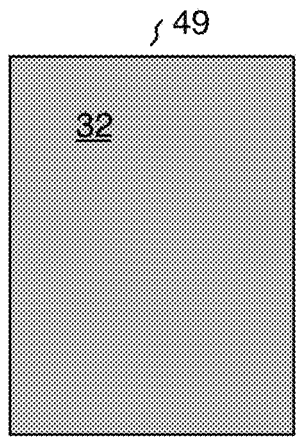
FIGS. 5A-5H depict some possible arrangements of input areas into which users gesture on facets of a device.
Figure 5B:
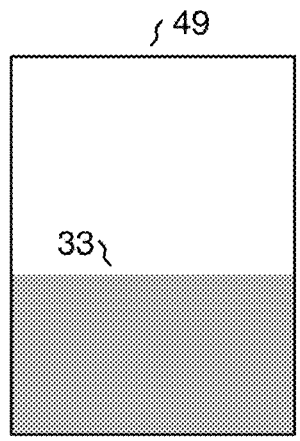
Figure 5C:
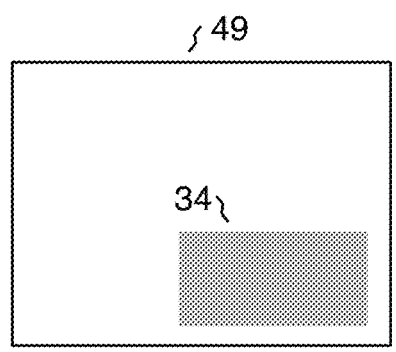
Figure 5D:
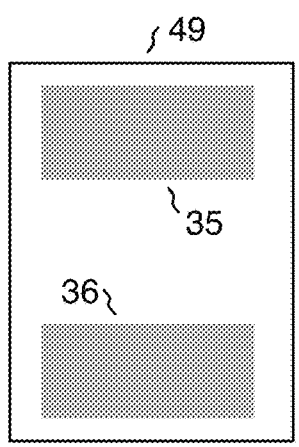
Figure 5E:
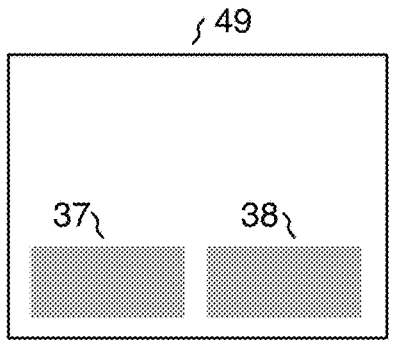
Figure 5F:
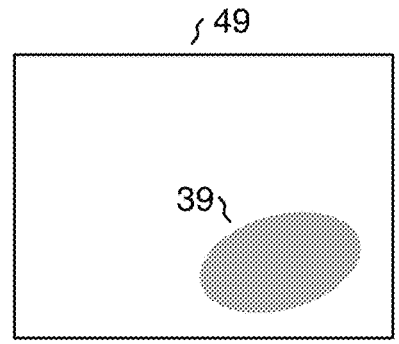

FIGS. 5A-5H illustrate some possible arrangements of input areas. The input areas 32-42 are the shaded portions of the figures. FIGS. 5A-5F each show a single-facet rectangular touchscreen 49. In FIG. 5A, the entire touchscreen 49 is used as an input area 32, allowing the gesture system to detect finger-mapped gestures no matter where they are performed. FIGS. 5B, 5C, and 5F each depict a single input area 33, 34, or 39. FIG. 5B depicts an arrangement that is suitable for a touch-sensitive phone, where the input area 33 replaces the virtual keyboard. The arrangement in FIG. 5C might be suitable for a tablet in landscape, allowing the host to display information to the left of the input area 34. FIG. 5F illustrates how the input area 39 can have any orientation on the touchscreen 49. The arrangements in FIGS. 5D and 5E each provide two input areas 35-38. The arrangement in FIG. 5D is suitable for multiple users providing simultaneous input, such as while playing a game. The arrangement in FIG. 5E is suitable for separate, simultaneous input by the left and right hands. Because input areas need not display visual elements, the entire touchscreen 49 is available to the host for rendering. However, it can be helpful to display an input area 32-42 and provide visual support for gesturing.

Figure 5G:
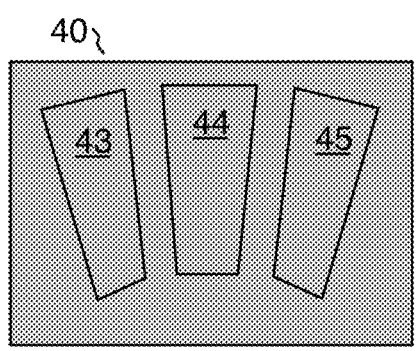
Figure 5H:
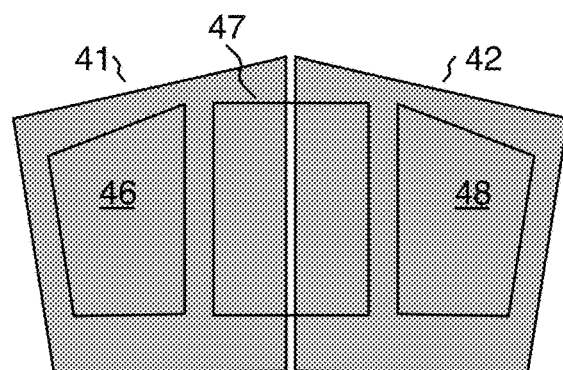

The boundaries of an input area are not constrained by facet boundaries; a given input area can reside entirely within the gesture surface area designated for a single facet, or it can span multiple facets, or it can partially span facets. This allows a multi-faceted device to support multiple input areas, whether simultaneously or not. FIGS. 5G and 5H each show a touch device having three facets 43-48. In the arrangement of FIG. 5G, the facets 43-45 are all part of the same input area 40, which spans an area of the gesture surface. One hand gestures on all three facets 43-45. In the arrangement of FIG. 5H, the gesture surface contains two input areas 41-42, one for each hand, with each input area 41-42 containing a portion of the central facet 47. This latter arrangement allows the left and right hands to gesture simultaneously, each on its own input area 41-42.

Each input area is monitored by a separate instance of a finger-mapped gesture system. An instance of a gesture system is called a "gesture session" or just a "session." A gesture system is the logic for a class of gestures, while a gesture session is an instance of that logic running for a particular input area. The distinction is not often informative but is relevant here. An input area, its gesture session, and its associated device facets together represent a finger-mapped gesture interface. The terms "gesture system" and "gesture session" are interchangeable except when it is important to distinguish among multiple concurrent sessions or to refer to the changing state of the session.

The host may dynamically add and remove input areas. The host does this by creating gesture sessions on surface allocations and by subsequently destroying those gesture sessions. For example, touchscreen devices typically pop up a virtual keyboard on a rectangular surface allocation. Instead of establishing a virtual keyboard, the host can establish an input area for finger-mapped gesturing on the surface allocation. The host does this by creating a gesture session and providing the gesture session with the surface allocation. The gesture system employs all or part of that surface allocation as an input area for receiving finger-mapped gestures. As another example, the host may allow the user to dynamically place input areas on the gesture surface and remove them when done. In this case, the host receives user input for positioning an input area on the gesture surface and in response provides a surface allocation at that position to a gesture system, which then establishes an input area on that surface allocation. Multiple users may even use the same gesture surface simultaneously, each dynamically adding input areas as desired.

The host may provide special gestures for adding, relocating, and removing input areas. The gestures for adding and relocating input areas are called "calibration gestures." The system that monitors for these gestures is called the "surface monitor" 5. The surface monitor initially monitors the gesture surface for a calibration gesture. Upon receiving that gesture, the host—perhaps by way of the surface monitor—establishes a gesture system for a surface allocation at the gesture's position, where the gesture system then establishes an input area. Once one or more input areas are present on the gesture surface, a host may even subsequently allow a calibration gesture to be performed on top of an existing input area, provided that the calibration gesture can be disambiguated from finger-mapped gestures. To accomplish the disambiguation, the host sends input events to both the surface monitor session and the finger-mapped gesture session. The first of these sessions to recognize and report a user request wins, and the host acts on that user request. The host also asks the losing session to reset so that it can attempt to match subsequent gestures anew. When the host provides only one input area, the finger-mapped gesture system can also be the surface monitor.

An input area is an interface element. The convention for touchscreen devices is that an interface element only responds to input events for fingers that originally touched the touchscreen within the interface element. This specification assumes this convention for input areas on a gesture surface: a gesture session only responds to input events from fingers that originally touched the gesture surface in the gesture session's associated input area. The host may arrange for this by only handing a gesture session events that originate in the gesture session's input area, or the host may hand a gesture session all events that originate in the gesture session's surface allocation and leave it to the gesture session to ignore input events originating outside the input area. This constraint makes each finger-mapped gesture interface an isolated system. Henceforth, the discussion of finger-mapped gestures therefore unambiguously refers to a single input area, a single gesture system, and a single gesture session. Moreover, when a finger initially touches the gesture surface, it is initially touching the single input area. The finger need not subsequently remain in the input area, however.

7.1.6 Component Relationships

Figure 2:
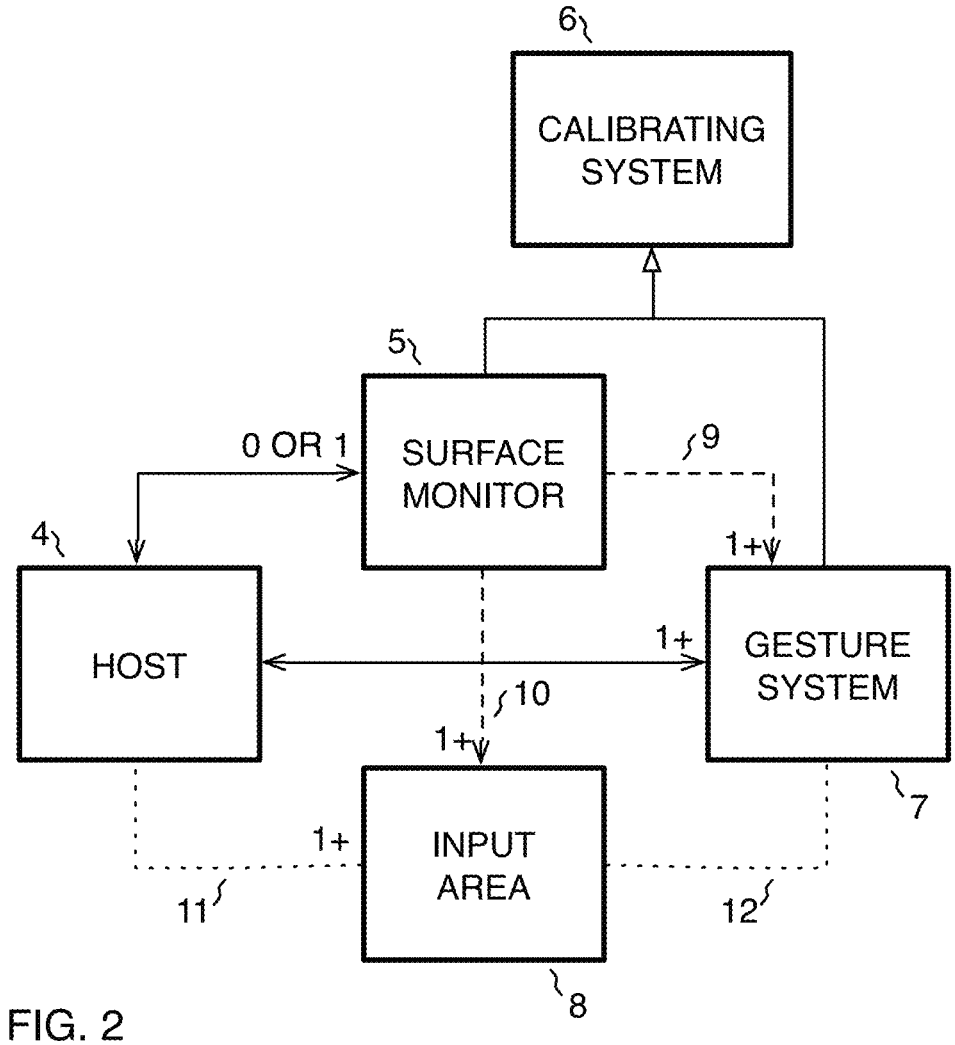
FIG. 2 depicts relationships among the logical components of a touch device.

The host 4, input area 8, and gesture system 7 are logical components of a system that implements finger-mapped gesturing. Some systems may also include a surface monitor component 5. FIG. 2 illustrates relationships among these components. The graphic notation borrows from Unified Modeling Language (UML) but is not strictly UML. Instead of defining the relationships, this figure strives to depict the relationships described elsewhere in this specification for these components. The components can be implemented as hardware, as software, or as a combination of hardware and software. The input area 8 can even be implemented as a purely mathematical entity within hardware or software. This specification treats the input area 8 as a mathematical entity. It is common practice in object oriented programming to encapsulate both hardware and mathematical entities in software objects, so the treatment of the input area 8 as a mathematical entity should not be construed as limiting the implementation of the input area 8.

A host 4 that allows calibration gestures to place an input area 8 does so via a surface monitor 5, which establishes each input area 8 and each gesture system 7 that monitors each input area 8. FIG. 2 depicts this relationship with dashed arrows 9-10 pointing to the components that the surface monitor 5 establishes. Once established, the host 4 sends input events to each gesture system 7, and the gesture system 7 sends user requests and other status information back to the host 4. The input area component 8 can be part of the host 4, part of the gesture system 7, or a distinct entity. If it is represented mathematically as part of either of these other components, the input area component 8 will not itself send or receive information. For example, the host 4 could filter events that it sends to the gesture system 7 based on whether it deems the events to be relevant to the input area 8 of the gesture system 7, or the host 4 could send all events to the gesture system 7 and let the gesture system 7 filter them by relevance to the input area 8 that it monitors. However, it is also possible for the input area 8 to be a distinct hardware component and thus preclude the need to filter events for the input area 8 because it would receive the events directly. Because it is possible for the input area 8 to be a non-communicating mathematical entity, no arrows are shown on the dotted lines 11-12 that associate the input area 8 with either the host 4 or the gesture system 7.

When there is no surface monitor 5, there is one input area 8 and one gesture system 7, although the input area 8 and gesture system 7 may require activation. A gesture system 7 can be implemented to accept calibration gestures to recalibrate an input area 8, without employing a surface monitor 5. That is, the surface monitor 5 and the gesture system 7 may each behave as a component that receives and applies calibrating gestures. As explained later, this general class of component is called a "calibrating system" 6. FIG. 2 depicts this relationship by showing a surface monitor 5 and a gesture system 7 as each being a type of calibrating system 6.

7.2 Gesture Taxonomy

There are many terms for characterizing gestures. Some are general terms requiring precise definition, some are basic geometric terms, some are terms that apply generically to gesturing, and some are specific to finger-mapped gestures. This section defines these terms for the discussion of finger-mapped gestures in later sections.

7.2.1 General Definitions

Most of the following terms have generally understood meanings, but they are defined here according to the meanings they have in this specification:

collection—A "collection" is an unordered group of things that can contain the same thing more than once. For example, the gesture system may collect numbers into a collection for the purpose of later averaging the numbers together. If it collects the same number more than once, the number must occur more than once in the collection in order to produce a proper average.

set—A "set" is an unordered group of things that never contains more than one of the same thing. It is a collection with no duplicates. A set of numbers never contains the same number more than once, for example. A range of angles is an example of a set of numbers, because there is no reason for an angle to be listed more than once in a range.

subset—A "subset" of a set S is a set of things each of which is a member of S. A subset of S may be identical to S. A "proper subset" of a set S is a subset of S that is not identical to S. These are the mathematical definitions of "subset" and "proper subset."

series—A "series" is an ordered group of things that can contain the same thing more than once. It is like a collection except that the members are ordered. Sequential members of a series are "adjacent" in the series. The first and last members of a series are called the "end-of-series" members of the series. The members of a series S that is a subset of another series T are ordered in S according to their order in T unless stated otherwise. A series may also be called an "ordering" to emphasize the fact that its members are ordered.

partially ordered set—A "partially ordered set" is a group of things some of whose members are ordered relative to one another and some of whose members are not. The term has the same meaning in this specification that it does in formal mathematics.

distinct—Given two collections A and B, each member of A is associated with a "distinct" member of B if, and only if, each member of A is associated with a member of B and no two members of A are associated with the same member of B. The term also applies to the members of a collection. The members of a collection are "distinct" exactly when no two members of the collection are identical. In addition, given entities X and Y, X is "distinct from" Y if, and only if, X and Y are not the same entity.

unique—Given two collections A and B, each member A is "unique" in B if, and only if, every member of A is a member of B and no two members of B are identical to the same member of A. X is "unique among" a collection A if, and only if, X is a member of A and no other member of A is identical to X.

size—The "size" of a group of things is the number of things in the group.

7.2.2 Geometric Definitions

Gestures are geometric notions, and a discussion of them requires agreeing on the definitions of terms that describe them. This section defines a number of geometric terms according to their use in this specification.

location—A "location" is a coordinate pair in the coordinate system of the gesture surface, given by coordinate values (x, y). In this specification, a location is different from a "point," which includes a parameter of time. A location on the gesture surface is said to be on a particular facet if, and only if, a position on that facet maps to the location on the gesture surface.

average location—The "average location" of a set of locations is a location having an x-coordinate value equal to the average of the x-coordinate values of the locations of the set and having a y-coordinate value equal to the average of the y-coordinate values of the locations of the set.

geometric element—A "geometric element" is a set, either finite or infinite, of one or more locations. Examples of geometric elements include locations, lines, line segments, curves, polygons, and circles, as well as combinations of these. Each location of a geometric element is said to be "in" the geometric element or "on" the geometric element. Each geometric element also "contains" and "has" each of its locations. According to this definition, a geometric element is an abstract structure that is independent of how it is created or represented.

form—The "form" or "geometric form" of a geometric element is a characterization of the shape, orientation, and size of the geometric element. Two geometric elements that differ in any of these properties have different forms.

origin—The specification employs the term "origin" in several contexts, but the "origin" of a coordinate plane is the location (0, 0).

line—A "line" is normally a line in the geometric sense. In particular, a line is straight and infinitely long within the dimensions of the gesture surface that contains the line. A line on a Euclidean plane is intuitively "straight," while a mathematically "straight" line on a non-Euclidean surface, such as a sphere, is curved from the perspective of Euclidean geometry. However, curves and line segments depicted in drawings are also called "lines."

line segment—A "line segment" is the portion of a line between two different locations on the line and includes both locations. Each of these two bounding locations is called a "terminus" of the line segment. (The plural of "terminus" is "termini.")

vector—A "vector" is a line segment in which one terminus is called the "starting location" and the other the "ending location." A vector "starts" at its starting location and "ends" at its ending location. A vector is said to "point" from its starting location to its ending location. It is also said to "originate" at its starting location and to "terminate" at its ending location. The "length" of a vector is the distance between the vector's starting and ending locations.

angle range—An "angle range" is a range of angles between two delimiting angles. A range that includes a delimiting angle is said to be "inclusive" of that angle, and a range that excludes a delimiting angle is said to be "exclusive" of that angle. Angles are given in radians, unless stated otherwise, and angle ranges are expressed using mathematical interval notation. The notation provides the two delimiting angles and for each delimiting angle indicates whether the delimiting angle itself is included within the range. The notation combinations are as follows:

[a, b]—the range includes both delimiting angles a and b.

(a, b)—the range excludes both delimiting angles a and b.

[a, b)—the range includes angle a but excludes angle b.

(a, b]—the range excludes angle a but includes angle b.

direction angle—A "direction angle" is an angle that represents a direction on the gesture surface. This specification reports direction angles in radians in the range $(-\pi, \pi]$, unless otherwise specified. Each angle is relative to the coordinate system of the surface, as reported in input events sent to the gesture system. By convention, a direction angle of 0 indicates the direction of increasing x-coordinate value for an unchanging y-coordinate value. This is the direction of the positive x-axis. Angle values increase counterclockwise relative to this direction and decrease clockwise. For example, if the user orients the hand relative to the gesture surface so that the x-value increases from left to right, an angle of 0 is directly right and an angle of $\pi$ is directly left. If in this same orientation y-values increase from the bottom to the top of the surface, an angle of $\pi/2$ points directly to the top of the surface, and an angle of $-\pi/2$ points directly to the bottom of the surface. Any angle can serve as a direction angle by expressing it as its equivalent in the range $(-\pi, \pi]$.

class equivalence—Two angles are "class equivalent" if, and only if, they differ by an integer multiple of $2\pi$. The difference between two angles Q and R "by class equivalence" is the smallest difference possible between class equivalent angles of Q and R. This difference is also the "class-equivalent difference." For example, the angles $5\pi/4$ and $-3\pi/4$ are class equivalent, the angles $3\pi/4$ and $-3\pi/4$ differ by $\pi/2$ by class equivalence, and the class-equivalent difference between the angles 0 and $4\pi$ is 0. Given an arbitrary angle, the angle is equivalent to a single direction angle by class equivalence; class equivalent angles represent the same direction. Comparisons by class equivalence allow direction angles near $\pi$ and $-\pi$ to be compared as if they were near each other. For example, the following pairs of angles all differ by less than $\pi/6$ by class equivalence: $\pi$ and $8\pi/7$; $\pi$ and $-6\pi/7$; $-\pi$ and $6\pi/7$; and $-\pi$ and $20\pi/7$. Angles that are near in the directions that they represent are near in their difference by class equivalence.

length of arc—The "length of arc" that a set of angle spans is the largest class equivalent difference between different angles of the set. This is also the "arc length" of the set of angles. The set of angles is said to "span an arc" of a given degree or radian arc length.

nearest bisection—The "nearest bisection" (or "nearest bisecting angle") of two direction angles Q and R is the direction angle that bisects two class equivalent angles of Q and R that differ by less than $\pi$. For example, the nearest bisection of the angles $\pi/2$ and $\pi$ is $3\pi/4$, which is also their normal bisecting angle. However, the nearest bisection of the angles $3\pi/4$ and $-3\pi/4$ is $\pi$ because $3\pi/4$ and $5\pi/4$ are class equivalent angles that both differ by less than $\pi$ and have a bisection that is also a direction angle. Note that the angle 0 also bisects $3\pi/4$ and $-3\pi/4$, but 0 is not the nearest bisecting angle. The nearest bisection of a range of angles is the nearest bisection of the angles that delimit the range. The nearest bisection is not defined for direction angles that differ by exactly $\pi$, so a gesture system may either choose it arbitrarily or fail to recognize a gesture requiring the nearest bisection.

nearest average—The "nearest average" (or "nearest average angle") of a collection of direction angles is an average of class equivalent angles for the angles in the collection, where the class equivalent angles are selected so that both (a) their average is a direction angle and (b) the largest and smallest of them differ by less than π. The nearest average is not defined when such a collection of class equivalent angles cannot be found. A "weighted nearest average" of a collection of direction angles is a weighted average of the class equivalent angles that meet these criteria; the "weights" for each angle are multiplied by the class equivalent found for the angle. Note that the nearest bisection of two angles is also the nearest average of the two angles.

vector angle—The "angle of a vector" with starting location (x1, y1) and ending location (x2, y2) is the direction angle given by the standard a tan 2( ) function as follows: a tan 2(y2−y1, x2−x1). Roughly speaking, this is the angle between the vector and the coordinate system's positive x-axis after the vector has been geometrically translated to originate at the coordinate system's origin.

line angle—A "line angle" or "angle of a line" is an angle of a line equal to either of the possible angles that a vector has when it is coincident with the line. The two possible angles differ by π radians (180 degrees). Either of these angles, combined with any location on the line, is sufficient to fully specify the line. In particular, any location and angle specify a line. The orientation of a line can be given by a line angle for the line. The orientation of a line segment can be given by a line angle for a line that coincides with the line segment.

linear direction—A "linear direction" is an indication of two opposite directions. The term is an abstraction for the directionality or orientation of a line. Like a linear direction, every line indicates two opposite directions, but unlike a linear direction, a line also has location. The slope of a line indicates two opposite directions independently of location and can therefore represent a linear direction. A line also has one line angle for each of the two directions along the line, and each line angle can be derived from the other by adding or subtracting π radians (180 degrees). An angle is therefore also sufficient to represent a linear direction, with every two opposite angles representing the same linear direction. To contrast linear directions with ordinary directions, consider that each possible ray that originates at a location corresponds to a distinct direction, whereas each possible line through a location corresponds to a distinct linear direction. Just as the available directions are the same for all locations, the available linear directions are the same for all locations.

coincidence—Two geometric elements of a coordinate system are "coincident" if, and only if, all of the locations that one of the elements contains are also contained in the other element. For example, a line and a vector are coincident if the vector's starting and ending locations are both on the line. Two geometric elements that are coincident are said to "coincide."

point—A "point" is a location paired with a time. Two points are "equal" or "identical" exactly when their locations and times are both equal. The "distance" between two points is the distance between the locations of the two points. A point is "older" than and "precedes" another point if, and only if, its time precedes the time of the other point, and it is "newer" than and "follows" another point if, and only if, its time is after the time of the other point. The specification refers to the conventional geometric notion of a point as a "geometric point."

jump—A "jump" is a pair of points, one of which is called the "starting point," the other of which is called the "ending point." A jump is said to "jump from" its starting point and to "jump to" its ending point. It is also said to "originate" at its starting point and to "terminate" at its ending point. The "vector of a jump" is the vector that starts at the location of the jump's starting point and ends at the location of the jump's ending point. The "angle of a jump" is the angle of the jump's vector. The "length" of a jump is the length of this vector. The "start time" of a jump is the time of the jump's starting point. The "end time" of a jump is the time of the jump's ending point. A jump "precedes" or "follows" another jump if, and only if, the jump's start time precedes or follows the other jump's start time, respectively. The "duration" of a jump is its end time minus its start time.

Although this specification describes orientations, directions, and differences between orientations and directions in terms of angles, the invention is not constrained to representing these notions as angles. Angles are a uniform measure for representing any of these notions and therefore serve as a convenient unit for generically expressing ways to implement the invention. There are many representations than can substitute for angles, and the invention could be implemented in terms of any of these representations, depending on the constraints of the gesture system. For example, every vector has an associated direction angle, allowing a vector to represent a direction. A slope can also represent a direction whose angle that falls within a known range of π radians. Coordinates can also represent angles, such as by having unit coordinates on a circle represent the angle of a vector that starts at the origin and ends at the coordinates. Anywhere this specification discusses angles, equivalent expressions exist in terms of other units.

7.2.3 Path Definitions

These definitions characterize the path of a finger on the gesture surface.

touch location—A "touch location" is simply a location on the gesture surface that a finger is touching or has touched. Normally the position that a device reports for a finger on a facet is a geometric point, but a device may instead provide an indirect specification of the position. For example, a device may instead report the area of the surface touched. In these cases, the touch location is a location on the gesture surface selected from the area to which the finger touch maps. For example, the touch location can be the point at the center of the area touched.

touch point—The "touch point" of a finger is a pairing of the finger's touch location with the time at which the finger was at the touch location.

initial touch point—The "initial touch point" of a finger is the touch point at which the finger first touches the gesture surface after being in a state of not touching the gesture surface. The "initial touch location" of a finger is the location of the finger's initial touch point. The "initial touch time" of a finger is the time of the finger's initial touch point. A finger is said to "initially touch" the gesture surface at its initial touch point.

path—A "path" is either a list of locations available to a finger that travels while touching the gesture surface, or it is a list of all touch points so far reported for a finger since, and including, the finger's initial touch point. The latter list is ordered chronologically starting with the initial touch point. A path of at least two points is equivalent to a partially ordered set of jumps. This set is the set of all jumps that originate at a point on the path and that terminate at a following point on the path. Consequently, given any two jumps in the set having distinct starting points, one jump precedes or follows the other. Jumps having identical starting points are not ordered relative to each other. A "jump of a path" is a member of this partially ordered set of jumps for the path. Absent context specifying otherwise, a singular reference to "the path" of a finger refers to the most recent path detected for the finger. Because the times of the points on a path effectively order the points, a path can be treated as either a series or a set. A gesture system need not represent a path as a set of points, however. For example, a gesture system could instead separately receive and process each point of a path, discarding previously received points after each new point or after each group of new points arrives.

most-recent point—The "most-recent point" of a finger is the last point in the finger's path. Similarly, the "most-recent location" and "most-recent time" of a finger are the location and time of the last point in the finger's path, respectively.

final touch point—The "final touch point" of a finger is the most-recent point of the finger at the time the finger lifts from the gesture surface. The "final touch location" of a finger is the location of the finger's final touch point.

finger identity—The "identity" of a finger is a name that the gesture system assigns to a finger that touches the gesture surface. It is most pragmatic to use the name of the finger on the user's hand that the gesture system presumes the user to be using. For example, the finger identity might take the name "thumb," "index finger," "middle finger," "ring finger," or "pinky finger." However, depending on the touch device, the user may be free to use a finger different from the one that the gesture system assumes the user to be using, in which case the name that the gesture system assigns to the finger will not be the name of the finger that is actually performing the action. For example, a user may gesture with the index finger in a way that conforms to gesture system's expectations for the middle finger. In this case, the gesture system will identify the finger as the middle finger and not the index finger. When the gesture system supports the use of multiple hands, the finger identity may also include an indication for whether the gesture system presumes the finger to belong to the user's left or right hand. This specification generally equates "fingers" with "finger identities," except in discussion involving the assignment of finger identities.

touch history—The "touch history" of a finger is the set of paths that the gesture system associates with a finger for a particular gesture. If the gesture system assigns a finger a finger identity within the context of a gesture, the finger's touch history is the set of paths that the gesture system has received and associated with that identity during the gesture. The gesture system may also associate multiple paths with a single finger without knowing the finger's identity. For example, the gesture system may interpret multiple paths as belonging to the same finger if they are input in the same vicinity or region of the gesture surface, such as when receiving a "touch count" (as explained later). It is also possible for the gesture system to be able to identify the finger identities to which the gesturing fingers correspond without being able to determine which finger has which identity. Even so, each finger still has a touch history possibly including multiple paths. The last path in a touch history is called the "most recent path" of the touch history. However, for the same reason a gesture system need not represent a path as a set of points, the gesture system need not represent a touch history as a set of paths. As with points on a path, the gesture system could instead receive and process each path separately, discarding previous paths after each new path or each group of new paths arrives. The gesture system only needs to collect the information that is relevant to the finger-mapped gesture.

7.2.4 Directional Partitionings & Discrete Directions

A "directional partitioning" is a partitioning of a set of directions into at least two ranges of directions. It is an abstract concept that provides a generic way to identify the directions in which fingers move at the granularity of direction required for determining user requests. Each range of a directional partitioning is called a "discrete direction" and contains at least one direction. Every directional partitioning includes at least the two discrete directions that this specification identifies by the capitalized names FORWARD and BACKWARD. FORWARD represents directions including finger extension away from the palm, and BACKWARD represents directions including finger flexion toward the palm. Directional partitionings serve as generalized maps for assigning discrete directions to the directions that the gesture system derives from gestures.

Direction angles are a generic way to represent directions on the gesture surface, so as a matter of convenience, this specification represents directions as direction angles. A directional partitioning may therefore be thought of as a partitioning of the direction angles $(-\pi, \pi]$ into two or more discrete directions. The directions of a discrete direction need not be continuous, allowing a single range of directions to span the direction angle $\pi$ without $\pi$ necessarily delimiting one end of the range. Although this specification represents directions as angles, the invention is not constrained to implementing directions as angles. A gesture system can represent directions as slopes, as unit coordinates on a circle, and as vectors, but far simpler representations are possible when only a few directions are available for input. Similarly, there is no requirement that discrete directions be represented as ranges of angles. A discrete direction abstractly represents a range of directions according to the representation of direction employed, but once the gesture system identifies a discrete direction, the gesture system can subsequently represent the discrete direction in any form, including as a range, as a software object, or as a simple identifier.

FIGS. 25A-25D show some directional partitionings that are useful for assigning discrete directions to fingers as they gesture. Each directional partitioning has an origin at one of the locations 410-413 and a "center-forward" direction represented by rays 414-417. Each origin 410-413 represents a location on the path of a finger for which a discrete direction is being determined. Each center-forward direction 414-417 is shown as a solid-line ray having an angle that bisects the FORWARD range 418, 420, 424, or 428. It serves as a standard direction for the directional partitioning, but any standard direction relative to the directional partitioning can be chosen. A "center-forward angle" is an angle representation of the center-forward direction. FIGS. 25A-25D depict the following kinds of directional partitionings:

Half-Plane Partitioning (FIG. 25A)—A "half-plane partitioning" splits a plane into two halves 418-419. It contains two discrete directions, each spanning an arc of π radians. The most useful half-plane partitioning partitions the plane along the horizontal, at angle 0 (or equivalently, π). Angles in the half plane 418 above the horizontal are considered FORWARD, and those in the half plane 419 below are considered BACKWARD.

Bow-Tie Partitioning (FIG. 25B)—A "bow-tie partitioning" partitions a plane into four pie-shaped ranges 420-423, with opposite ranges 420-421 or 422-423 spanning the same length of arc $\Delta_{FB}$ or $\Delta_{LR}$, respectively. By varying the arc length, the ranges can be narrowed or broadened to emphasize the detection of the FORWARD and BACKWARD ranges at the expense of the LEFT and RIGHT ranges, or vice versa.

Quarter-Plane Partitioning (FIG. 25C)—The "quarter-plane partitioning" is perhaps the most useful bow-tie partitioning for identifying a gesture's direction. Each of its ranges 424-427 is an arc of π/2 radians. It is useful for allowing gestures performed in any of four directions to be indicated with equal ease.

Half-Symmetric Four-Way Partitioning (FIG. 25D)—A "half-symmetric four-way partitioning" is a directional partitioning that has four discrete directions 428-431 and that is only bilaterally symmetric, with the FORWARD and BACKWARD ranges 428-429 spanning different arc lengths. This partitioning is useful for making either FORWARD or BACKWARD less detectable than the other.

A discrete direction may be determined from a directional partitioning by comparing the directional partitioning with a direction and reading the discrete direction that contains the direction. This specification calls this direction the "sampling direction," which when expressed as an angle is the "sampling angle." However, a given directional partitioning may be used as a template for determining directions at varying center-forward directions. This can be done by effectively rotating the directional partitioning to a particular center-forward direction before reading the discrete direction at the sampling direction. The general process for determining a discrete direction is therefore to choose a directional partitioning, to choose a target center-forward direction, to rotate the directional partitioning so that its center-forward direction is the target direction, and then to compare the rotated directional partitioning with a sampling direction to read the discrete direction for the sampling direction. The target center-forward direction is called the "reference direction" or else the "reference angle" when the direction is expressed as an angle. An "oriented partitioning" is a directional partitioning that has been oriented to a reference direction.

Figure 25A:
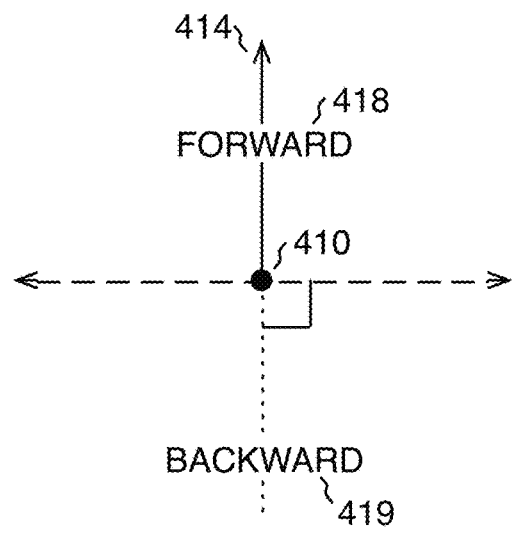
FIGS. 25A-25D depict several examples of directional partitionings.
Figure 25B:
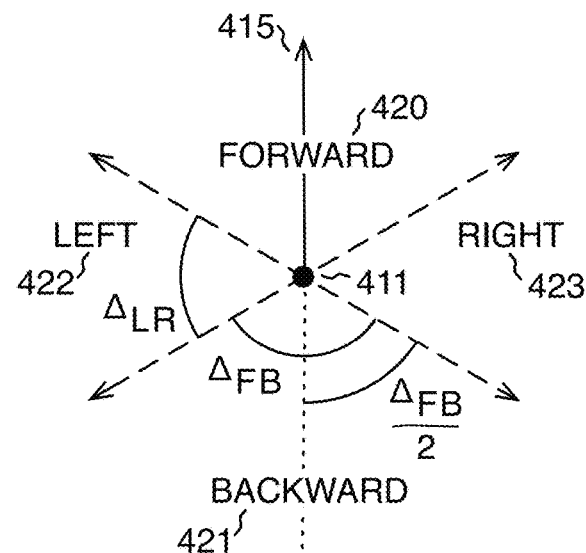
Figure 25C:
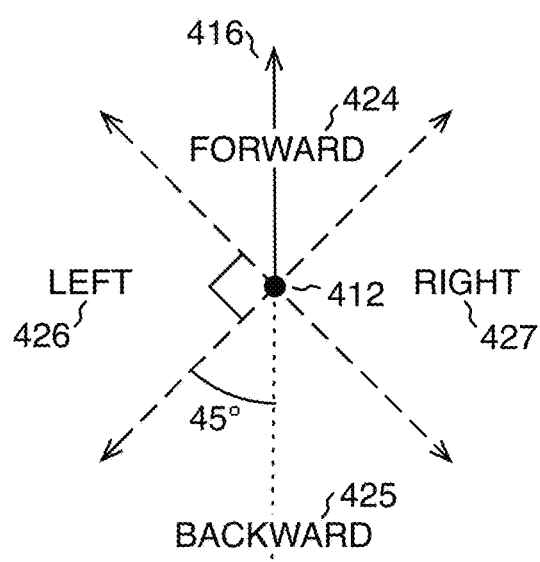
Figure 25D:
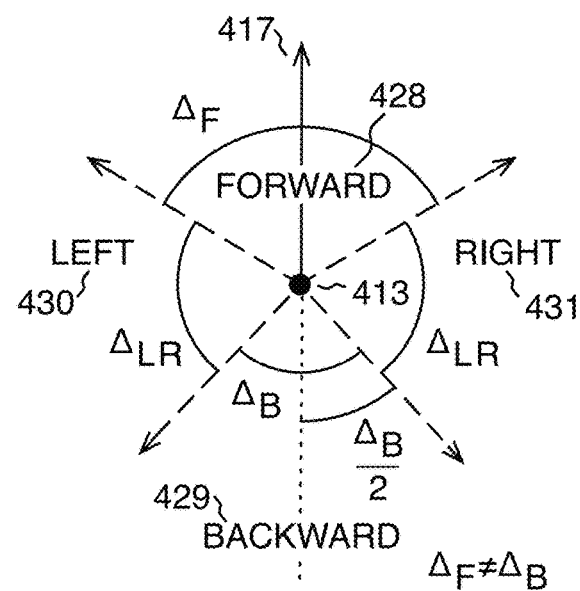
Figure 26B:
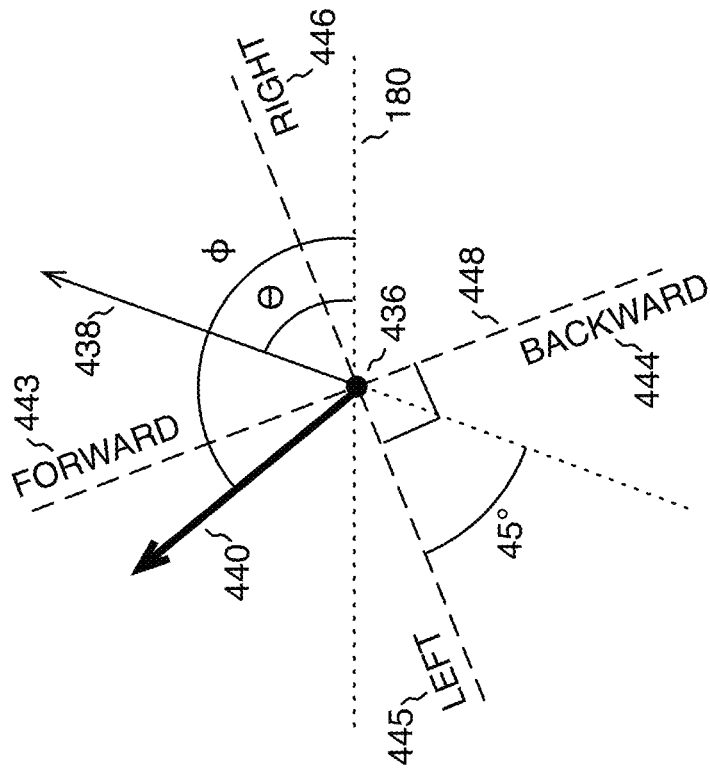
FIGS. 26A-26B depict two examples of the process of determining a discrete direction from a sampling angle and a directional partitioning.
Figure 26A:
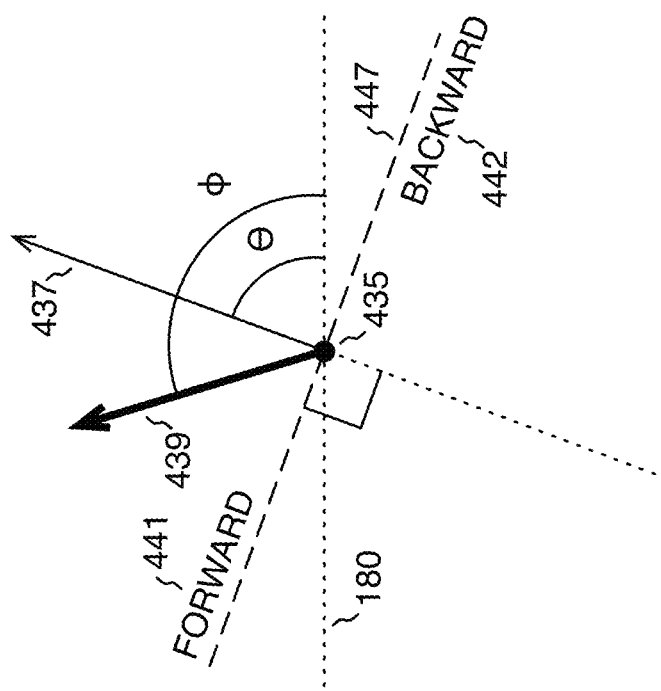

The examples in FIGS. 25A-25D can be thought of as template directional partitionings each having a center-forward angle of π/2. FIGS. 26A and 26B illustrate the generic procedure for determining a discrete direction from a directional partitioning given a reference angle θ and a sampling angle φ. FIG. 26A shows the procedure for a half-plane partitioning 447, and FIG. 26B shows the procedure for a quarter-plane partitioning 448. In each figure, the directional partitioning 447-448 is rotated around the origin 435-436 to align the center-forward direction 437-438 with the reference angle θ. This process makes the rotated center-forward direction equal the reference direction and is called "orienting" it to the reference direction. The sampling direction is shown as a ray 439-440 that extends from the origin 435-436 at the sampling angle on the oriented partitioning. Visually, the direction indicated is the discrete direction 441-446 of the oriented partitioning 447-448 that contains the sampling direction 439-440; FIG. 26A indicates the FORWARD range, and FIG. 26B indicates the LEFT range.

The visual representations of FIGS. 26A and 26B depict a simple mathematical relationship among the relevant angles. The discrete direction that a directional partitioning indicates for a sampling angle is the range of angles that contains the angle calculated as follows: add the sampling angle φ to the predetermined center-forward angle and subtract the reference angle θ. Notice that this computation does not actually require rotating the directional partitioning, as the sampling angle and the directional partitioning need only be oriented relative to each other.

Every pair of FORWARD and BACKWARD ranges of directions has two "side ranges" of directions. Consider the directions that are available to each side of the FORWARD and BACKWARD ranges. If the FORWARD and BACKWARD ranges are continuous on the left, the left side range is defined to be the empty set. Otherwise, the left side range is defined to be the range of directions between the left boundary directions of the FORWARD and BACKWARD ranges. Likewise, if the FORWARD and BACKWARD ranges are continuous on the right, the right side range is defined to be the empty set; otherwise, the right side range is defined to be the range of directions between the right boundary directions of the FORWARD and BACKWARD ranges. Suppose S and T are opposite ranges of directions, with one of them being the FORWARD range and the other the BACKWARD range, but also suppose it is not known which of S and T is FORWARD and which is BACKWARD. The "side ranges" of S and T are defined to be the LEFT and RIGHT ranges of S and T absent indication of which range is LEFT and which is RIGHT, and S and T are said to "define" their side ranges. This terminology helps to simplify the communication of constraints on left and right ranges of directions given forward and backward ranges directions.

This specification uses this generic process for determining directions because the process provides a common framework that works for all examples. The invention is not limited to this mechanism for determining directions, however. Any mechanism for identifying the range of directions that contains a particular direction suffices for this invention. For example, if a gesture system only recognizes two directions, such as one towards the top of a touch device and one towards the bottom, the gesture system need not represent directions as angles, need not compute directions to compare with ranges of directions, and need not orient ranges of directions to the center-forward direction. Even so, this generic process could be used to implement the gesture system and hence suffices to illustrate a way to implement details of the invention. Moreover, by definition, a directional partitioning represents any partitioning of directions into ranges of directions, so directional partitionings and their discrete directions characterize any gesture system that detects directions. However, there are other approaches to determining a direction's discrete direction, such as by looking up the discrete direction in a table indexed by direction, by dividing a numeric representation of the direction by the range span of a discrete direction, and by conditionally testing direction range boundaries by program logic.

7.2.5 Local Direction

A finger may change directions intermittently as it performs a gesture, even if only accidentally over short distances. The direction in which a finger is travelling at any point on a path is the "local direction" and can be given by a direction angle and a discrete direction. The direction angle for a point is called the "local angle" for that point, and the discrete direction for a point is called the "local discrete direction" for that point.

There are many ways to compute the local angle for a point. Precise formulations are possible when many points are available on the finger's path before and after the point being sampled. However, a gesture system that provides real-time feedback to the user about the status of a "direction-constrained" gesture, as explained below, may have to estimate the local angle for the most-recent point, in which case the gesture system can only base the local angle on preceding points of the path. There are many ways to perform this estimate as well.

A simple way to estimate the local angle for the most-recent point is to use the angle of the jump that ends at the most-recent point and starts at the newest preceding point on the path that has at least a specified minimum distance from the most-recent point. This specified minimum distance is called the "direction assignment distance." The gesture system can implement this approach by keeping a list of all points reported for the finger, but this might be taxing for some mobile devices. As an alternative, the gesture system can keep a list of the newest points reported for a finger using the following rules:

1) Every new point reported for a finger is added to the end of the list.
2) Every time a new point is added to the end of the list, all points are discarded from the beginning of the list that have a distance from this new point greater than or equal to the direction assignment distance, except for the newest point in the list having a distance greater than or equal to the direction assignment distance, which is kept at the start of the list.

After performing the above procedure for a new point, the local angle estimate for the most-recent point is the angle of the vector that starts at the first point in the list and ends at the most-recent point, which is the last point in the list. This algorithm can further reduce resource consumption by only recording every nth point or by only sampling points at pre-specified intervals.

There is a reasonable range for the direction assignment distance that is dependent on the configuration of the host, the sensitivity of the device facets, and the resolution of the device facets. When the direction assignment distance is too small, random accidental shifting or rocking of the finger registers as changes in direction. When the distance is too big, the user has to move the finger excessively before the gesture system registers the change in direction. There may also be a component of user preference, suggesting that it be configurable.

Finally, the local discrete direction at a point on a path can be computed from the point's local angle using a previously established directional partitioning and reference angle. With the directional partitioning oriented to the reference angle, the local discrete direction is the discrete direction indicated for the partitioning at a sampling angle equal to the local angle.

7.2.6 The Gesturing Threshold

Touch devices can be sensitive and report slightly shifting or rocking fingers as changing locations. In a finger-mapped gesture system the user ideally types quickly by inputting many small gestures in rapid succession. It is helpful for the gesture system to distinguish intentional from unintentional finger movement. Because finger-mapped gestures tend to be very short, the challenge is mainly in determining whether a finger is gesturing at all. Fingers may accidentally touch the gesture surface, a user may touch a finger and lift it before performing the gesture in order to rescind the gesture, or on gesture systems that support "holds," a user may touch the surface with the intention of performing a function analogous to pressing the shift key on a keyboard in order to qualify a gesture concurrently performed by other fingers. To distinguish between gesturing and non-gesturing fingers, the gesture system should employ a gesturing threshold.

A "gesturing threshold" is a condition under which the gesture system considers a finger to be gesturing at a point on the finger's path. A finger "exceeds" the gesturing threshold at the point where it satisfies this condition. Once a finger exceeds the gesturing threshold, the finger is considered to be "gesturing," and it is considered to be gesturing for the remainder of the finger's path, until the finger lifts from the gesture surface, unless the gesture system subsequently re-designates the finger otherwise. Note that a gesturing threshold is not the only way that a gesture system can distinguish gesturing and non-gesturing fingers; it is also possible for a finger to be "gesturing" in a gesture system that does not implement gesturing thresholds. For example, a gesture system may consider any touching finger to be gesturing.

There are at least two approaches to implementing gesturing thresholds: detecting a minimum distance and detecting a minimum speed. A gesturing threshold ideally includes at least the requirement that the finger travel a minimum distance or greater. This is the "gesturing threshold distance." If the gesturing threshold is merely to be sensitive to any movement at all, the gesture system can set the gesturing threshold distance to the minimum detectable distance of movement. However, unless the fingers are moving against resistance, it is likely easy for a user to accidentally move a finger short distances at any speed, so the gesturing threshold distance should probably be somewhat greater than the minimum detectable distance. The gesturing threshold distance therefore also provides a minimum gesture length for each finger. Each finger may have a different minimum length at which it is capable of gesturing, so the gesture system could have gesturing threshold distances vary from finger to finger.

Another option is for the gesture system to recognize gesturing fingers as those that move at a minimum speed or greater. The gesture system can accomplish this by keeping a list of all points that fall within a polling window. The polling window can be an amount of time, in which case the newest point is always added to the end of the list, and upon adding a new point to the end, all points older than the newest point by more than the polling window time are removed from the start of the list. If the distance between the oldest and newest points, along with the difference in time between them, indicate that the finger averaged the minimum speed or greater, the minimum speed condition is satisfied. The speed can also be measured by using a polling window that is a distance, in which case the gesturing threshold requires both a minimum distance and a minimum speed. Under this approach, the list only include points within a predetermined distance of the newest point, plus the first point at that distance or greater. The time-based polling window monitors for a minimum average speed over a given period of time, and the distance-based polling window monitors for a minimum average speed over a given distance. It is less desirable to measure only over a window of time, because to distinguish intentional gestures from fast accidental movements, the gesture would have to last at least this length of time, potentially reducing the maximum rate of gesture input.

The straightness of the finger's path is another possible condition for the gesturing threshold. The gesture system could require that the user begin a gesture by moving the finger in approximately a straight line. A simple way to test the straightness of a path between two end points first determines the distance between the two end points. Call this distance D. The test then examines each intervening point in turn and sums the two distances from this intervening point to each end point. If this sum is greater than D by a predetermined percentage of a D, the path is not considered to be straight. 5% to 10% are reasonable percentages. This test is equivalent to requiring that all points between the two end points fall within an ellipse having those end points as foci. Testing for straightness can help to reduce the effective gesturing threshold distance.

Regardless of the approach taken, there is a point at which a finger is determined to have exceeded a gesturing threshold and a point at which the finger is determined to have begun gesturing. The latter point is called the finger's "starting point" for gesturing. Depending on the gesturing threshold in effect, the starting point may not be known until the gesturing threshold is exceeded. For example, the starting point may be the point that precedes the point of exceeding gesturing threshold by the distance in time or space given by a polling window. A vector from the starting point to the point of exceeding a gesturing threshold is the "gesturing threshold vector."

The most effective gesturing threshold appears to use a gesturing threshold distance and at least one additional condition. It is sufficient to monitor for a minimal speed over a gesturing threshold distance. A jittery finger may move quickly over short distances, so it is best to establish a non-trivial gesturing threshold distance. This approach ignores the distance that a finger travels before the user appears to begin gesturing, allowing the user to hesitate before gesturing without consequence while the finger is touching the gesture surface. Testing for an "initial slide" is an effective example of this combined test.

7.2.7 The Initial Slide and Sliding

Testing for an "initial slide" appears to provide an ideal gesturing threshold. The "initial slide" of a finger is the first jump on the finger's path that has at least a specified minimum length and at most a specified maximum duration. The specified minimum length is called the "minimum initial slide length" and is the gesturing threshold distance. The specified maximum duration is called the "maximum initial slide time." The initial slide is therefore the first occurrence of a finger moving at least a certain distance at a minimum speed.

The characterization of an initial slide precludes more than one jump on a finger's path from satisfying the criteria; each finger has at most one initial slide between the time it touches the surface and the time it lifts from the surface. A finger has no initial slide if no jump satisfies the criteria.

A finger begins "sliding" the instant an initial slide exists for a finger. An initial slide occurs the instant an initial slide is detectable, even though this instant happens at the end of the period to which the initial slide pertains. The "starting point" of an initial slide is the starting point of the initial slide jump, and the "starting location" of a slide is the location of the starting point. The "initial slide vector" is the vector that starts at the location of the jump's starting point and ends at the location of the slide's ending point; this is the gesturing threshold vector of a gesturing threshold that tests for an initial slide.

A finger is said to "slide" and be "sliding" the instant it has begun sliding, according to the definition of "initial slide."

Moreover, once a finger has begun sliding, the finger is thereafter considered to slide and be sliding until the finger lifts from the gesture surface. To be clear, once a finger has begun sliding, it is considered to remain sliding no matter how fast or far the finger moves and is sliding even if the finger is not moving at all.

Figure 12:
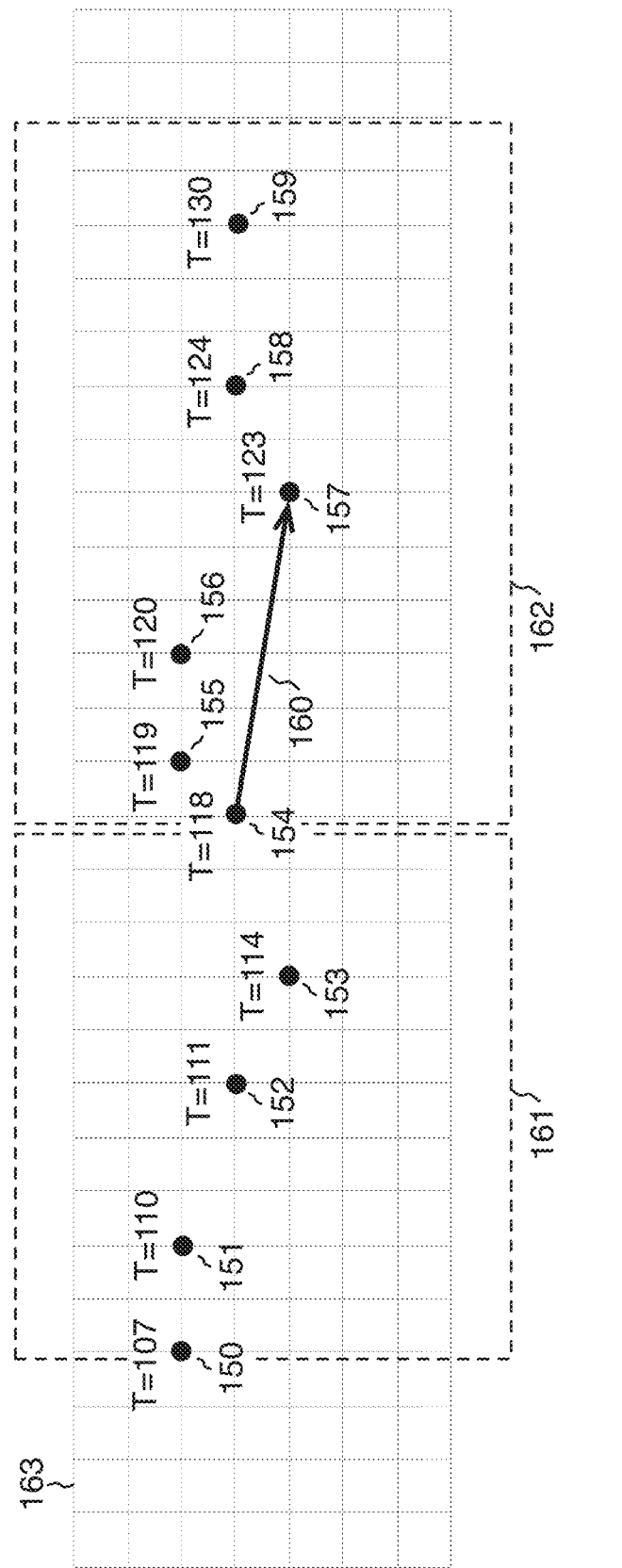
FIG. 12 depicts an example path of a finger that exceeds a gesturing threshold by performing an initial slide.

FIG. 12 depicts the hypothetical path of a finger from the time it initially touches the gesture surface at the initial touch point 150. The dots 150-159 indicate successively provided points on the path, and the graph 163 depicts their relative locations. The "T=" number associated with each point shows a POSIX integer time for the finger at that point. In this example, the finger touches point 150 at POSIX time 107. The gesture system monitors all possible jumps within either a window for the minimum initial slide length or a window for the maximum initial slide time. Here the minimum initial slide length is 6 units of the graph 163, and the maximum initial slide time is 5 POSIX units of time. The first jump to equal or exceed the minimum length in no more than the maximum time is the jump from point 154 at POSIX time 118 to the point 157 at POSIX time 123. This jump has a length just over 6 units and a duration of 5 units. The gesture system therefore identifies the initial slide 160 at time 123; the finger exceeds the gesturing threshold at point 157. This establishes point 154 as the starting point of the slide 160 and point 157 as the ending point of the slide 160.

7.2.8 Distance Measure

A "distance measure" is a function that produces a distance between two points for some way of measuring the distance. One point is called the "sampling point" and the other point is called the "measurement origin." The measurement origin remains fixed as the sampling point changes, and the distance between the two points is measured as a function of the path of the finger between the points. The sampling point is normally the most-recent location of a finger.

The three most useful measurement origins are a finger's initial touch point, the starting point of a gesturing threshold, and a point at which a finger reverses direction. In the first case, a distance measure is defined for the finger from the moment the finger touches the gesture surface until the moment it lifts. In the latter two cases, the distance measure is not defined until certain conditions are met. Once a distance measure is defined for a touching finger, the distance measure remains defined for the finger until it is redefined for a new distance measure or until the finger lifts.

The simplest distance measure is the length of the distance vector. The "distance vector" is the vector that starts at the measurement origin and ends at the sampling point. The distance vector is also called the distance vector "for" the sampling point, and the angle of a distance vector is also called the "distance vector angle." The length of the distance vector is the linear distance between the measurement origin and the sampling point. This distance measure is sufficient for finger-mapped gestures that only require the user to move the finger short distances. The ideal distance measure uses the actual distance that the finger travelled, provided that the finger travelled in roughly the same direction for the entire distance. This is ideal because users directly sense and control the distance the finger actually moves. Under this second approach, the gesture system sets the distance measure to the length of the path from the measurement origin to the sampling point.

Figure 13:
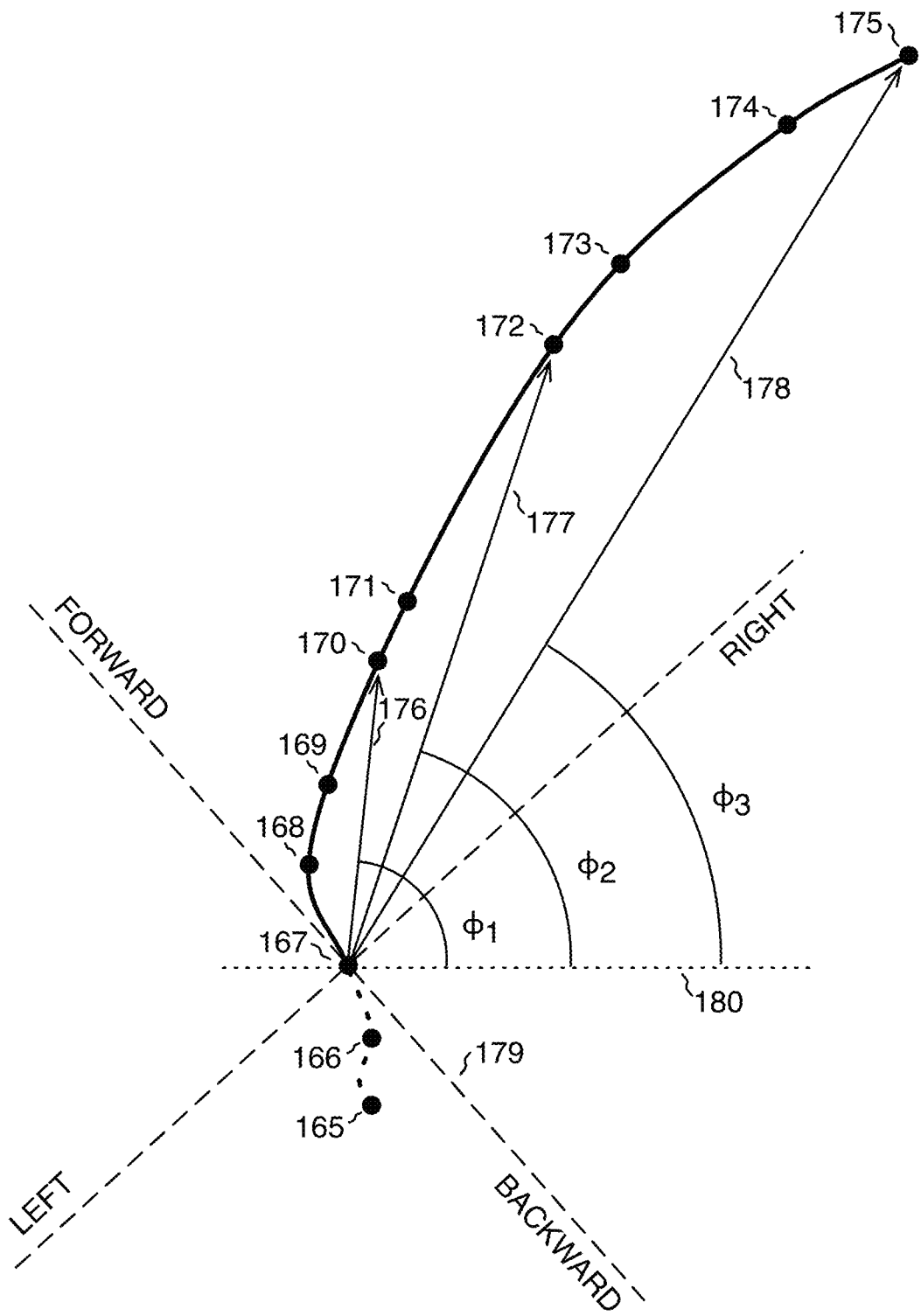
FIG. 13 depicts distance vectors for various points on a path that exceeds a gesturing threshold.

FIGS. 12 and 13 depict distance measures based on the starting point of an initial slide. In FIG. 12, the measurement origin is point 154. The distance measure is undetermined on the portion 161 of the path prior to point 154, and it is determined on the subsequent portion 162 of the path, starting with point 154. FIG. 13 shows the path of a finger that touches at point 165, travels along a line through points 166-174, and finally lifts at point 175. The finger meanders slowly from point 165 to point 167 and then moves quickly from point 167 through points 168-170. Upon reaching point 170, the finger has begun sliding, here represented with the initial slide vector 176. Point 167 is the starting point of the initial slide and serves as the measurement origin in this example. The vectors 176, 177, and 178 are distance vectors; the distance measures at points 170, 172, and 175, are the lengths of the vectors 176, 177, and 178, respectively. The distance measure of the finger at the time it lifts is the length of vector 178. The other features of FIG. 13 are described later in the specification when relevant.

Another approach to measuring distance is to take the vector that starts at the measurement origin and ends at the sampling point and project it onto another line and use the length of the projection as the distance measure. This line is called a "reference line." The reference line for the projection is chosen to have a direction equal to the direction at which the finger naturally moves forward. The projection therefore measures the distance that the finger travels along the center-forward or center-backward direction, diminishing the measured distance the farther the finger strays from one of these directions. It is an option for the gesture system to choose the reference line onto which to project the line segment as a function of the finger's discrete direction. This allows the gesture system to measure the projected distance travelled along the center-left and center-right directions as well: distance measures for left and right movement could be determined by projection onto a line perpendicular to the reference line used to measure center-forward and center-backward distances. More specifically, the distance measure can be determined by projection onto a line that bisects the range of the discrete direction in which the finger is determined to be travelling.

7.2.9 Extent Vectors

It is possible to model the path of a finger as a series of vectors that each represent a finger's movement in roughly a single direction, if the path has at least two points. These vectors are called "extent vectors." Each reversal in direction of the finger corresponds to an extent vector. If a gesturing finger never reverses direction before lifting, a single extent vector models its path. If a gesturing finger travels back and forth before lifting, the finger's path can be modeled as a zigzag of line segments in which each leg of the zigzag is an extent vector. An extent vector represents the full extent that a finger travels in a direction that is within $\pi/2$ radians of the direction in which the extent vector began. While efficient finger-mapped gestures involve the fingers only moving in two opposite directions, it is unlikely that a finger will exactly retrace a preceding path upon reversing direction, so the gesture system needs to employ an algorithm to detect extent vectors.

To recognize each successive extent vector, the gesture system monitors the finger for reversals of direction relative to the direction determined for the preceding extent vector. This can be done via angle estimates for each extent vector, determined at the start of the extent vector. The angle estimate for the first extent vector is the angle of the vector of the finger's gesturing threshold vector. To monitor for reversals, the gesture system can orient a half-plane partitioning to the angle estimate, using the angle estimate as the reference angle. A finger can be considered to enter the reversal state the first time it moves from one point to another in the BACKWARD range of this directional partitioning.

Once a finger has entered the reversal state, the gesture system can monitor the finger's distance from the point where it reversed direction, a point called the "potential end-of-vector point." If this distance ever exceeds a minimum extent vector length, without the finger having left the reversal state, the gesture system records the preceding extent vector so that it ends at the potential end-of-vector point. It also begins a new extent vector at the potential end-of-vector point, estimating its angle as the angle of the vector from the potential end-of-vector point to the point where the finger exceeded the minimum extent vector length. This new angle can be used as the reference angle for a new oriented partitioning for monitoring reversals of the new extent vector. Upon beginning the new extent vector, the finger is no longer considered to be in a state of reversal.

The finger may reverse again while in the reversal state but before exceeding the minimum extent vector length. In fact, the finger may reverse any number of times before achieving a distance of the minimum extent vector length from the potential end-of-vector point. If during these reversals the finger ever travels to a point where its extent vector would have a length greater than what it would have at the potential end-of-vector point, the finger is considered to be moving forward again and is no longer in a state of reversal. In this situation, the reversal was too short to result in a new extent vector, and the current extent vector instead lengthens as a result of the finger having reversed the reversal. Upon leaving the reversal state, the gesture system ceases to monitor the finger for exceeding the minimum extent vector length. A series of reversals that fails to travel far enough to trigger another extent vector likely corresponds to random rocking movements of the finger.

The first extent vector starts at the finger's initial measurement origin. Each time the finger reverses direction and starts a new extent vector, it is an option for the gesture system to establish a new measurement origin at the reversal point that starts the new extent vector. Regardless, the gesture system must monitor the length of each extent vector separately, in order to detect the resumption of forward movement after a reversal. The above procedure can be made more efficient by only testing for reversal when the extent vector reduces in length from one point to the next, eliminating the need to compute a direction angle between every two points on the finger's path. The last extent vector ends when the finger lifts, at the location where the finger lifts.

Figure 22:
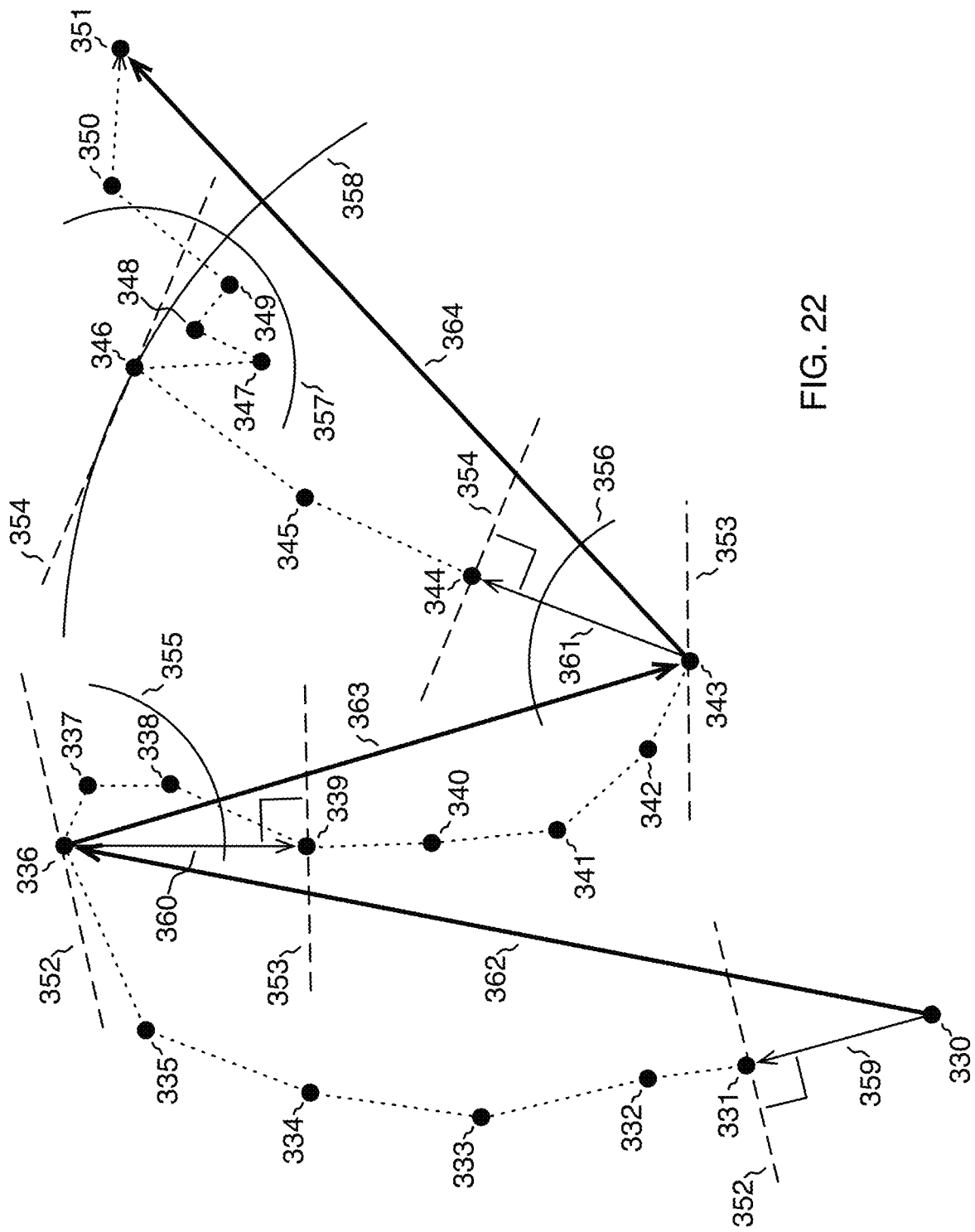
FIG. 22 depicts an example of determining extent vectors from the path of a finger.

FIG. 22 illustrates this procedure for determining extent vectors using initial slides. The dots 330-351 represent points on the path of a finger, with dotted lines connecting them to indicate their sequence of occurrence. The three long bold vectors 362-364 represent the computed extent vectors. The short vectors 359-361 represent the initial vectors that establish the estimated angles for the extent vectors 362-364. Each long-dashed line 352-354 represents the half-plane boundary between the two discrete directions of a half-plane directional partitioning that is oriented to an extent vector's estimated angle. In other words, each of the half-plane boundary lines 352-354 partitions the plane in half through the point at its center, therefore also partitioning the ranges of directions of vectors that originate at this center point into two 180-degree ranges. The arcs 355, 356, 357, and 358 indicate distances from the points 336, 343, 346, and 343, respectively, with arcs 356 and 358 indicating two different distances from the same point 343. Notice the following:

- The finger begins gesturing at point 330, and an initial slide is detected at point 331, with vector 359 being the initial slide vector. Vector 359 establishes an estimated angle for the first extent vector 362, which has not yet been determined. A half-plane directional partitioning 352 is oriented to the angle of this vector 359. Line segment 352 represents the angle of the boundary between the two discrete directions of this oriented partitioning. The finger continues gesturing after point 331.
- The direction angle of a vector from point 335 to point 336 yields the same discrete direction as the initial slide vector 359, according to oriented partitioning 352. It does not produce a reversal. However, the direction angle of vector from point 336 to point 337 yields a different discrete direction for this oriented partitioning 352, which has been redrawn at point 336; this can be seen visually as the vector from 335 to 336 pointing towards one side of the dashed line 352 and the vector from 336 to 337 pointing towards the other side of the dashed line 352. Upon reaching point 337, the finger enters a state of reversal, and point 336 becomes the potential end-of-vector point.
- The arc 355 represents the distance from the potential end-of-vector point 336 that the finger must travel in order to complete the first extent vector and start the second. It is the distance of the minimum extent vector length. Points 337 and 338 have not reached this distance. Point 339 exceeds this distance. At point 339, the gesture system establishes the first extent vector as a vector 362 from point 330 to point 336. Point 336 becomes the starting point of the second extent vector 363, which has not yet been determined. The vector 360 from point 336 to point 339 provides the estimated angle of this second extent vector 363. A half-plane directional partitioning 353 is oriented to this estimated angle, shown as a dashed line representing the boundary angle between the two discrete directions of this oriented partitioning.
- The finger continues gesturing through point 343. The next point reported to the gesture system for the finger is point 344. The vector 361 from point 343 to point 344 indicates the opposite discrete direction from that indicated by the initial vector 360 for the extent vector. Point 343 is therefore a potential end-of-vector point. Point 344 is at a distance from point 343 greater than the minimum extent vector length, shown as being outside the arc 356. Hence, point 344 also establishes a new vector 361. The gesture system records the second extent vector 363 as starting at point 336 and ending at point 343. Point 343 starts the third extent vector 364, which has not yet been determined. A half-plane directional partitioning 354 is oriented to the initial estimated angle of the third extent vector 364, given as the angle of the vector 361 from point 343 to point 344.
- Upon reaching point 347, the finger is found to have reversed direction again. Point 346 is the potential end-of-vector point. The arc 357 indicates a distance of the minimum extent vector length from point 346, and point 347 has not reached that distance. The finger is in a state of reversal at point 347, but no fourth extent vector has been detected. The finger reverses direction again at point 348 and again at point 349. However, none of these points passes arc 357 and therefore no fourth extent vector is triggered. Moreover, none of these points is at a greater distance from the start of the current extent vector, point 343, than the potential end-of-vector point 346 is. Arc 358 represents that distance. The finger is in a state of reversal at all of these points, and none has travelled far enough to end the state of reversal.
- Prior to reaching point 350, the finger is in a state of reversal, but upon reaching point 350 the finger exits the state of reversal and resumes the third extent vector without producing a fourth extent vector. At point 350, the finger has both travelled a distance greater than the minimum extent vector length 357 from point 346 and achieved a distance from point 343 greater than the distance 358 that point 346 is from point 343—it has passed both arcs 357 and 358. The former condition would normally trigger another extent vector, but the latter condition overrides this condition and resumes the current extent vector. Passing the distance at arc 358 is sufficient to resume the third extent vector. The series of reversals between points 346 and 350 did not result in starting a fourth extent vector.
- The finger lifts at point 351. Lifting terminates the current extent vector 364. The last extent vector 364 therefore starts at point 343 and ends at point 351. The finger has traced the three extent vectors 362-364.

7.3 Finger-Mapping Posture

Finger-mapped gesturing is optimized for the rapid sequential input of gestures by a single hand. Input appears to be most rapid when the user holds the hand stationary and selects user requests simply by moving fingers forward and backward on the device facets. "Forward" movement of the finger is finger extension, where the fingertip moves away from the palm, corresponding to the FORWARD discrete direction. "Backward" movement of the finger is finger flexion, where the fingertip moves towards the palm, corresponding to the BACKWARD discrete direction. Backward movement of a finger curls the finger, and forward movement uncurls the finger. Movement of the finger either forward or backward is called "longitudinal" movement.

The ideal posture for a hand performing finger-mapped gestures is called the "finger-mapping posture." To envision the posture, first imagine both hands on a conventional keyboard with the fingers on the home row. That is, on a QWERTY keyboard, the fingers of the left hand are on "A-S-D-F", and the fingers of the right hand are on "J-K-L-;". The fingers are also slightly curled, with the thumbs held in the air. That's the home row posture on a conventional keyboard. Now, leaving the hands in place, remove the keyboard and put a touchscreen tablet or mobile phone under either hand in any orientation—under just one hand, but it doesn't matter which one. Lift the fingers slightly off the touchscreen, and the hand is now in finger-mapping posture for a device accepting input from four fingers. Should the device employ fewer fingers, the additional fingers may stray from this position. The fingers may also relax slightly so that they are no longer perfectly in line as required by buttons on a keyboard. Because touch devices are ideally designed to conform to the gesturing tendencies of the hand, this posture—or a similar one—is also likely best posture for devices having multiple facets or curved facets.

Figure 3C:
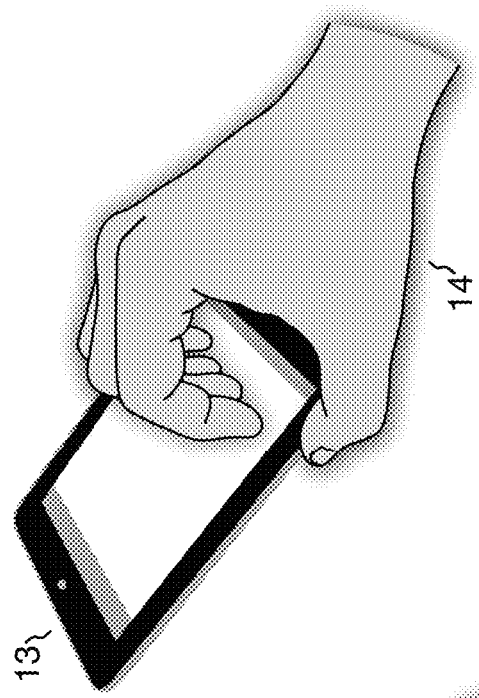
FIGS. 3A-3C depict a hand in "finger mapping posture," which is the suggested posture of a hand that is performing finger-mapped input on a device.
Figure 3B:
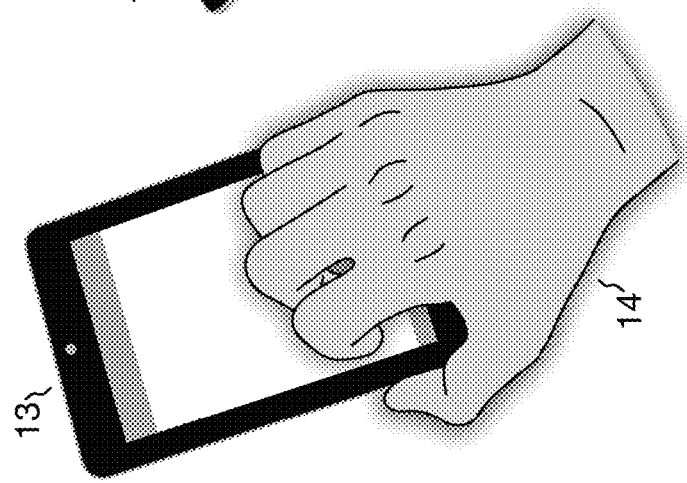
Figure 3A:
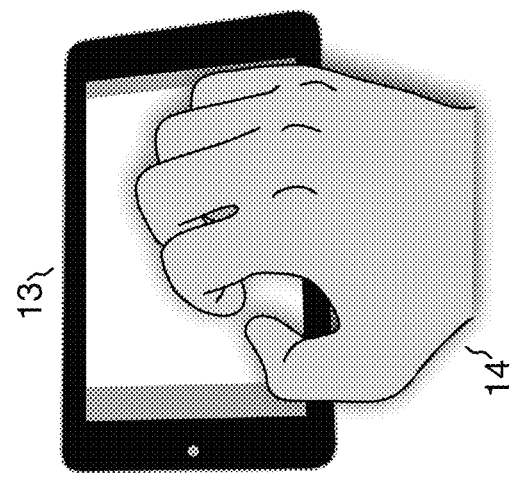
Figure 4A:
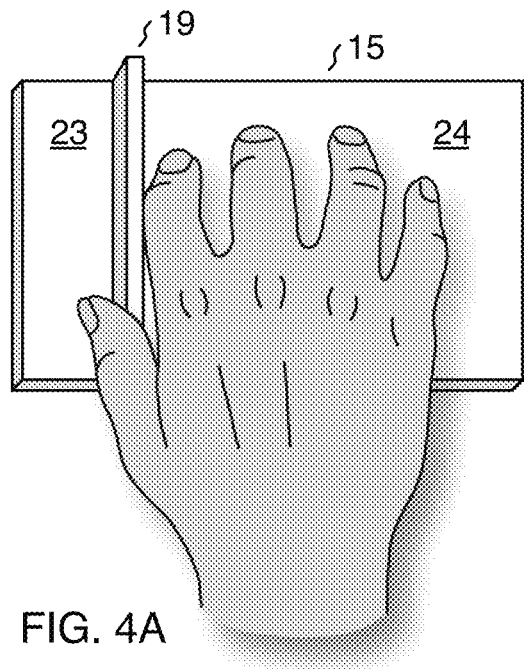
FIGS. 4A-4D depict several input configurations of a two-faceted touch device.
Figure 4B:
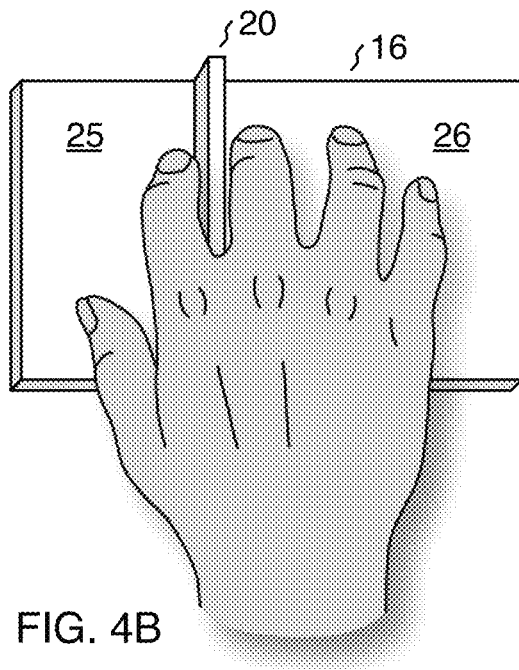
Figure 4C:
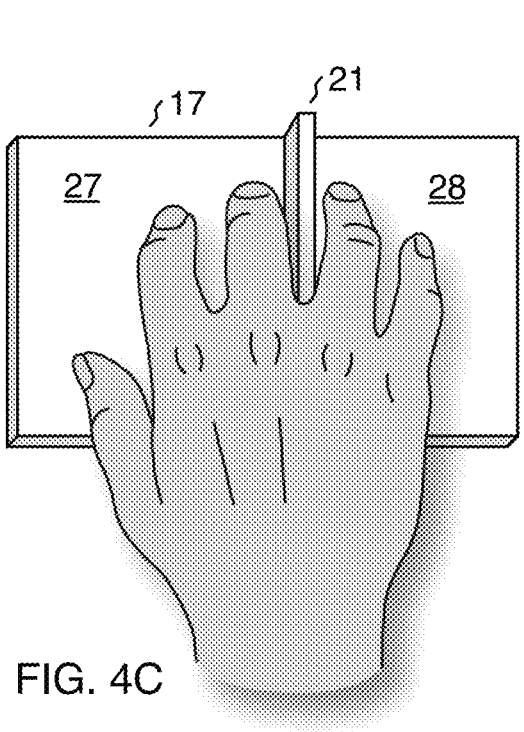
Figure 4D:
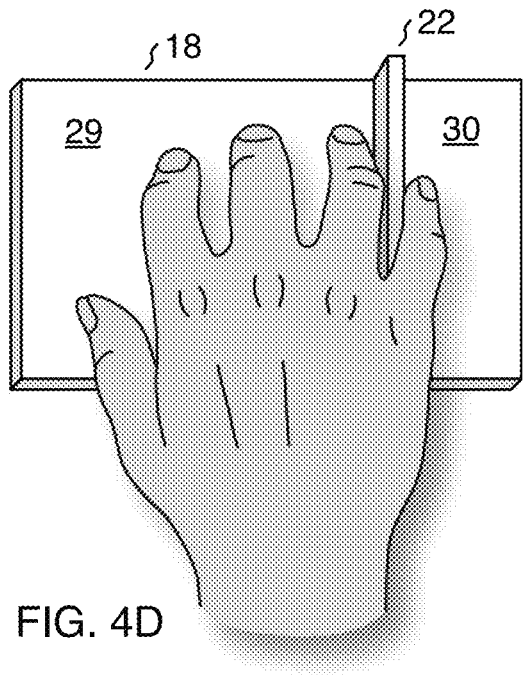

FIGS. 3A-3C each illustrate a hand 14 in finger-mapping posture in several orientations on a touchscreen device 13. The gesture system employs up to four fingers in each these examples. As with touch-typing on a conventional keyboard, in order to reduce stress on the wrist, the wrist is best kept straight, at least on touch devices containing only a single flat facet. The double-headed arrows (e.g. 87-89) in FIGS. 7D-7N illustrate how fingers might gesture forward and backward while in from finger-mapping posture.

Users may find it difficult to push a finger to gesture in the "forward" direction on touch-sensitive surfaces. This pushing action is similar to attempting to point a finger while keeping the finger physically in contact with the surface. While the pushing action will work, it is a difficult technique to master. It is easier for a user to instead think of dragging the fingers away from the palm by brushing the very tip of the finger against the surface. This way the fingers remain curled while gesturing, remaining more in finger-mapping posture. This not only eases gesture input but also speeds up the input of successive gestures.

When the user holds a hand in finger-mapping posture for input into a touch device, the user is also holding the hand in a position and orientation relative to facets of the touch device. For example, the user can place a hand in finger-mapping posture in varying positions and orientations over a touchscreen. This specification refers to a combination of a position and orientation of a hand as a "hand position." The touch device likely does not represent hand positions because the information is not likely available to the touch device. Even so, different hand positions can produce different gesture input, so touch devices may still need to be designed to accommodate different hand positions. For example, an input area on a single facet may support a hand inputting in any of various positions and orientations. It may also be that a touch device provides only one hand position, ensuring that a hand always has the same position and orientation relative to device facets. A device that constrains fingers to grooves may fall into this category, as may a device that receives input via a virtual reality glove, despite the ability of the user to reposition the glove anywhere in space.

Figure 37A:
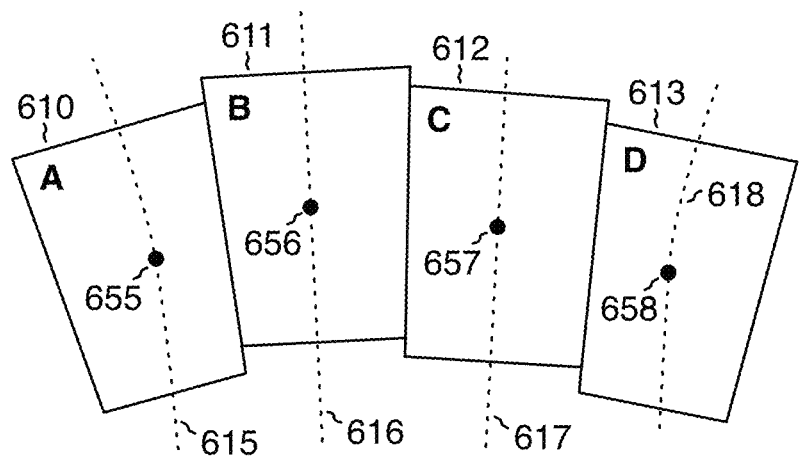
FIG. 37A depicts example longitudinal paths of a hand on a finger map.
Figure 37B:
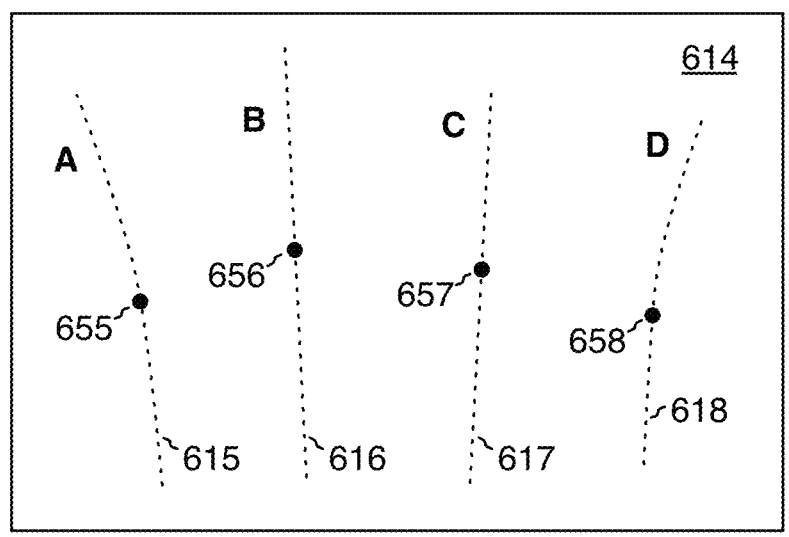
FIG. 37B depicts example longitudinal paths of a hand on an input area absent a finger map.

Fingers move longitudinally while gesturing in finger-mapping posture. A path on the gesture surface that is available to a longitudinally moving finger of a hand in a particular hand position is called a "longitudinal path" of the finger in that hand position. FIGS. 37A-37B each depict an input area and example longitudinal paths 615-618 along which the non-thumb fingers of a hand might gesture while the hand is in finger-mapping posture. Locations 655-658 represent "rest locations" for the fingers, where the fingers might touch were they to rest on the input area while in the posture. FIG. 37A shows that it may be possible for the paths of gesturing fingers to extend outside the input area, and FIG. 37B shows that an input area 614 may fully enclose longitudinal paths. Gesturing mainly entails varyingly moving fingers longitudinally, but the gesture system may also recognize fingers moving in other directions, such as left and right, associating different gesture outcomes with the different directions. Gestures that are not longitudinal are "lateral" gestures.

7.4 Channel-Based Hand Calibration

A gesture system may detect finger-mapped gestures using a characterization of the hand in finger-mapping posture. This characterization is called a "hand calibration." The hand calibration may indicate a particular location and orientation for the hand on the gesture surface, but it may also characterize a hand independently of its orientation and location. Of the variety of possible hand calibrations, the "channel-based hand calibration" is one of the simplest capable of independently characterizing each finger. This hand calibration specifies a particular location and orientation for a hand on the gesture surface, but once established, it can be geometrically translated to other locations, rotated to new orientations, and even scaled to new sizes. Simpler hand calibrations tend to represent subsets of the channel-based hand calibration, and more complicated hand calibrations can generally be represented as channel-based hand calibrations.

7.4.1 Channel Lines

Figure 8A:
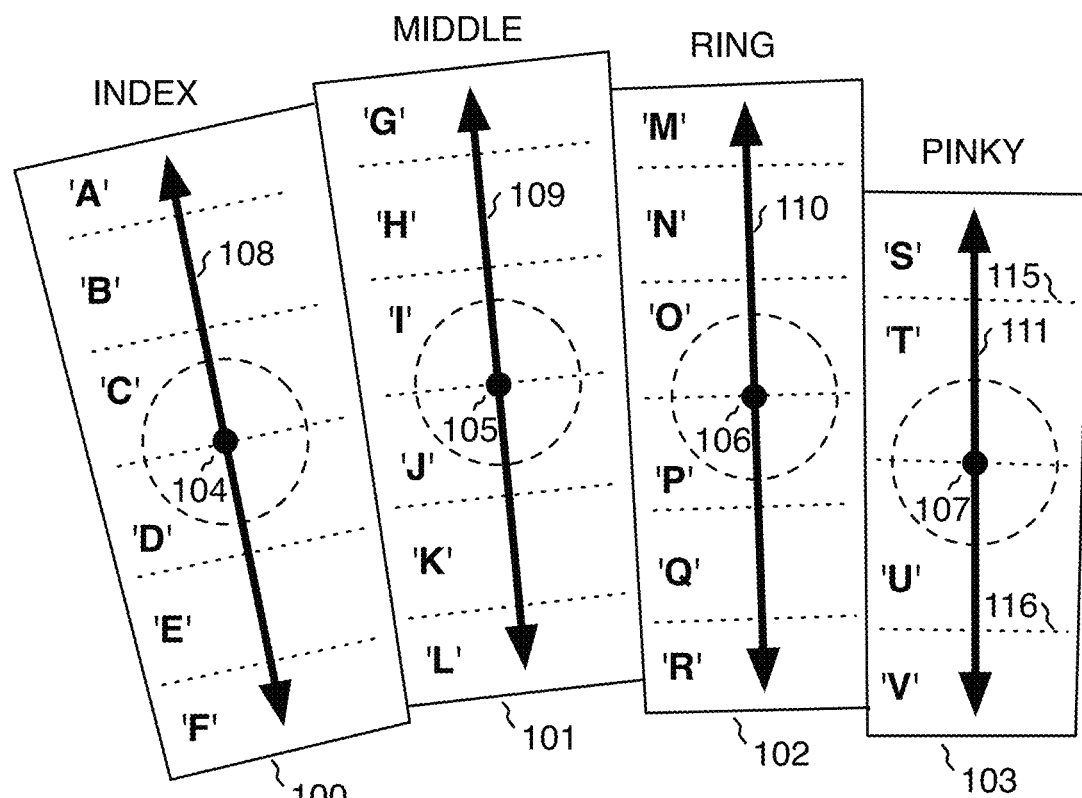
FIG. 8A illustrates the longitudinal selectability of gesture level and gesture direction in single-finger stroke gestures.
Figure 8B:
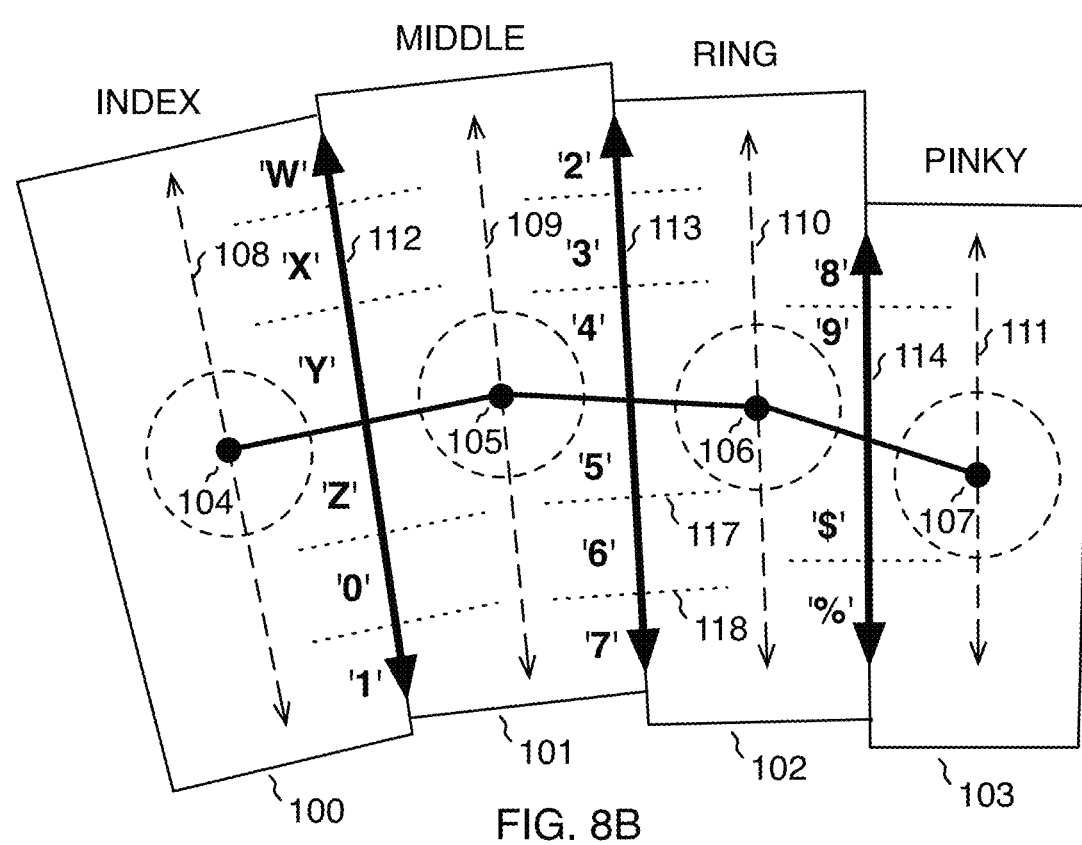
FIG. 8B illustrates the longitudinal selectability of gesture level and gesture direction in two-fingered sweep gestures.
Figure 38:
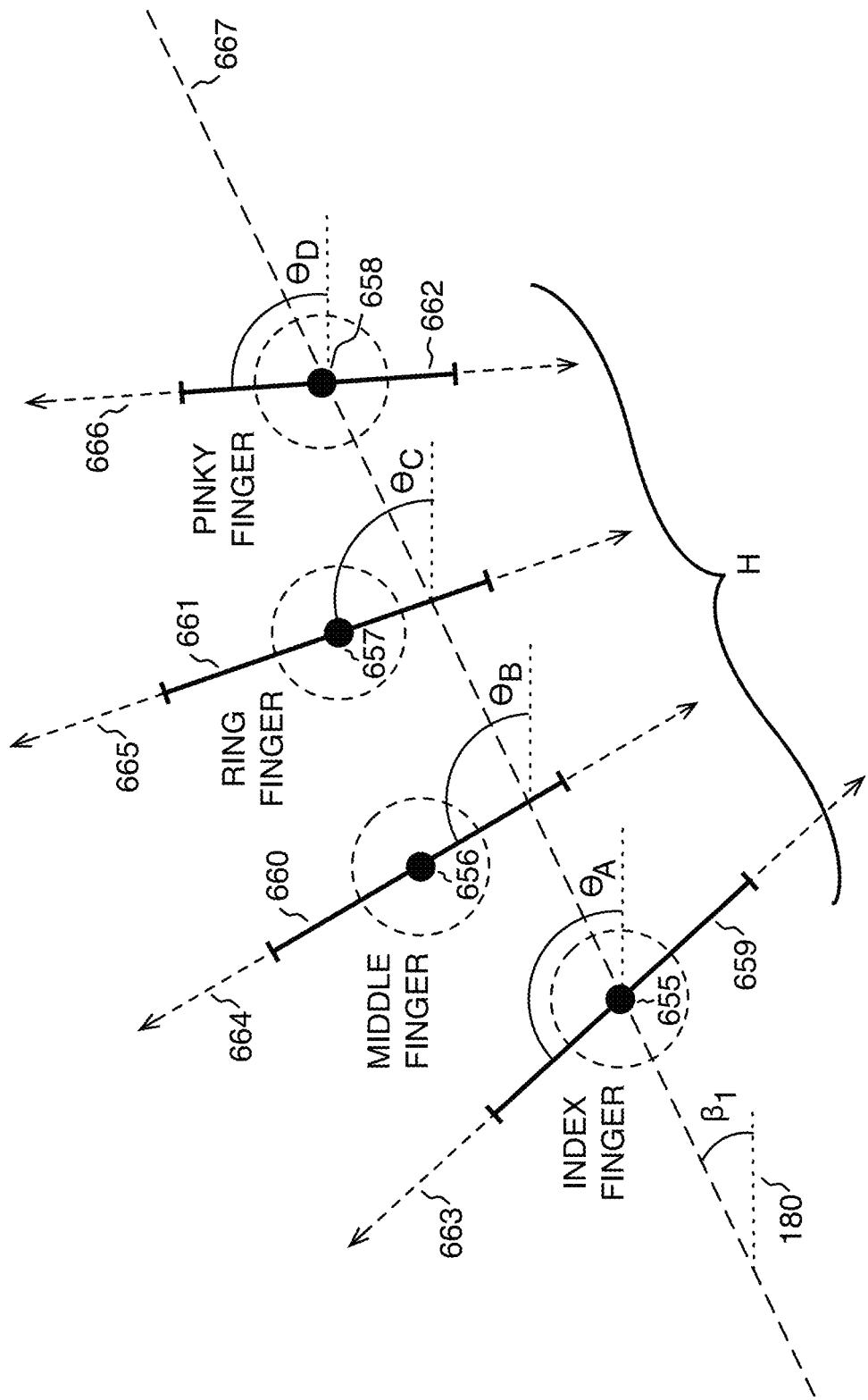
FIG. 38 depicts properties of a channel-based hand calibration.

A channel-based hand calibration approximates longitudinal paths as lines on the gesture surface. As a finger moves forward and backward in finger-mapping posture, the fingertip traces a short path on the gesture surface. The path may be somewhat curved, but users most quickly input gestures by keeping them short, allowing each path to be approximated by a straight line. These are the "channel lines." To best accommodate each finger's inclinations, channel lines need not be parallel. Those that are not parallel will converge somewhere on the gesture surface, indicating that there is an ideal position for the fingers—and hence the hand—along the channel lines, at least when channel lines occur on the same device facet. The rough proximity of this ideal position is called the hand's "home position." A channel-based hand calibration specifies the orientations and positions of the channel lines and the home position on the gesture surface. FIGS. 8A and 8B represent channel lines 108-111 for the index, middle, ring, and pinky fingers. The portions of the channel lines shown depict the reach of fingers that start gesturing at locations 104-107 of an input area. FIG. 38 also depicts channel lines 663-666 for four fingers of a hand.

While a gesture system may support the simultaneous gesturing of multiple hands, this specification refers to a hand calibration as a characterization of a single hand. The channel lines of adjacent non-thumb fingers of a hand tend to be roughly parallel. Most users should find their hands accommodated by a set of channel lines for which line angles of every two adjacent channel lines differ by at most $\pi/6$ radians by class equivalence. Unless the channel lines are actually parallel or the fingers all have independent facets, there is a location on each channel line to which each finger most naturally returns between gestures, where the finger would touch were it resting on the gesture surface. These are called "rest locations." There are also maximum distances above and below the rest locations that the fingers are likely to travel while gesturing. These distances bound line segments on the channel lines. These line segments are called "channel line segments." FIG. 38 depicts an example hand calibration with rest locations 655-658 and channel line segments 659-662.

7.4.2 Finger Calibrations

A "finger calibration" is a representation of the properties of a particular finger of a hand calibration. A channel-based hand calibration is defined in terms of finger calibrations, representing possible gesturing fingers. Each finger calibration includes some or all of the following information, including at least an associated finger identity:

Finger Identity—Each finger calibration corresponds to a particular finger identity.

Channel Line—The "channel line" is the line that the finger traces on average as it moves forward and backward on the gesture surface while the hand remains in home position. The line may be theoretical and not actually correspond to a known longitudinal path of the finger, in which case the line serves as the presumed average path of the finger. However, the line may also be computed from actual movements of the finger, representing a bisection of the space that the finger tends to occupy as it moves forward and backward, according to the locations that the finger assumes during its travels, or at least according to the locations of the maximum extents of the finger as it travels. A channel line extends infinitely in two directions, even though the fingers only traverse a portion of the distance.

Channel Line Segment—The "channel line segment" indicates the maximum extents forward and backward that the finger is likely to gesture along the channel line when the hand is in home position. This is not a property that the gesture system must enforce; rather, it's a property that the gesture system may use to help accommodate the user. The channel line segment can be determined for a specific finger of a specific user's hand, but it can also be assigned by default independently of a particular user's hand. If it is not explicitly specified, it can be assumed to be the line segment given by the intersection of the channel line with the input area.

Channel Direction—The "channel direction" is the linear direction of the channel line. Just as the channel line represents the average longitudinal path of the finger, the channel direction represents the average linear direction of a finger as it travels along longitudinal paths. A channel direction indicates both a forward direction and a backward direction along the channel line without necessarily distinguishing the two directions. Channel direction is independent of location, so it is possible to establish a finger's channel direction without also establishing the finger's channel line.

Forward Direction—The "forward direction" of the finger is the forward direction of the finger along the channel line. It is one of the two directions of the channel line. The forward direction of a region may also be thought of as the direction in which the finger that gestures on the region is most likely to move when extending. This specification expresses the forward directions of fingers in terms of angles for illustrative purposes only and refers to these angles as "forward angles"; other representations of direction are also possible.

Rest Location—The "rest location" of a finger is a location on the channel line that serves both as an estimate for the midpoint of the channel line segment and as an estimate for where the user could rest the finger on the gesture surface to indicate the placement of the finger for the hand's home position. Stated another way, the rest location is a location for the finger when a hand in finger-mapping posture rests all of the fingers of a hand on the gesture surface. Touchscreen devices can display finger rest locations to help the user position the hand in home position for optimal gesturing. The actual rest locations suitable for a hand in finger-mapping posture will likely vary over time as the hand gestures, because the hand is likely to gradually drift across the gesture surface. Rest locations for adjacent finger identities can normally be expected to be within 20 mm of each other.

FIG. 38 depicts a channel-based hand calibration for a gesture system supporting four non-thumb fingers on a single-facet touch-sensitive surface. It illustrates rest locations 655-658, channel lines 663-666, channel line segments 659-662, and forward angles ($\theta_A$, $\theta_B$, $\theta_C$, and $\theta_D$) for the fingers of a hand in home position. The channel lines 663-666 also represent channel directions, with an arrow pointing in each direction of the channel direction. Notice that the channel line segments 659-662 appear on the gesture surface in series, one after another, so that there is one line segment at each end of the series (659 and 662) and so that each of the remaining line segments (660 and 661) is between two other line segments. While it is technically possible to support finger mapping with line segments in arbitrary arrangements on the gesture surface, the series arrangement is the most pragmatic one for input by a stationary hand and hence the one that this specification assumes for fingers that share facets in hand calibrations. Were a channel line included in this figure for the thumb, it would likely appear at an angle significantly different from the angle $\theta_A$ of the index finger's channel line 663, depending on the characteristics of the particular user's hand, because the natural paths of the thumb and the index finger tend to be nearly perpendicular.

7.4.3 Correspondence Series

A "correspondence series" is a group of entities that correspond to distinct finger identities of a hand. The group behaves as a series because the finger identities are ordered according to the order on the hand of the fingers that they identify. The order of the finger identities implies an order for the entities of the group. The actual representation of the group within the gesture system may be unordered with each entity associated with a finger identity, but the representation of the group may also be ordered, possibly with the entities being implicitly associated with finger identities according to their order. In any case, a correspondence series is treated as a series having adjacent members, as series do, and having end-of-series members, as series do. Fingers may occur in a correspondence series, as may touch locations for fingers, paths for fingers, and finger calibrations.

Consider a hand in finger-mapping posture held stationary over a touchscreen. Imagine the fingers brushing forward and backward along the touchscreen, as the fingers extend and flex. Each finger approximately traces a channel line segment. The channel line segments occur ordered on the touchscreen according to the order of their corresponding fingers, as do the associated channel lines. Upon determining the order in which the channel line segments occur on the touchscreen, the channel line segments and their finger calibrations can be sequentially associated with sequential finger identities, consequently forming a correspondence series.

When the members of a correspondence series are physical entities, sequential members of the series are physically ordered according to their order in the series. Adjacent members of a series of physical entities are physically adjacent, except possibly for buffers between the fingers. For example, as shown in FIGS. 4A-4D, a physical barrier can separate adjacent fingers, and as shown in the facets 51-54 of FIG. 6 and their projections 55-58 onto a gesture surface 59, per-finger gesturing areas can be separated from each other by horizontal and vertical space.

Adjacent members of a correspondence series need not correspond to the finger identities of adjacent fingers of a hand. When they do not, no member of the correspondence series corresponds to a finger identity that is between the finger identities to which the adjacent members correspond. There is no requirement that a gesture system only employ adjacent fingers of a hand. Moreover, it is possible to describe properties of a gesture system in terms of subsets of the fingers that the gesture system supports. For example, it is possible to describe behavior that is available to a selection of three finger identities even though the gesture system supports the use of four finger identities. In particular, a subset of a gesture system may itself have the properties of a gesture system, suggesting that a subset of a correspondence series of one gesture system can itself be a correspondence series in the context of another gesture system. In this scenario, it is possible for physical entities that are part of a correspondence series to end up serving as buffers between physical entities of a subset correspondence series.

The use of a correspondence series allows the gesture system to infer unspecified properties of members of the series from properties specified for other members of the series. In order to take advantage of this, the correspondence series must include at least three members, and properties must be specified for at least two of the members. For example, when a hand calibration is for three or more finger identities and only two finger calibrations are specified, finger calibrations for the remaining fingers can be approximated through interpolation or extrapolation. FIGS. 46A-46F and 47A-47F, which are explained in detail later, depict examples of inferring properties of finger calibrations from properties of other finger calibrations. Because thumbs tend to move and be positioned in ways that are generally independent of other fingers, this specification sometimes excludes from correspondence series entities that correspond to a thumb.

7.4.4 Derived Properties

A number of properties can be derived from the hand calibration for use by the gesture system. Two of them derive from the rest locations of the first and last non-thumb fingers in the series of finger calibrations and are considered to be properties of the hand calibration. These properties are as follows, as illustrated in FIG. 38:

Orientation Line—The "orientation line" is a line that intersects the rest locations of the first and last finger calibrations. FIG. 38 shows an orientation line 667 intersecting rest locations 655 and 658. It also shows the orientation of the orientation line as the angle $\beta_1$.

Hand Breadth—The "hand breadth" is the distance between the rest locations of the first and last finger calibrations. FIG. 38 shows the hand breadth with length H as the distance between rest locations 655 and 658.

These properties are mainly useful for re-positioning a hand calibration on the gesture surface. Hand calibrations can be saved for later use, possibly at different locations on the gesture surface and possibly in different orientations. A gesture system that employs parallel channel lines only requires the hand breadth property to determine the spacing that is suitable for a particular user's hand. However, having rest locations for each finger allows the gesture system to better accommodate the user's gesturing inclinations. When the channel lines are parallel, the rest locations should be normalized to all occur on an orientation line perpendicular to the channel lines, so that orienting the orientation line predictably orients the channel lines.

7.5 Finger Identification

Finger-mapped gesturing allows different fingers performing the same gesture actions to yield different gesture outcomes. The outcome of a finger-mapped gesture is a function of the identities of the fingers that perform the gesture. There are many approaches to establishing finger identities. On some devices, the host may provide finger identities, such as when the device physically tracks the fingers or distinguishes fingers by their electrical characteristics. On other devices, the gesture system may deduce finger identities. When each finger uses a different facet of the device, the gesture system can associate each facet with a distinct finger identity. When multiple fingers share the same facet, the gesture system can implement a "finger map" to associate fingers touching different regions of the facet with different finger identities. Finger maps are generic enough to be implemented when the host does not provide finger identities. Regardless of the approach, in order to maximize user efficiency, the touch device should provide the user with assistance associating fingers with finger identities.

7.5.1 Finger Maps and Input Regions

A "finger map" is a partitioning of the input area into two or more regions, which for contextual clarity may also be called "input regions." Being a partitioning, every location in a finger map belongs to exactly one region. Regions do not cross facet boundaries, but multiple regions may partition a single facet. Regions may correspond to entire facets on multi-faceted devices, but only the facets capable of serving multiple fingers can be partitioned. According to the definition of "gesture surface," different facets are assumed to map to different areas of the gesture surface, allowing this specification to describe the gesture system as identifying fingers by the input regions that they touch, or in certain cases involving conflicts, by the proximities of fingers to input regions.

When the host does not provide finger identities, the gesture system identifies fingers with finger maps. To determine the identity of a finger using a finger map, the gesture system first associates each finger that touches the input area with a region of the finger map. By default, a finger is associated with its originating region. A finger's "originating region" is the region that contains the finger's initial touch location. When multiple simultaneously touching fingers are in conflict by having the same originating region, the gesture system may reassign the fingers to distinct regions. Except when reassigned to resolve conflicts, a finger retains its region association for as long as it remains touching the gesture surface, no matter where the finger moves, even if it moves into a different region. A finger also retains its region association even if it moves out of the input area, for as long as it remains touching a facet. Each region is associated with a finger identity, and each finger is assigned the finger identity of its associated region. Using a finger map, the gesture system thus presumes to know the identities of fingers that touch the gesture surface.

Figure 7A:
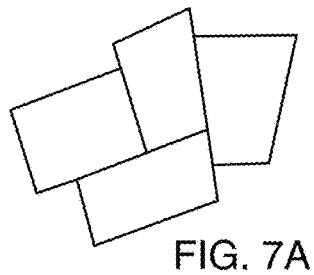
FIGS. 7A-7N depict a variety of ways to partition an input area into the input regions of a finger map.
Figure 7B:
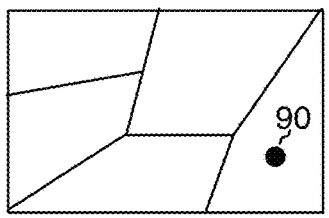
Figure 7C:
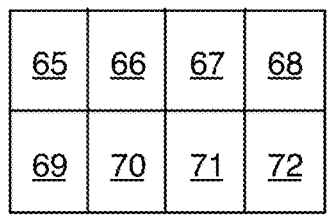
Figure 7D:
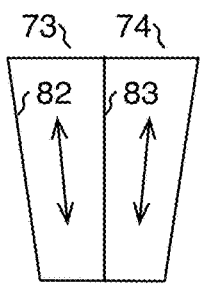

The form of a finger map and its input regions can be tailored to facilitate associating input regions with finger identities. FIGS. 7A-7N illustrate some possible finger maps for a single-facet input area. The double-headed arrows (e.g. 87-89) indicate the anticipated directions of finger extension and flexion and can be thought of as channel lines or channel directions. The dots 90-97 indicate regions supporting "holds," which are explained later. The finger maps of FIGS. 7A and 7B are examples of arbitrary partitionings of the input area. Arbitrary partitionings limit the rate at which users can input gestures because they are not design for efficient input. Finger map of FIG. 7C has a uniform layout analogous to a keyboard, but a user attempting to input finger-mapped gestures on it must be careful to originate vertical strokes in the proper region 65-72. The configuration would be better suited as two distinct finger maps, one for regions 65-68 and one for regions 69-72, that the user selects between while inputting user requests. The finger maps of FIGS. 7D, 7E, and 7F only support finger-mapped gestures of two or three fingers. The finger maps of FIGS. 7G, 7H, and 7I each support input by the index, middle, ring, and pinky fingers. For example, regions 63, 64, 98, and 99 identify the index, middle, ring, and pinky fingers, respectively. Regions 78-81 are parallel in FIG. 7G, making this finger map especially well suited for a small input area such as might be expected on a touchscreen smartphone, but poorly suited for people whose fingers do not easily gesture along these directions. The finger maps of FIGS. 7J, 7K, and 7L include support for the thumb performing a hold, as explained later. FIGS. 7M and 7N show finger maps that are designed to support two hands at once. These latter finger maps can be implemented as two distinct finger maps working together. If they are implemented as a single finger map, the finger identity includes an indication of whether it refers to a finger on the left or right hand.

The input areas shown in FIGS. 7A-7N have varying shapes, as do the regions (e.g. 65-81) depicted in the input areas. The form of the surface allocation in part limits the form of its input area and hence also the forms of the input regions. It is useful to select the forms of an input area and its input regions to optimize them for a particular person's hand, according to measurements that are specific to the particular hand. The contour of the finger map is limited by the boundaries of the surface allocation that the host provides, but a gesture system may further limit its extent to just the area that a particular hand is likely to reach while gesturing.

7.5.2 Hand-Optimized Finger Maps

Gesturing on finger maps having more than two regions is difficult and unreliable unless the finger map is tailored to the requirements of a person's hand. As with touch-typing on a conventional keyboard, rapid input requires that a hand remain stationary as the fingers quickly move. This places each finger in its own region. Even so, people's hands have varying widths, placing their fingers at varying distances apart. A conventional keyboard requires that everyone place their fingers on the same keys of the home row, but hands of different sizes have different levels of difficulty reaching other keys. Sliding fingers forward and backward on a gesture surface is analogous to reaching for keys other than those on the home row and presents similar difficulties. To eliminate the difficulties of accommodating different users, a finger map can be based on a hand calibration.

Figure 7E:
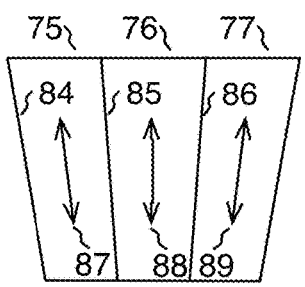
Figure 7F:
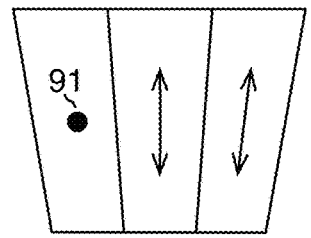
Figure 7G:
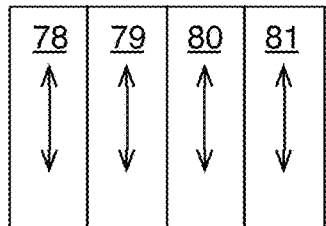
Figure 7H:
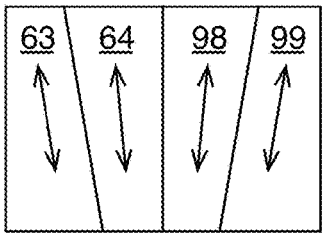
Figure 7I:
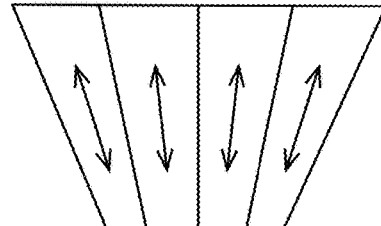
Figure 7J:
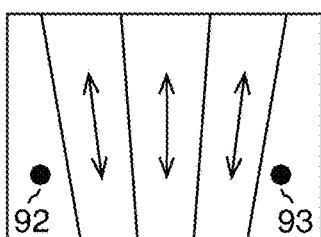
Figure 7K:
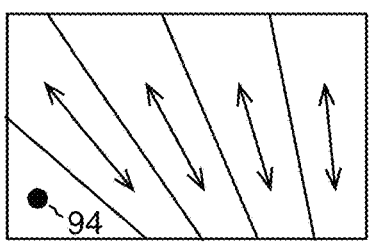
Figure 7L:
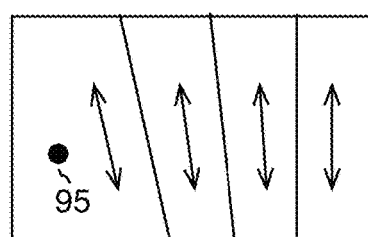
Figure 7M:
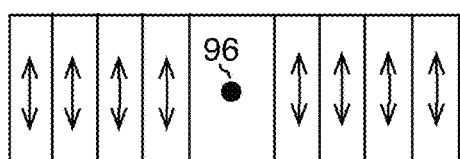
Figure 7N:
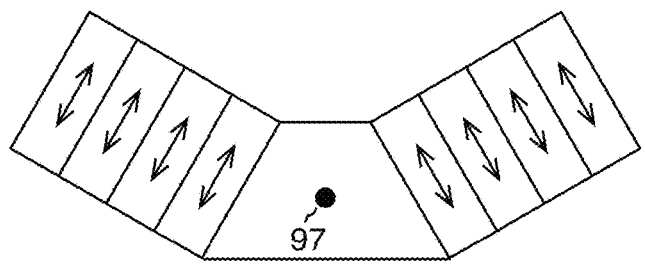

Consider the finger map in FIG. 7E. This finger map has three regions 75-77. To maximize gesturing efficiency, these regions 75-77 should be spaced according to the needs of a particular person's hand, thus selecting the width of the middle region 76. Spacing is not required for finger maps of only two finger identities, such as the finger map of FIG. 7D, where a person need only have two fingers straddle the boundary 83 between two regions 73-74, obviating the need to space regions 73-74 specifically for the hand. A hand calibration provides the information necessary to space regions to suit a particular hand.

A hand calibration for a finger map determines the spacing of the input regions, so that the regions are comfortably located under the user's fingers. It need only specify the relative positions of regions, rather than the actual positions of the regions on the gesture surface, as long as the gesture system provides a means for positioning the resulting finger map. For example, the gesture system could center the finger map on the given surface allocation, or the gesture system could provide a way for the user to select the placement of the finger map and then construct a finger map at that placement having the indicated relative spacing properties. A channel-based hand calibration is capable of specifying the relative positions by virtue of specifying positions in each finger calibration, but simpler hand calibrations are possible. For example, a hand calibration could just specify a width, such as by having the user input a number or by spacing two user interface elements to an appropriate distance apart. This width can be used as a hand breadth, indicating how far apart the end regions are to be separated, with the sizing of the interior regions being determined by interpolation. This specification later describes many other possible hand calibrations.

In order to take advantage of the efficiency available to finger-mapped gesturing, a finger map must have at least two regions designed to accommodate the gesturing of at least two different fingers of the same hand. When the fingers of the same hand reside on different facets, the touch device itself can ensure that the facets accommodate the fingers for gesturing, such as by allowing the user to change the relative positioning of the facets. When multiple fingers of the same hand reside on a shared facet, a hand calibration specifies how to partition the facet into regions.

Figure 27A:
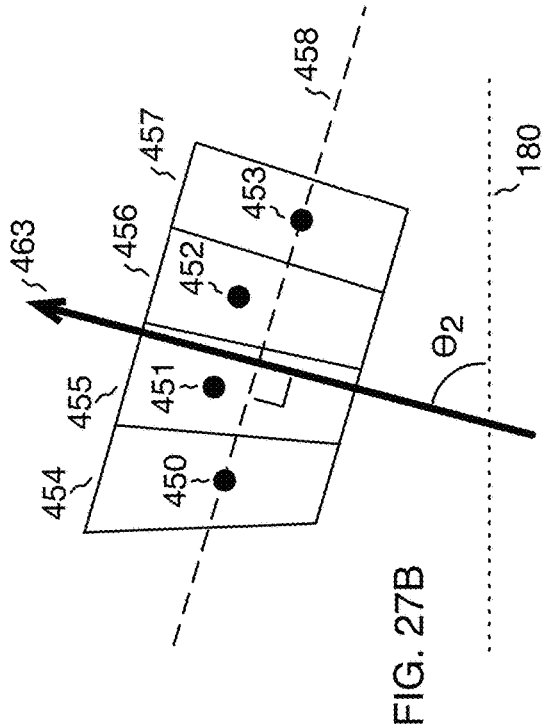
FIGS. 27A-27D depict several ways to define a reference angle for a finger map.
Figure 27B:
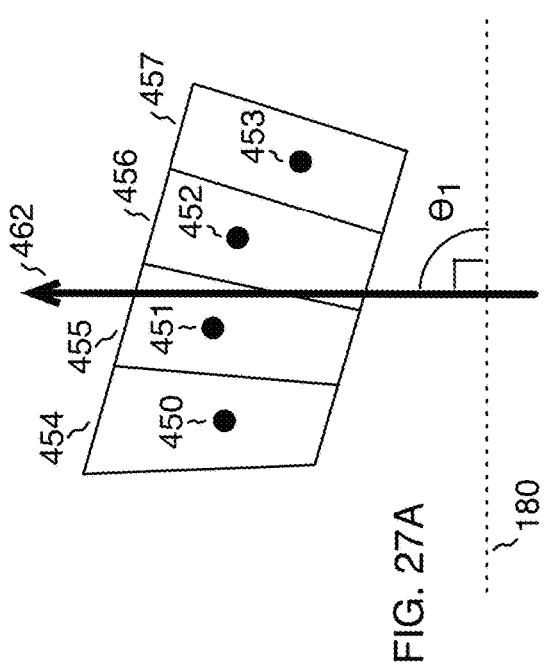

Regions of a shared facet that correspond to fingers of the same hand form a correspondence series. Some examples might include: a) when a facet accommodates multiple fingers of the same hand, b) a channel-based hand calibration specifies a series of adjacent finger identities, c) a series of adjacent channel lines or channel line segments, or d) a series of adjacent regions for the facet, all corresponding. Ideally, the gesture system defines adjacent regions to be contiguous in order to maximize the space available to a finger for gesturing and to minimize the odds of a gesture attempt going unrecognized. When a hand calibration specifies the spacing of regions, the gesture system should widen regions as necessary to keep adjacent regions contiguous. A correspondence series of regions typically has the property that a straight line can be drawn on the gesture surface through all of the regions in the series. FIG. 27B depicts this with the dashed line 458 through regions 454-457.

7.5.3 Channel-Based Finger Maps

There is a way to base a finger map on a channel-based hand calibration that is ideal for its simplicity and for its benefit to users. The approach specifies the boundaries between regions that are adjacent on a shared facet. In a channel-based hand calibration, each finger calibration defines an input region by defining a channel line that represents the average longitudinal path of the finger in that region. As users gesture, their fingers are likely to touch the gesture surface around this channel line, so the ideal finger map associates each finger with the nearest channel line. This is accomplished by putting the boundary between adjacent regions exactly halfway between their channel lines, bisecting the space between the channel lines. This assigns each location of the input area to the region whose channel line is nearest to that location. The locations on the boundary line itself should also be assigned to one of the adjoining regions.

The inventor has derived a set of equations for determining the ideal boundary line between adjacent regions, given channel lines of the regions' finger calibrations. The first equation yields an indication of the distance between two channel lines relative to a particular location on one of the channel lines. Specifically, the equation yields the length of a line segment having one terminus at the particular location, having the other terminus on the other channel line, and passing perpendicularly through a line that bisects the area of the gesture surface between the two channel lines. Let the first channel line be given by the location $(Q_X, Q_Y)$ and angle $\theta_Q$. Let the second channel line be given by the location $(R_X, R_Y)$ and angle $\theta_R$. The "distance" d from location $(Q_X, Q_Y)$ to the second channel line is then given by the following equation, where absolute values are denoted in vertical bar notation:

$$d = |(\sin(\theta_R)*(R_X-Q_X)+\cos(\theta_R)*(Q_Y-R_Y))/\cos(|\theta_Q-\theta_R|/2)|$$

To specify the boundary line between the two adjacent regions, let $(P_X, P_Y)$ be a location on the boundary line, and let $\theta_P$ be the angle of the boundary line. The boundary line is calculated as follows:

$$\theta_P = (\theta_Q + \theta_R)/2$$

$$P_X = Q_X + (d/2)*\sin(\theta_P)$$

$$P_Y = Q_Y - (d/2)*\cos(\theta_P)$$

Figure 42:
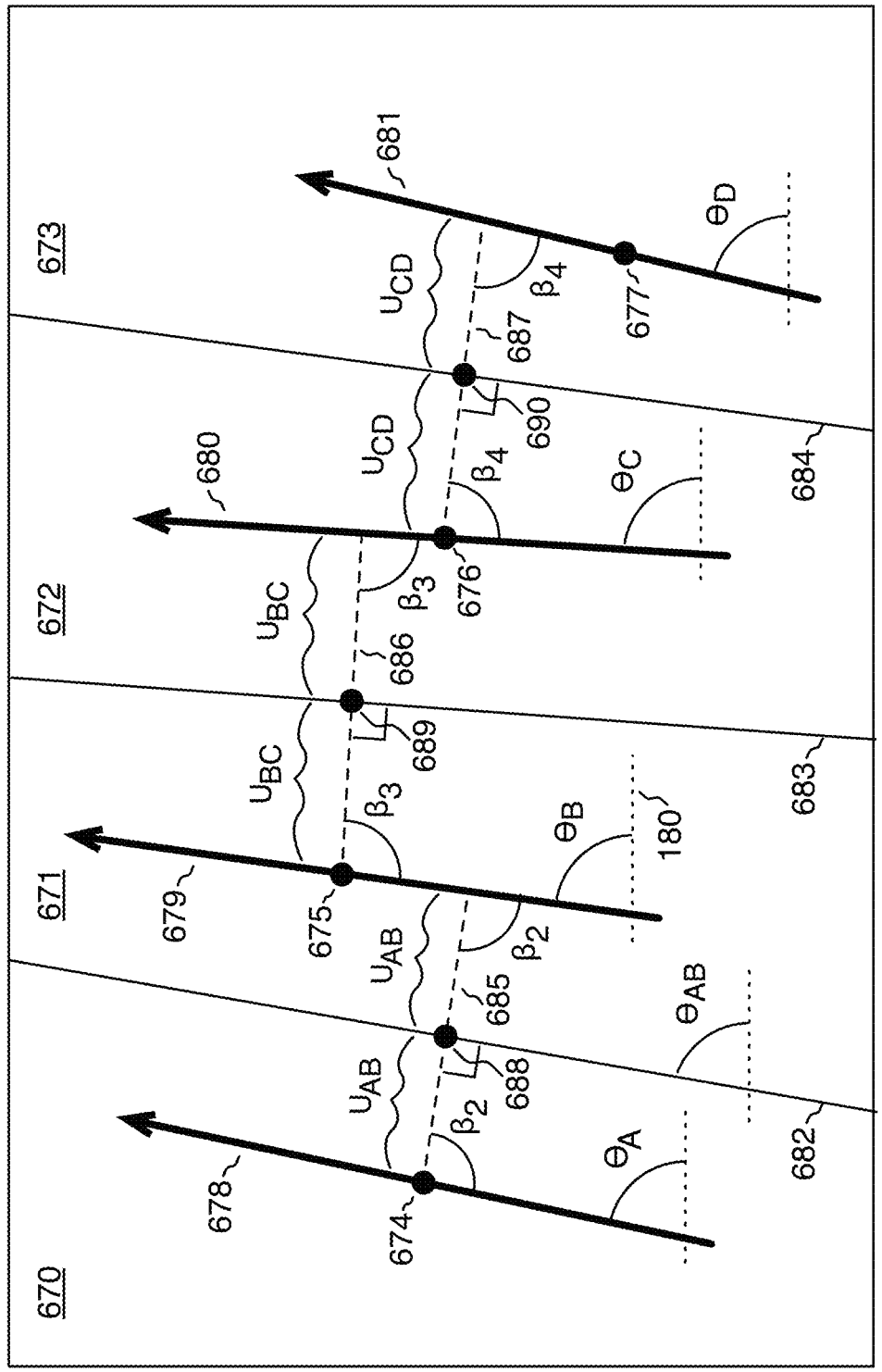
FIG. 42 depicts an example of a channel-based finger map.

The gesture system can apply this set of equations to determine the boundary line between every two adjacent regions on a facet defined by a series of finger calibrations. FIG. 42 depicts some of the geometric properties of a finger map computed via these equations. In this figure, region boundaries 682-684 are computed for a rectangular input area from a hand calibration for four fingers. The dots 674-677 represent rest locations and the bold arrows 678-681 represent channel lines. The angles $\theta_A$, $\theta_B$, $\theta_C$, and $\theta_D$ are line angles for the channel lines 678-681. To compute region boundary 682, let $(Q_X, Q_Y)$ and $(R_X, R_Y)$ be the coordinates for rest locations 674 and 675, respectively. Rest locations 674-675 are chosen because they are points that the hand calibration provides for the channel lines 678-679. Let $\theta_Q$ be the angle $\theta_A$ of the channel line 678 through point 674, and let $\theta_R$ be the angle $\theta_B$ of the channel line 679 through point 675. The value of the computation for d yields the length of the dashed line segment 685 through points 674 and 688, although point 688 has not yet been computed. d is the shortest distance from rest location 674 to channel line 679. Computing $\theta_P$ yields the angle $\theta_{AB}$, which is the angle of the boundary 682 between regions 670 and 671. Computing $(P_X, P_Y)$ yields the coordinates of point 688, which is the midpoint of the dashed line segment 685. Point 688 and the angle $\theta_{AB}$ together specify a line, which is the boundary line between regions 670 and 671, halfway between channel lines 678 and 679.

After computing all three interior boundary lines 682-684, each point on an interior boundary line is equidistant from the nearest points on the two adjacent channel lines. FIG. 42 depicts this property for the points 688-690 on the interior boundary lines 682-684. Each point 688-690 is the midpoint of a dashed line segment 685-687 that is perpendicular to a boundary line 682-684, as illustrated by the lengths $U_{AB}$, $U_{BC}$, and $U_{CD}$ indicated for each half of the line segments 685-687. The lengths $U_{AB}$, $U_{BC}$, and $U_{CD}$ together with the angles $\beta_2$, $\beta_3$, and $\beta_4$, depict the relationships that establish the boundary lines 682-684 as bisecting the area between adjacent channel lines.

The equations successfully determine a boundary line between two converging channel lines as well as a boundary line between two parallel channel lines. The boundaries can be used not only for determining the identities of touching fingers, but also for displaying the boundaries to assist the user with positioning the hand. The gesture system need not actually determine the boundary lines, as the gesture system could equivalently determine the nearest channel line to a finger's touch location and assign the finger the finger identity to which the channel line corresponds.

Channel-based finger maps are able to shape and orient each input region to the preferences of a particular finger of a particular hand. It may be that most people are able to perform finger-mapped gestures in input regions having parallel, vertical boundaries, once appropriately spaced. However, it may also be that a small but non-negligible portion of the population cannot gesture reliably under these constraints: some people may have fingers that insist on gesturing forward or backward at non-negligible differences in direction. Absent accommodation by the finger map, the user could frequently indicate the wrong finger identity or the wrong discrete direction, should the gesture system parameterize user requests by gesture direction. For example, unless the shape of a region is slightly angled to accommodate a finger, the finger may on occasion start a gesture in the wrong input region and thereby indicate the wrong finger identity.

A distinctive characteristic of channel-based finger maps is that they are able to capture finger movements that are approximately but not perfectly parallel. Heeding even limited differences between adjacent channel directions also enable the gesture system to better accommodate gestures that distinguish between left and right movement of the hand. If a user naturally moves a finger forward and backward at a large angle compared to the angles at which other fingers of the same hand move forward and backward, the gesture system may not always properly distinguish left-and-right movement of the finger from forward-and-backward movement. However, if the user performs the left or right gesture by pivoting the hand left or right at the wrist instead of moving the entire forearm, the finger moves in a direction that is locally perpendicular to the finger's natural forward and backward directions of movement, requiring the finger map to be sensitive to the ranges of forward and backward directions that are specific to the finger. By determining a gesture's direction relative to the directions at which each finger naturally moves, no matter how minimally different those directions are, the gesture system is able to more accurately detect an intended LEFT or RIGHT range of movement or other range not FORWARD or BACKWARD.

7.5.4 Multi-Hand Finger Maps

The gesture system may also deduce finger identities for a gesture from calibrations for multiple hands, such as hand calibrations for both the left and right hands. It is possible for a single gesture system to monitor an input area with a single finger map consisting of regions for fingers of both hands, where each finger identity also identifies the left or right hand. FIGS. 7M and 7N illustrate such finger maps. However, there is also a way to architect the gesture system so that it scales across arbitrary numbers of coordinating hands. This latter approach leverages a gesture system designed for only one hand, with each gesture system employing a single hand calibration. The gesture systems independently report their gesture outcomes to the host, but along with each gesture outcome they also report the time at which all gesturing fingers were first touching the gesture surface and the time at which the first gesturing finger lifted. The host combines the separately reported gesture outcomes to determine the behavior that the user intended to indicate. The two times accompanying each gesture outcome enable the host to determine whether gestures by separate hands on separate gesture sessions are joint or sequential: two gestures are joint exactly when the intervals that these times delimit overlap. Joint gestures together indicate a single user request, while sequential gestures indicate sequential user requests.

7.5.5 Assistive Association

Consider a touch device that uses the same fixed-width finger map for all users. On this touch device, the finger map never changes, and the user has no ability to select among different region widths. Such a finger map may be fixed in the form of the finger map of FIG. 7G. This touch device delegates to the user all responsibility for properly indicating finger identities. The user must train each finger to gesture in the appropriate region. When there are only two adjacent regions, the fingers need only straddle the boundary between the regions, but when there are more than two regions, the fingers must spread appropriately apart, because each finger must be positioned relative to adjacent fingers. If multiple devices employ this approach using finger maps of different widths, the user must adapt the hand to the varying widths when moving from device to device. These devices provide the user with no assistance for indicating finger identities, thereby restricting efficient, accurate input to skilled and adaptable users. Hence, touch devices for three or more fingers best serve users by providing assistance associating finger identities with fingers.

There are several ways for a touch device to assist users with input into a finger map. Generating a finger map from a hand calibration is one such way. Another is to provide multiple finger maps of varying widths to give the user a selection of finger maps to choose from. The user can choose the finger map that is most effective for the user's hand. The touch device can also provide the user with finger maps of a variety of forms, where the input regions may also vary in form. The touch device may also provide the user with a fixed finger map that varies in width, allowing the user to place the hand in home position on the finger map over the portion of the finger map according to the width that suits the user. The finger maps of FIGS. 7E and 7I can be used for this purpose. For example, a child could place the hand with the fingers near the bottom of the finger map, where the finger map is narrow, while an adult could place the hand with the fingers near the top of the finger map, where the finger map is wide. People with hands of intermediate size could place the hand with fingers somewhere midway between the top and the bottom.

The touch device could also provide physical boundaries between fingers to keep each finger gesturing on its associated input region. FIGS. 4A-4D illustrate various placements of a boundary 19-22 between fingers. A touch device may even include a boundary between every two fingers that can gesture, or equivalently, the device may provide a groove for each finger to follow in order to reduce the chance that a finger will accidentally gesture on the wrong portion of the gesture surface. In these scenarios, the gesture system may implement a finger map to determine the identities of gesturing fingers or the host may directly indicate the finger identity. For example, if the boundaries or grooves restrict each finger to a distinct facet of the touch device, the host can report the finger's facet to the gesture system. The facet indicates the finger identity, so there is no need for the gesture system to use a finger map to distinguish fingers of that finger identity. When each finger has its own facet, as in FIG. 6, there is no need for a finger map at all.

A host that determines finger identities for the gesture system may be able to assist the user by making the process of indicating finger identities invisible to the user. Compare FIG. 37A, which represents an input area that is a finger map, with FIG. 37B, which represents an input area that does not use a finger map. In FIG. 37A, the user must place fingers so that they gesture paths 615-618 in the proper input regions 610-613, whereas in FIG. 37B, the host is expected to distinguish fingers for the user. Assuming that the host can accurately distinguish fingers, the solution of FIG. 37B is preferable because fingers cannot drift out of their input regions.

There are many ways for a host to distinguish fingers. One way is to mechanically track the fingers. A probe or sensor could be fixed to each finger, so that the identities of the fingers correspond to the identities of the probes or sensors that provide the data. Gloves that track the movements of fingers fall into this category. The host may even track fingers by more sophisticated means, such as by analyzing visual, sound, or magnetic field information. In these cases, the host likely determines finger identities according to heuristics for associating three-dimensional information with individual fingers. It may also be possible for a device to identify fingers according to electrical properties detected for the fingers as they gesture on a touch-sensitive surface. In this case, the host distinguishes fingers of different finger identities by their electrical signatures. Some electrical signatures may be common to many people, while some may require calibration to a particular hand. A device may even combine methods for determining finger identities. In these cases, it is unnecessary to have multiple regions or facets.

Figure 58A:
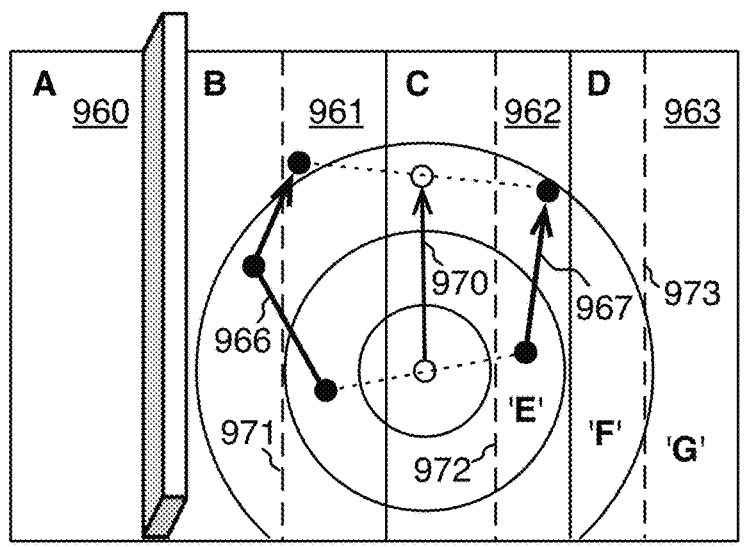
FIGS. 58A-58C depict a series of gestures input on a divided input area for which a division contains three input regions spaced via a calibration.
Figure 58B:
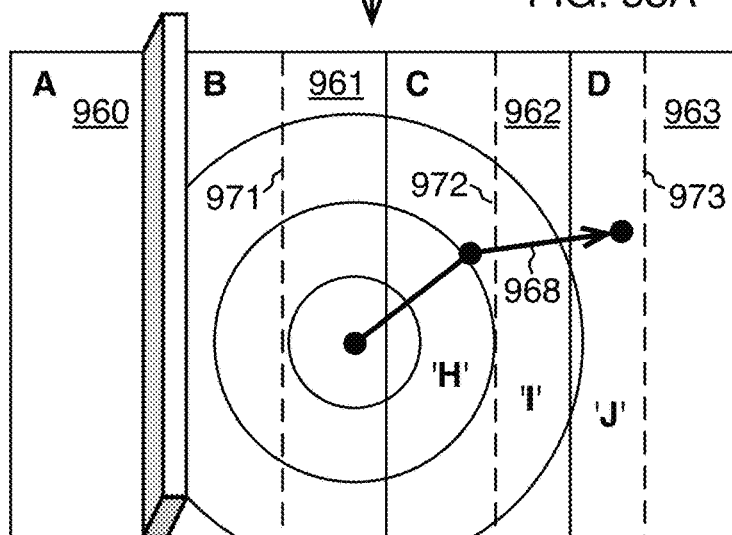
Figure 58C:
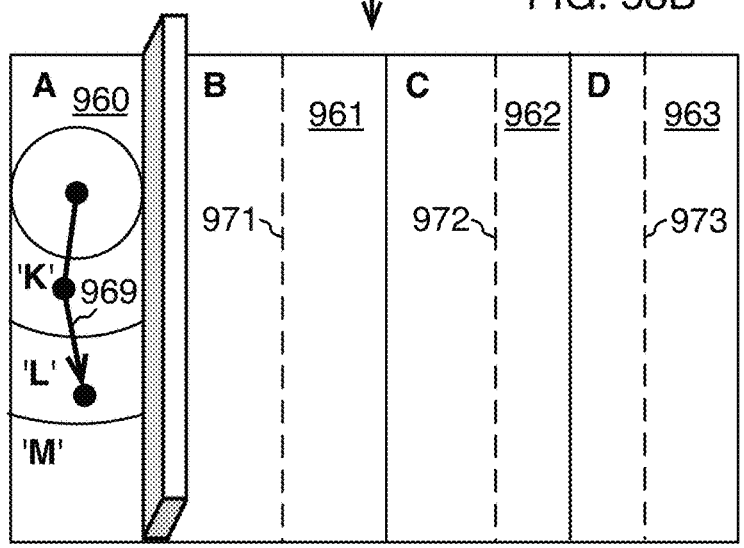

It is also possible for the host to provide some but not all finger identities. It may be that the host is only be able to determine the identities of specific fingers, such as just identities for the thumb and the index finger, perhaps because their electrical properties happen to be recognizable. In this case, the gesture system can employ a finger map to determine the identities of the otherwise unidentified fingers. FIGS. 58A-58C each show a device with a facet 960 dedicated to one finger along with a second facet having a finger map divided into regions 961-963 for determining the identities of additional fingers. However, even if all of the fingers use the same facet, the gesture system need only employ a finger map for the unidentified fingers.

The host provides a finger identity either by reporting it directly to the gesture system or by reporting a specification from which the gesture system can determine the finger identity. For example, when a facet directly corresponds to a finger identity, reporting the facet effectively reports the finger identity. However, a host may instead collect a complex signature for a finger and defer to the gesture system the determination of a finger identity. This also amounts to the host reporting the finger identity, as the boundary between the host and gesture system is immaterial in this case. All that matters is that finger identities become available for interpreting finger-mapped gestures, and ideally, that the touch device assists the user with indicating those identities.

7.6 Finger-Mapped Gesturing

Finger-mapped gestures are gestures that select user requests according to the fingers with which the user gestures and according to the actions that the user performs with the fingers while gesturing. There are many possible classes of finger-mapped gestures. The present invention concerns itself mainly with the finger-mapped gestures that can be input while keeping the hand stationary and only moving the fingers longitudinally, as these are the most efficient gestures. It is useful to constrain finger-mapped gestures to be "lockstep" in direction and length, in order to teach users to gesture with maximal efficiently and to help disambiguate finger-mapped gestures from other gestures that the host might support. Non-finger-mapped gestures might include gestures such as two-finger pinching and zooming actions, which the host might allow the user to perform on top of the input area for application purposes. This section describes detecting finger-mapped gestures and assigning finger identities to fingers according to the input regions that the fingers touch.

7.6.1 Finger-Mapped Gestures

A "finger-mapped gesture" is a gesture that the user performs on the input area to input a user request, selecting the user request according to the finger identities of the gesturing fingers and the actions that the fingers perform.

The combinations of gesturing fingers are sufficient to input a large variety of user requests, but it is difficult to remember many arbitrary assignments of user requests to finger combinations. Instead of relying strictly on finger combinations, the gesture system introduces at least one additional way to select user requests so that it can avoid the difficult finger combinations. The additional ways to select user requests are based on what the fingers do during the gesture. For example, finger-mapped gestures already entail the user moving fingers over a distance, so it is convenient for the gesture system to further select the user request by the direction in which a finger moves and the distance that the finger moves in that direction, without requiring the user to perform additional gesture actions. Under this approach, the finger identities, direction, and distance together parameterize the gesture, thus parameterizing the gesture outcome.

The various means for parameterizing a finger-mapped gesture are called "gesture parameters." Specifically, a "gesture parameter" is an attribute of a gesture that has a particular value for a particular occurrence of a gesture. At least two values are possible for each gesture parameter, and the gesture outcome of the gesture is dependent on the value. Notice that the finger identities of a gesture are themselves a gesture parameter. A gesture parameter that determines a discrete direction for the gesture is called a "gesture direction." There are a number of ways to define a gesture parameter based on the distance that a finger moves relative to a measurement origin. The simplest is perhaps the one this specification calls a "gesture level." Other possible parameters include (a) the number of times the user taps a finger prior to performing the gesture ("touch count"), (b) the fingers that the user is holding down on the gesture surface to behave as "shift" keys ("shift holds"), and (c) the distance that a finger travels after reversing directions ("backbrush level"). The gesture system determines a gesture outcome from the gesture parameters and reports user requests to the host.

Parameterizing gestures via gesture parameters allows users to input a broad variety of gestures. A "gesture parameterization," or simply a "parameterization," is a set of values that are each associated with a gesture parameter of a gesture. Each gesture parameter, except for the selection of finger identities, has the property that the parameter's value is largely independent of where the gesture is input on the gesture surface, other than the extent to which the value may depend on the finger identities. This property is called "position independence" and is explained in detail later. For brevity, a reference in this specification to a gesture parameter indicates the value of the gesture parameter when the context of usage requires a value for the gesture parameter.

Each gesture parameterization available to the gesture system corresponds to a particular gesture outcome. There are different ways for a gesture system to report a gesture outcome to the host. Under the most generic approach, the gesture system reports the gesture parameterization itself to the host. The host attempts to map the parameterization to a behavior. It is also possible to employ a gesture system that has specific knowledge of how the parameterizations correspond to host behaviors. In this case, the gesture outcome can directly identify the specific behavior desired of the host, such as by name or identifier. These are both examples of the gesture system reporting a user request to the host. If the gesture system ever determines that the user is not entering a valid finger-mapped gesture or that the provided gesture parameterization in not one of the parameterizations that it associates with a user request, the gesture system need not report the gesture outcome. Alternatively, the gesture system may report unrecognized gestures.

There are many ways to represent the value of a gesture parameter in program logic. One way is to use a name, number, or other identifier for the value. This approach allows a parameterization to be represented as a list of values. The gesture system can use lookup tables to identify the gesture outcome to which any list of parameter values corresponds, doing so by selecting rows and columns within the tables according to the parameter values associated with the rows and columns. These tables can be many-dimensional to accommodate many parameters. When processing speed is important, it is common practice in software to use decision trees instead of lookup tables, in which case the program logic need never actually compute an identifier to represent the value of any gesture parameter. In this case, the program logic simply branches to code that is specific to the scenario where the gesture parameter would otherwise have a particular value. Because the program counter points to a branch of program logic that is specific to a particular parameterization, the branch of program logic can serve as a parameterization for the gesture, thus also representing a parameter value for each gesture parameter. It is also possible to hybridize these approaches. Representing parameter values as software objects can facilitate the hybridization. In general, a parameter value is the result of evaluating a gesture parameter for a particular gesture.

7.6.2 Gesture Bases

The finger-mapped gestures that a gesture system supports can be defined in terms of the gesture bases that characterize the gestures. A "gesture basis" (plurally "gesture bases") is an association of a non-empty set of finger identities with a non-empty set of gesture parameters. The set of finger identities is called the "characteristic identity set" of the gesture basis, and the set of gesture parameters is called the "characteristic parameter set" of the gesture basis. The characteristic parameter set does not include a gesture parameter for the set of finger identities because the characteristic identity set specifies the value of that particular gesture parameter for the gesture basis. A gesture basis represents a set of gestures that all use the same set of finger identities and the same set of gesture parameters. Each gesture of a gesture basis has a parameterization that characterizes the gesture. Each of these parameterizations includes the finger identities of the characteristic identity set and values for the gesture parameters of the characteristic parameter set. Together these parameterizations are the "selectable parameterizations" of the gesture basis. A selectable parameterization is said to "indicate" the user request that it represents. The "path parameterization" of a selectable parameterization is the portion of the selectable parameterization that consists of all of the parameter values other than the finger identities.

A gesture system implements each gesture basis of a set of gesture bases. The gesture bases of a set are said to be "independent" if, and only if, no two gesture bases of the set both have characteristic identity sets that are identical and have characteristic parameter sets in which one is a subset of the other. Given two gesture bases, if a characteristic parameter set of one were a subset of the characteristic parameter set of the other, they would not represent distinct sets of gestures. A gesture system is therefore most usefully characterized as implementing a set of independent gesture bases. Gesture bases with different characteristic parameter sets may have the same characteristic identity set, provided that the characteristic parameter sets are distinguishable from the touch histories of the fingers. Note that a gesture basis may characterize a gesture that uses more gesture parameters than those in the character parameter set of the gesture basis; gesture bases need not fully specify gestures. The "series of available finger identities" of a set of gesture bases is a series of finger identities consisting of the set union of the characteristic identity sets of all the gesture bases in the set of gesture bases, with finger identities ordered in the series according to the order of the fingers on a hand that they are assumed to represent. A "selectable parameterization" of a set of gesture bases is a selectable parameterization of a gesture basis of the set.

It is possible to have a set of gesture bases that only characterizes gestures that are composed of other gestures of the set of gesture bases. For example, suppose the series of available finger identities is as follows: index finger, middle finger, and ring finger. One gesture basis may have a characteristic identity set that contains only the ring finger, another that contains both the ring finger and the middle finger, and another that includes all three fingers. The gesture bases of this set can potentially be distinguished by number of fingers without requiring individual fingers to be identified. This is a form of gesture "subsumption" and contrasts with "non-subsumptive" sets of gesture bases. A "non-subsumptive" set of gesture bases is a set of gesture bases in which all of the characteristic identity sets of the gesture bases are different and yet have the same number of finger identities. Moreover, every non-subsumptive set of gesture bases contains multiple gesture bases. A non-subsumptive set of gesture bases describes a collection of gestures that all use the same number of fingers. Because a set of gesture bases need not characterize all of the gestures available to a gesture system, multiple non-subsumptive sets of gesture bases may characterize the same gesture system, using one non-subsumptive set for each number of fingers available to a gesture.

When an input area "implements" a set of gesture bases, the gesture system implements the set of gesture bases as gestures that can be initiated from locations on the input area, and the gesture system is not constrained to only implementing the indicated set of gesture bases. The gesture system need not represent any given gesture basis as a distinct component. Instead, a gesture system implements a gesture basis by virtue of implementing the gestures that the gesture basis characterizes. A gesture basis is just an abstract characterization of gestures available to a gesture system. Similarly, the gesture system need not represent a set of gesture bases as a distinguishable component. The series of available finger identities of a set of gesture bases is also just a characterization of the finger identities that the gesture system supports; it is the series of finger identities that the gesture system uses with the gestures that the gesture bases characterize. For example, a gesture system might implement a set of gesture bases as a table that returns a set of gesture parameters for a given set of finger identities, or a gesture system might hardcode the available gesture parameters and look up a user request in tables that cross reference finger identities with the values for the various gesture parameters. It is also possible to implement a set of gesture bases without tables, such as by having state machine software objects or programming language "case" statements assign user requests, with programming logic identifying the user request.

7.6.3 Detecting Gestures

Each finger-mapped gesture involves the user touching one or more fingers to the gesture surface, moving those fingers, and then lifting the fingers. During this process, the gesture system may opt to distinguish the movement of gesturing fingers from fingers that are not gesturing. Upon detecting the fingers that are participating in a gesture, the gesture system interprets the paths of those fingers as contributing to a gesture parameterization. It then reports the parameterization to the host in the form of a user request. This section introduces the details of this overall process.

7.6.3.1 Gesturing/Non-Gesturing Distinction

Users interacting with the gesture surface normally either "tap" a finger on the gesture surface, "hold" a finger on the gesture surface, or move a finger along the gesture surface. A user taps or holds a finger to indicate a location on the gesture surface, and a user moves a finger to indicate a path of multiple points. Only movement is considered "gesturing"; tapping and holding are considered to be "non-gesturing" interactions with the gesture surface. Because modern touch-sensitive surfaces are highly sensitive to finger movement, taps and holds are likely to input multiple points and therefore also input a path that could be interpreted as gesturing. It is an option for the gesture system to make an effort to distinguish gesturing and non-gesturing according to properties of the paths, allowing the gesture system to either ignore non-gesturing or give it meaning. The path of a finger that the gesture system considers to be gesturing is called a "gestured path."

There are several approaches to distinguishing gesturing and non-gesturing. Under one approach, any finger touching the gesture surface is assumed to be non-gesturing until it exceeds a gesturing threshold, at which point it is assumed to be gesturing. Under another approach, any finger touching the gesture surface is assumed to be gesturing until it satisfies a condition that identifies it as non-gesturing. If the gesture system only needs to recognize fast taps, the non-gesturing condition could be that the finger touches and lifts before a timeout period. This condition is suitable for ignoring extraneous touches and for interpreting rapid touch input as gesturing. Alternatively, the gesture system might only recognize a finger as non-gesturing if it has been touching for at least a certain amount of time. This condition is suitable for distinguishing an intention to press a user interface button that underlies the input area from an intention to perform a finger-mapped gesture. It is also suitable for interpreting fingers as resting on the gesture surface without providing input. Additional constraints ideally embellish these conditions, such as limiting the length of a non-gesturing path. The gesture system may also treat fingers as neither gesturing nor non-gesturing until the finger satisfies a distinguishing threshold that appropriately characterizes the finger.

The gesturing threshold is the ideal condition, regardless of whether the gesture system also implements a non-gesturing condition. A gesturing threshold provides the following benefits, some of which are further explained later in the specification:

Supports ignoring accidental touches

Supports "touch count" parameters, which count taps

Supports parameters that monitor changes in direction, such as "backbrush level."

Supports the rapid and temporary indication of "shift holds" while gesturing.

Supports superposing the input area on touchscreen user interface buttons.

Supports ascribing special meaning to gestures strictly involving taps.

Supports allowing the user to rest fingers on the input area without effect.

An implementation of the gesture system that uses neither gesturing thresholds nor non-gesturing conditions can interpret all touching fingers as gesturing. Some gesture parameters will require that a finger travel a path of at least two points, however. It is an option to monitor for the rare circumstance in which a tap only inputs a single touch point and to decline to recognize the tapping finger as gesturing, although the value of doing so may depend on the sensitivity of the touch device.

Gesture systems grow more complicated with the addition of a gesturing threshold. This specification hereafter illustrates gesture systems with gesturing thresholds that include a gesturing threshold distance, usually as part of an initial slide.

7.6.3.2 Detection Process

The process of detecting a finger-mapped gesture entails detecting a set of gesturing fingers, determining their finger identities and other gesture parameters, and identifying the user request that corresponds to the gesture parameters. The set of fingers that the gesture system detects gesturing is called the "gesturing finger set." The set of gesturing fingers actually used to determine finger identities is called the "selecting finger set"; at some point during the gesture, a gesturing finger set becomes the selecting finger set. The set of finger identities that the gesture system associates with the fingers of the selecting finger set is called the "selected identity set." This specification often refers to finger identities of the selected identity set as just "finger identities," when it is clear that the finger identities characterize a selecting finger set.

Figure 9:
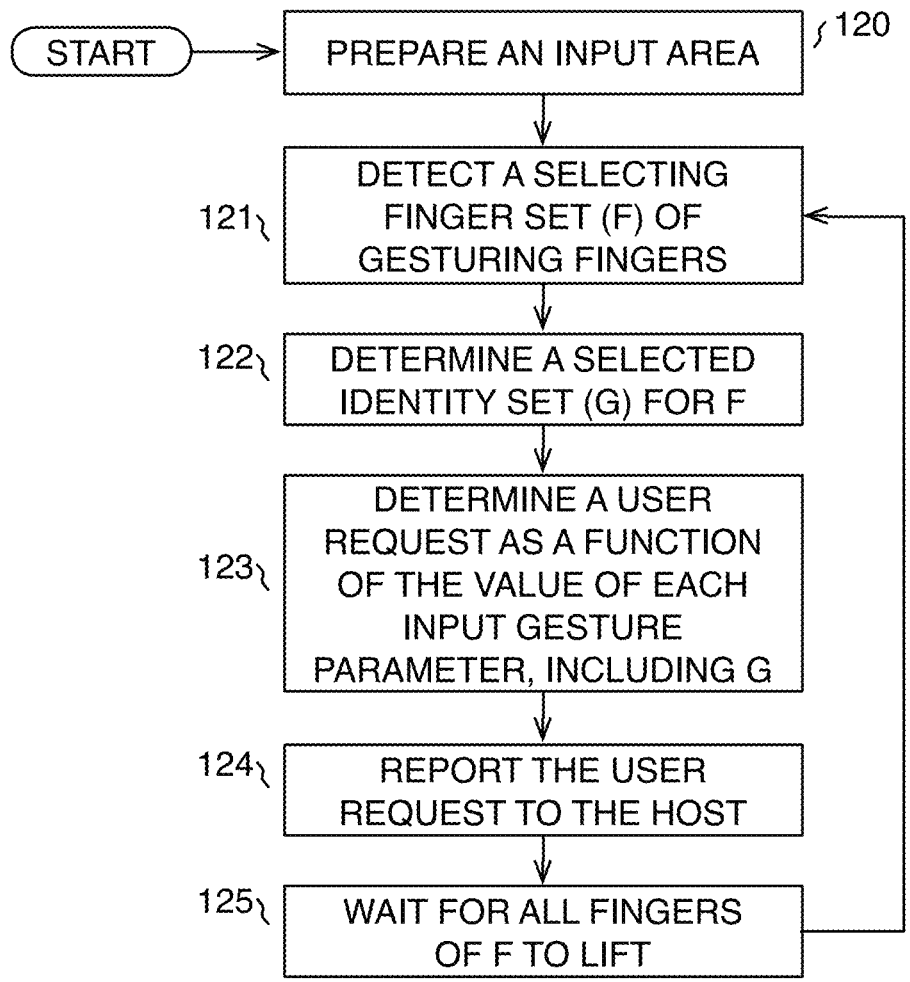
FIG. 9 depicts the general process of detecting and interpreting finger-mapped gestures.
Figure 10:
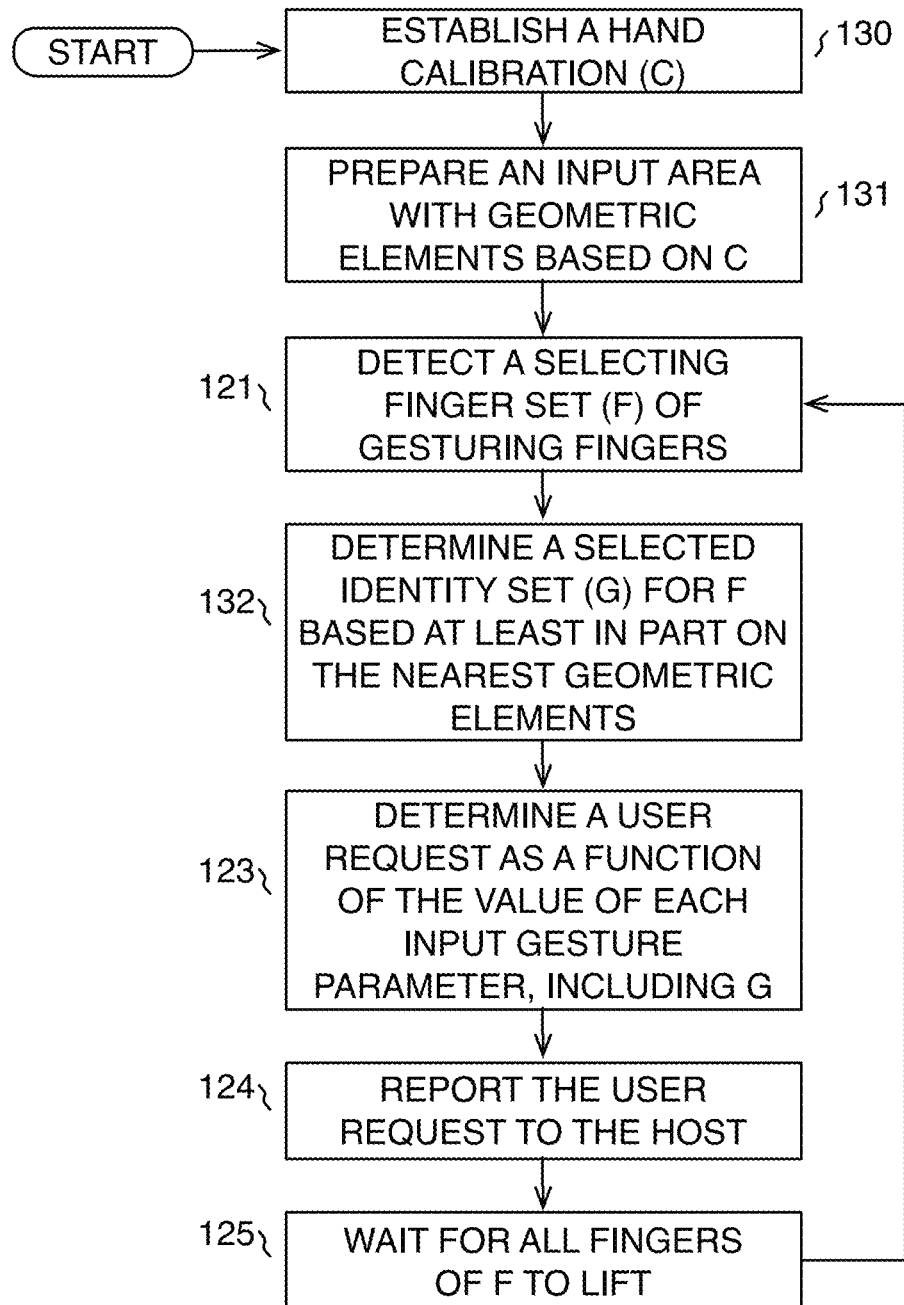
FIG. 10 depicts the process of detecting and interpreting finger-mapped gestures for the case where a hand calibration specifies a finger map.

In its general form, the process of detecting a gesture includes the following steps, as illustrated in FIG. 9, with some refinements shown in FIG. 10:

- In step 120, the host or gesture system first prepares an input area. If the input area is based on a hand calibration, the user first provides this hand calibration, as in step 130 of FIG. 10. If the host does not provide finger identities, the gesture system uses the hand calibration to produce a finger map on the input area, as in step 131 of FIG. 10.
- In step 121, the gesture system monitors the input area for gesturing fingers. Some condition occurs and establishes the gesturing fingers as the selecting finger set, completing the gesture. This condition is normally the lifting of at least one gesturing finger. That is, the gesture system tests for the condition of any gesturing finger lifting, of some number of gesturing fingers having lifted, or of all of the gesturing fingers having lifted. There may also be circumstances when the gesture system can assign the selecting finger set before any finger lifts. For example, the gesture system may monitor gesturing fingers for their parameter values and assign the selecting finger set once the fingers indicate a gesture parameterization that cannot be further changed by further gesturing.
- In step 122, the gesture system determines a selected identity set for the fingers of the selecting finger set. Either the host provides the finger identities to the gesture system or the gesture system deduces them using a finger map. FIG. 10 depicts the finger map approach as step 132 and is explained later. The gesture system may or may not associate each finger of the selecting finger set with a distinct finger identity, as only the full selected identity set is relevant to determining the user request.
- In step 123, the gesture system determines values for the gesture parameters input by the fingers of the selecting finger set and attempts to determine a user request for these parameters. The gesture parameters include the selected identity set of step 122. The particular gesture parameterization may or may not correspond to a user request, however. In some gesture systems, all parameterizations may be valid, such as in systems that report the gesture parameterization itself to the host. Other gesture systems may have to perform a look-up to associate a user request with the parameterization, and some parameterizations may not have associated user requests. Depending on the gesture system, the process of determining values for the gesture parameters may be indistinguishable from the process of determining a user request.
- In step 124, the gesture system reports the user request to the host if the gesture parameterization is associated with a valid user request.
- In step 125, if any fingers of the selecting finger set remain touching, the gesture system waits for them to lift before looping back to step 121 to receive another gesture.

Subsequent sections of this specification express a variety of refinements of this general process of detecting gestures for different possible features of the gesture system.

7.6.3.3 Real-World Handling

Figure 11:
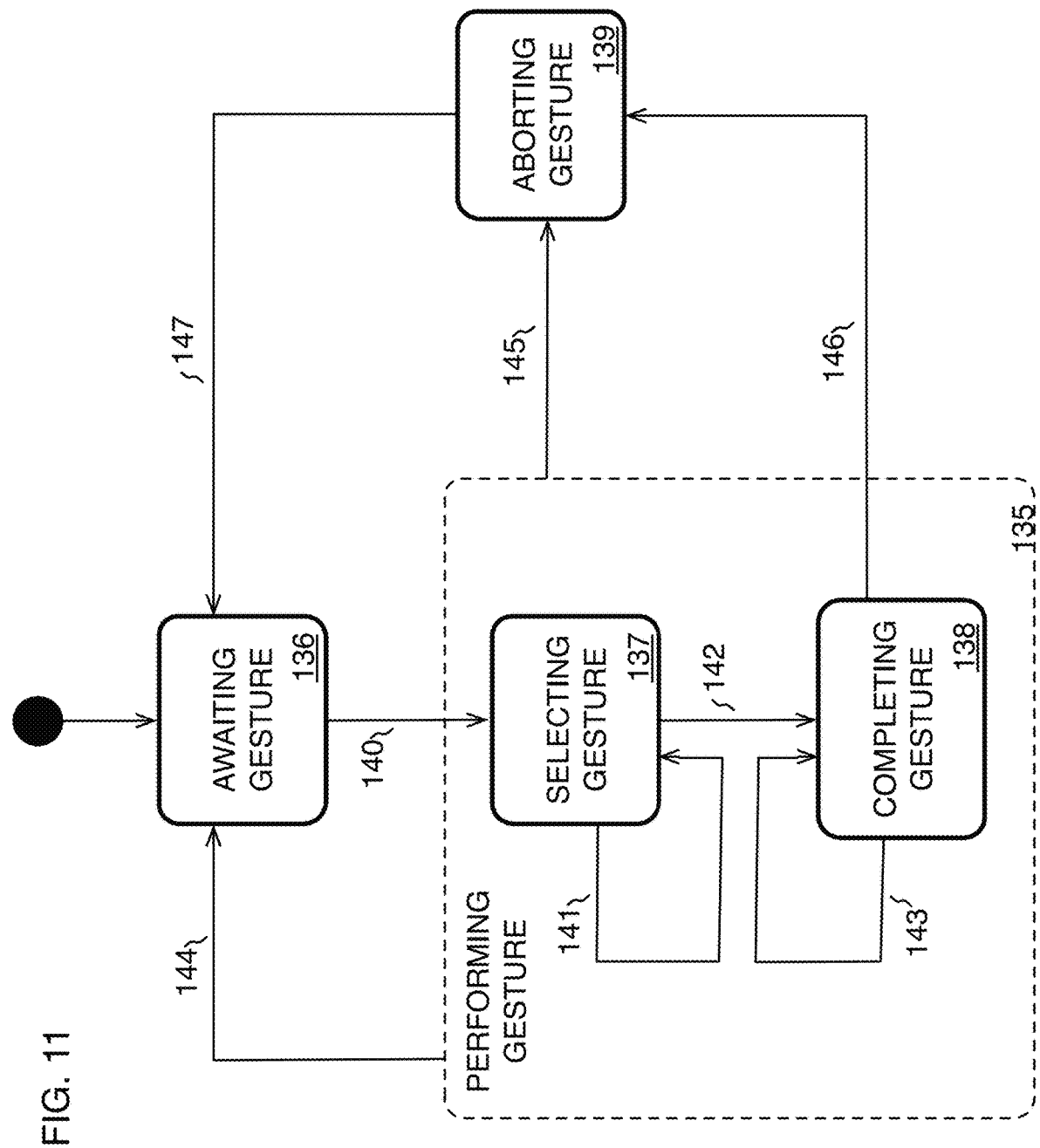
FIG. 11 depicts a state machine for detecting a gesture.

The process of detecting a finger-mapped gesture should provide handling for intermittent real-world conditions. State-transition diagrams are better able to economically express such complex state handling than traditional flow diagrams. FIG. 11 depicts a state-transition diagram that inputs gestures and handles out-of-sequence conditions that can arise during the process of inputting gestures. The diagram depicts general states of detecting a gesture and events that transition among these states, implementing an approach that identifies gesturing fingers as those that exceed a gesturing threshold and that detects gesture completion as the first lifting of a gesturing finger. See the section "State-Transition Diagrams" at the end of the accompanying sample implementation for an explanation of how to read the state-transition diagrams.

The transition events of the diagram in FIG. 11 are as follows:

- 140—If a finger begins gesturing, initialize a gesturing finger set with the finger and transition to state 137.
- 141—If another finger begins gesturing, add the finger to the gesturing finger set and remain in the current state.
- 142—If multiple fingers are gesturing and one of them lifts, transition to state 138.
- 143—If multiple fingers remain gesturing and one of them lifts, remain in state 138.
- 144—If the last gesturing finger lifts, report the gesture outcome and transition to state 136.
- 145—If unrecognized gesturing movement is detected, transition to state 139.
- 146—If excessive additional gesturing is detected, or if another finger begins gesturing, transition to state 139.
- 147—If the last gesturing finger lifts, transition to state 136.

The states of the diagram in FIG. 11 are as follows:

Awaiting Gesture 136—This is the initial state of a gesture session, in which no fingers that are touching the gesture surface are considered to be gesturing, except possibly for fingers that have moved while serving as "locked holds," as explained later in the specification. When a finger exceeds a gesturing threshold, the session begins collecting a gesturing finger set, which initially contains only this first finger, and it transitions via transition 140 to the Selecting Gesture state 137.

Selecting Gesture 137—This is the first of two states 137-138 in the Performing Gesture superstate 135. It is the state during which the user selects the fingers that compose the gesture. During this state, the gesture system collects the gesturing finger set via transition 141; whenever another finger exceeds the gesturing threshold, it is added to the gesturing finger set, unless the finger is serving as a "hold," as explained later. Fingers can touch the gesture surface in any order and exceed the gesturing threshold in any order. On the first occurrence of a gesturing finger lifting from the gesture surface, the session transitions out of this state via transition 142 or 144, at which point the session establishes the gesture's selecting finger set. The selecting finger set is here the set of fingers in the gesturing finger set the first time one of the fingers of the gesturing finger set lifts, with the set including the lifting finger itself. If there is more than one finger in the selecting finger set, the session transitions via transition 142 to the Completing Gesture state 138; otherwise the session transitions via transition 144, according to the Performing Gesture superstate 135.

Completing Gesture 138—This is the second state in the Performing Gesture superstate 135. In this state, the user has lifted at least one finger to end the gesture, and the session is waiting for the user to lift the remaining fingers of the gesture. That is, during this state, the session is waiting for the user to lift all of the fingers of the selecting finger set. Should the gesture system detect unexpected movement, either the user did not intend the gesture to be interpreted as a finger-mapped gesture or the user performed the gesture incorrectly. Hence, while in the state, the session should monitor the remaining fingers of the selecting finger set for excessive additional movement and to transition to the Aborting Gesture state 139 via transition 146 if detected. The session also transitions to the Aborting Gesture state 139 via transition 146 if it detects that another finger has begun gesturing, because this amounts to the user apparently intending to add another finger to the selecting finger set after having indicated that there are no more fingers in the selecting finger set. Otherwise, the session remains in this state until it transitions according to its Performing Gesture superstate 135.

Performing Gesture 135—This is a superstate that contains the Selecting Gesture and Completing Gesture states 137-138. The session will transition via transition 145 out of either of these two states into the Aborting Gesture state 139 if it ever detects that one of the fingers in the gesturing finger set is moving in a way not known for finger-mapped gestures. For example, if the gesture system limits finger-mapped gestures to lockstep gestures, as described later, the session transitions to the Aborting Gesture state 139 if it ever determines that the gesture in progress is not a lockstep gesture. However, if one of the fingers of the gesturing finger set lifts and either there are no other fingers in the gesturing finger set or all other fingers of the gesturing finger set have already lifted, the gesture has completed, and transition 144 occurs. In this case, a selecting finger set will have been established, as already explained, so the session translates the selecting finger set into a gesture outcome and reports the gesture outcome to the host. After reporting the gesture outcome, the session returns to the Awaiting Gesture state 136 to await the next gesture.

Aborting Gesture 139—In this state, the user is in the process of performing a gesture that the gesture system does not recognize. The session is waiting for the user to lift all fingers that are gesturing but not serving as "locked holds," as described later. When the last such gesturing finger lifts, the session transitions via transition 147 back to the Awaiting Gesture state 136 to wait for the user to begin inputting a new gesture. The gesture system may optionally report to the host that the gesture is not a recognized finger-mapped gesture, doing so either when the session transitions into the Aborting Gesture 139 state or when the session transitions from the Aborting Gesture 139 state to the Awaiting Gesture state 136.

FIG. 11 depicts one of many possible designs of a gesture session. This particular design ignores all finger activity that it does not explicitly handle. In particular, fingers may touch and lift from the gesture surface without affecting the gesture, provided that the fingers do not exceed the gesturing threshold while they are touching. The gesture system may also support "holds," as explained later, that must also lift before the first gesturing finger lifts in order not to be interpreted as performing a hold. This facility for ignoring accidental touching is helpful because the close proximity of multiple fingers rapidly performing finger-mapped gestures virtually guarantees that some fingers will briefly touch the gesture surface by accident.

When the host is also capable of receiving non-finger-mapped gestures on an input area, the gesture system should be careful to ensure that the user indeed performed a finger-mapped gesture. The process depicted in FIG. 11 accomplishes this by waiting for the last finger of the gesturing finger set to lift before reporting the gesture outcome. This way the gesture system can avoid reporting a gesture outcome if the gesture ultimately ends up deviating from the expectations of finger-mapped gestures. This approach also has the benefit of allowing the host to provide feedback indicating gesture completion, so the user can see when the gesture system is ready for another gesture. However, it is also an option for the gesture system to report the gesture outcome at the time the first gesturing finger lifts, when it has determined the selecting finger set.

Under a variation of the approach depicted in FIG. 11, the gesture session maintains a gesturing finger set of fingers that have gestured and touched the gesture surface within the recent past. The session delays determining the selecting finger set until the last gesturing finger has lifted. Fingers are retained in the gesturing finger set after they have lifted until they are older than a certain amount of time. The selecting finger set is defined as the set of fingers that remain in the gesturing finger set at the time the last gesturing finger lifts. With an appropriately chosen amount of time, this approach helps to eliminate accidental gesturing that occurs early in the gesture. The approach also allows the user to pause a gesture before completing to guarantee that only certain fingers occur in the selecting finger set and contribute to the gesture.

7.6.3.4 Example Gestures

Figure 16:
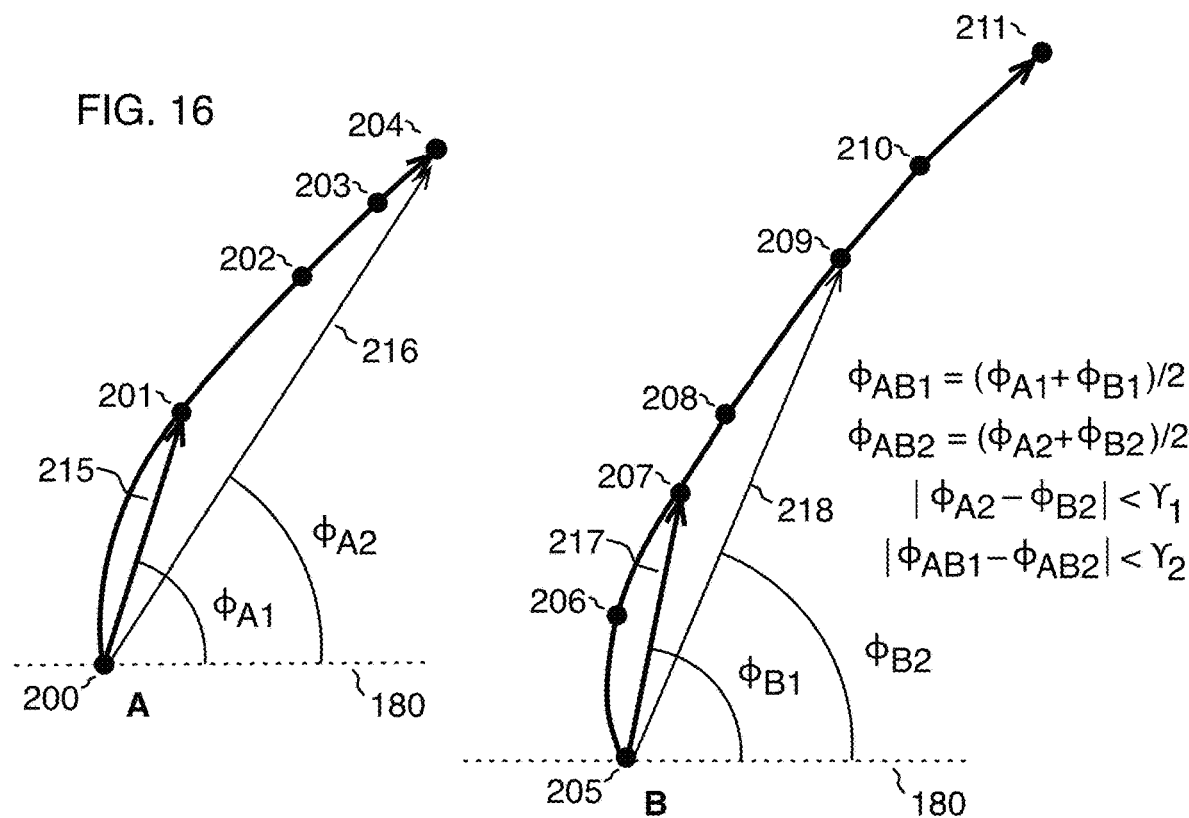
FIG. 16 depicts determining the gesture length and sampling angle of a two-fingered sweep using values computed independently for each finger.
Figure 17:
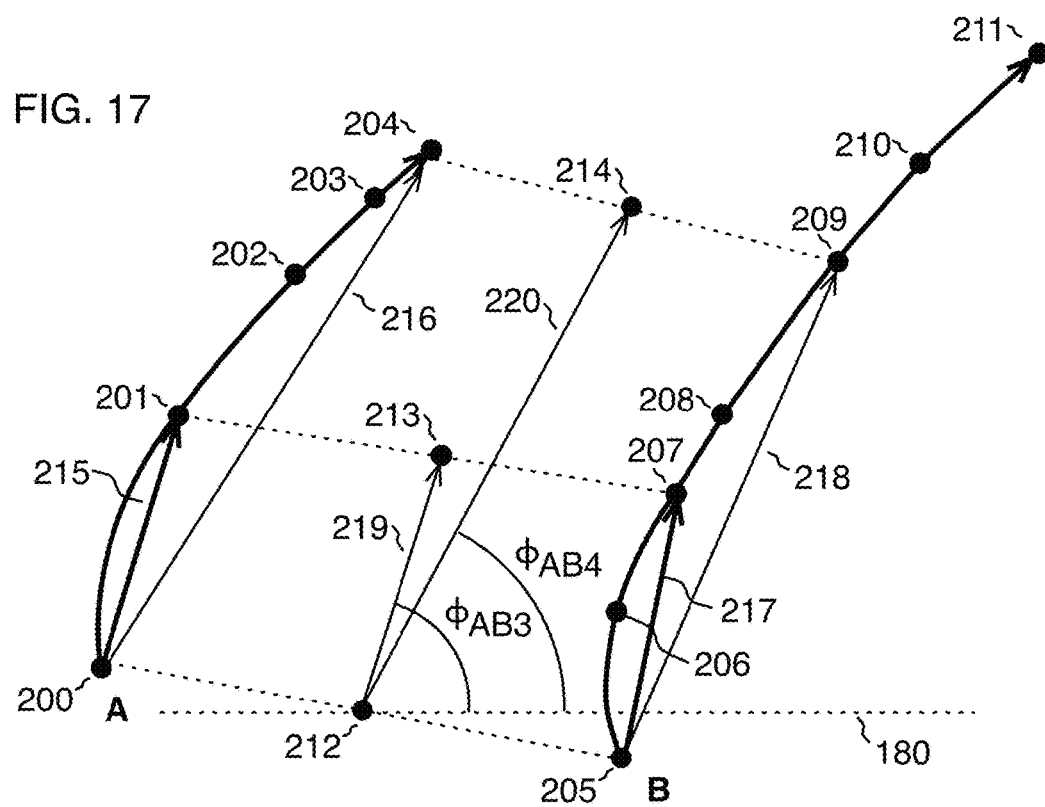
FIG. 17 depicts determining the gesture length and sampling angle of a two-fingered sweep using values that are intermediate between the fingers.

A few examples help to illustrate the process of detecting gestures using gesturing thresholds. FIGS. 16 and 17 depict the same two-fingered gesture. Vector 215 is the initial slide vector for finger A, and vector 217 is the initial slide vector for finger B. Finger A lifts first at point 204. Finger B is at point 209 at this time. Fingers A and B are the only gesturing fingers, so the selecting finger set consists of fingers A and B. The gesture system can determine a gesture level and a discrete direction at this time from the lengths and directions of vectors 216 and 218. Meanwhile, the session is in the Completing Gesture state 138 (FIG. 11) and finger B continues to gesture before finally lifting at point 211. If finger B travels too far beyond point 209 or takes too much additional time to lift, the gesture system can decline to recognize the gesture. Finally, when finger B lifts at point 211, the gesture system reports the gesture outcome determined at points 204 and 209 to the host.

Figure 18A:
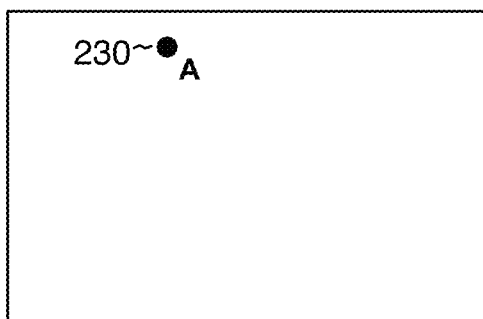
FIGS. 18A-18H depict a sequence in which the paths of two fingers perform a sweep.
Figure 18E:
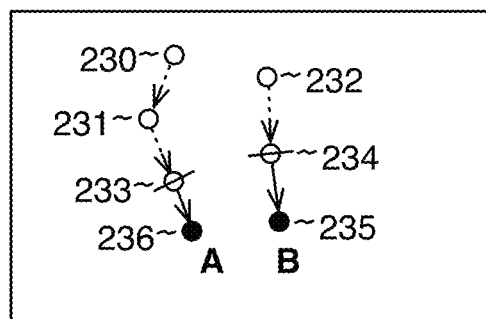
Figure 18B:
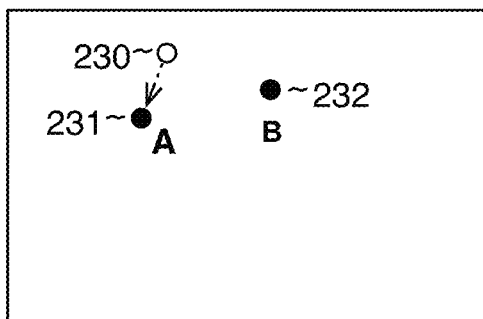
Figure 18F:
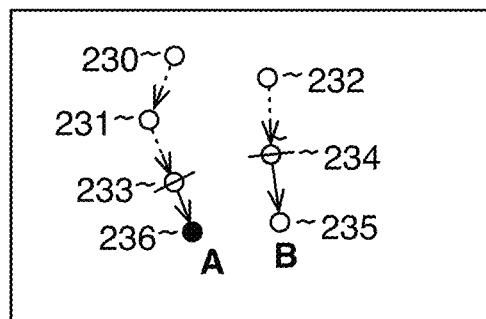
Figure 18C:
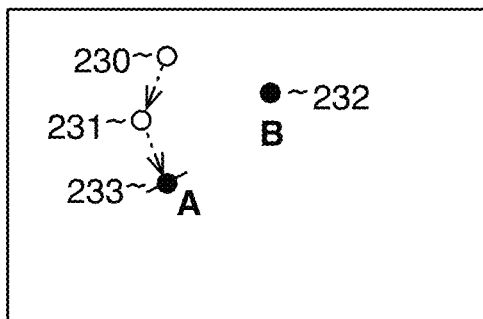
Figure 18G:
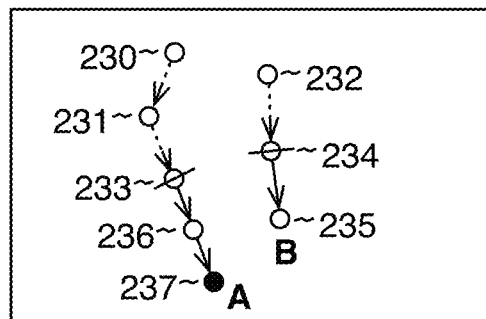
Figure 18D:
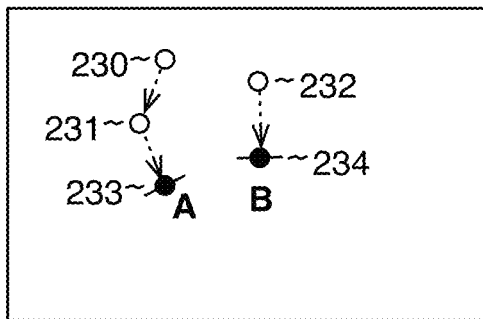
Figure 18H:
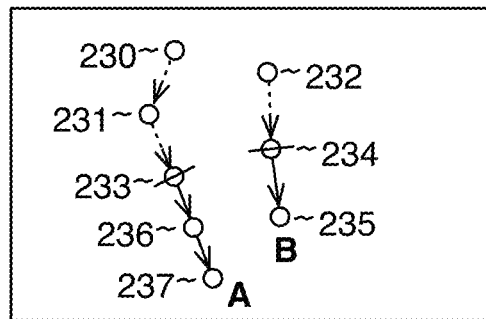

FIGS. 18A-18H illustrate a two-fingered finger-mapped gesture. Each of these figures depicts an input area. A solid dot (e.g. point 230 in FIG. 18A) represents a location where a finger is touching. An open dot (e.g. point 230 in FIG. 18B) represents a location that a finger previously touched; points change from solid to open during the course of the gesture. An arrow connecting dots indicates a finger's direction of travel. An arrow with a dashed line (e.g. from point 230 to 231 in FIG. 18B) indicates that the finger had not yet exceeded the gesturing threshold for that leg of the path. An arrow with a solid line (e.g. from point 233 to 236 in FIG. 18E) indicates a leg of the path where the finger is considered to be gesturing. A cross line through a point (e.g. through point 233 in FIG. 18C) indicates that the gesturing threshold was exceeded at that point. The capital letters A and B represent finger identities. The series of figures depicts two fingers traveling paths. The figures are further described as follows:

1) FIG. 18A. A finger with finger identity A has touched the input area at point 230. The figure does not indicate how the finger identity was determined for the finger. It could have been determined according to its location on the input area. It could also have been determined by the device from physical properties that the device monitors.
2) FIG. 18B. Finger A moved from point 230 to point 231, but the movement was not fast enough or not far enough to exceed the gesturing threshold. Meanwhile, another finger with identity B touched at point 232. Neither finger is gesturing because neither has exceeded the gesturing threshold yet. Were either finger to lift now, no finger-mapped gesture would be registered.
3) FIG. 18C. Finger B remains motionless as finger A continues to gesture. Finger A exceeds the gesturing threshold upon reaching point 233: it is now gesturing and inputting a finger-mapped gesture. The finger identities contributing to a finger-mapped gesture are not determined in this example until at least one of the gesturing fingers lifts, so finger B can still participate in this gesture.
4) FIG. 18D. Finger A stops moving, but finger B begins moving and exceeds the gesturing threshold on the very first segment of the path at point 234. The gesture is now a two-fingered finger-mapped gesture with finger identities A and B. Because no gesturing finger has lifted yet, additional fingers may yet contribute to the gesture.
5) FIG. 18E. Fingers A and B are now both moving, having moved to points 236 and 235, respectively. This figure depicts the predominant condition during two-fingered gesturing.
6) FIG. 18F. Finger B has lifted from point 235. No more fingers can contribute to this gesture, so the gesture's selecting finger set is now known to contain fingers A and B. The gesture system can determine the indicated user request at this point. The directions and distances that the fingers have so far travelled can be used to determine a discrete direction and a gesture level. However, it is best for the gesture system to wait for the user to lift all of the gesturing fingers before reporting the user request to the host.
7) FIG. 18G. By moving to point 237, finger A continues to gesture after finger B has lifted. This is likely to happen whenever humans try to simultaneously move two fingers at once and lift them at once; one finger is likely to gesture for slightly longer than the other.
8) FIG. 18H. Finally, finger A lifts too. The gesture is complete. This is the ideal time for the gesture system to report the user request to the host.

7.6.4 Gesture Types

It is useful for the gesture system to restrict the kinds of gestures that are interpreted as finger-mapped gestures beyond the minimal requirements of finger-mapped gesturing. Each kind of gesture is called a "gesture type." Restricting gesture types allows both the host and the gesture system to monitor for gestures on the same input area by detecting different gesture types: the host ignores gesture types that the gesture system recognizes, and the gesture system ignores gesture types that the host recognizes. Restricting the gesture types that the gesture system recognizes also trains the user to only input the recognized gestures types, and by making the recognized gesture types those that are most efficient for finger-mapped gesturing, the restrictions help train the user to be efficient. Restricting the recognized gesture types also helps to reduce erroneous input by having the gesture system ignore unusual input that might have been accidental, making the user still more efficient by reducing the number of unintentional user requests the user would have to undo.

7.6.4.1 Lockstep Gestures

The most efficient gesture type for finger-mapped gesturing is the lockstep gesture. A "lockstep gesture" is a gesture in which all gesturing fingers move roughly the same distance in roughly the same direction. It is an action that the user performs. The user performs a lockstep gesture by deciding which fingers to include in the gesture and intending to move all of these fingers together as a unit, all in the same direction for the same distance. Lockstep gestures are natural for the human hand, as people readily move multiple fingers together when gesturing, whereas people require a lot of practice and skill to simultaneously move multiple fingers independently. In practice, the fingers are likely to move in slightly different directions for slightly different distances, and it is up to the gesture system to determine whether these differences are within the tolerances of a lockstep gesture. The gesture system need only test gestures for being lockstep to disambiguate them from non-lockstep gestures. However, in order to be able to assign a direction to a gesture involving multiple gesturing fingers, the angles of the final distance vectors of the gestured paths should not span a range of more than $\pi/2$ radians for some class equivalent set of angles.

7.6.4.2 Stroke and Sweep Gestures

A lockstep gesture involving only one gesturing finger is called a "stroke," and one involving two or more gesturing fingers is called a "sweep." A gesture system may limit itself to recognizing only lockstep gestures involving a certain numbers of fingers, such as only strokes or only two-fingered sweeps. More specifically, a "stroke" is a lockstep gesture in which the user places a single finger on the input area, moves the finger to a new location, and lifts the finger; it is also a finger-mapped gesture whose selecting finger set contains exactly one finger. A "sweep" is a lockstep gesture in which the user places two or more fingers on the input area, moves the fingers in roughly the same direction for a distance, and lifts the fingers; it is also a finger-mapped gesture whose selecting finger set contains two or more fingers. FIGS. 14A-14H depict hands demonstrating two- and three-fingered sweeps in various directions. Extended fingers (e.g. 185-186) indicate fingers that are touching and gesturing, and arrows (e.g. 187-188) indicate direction of movement.

A simple approach to testing for movement roughly in the same direction is to require that the direction angles of every two fingers in the selecting finger set differ by at most a maximum amount by class equivalence. For example, $\pi/2$ radians is a reasonable maximum, allowing fingers to be considered travelling in the same direction if they all travel in the same $\pi/2$ radian angle arc from their respective measurement origins. FIGS. 16 and 17 illustrate this approach for a two-fingered sweep. Both figures depict the same gesture. Finger A lifts at point 204 when finger B is at point 209, corresponding to distance vectors 216 and 218. The gesture system ensures that the angles $\phi_{A2}$ and $\phi_{B2}$ of these two distance vectors are roughly the same by requiring that they differ by less than the maximum amount $\gamma_1$ by class equivalence. Alternatively, the gesture system can assign a discrete direction to each finger separately, for some directional partitioning, and require that the fingers all have the same discrete direction. For example, the angles $\phi_{A2}$ and $\phi_{B2}$ would both be required to indicate the same discrete direction on an oriented partitioning, possibly a different oriented partitioning for each finger. Although $\pi/2$ radians is a reasonable $\gamma_1$ for ensuring that the gesture system can assign a direction to the gesture, a sweep typically consists of adjacent fingers of a hand, and adjacent fingers typically gesture along roughly parallel lines. The dotted lines 180 represent the horizontal relative to which directions are determined.

It is less important that all of the fingers of a sweep move roughly the same distance, because the user can indicate the distance intended for the gesture as the average of the distance measures of all the fingers or as the greatest distance measure of the fingers, controlling the intended distance during the gesture. A lockstep gesture therefore need not restrict all fingers to moving roughly the same distance. However, a user may more quickly learn to gesture effectively if the fingers are required to move approximately the same distance. A simple way to do this is to require that no distance measure differ from any other distance measure by more than a certain percentage. However, a better approach accommodates the likelihood that different fingers tend to move different distances when gesturing despite intending to indicate the same gesture level. As explained later, this approach assigns a gesture level integer to each finger of the gesturing finger set and requires that none of the resulting gesture level integers differ by more than 1.

The gesture system of a multi-faceted touch device should select a means for determining directions that is comparable across facets. If the gesture system first maps all facets to a common gesture surface, the relative orientation of the facets on the gesture surface affects whether fingers moving on different facets are moving in the same direction. If the gesture system is designed with knowledge of the facets, it can map the facets to appropriately oriented portions of the gesture surface. The obvious alternative is for the gesture system to determine directions for each facet separately using the facet's own coordinate system; remember that the gesture surface is only a device for making the language of the specification generic. Another alternative is for the discrete directions to be determined for each finger separately, according to the forward direction associated with each finger, and to compare the directions of fingers by comparing their discrete directions. Still another alternative is to compare finger "forward-relative" directions, as explained later.

Once the gesture system has determined that it has a lockstep gesture, it can report a gesture outcome under any of the following conditions: upon detecting a subsequent newly gesturing finger, upon detecting the first lifting of a gesturing finger, upon detecting that all fingers of the selecting finger set have lifted, or upon determining that no further modification to the gesture parameterization is possible. It is possible for the gesture system to decide that it has a stroke upon detecting a subsequent newly gesturing finger, and to report a gesture outcome at this time, but doing so precludes the gesture system from also detecting sweeps, because the subsequent gesturing finger may be the second finger of a sweep. A gesture system that accepts both strokes and sweeps should therefore wait for at least one gesturing finger to lift and a selecting finger set to be defined before reporting a gesture outcome. However, it is ideal to only report the gesture outcome after all fingers of the selecting finger set have lifted, thus allowing the user to interpret the host having performed a behavior as a signal that the gesture system is ready to receive another gesture.

7.6.4.3 Direction-Constrained Gestures

It can be helpful to require that lockstep gestures be performed in a constant direction as the user performs the gesture, for the duration of the gesture. This allows the host to give special meaning to gestures in which the fingers change direction mid-gesture. This optional constraint forces users to perform lockstep gestures efficiently and unambiguously, which is particularly important when the gesture system includes a gesture direction as part of a gesture parameterization. Lockstep gestures that are constrained in this way are called "direction-constrained" gestures. Here are some ways to require that users perform direction-constrained gestures:

1) Record the angle of the distance vector for each finger at the moment the finger is detected to have travelled at least a minimum distance, according to each finger's distance measure. The gesture system subsequently monitors either the local angle or the distance vector angle of each finger. The gesture system fails to recognize the gesture if the angle monitored for a finger ever subsequently differs too much by class equivalence from the angle recorded for the finger. A maximum allowed difference of $\pi/4$ is reasonable.

2) Assign each finger a discrete direction the moment the finger is detected to have travelled at least a minimum distance, according to each fingers' distance measure. The gesture system subsequently monitors either the local angle or the distance vector angle of each finger. If the discrete direction determined for a monitored angle is ever found to disagree with the finger's originally assigned discrete direction, the gesture system fails to recognize the gesture. Consider the stroke shown in FIG. 13. Vector 176 is the initial slide vector and has a length at least the minimum initial slide length. A directional partitioning 179 is superimposed centered on the measurement origin 167. To constrain the direction, the gesture system can require that the angle of the distance vector (e.g. angles $\phi_2$ and $\phi_3$ for distance vectors 177-178) always indicate the discrete direction that the angle $\phi_1$ of the initial slide vector indicated. The dotted line 180 indicates the horizontal axis relative to which direction angles are determined. All of the distance vectors 176-178 have sampling angles in the FORWARD range, indicating that the stroke has constant direction.

3) An approach only available to sweeps records a direction angle for the sweep once all of the fingers have each travelled the minimum distance. The direction angle for the sweep can be computed, among other possibilities, as the nearest average of the distance vector angles of all the fingers or as the nearest bisection of the range of angles that the fingers' distance vector angles span. The gesture system subsequently monitors the local angles or the angles of the distance vectors for each finger to compute a current direction angle for the sweep. The gesture system fails to recognize a gesture if the current direction angle ever differs too much by class equivalence from the direction angle originally recorded for the sweep. Consider the sweep shown in FIG. 16. Vectors 215 and 217 are the initial distance vectors for fingers A and B, respectively, having angles $\phi_{A1}$ and $\phi_{B1}$. Let $\phi_{AB1}$ be the nearest average of these angles, establishing an initial angle for the sweep. Vectors 216 and 218 represent distance vectors for the two fingers at the same time. Let $\phi_{AB2}$ be the nearest average of their angles $\phi_{A2}$ and $\phi_{B2}$. The gesture system can constrain the direction by ensuring that $\phi_{AB1}$ and $\phi_{AB2}$ differ by less than $\gamma_2$ by class equivalence as $\phi_{AB2}$ varies.

4) Another approach only available to sweeps records a discrete direction for the sweep once all of the fingers have each travelled the minimum distance. The discrete direction for the sweep can be determined, among other possibilities, by using a direction angle for the sweep as the sampling angle. The gesture system subsequently monitors the direction angle for the sweep to compute a current discrete direction for the sweep. The gesture system fails to recognize a gesture if the current discrete direction ever differs from the discrete direction originally recorded for the sweep.

7.6.4.4 Non-Lockstep Gestures

Lockstep gestures are not the only possible finger-mapped gestures, though they are probably the ones most suitable for accurate gesturing at high speed. It is also possible to allow gestures such as switches, pinches, and zooms to be finger-mapped gestures. A "switch" is a gesture in which two gesturing fingers approach and pass each other before lifting, essentially switching sides. For example, an index finger might gesture backward as the middle finger gestures forward, passing each other and performing a switch. A "pinch" is a gesture in which two gesturing fingers approach each other and lift without passing each other. A "zoom" is a gesture in which two gesturing fingers move in roughly opposite directions before lifting. All of these can be interpreted as finger-mapped gestures by parameterizing the finger identities and at least one property of the paths, such as the distances or directions that the fingers travel.

A gesture system that supports multiple gesture types for finger-mapped gestures can further parameterize gestures as a function of gesture type. For example, when a two-fingered sweep gesture and a switch gesture are performed one after the other, they could use the same two finger identities and have the same gesture level but indicate different gesture outcomes. Strokes and sweeps are distinguishable by the number of finger identities, so by virtue of already selecting gesture outcome as a function of finger identities, a gesture system need not further distinguish between strokes and sweeps. That is, a gesture system that only supports lockstep gestures need not further parameterize gestures according to whether they are a strokes or sweeps.

7.6.5 Region Conflict Resolution

On touch devices that do not directly indicate finger identities, gesture systems infer finger identities from the input regions touched. During a finger-mapped gesture, the gesture system associates each finger of the gesturing finger set with an input region. Each finger is normally associated with its originating region. However, when inputting combinations of fingers on facets that contain multiple input regions, it is possible for multiple fingers of the gesturing finger set to have the same originating region. Unless the situation is resolved, the gesture system would assign both fingers the same finger identity, yielding a conflict. The gesture system can handle the conflict by treating the gesture as unrecognized, but doing so may frustrate the user, who likely only accidentally originated the fingers on the same region. To make gesturing more responsive to the user, the gesture system can instead determine the regions that the user most likely meant to touch and re-associate the fingers with these regions, thus reassigning finger identities. The gesture system resolves region conflicts using the order in which the regions occur in the finger map.

The point of time at which a gesture system must perform region conflict resolution depends on the gesture system. In order to allow the gesture system to monitor fingers according to the requirements of their associated regions, the gesture system should perform conflict resolution for each newly touching finger by the time the finger is added to the gesturing finger set, according to the process previously described for determining the gesturing finger set. For example, as part of constraining the direction of sweeps, the gesture system may monitor the discrete direction of each finger in the gesturing finger set, computing the discrete direction using a reference direction that varies with the finger's associated region. This requires that the gesture system reference a finger's properly associated region when the finger becomes part of the sweep's gesturing finger set. Hence, if a gesture system that enforces sweep direction in this manner is also to perform region conflict resolution, conflict resolution for a newly touching finger must be performed by the time the finger is determined to be in the gesturing finger set. However, if the gesture system is not monitoring fingers according to the requirements of their associated regions, the gesture system need not determine finger identities until it determines the gesture outcome.

There are two conflict conditions that the gesture system can handle in a straightforward way. First, the gesture system need not determine the identities of fingers that do not gesture, unless the fingers turn out to be performing holds (which are explained later). This allows multiple fingers to be touching the same region, potentially creating ambiguity, but resolving ambiguity by giving precedence to gesturing fingers. If one finger is holding and the gesture system needs its identity, the gesture system can apply the normal means for resolving conflicts between two fingers. Second, if as many fingers are touching as there are regions, the gesture system can simply have the selecting finger set indicate all of the finger identities. If it is important to have each finger assigned to a region, such as for purposes of confirming a lockstep gesture, the gesture system can arbitrarily re-assign one of the fingers of the conflicting region to the input region to which no finger is assigned. Less straightforwardly, for other conflict conditions, when two fingers originate on the same region, the gesture system can reasonably assume that the finger that is nearest to another region actually belongs to that other region. The gesture system applies heuristics for determining which finger is nearer to another region and re-associates the finger with that region.

A general way to uniquely associate fingers with their nearest regions is to associate each finger with a distinct region in a way that minimizes the sum of the distances from each finger's initial touch location to the finger's prospective associated region. The distance from a finger's initial touch location to a prospective region could be the distance from the initial touch location to the location in the prospective region that is nearest to the finger's initial touch location. Although this generic rule works no matter how many fingers participate in the gesture, in practice a finger map is based on a hand calibration, and if three or more fingers ever have the same originating region, it is most likely that either the hand calibration is for a user other than the user who is gesturing or the user has positioned the hand on the finger map entirely incorrectly. So when the gesture system finds three or more fingers of the gesturing finger set to have the same originating region, it is best for the gesture system to treat the gesture as unrecognized. It is only pragmatic to provide conflict resolution when only two fingers have the same originating region.

When two fingers are found to have the same originating region, they can be re-associated with regions according to one of two rules. The rules employ the distance between an initial touch location and a region. The distance between an initial touch location and a region other than the one that contains the initial touch location is the length of the line segment that starts at the initial touch location and ends at the location in the adjacent region that is nearest to the initial touch location. For regions defined by a hand calibration, this can be the distance between the initial touch location and the nearest point on the line that forms the nearest boundary of the region. The rule applied depends on the situation. The rules are as follows:

1) The first rule applies when the common originating region is adjacent to only one other region; that is, it applies when the common originating region is at one end of a series of regions. In this case, the finger whose initial touch location is closest to the adjacent region is re-associated with the adjacent region, and the other finger retains its original region association. If the two initial touch locations are equidistant from the adjacent region, the gesture system may arbitrarily re-associate one of the fingers with the adjacent region or it may treat the gesture as unrecognized for its remainder. Ideally however, the gesture system would postpone the re-association until the first time at which one finger is found to occur closer than the other finger to the boundary of the adjacent region. When the gesture system depends on knowing the association, this latter tactic requires delaying interpreting the finger as a member of the gesturing finger set until the re-association is made.

2) The second rule applies when the common originating region is adjacent to two distinct other regions. In this case, the gesture system first determines the midpoint between the two initial touch locations. The midpoint is either closer to the one of the adjacent regions or it is equidistant from both adjacent regions. If it is closer to one of the regions, the fingers are re-associated according to the previous rule as if the only two regions under consideration were the region containing the midpoint and the adjacent region that is closest to the midpoint. If the midpoint is equidistant from both adjacent regions, the gesture system cannot reliably re-associate either finger unless one of the adjacent regions is already associated with a finger, in which case one of the fingers may be arbitrarily associated with the other adjacent region. If the gesture system cannot perform a re-association, the gesture is treated as unrecognized for its remainder. Ideally however, the gesture system would postpone the re-association until the first time at which the midpoint is calculated to be closer to one of the adjacent regions. When the gesture system depends on knowing the association, this tactic requires delaying interpreting the finger as a member of the gesturing finger set until the re-association is made.

Figure 20A:
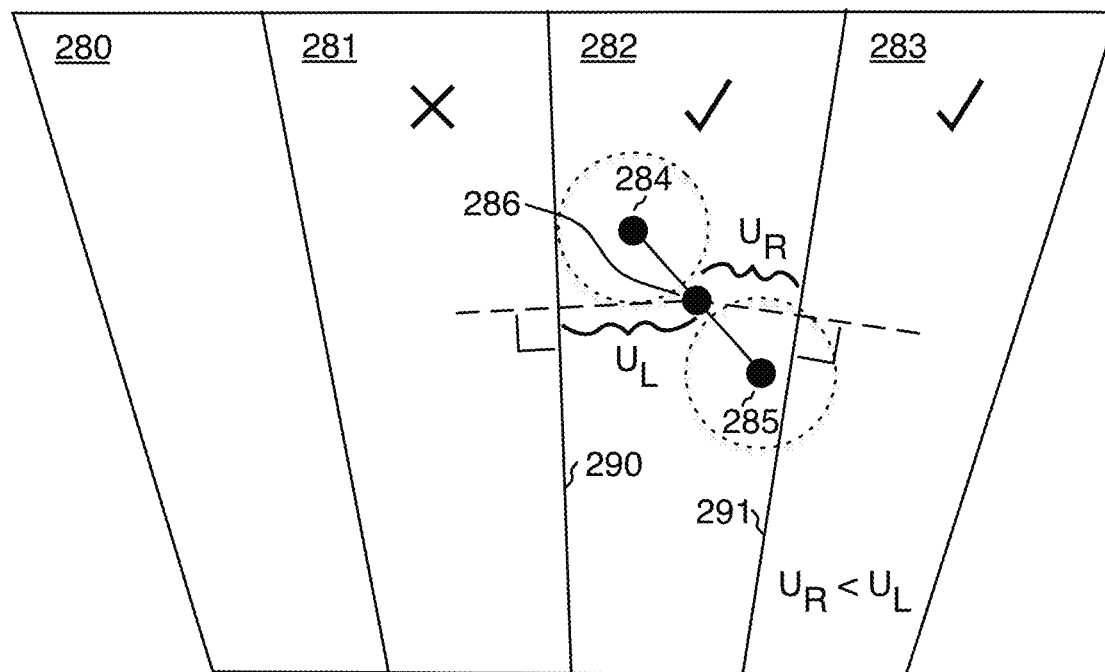
FIGS. 20A-20B depict two examples of two fingers touching the same region with one being reassigned to another region.
Figure 20B:
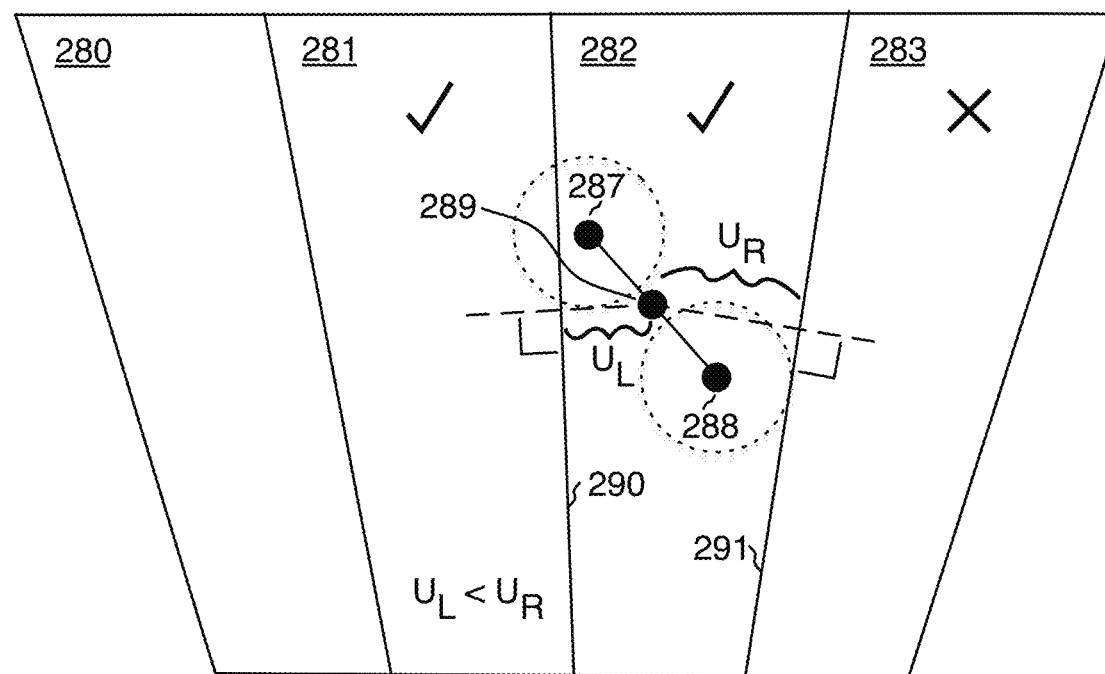

FIGS. 20A and 20B depict two scenarios in which two fingers have initial touch locations in the same region, region 282, of a finger map having four regions 280-283. In FIG. 20A the fingers initially touch locations 284 and 285, and in FIG. 20B the fingers initially touch locations 287 and 288. If the fingers gesture before they lift, the gesture system re-associates one of the fingers with a different region. Each scenario has a location 286 or 289 marked at the midpoint between the two initial touch locations. The gesture system determines the distance from this midpoint to each of the adjacent regions 281 or 283. The distance from a midpoint to region 281 is given as UL, and the distance from a midpoint to region 283 is given as UR. In these scenarios, the gesture system is measuring the distance UL or UR from the midpoint 286 or 289 to the adjacent regions as the length of the line segment having one terminus on the midpoint and another terminus on the region boundary 290 or 291, such that the line segment is perpendicular to the region boundary. This is the distance from the midpoint 286 or 289 to the nearest location on the boundary 290 or 291. In the first scenario, FIG. 20A, the midpoint 286 is closer to region 283, so the finger to the right of the midpoint 286 having initial touch location 285 is re-associated with region 283. In the second scenario, FIG. 20B, the midpoint 289 is closer to region 281, so the finger to the left of the midpoint 289 having initial touch location 287 is re-associated with region 281. The gesture system can also use this technique to determine the selected identity set when a conflict arises, without individually re-associating the fingers.

In a gesture system that requires all finger-mapped gestures to be lockstep gestures, the user is unlikely to be able to sense which of the two fingers gets re-associated with the identified adjacent region. This is because the user intends the fingers of the lockstep gesture to move in the same direction for the same distance. A gesture system may therefore arbitrarily re-associate one of the fingers with the identified region. However, there is a chance that this re-association shortcut might cause the gesture to be interpreted incorrectly if the gesture system includes gesture direction as part of a gesture parameterization and the user's fingers tend to move apart during a sweep gesture, provided that the finger map reflects this tendency of the user's hand.

Upon re-associating a finger with a new region, the finger's identity is reassigned according to its new region. If one of these rules is applied while the gesturing finger set includes three or more fingers, it is possible for the region re-association to conflict with an already established association of a finger with a region. This conflict can occur when the fingers shift too far from home position on the finger map. In this case, it is reasonable and perhaps helpful for the gesture system to treat the gesture as unrecognized until it completes, inviting the user to correct back to home position or establish a new hand calibration. Alternatively, the gesture system can shift each conflicting finger association over by one, only treating the gesture as unrecognized if the last finger requiring re-association cannot be re-associated because there is no next adjacent region.

Figure 19:
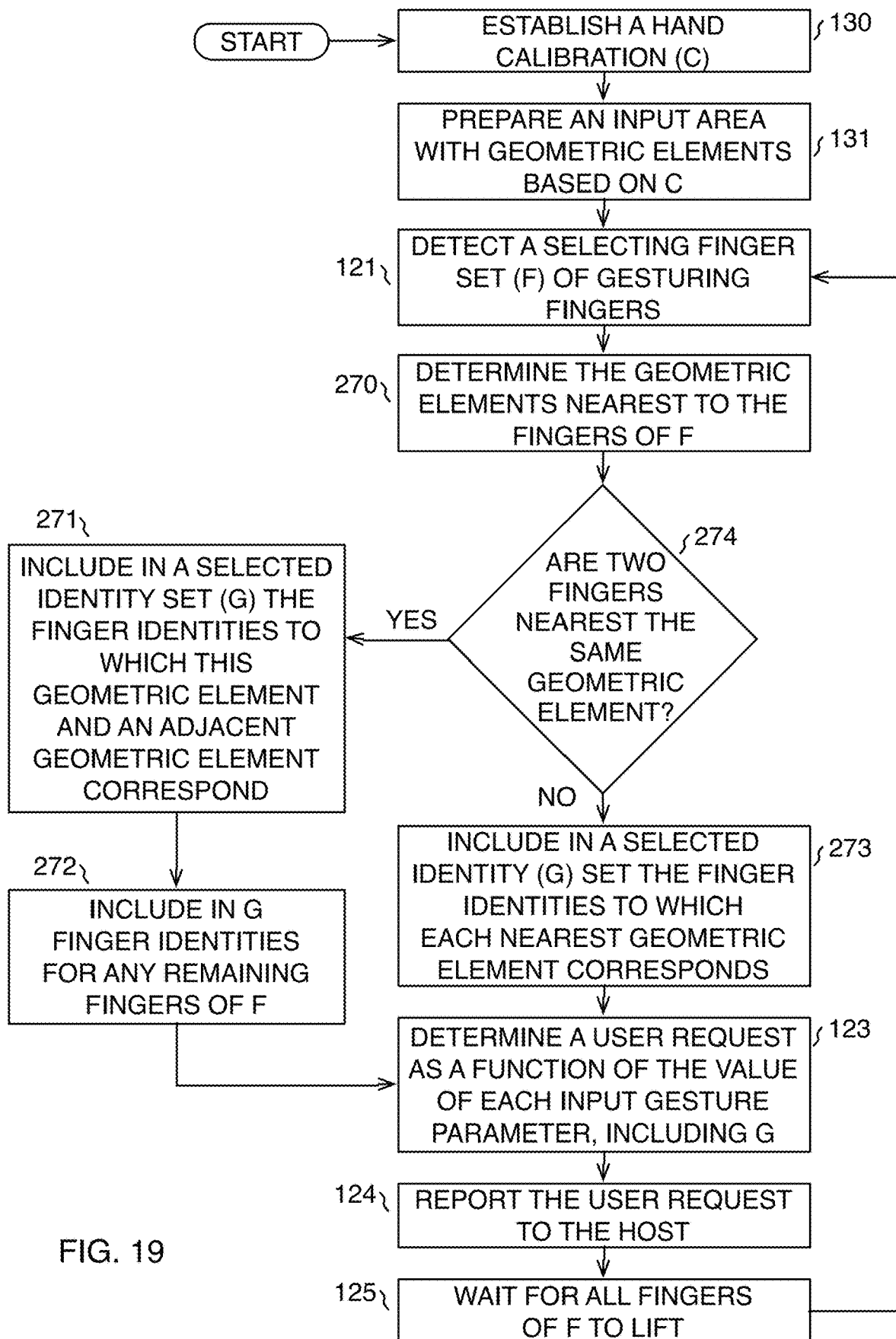
FIG. 19 depicts the general process for resolving finger identity determination conflicts.

FIG. 19 depicts an incorporation of conflict resolution into the steps for processing a finger-mapped gesture. FIG. 19 is expressed in terms of a generalization of input regions that has not been discussed yet. To interpret this figure for input regions, interpret a "geometric element" as an input region, and interpret the "nearest" geometric element to a finger as the input region that contains the finger's initial touch location. The process for determining the selected identity set has been expanded into several steps 270-273, the first of which 270 determines the input regions, referred to here as "geometric elements," that are nearest to the fingers of the selecting finger set. Test 274 checks whether two fingers have an initial touch location in the same input region. If each finger of the gesture has an initial touch location in a different input region, the selected identity set includes the finger identities to which the each of these different input regions corresponds, as shown in step 273. If two fingers of the gesture have an initial touch location in the same input region, the selected identity set includes the finger identity to which that input region corresponds and also the finger identity to which one of the adjacent input regions corresponds, as shown in step 271. The choice of adjacent input region can be made using one of the techniques previously described. If there was a conflict of two fingers in a gesture of three or more fingers, step 272 includes in the selected identity set the finger identities to which correspond the input regions in which each of the remaining fingers has an initial touch location. At this point, the gesture system has the complete selected identity set and can proceed with determining the user request in step 123.

7.6.6 Retraction and Revocation

A gesture system may optionally implement retraction. "Retraction" is a process whereby the user moves the fingers to perform a lockstep gesture, tracing paths for the gesture, but prior to lifting the fingers, roughly retraces the fingers in reverse along their paths for at least a portion of their paths. The process of moving roughly in a reverse fashion reduces the distance measures reported for the fingers, which in turn may change the value of the gesture level or of other gesture parameters, hence also changing the outcome that would be selected for the gesture were the fingers to lift at the retracted location. Retraction is useful for providing users with assistance learning the gesture system. As the user moves the fingers to perform a gesture, the gesture system provides the host with status notices indicating the outcome that the gesture would have if the fingers were to lift at their current locations. The host can provide this real-time feedback to the user.

The gesture system may also support revocation. A "revoked" gesture is a gesture that completes with a special gesture outcome called a "revocation." A gesture is in a revoked state when any of its gesturing fingers acquires a distance measure less than or equal to a revocation threshold length, such as the gesturing threshold distance. A revocation produces no effect except perhaps the sending of a status notice to the host indicating its occurrence. Revocation allows the user to begin performing a gesture, but to decide against completing the gesture, and to do so in a way that isn't reported as either a user request or a user error. Revocation is most useful to people who use retraction to explore the set of possible outcomes available to a gesture prior to selecting one, as when training to use the gesture system. Revocation provides an easy way for these people to simply drop the gesture without effect so they can check another gesture.

Because users may forget where their fingers began gesturing, it's not pragmatic to base revocation detection exclusively on the proximities of fingers to their measurement origins. Revocation is best employed with a distance measure determined by projection onto lines parallel to each finger's initial direction of travel, allowing the user to revoke a gesture by retracting each finger into a half-plane corresponding to distance measures equal to or below a specified revocation threshold value. Distance measures in the direction opposite the measurement origin from a finger's initial direction of travel can be treated as negative lengths.

Figure 21:
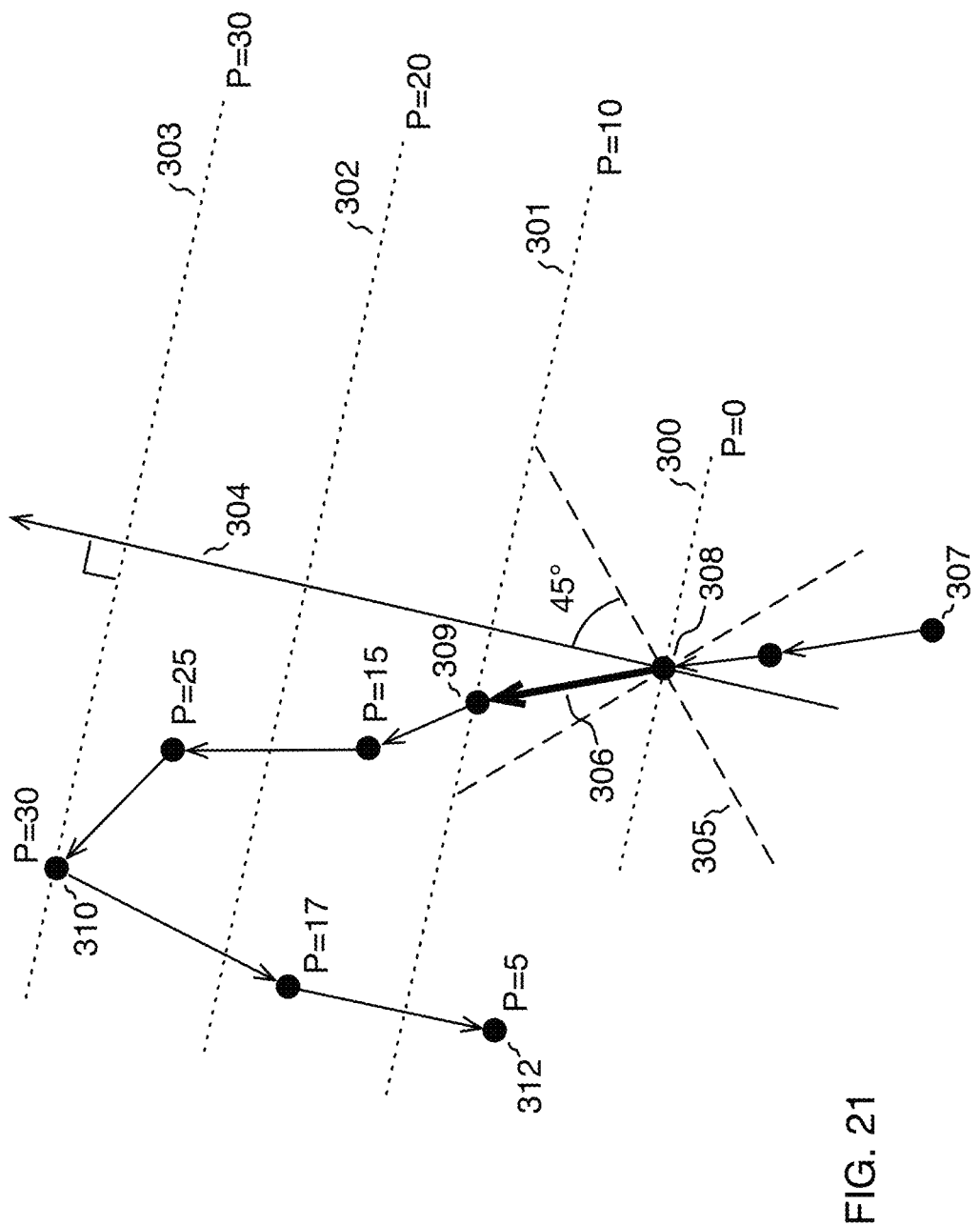
FIG. 21 depicts an example of determining the length of a stroke by projecting its path onto a line.

FIG. 21 illustrates the revocation of a stroke gesture. The finger has an initial touch location at point 307 and exceeds a gesturing threshold at point 309. Exceeding the gesturing threshold establishes the initial slide vector 306 and the measurement origin 308. The gesture system determines a discrete direction for the gesture using the initial slide vector 306 and a quarter-plane directional partitioning 305 relative to the measurement origin 308. A projection line 304 is established bisecting the quarter plane 305 that contains the initial slide vector 306 and intersecting the measurement origin 308. The "P=" notations indicate the distance measure at each point, where the distance measure is the length of the distance vector when projected onto the projection line 304. The figure illustrates distances 300-303 at increments of 10. The measurement origin 308 is at distance 0. The finger continues travelling and reverses direction at point 310, which projects onto the projection line 304 at distance 30. The finger continues its reversal of direction until it reaches point 312. Suppose the gesture system considers projection distances of 10 or less to be revocation. In this case, lifting the finger at point 312 revokes the gesture. Were the finger to instead lift at any preceding point, the distance measure of the gesture would be the value of P at the point.

The gesture system can take advantage of negative distance measures to provide an additional feature called "re-origination." Re-origination effectively pushes the measurement origin back to the farthest point that the finger ever reaches in the negative-value half-plane. Under this approach, a finger's effective distance measure never drops below zero, and every movement again in the original direction of the gesture increases the value of the measure. Re-origination is easily implemented with a gesture level by calculating the gesture level as a function of each finger's distance measure minus the most-negative value ever achieved by the distance measure. Re-origination makes it easy for the user to revoke a gesture by pulling fingers backward any distance greater than the forward distance they travelled, while also allowing the user to move subsequently forward again as if the finger were starting a new gesture at the point at which it reversed direction.

Retraction, revocation, and re-origination are primarily helpful for tutorial or instructional purposes. They are not necessary because it is just as easy—if not easier—for the user to complete a mistaken gesture, undo the mistake if the gesture corresponded to a known behavior, and then perform the correct gesture. This is the same reason that a conventional computer keyboard need not provide a way for a user to undo having pressed the letter 'A' before the user lifts the keyboard button for 'A'; the user can always lift the mistaken key press, delete the 'A', and then type the actually intended letter. In fact, most keyboards register the key pressed at the time the key is pressed rather than at the time the key is lifted, eliminating the possibility of revocation.

7.7 Parameter Types

A finger-mapped gesture includes a selection of finger identities and at least one additional gesture parameter. This section describes some of the possible gesture parameters, focusing on those that a user can input without having to change the hand position during the gesture. Gesture outcomes are a function of the parameter values indicated by these gesture parameters, in addition to being a function of the selected finger identities. This specification defines the following gesture parameters: gesture level, touch count, holds, gesture direction, backbrushing, and multi-reversal. A finger-mapped gesture system can provide the user with easy access to a diversity of user requests by supporting multiple gesture parameters, thus enabling a great variety of parameterizations. Gesture level and gesture direction are the most basic gesture parameters, because they only require movement for a distance, which is the minimal action of a finger-mapped gesture.

7.7.1 Gesture Level

The gesture level of a finger-mapped gesture is an abstract measure of the length of the gesture that is dependent on at least one length property of the gesture. When a user inputs a gesture level as part of a gesture, the user selects a gesture outcome according to how far the fingers travel during the gesture. Gesture levels partition possible lengths into ranges, where each range corresponds to a distinct gesture level. The length partitioning allows the user to input varying gesture lengths that all select the same gesture level. The gesture system translates one or more length measures of a gesture to a gesture level. Because the user strives to input a single length when selecting a gesture level, finger-mapped gestures that include a gesture level parameter are best treated as lockstep gestures.

7.7.1.1 Determining a Gesture Length

Many different length properties may characterize a gesture. A length of a gesture depends on distances that the fingers travel along their gestured paths. In particular, a length depends on the gesturing fingers' measurement origins and level selection points. The "level selection point" of a finger is the point on the finger's path that is used for determining the gesture length relative to a measurement origin. The gesture system can define a finger's level selection point as any of the following or even as the first of any of the following to occur:

1) The point at which the finger lifts.
2) The point on the path at which the finger had its maximum distance measure during the gesture.
3) The point at the time the selecting finger set is determined.

The distance measure of a finger at the level selection point is called the finger's "selected distance." The length of a stroke gesture is the finger's selected distance. The length of a sweep can be a function of the selected distances of the gesturing fingers or more generally a function of the fingers' measurement origins and level selection points. Techniques for determining a gesture length for a sweep gesture include the following:

1) The gesture length is the selected distance of just one of the fingers of the selecting finger set, such as the selected distance of the leftmost or the rightmost gesturing finger.
2) The gesture length is the average of the selected distances of the fingers. FIG. 16 illustrates this approach with a two-fingered sweep. Finger A lifts at point 204 while finger B is still touching at point 209. If the level selection points are determined at the time of the selecting finger set is determined, both points 204 and 209 are level selection points. The selected distances are therefore the lengths of the distance vectors 216 and 218. Under this approach, the gesture length is the average of the lengths of vectors 216 and 218.
3) The gesture length is the length of the interpolated distance vector of the fingers. The "interpolated distance vector" is the vector that starts at the average measurement origin and ends at the average level selection point. The average measurement origin has a location given by separately averaging the x- and y-values of the measurement origins of the fingers in the selecting finger set. Similarly, the average level selection point has a location given by separately averaging the x- and y-values of the level selection points of these fingers. The result is a single virtual measurement origin and a single virtual level selection point. The gesture length can be the distance between these two virtual points.

Figures in this specification preferentially illustrate gesture length and discrete direction being determined for sweeps using an interpolated distance vector because the interpolated distance vector is readily amenable to graphical representation. FIG. 17 depicts the details of computing an interpolated distance vector for a two-fingered sweep. Finger A has a measurement origin at point 200 and finger B has a measurement origin at point 205. Point 212 is the average measurement origin. Finger A lifts at point 204 while finger B is still touching at point 209. If the level selection points are determined at the time of the selecting finger set is determined, and if the selecting finger set is determined at the time that the first gesturing finger lifts, both points 204 and 209 are level selection points. Point 214 is the average of these points and hence an average level selection point. The gesture length in this example is therefore the length of vector 220, which starts at the average measurement origin 212 and ends at the average level selection point 214. Because different facets may employ different coordinate systems for finger locations, interpolated distance vectors cannot necessarily be calculated between fingers that are on different facets. The direction of a sweep that is evaluated as an interpolated distance vector can be constrained to the direction detected for the sweep when both fingers of the sweep have exceeded a gesturing threshold. As illustrated in FIG. 17, the varying direction indicated by the angle $\phi_{AB4}$ can be constrained to the direction originally indicated by the angle $\phi_{AB3}$ interpolated at the gesturing threshold of both fingers.

7.7.1.2 Determining the Gesture Level

The gesture lengths available to a gesture can be partitioned into ranges of length. A "gesture level" represents a particular range of gesture lengths corresponding to a value of a gesture level parameter. The form of this representation within the gesture system is immaterial. The gesture system could directly represent a gesture level value as a range of lengths, but it is convenient to represent the value with an identifier. For example, gesture levels could be labeled as letters of the alphabet, as the names 'first', 'second', 'third', etc., or with the words "short", "medium", "long", and "extra long." This specification indicates each gesture level with an integer. Each integer corresponds to a different range of gesture length, with increasing values of the gesture level integer corresponding to ranges of increasing length. The minimum length for the range of a particular gesture level is called the "threshold distance" or "threshold length" for that gesture level. Different fingers may employ different threshold lengths, as may different combinations of fingers. For convenience of discussion, assume that in the context of a particular set of threshold lengths, the lowest selectable range of lengths has gesture level 1, that the next higher range has level 2, and so on. Integer levels are useful because they can be averaged together or compared numerically. To be clear that the accompanying claims are not restricted to the representation of gesture levels as integers, the claims may refer to the lowest gesture level length range as the "first-range" gesture level and the second lowest length range as the "second-range" gesture level.

The gesture level of a gesture is dependent on the range of lengths in which each relevant length of the gesture falls; determining the gesture level of a gesture is a matter of determining these ranges of lengths. This is straightforward for a stroke gesture, because the finger's selected distance is the only length available: the gesture level of a stroke is determined from the finger's selected distance. There are several ways to assign a gesture level to a sweep gesture, because several length computations are available. One approach is to determine a single gesture length for the entire gesture and determine a gesture level from this length. Any of the gesture length computations described in the previous section for a sweep serve this purpose. It is also possible to determine multiple intermediate gesture lengths and an intermediate gesture level for each intermediate gesture length, and then to determine a gesture level for the entire gesture from intermediate gesture levels. The following methods exemplify this latter technique:

1) The gesture level for the gesture is the average of intermediate gesture level integers determined separately for each of the fingers. Under this approach, the gesture system first maps each finger's selected distance to the gesture level integer that the gesture would have were that finger the only member of the selecting finger set. The result is one integer per finger of the actual selecting finger set. The gesture level integer for the gesture as a whole is a rounded average of these integers, indicating a particular gesture level. This approach enables the user to train each finger to independently learn the lengths of its gesture levels and to control the gesture level of a multi-finger sweep gesture in terms of these learned per-finger gesture levels. The difference between this approach and averaging the selected distances of all the fingers is subtle, but it may be significant for adept users.

2) The gesture level integer for the gesture is the greatest of intermediate gesture level integers determined separately for each of the fingers. Under this approach, the gesture system first maps each finger's selected distance to the gesture level integer that the gesture would have were that finger the only member of the selecting finger set. The result is one integer per finger of the actual selecting finger set. The gesture level integer for the gesture as a whole is greatest of these integers. This approach allows the user to benefit from independently training fingers to their associated ranges of gesture levels. It is also forgiving of fingers that happen to be a little lazy while gesturing. The gesture system may optionally decline to recognize the gesture if any two intermediate gesture level integers differ by more than one, helping to keep the gesture from being ambiguous. If the selecting finger set contains three or more fingers, the gesture system may limit the number of fingers allowed to have gesture level integers different from the maximum, which may help to reduce the chance of misinterpreting the gesture. This approach also offers the best method for ensuring that all fingers of a sweep move roughly the same distance, as is ideal in a lockstep gesture.

3) The gesture level integer for the gesture is the smallest of intermediate gesture level integers determined separately for each of the fingers, analogous to the previous example.

The gesture system may employ a combination of different methods for translating gestures to gesture levels. In particular, a function that translates a gesture length into a gesture level may vary by other parameters of the gesture. Consider that different fingers tend to gesture different lengths, indicating that it would be useful to determine gesture level thresholds separately for each finger, perhaps basing each threshold on the lengths of channel line segments determined for the fingers. It may also be useful to vary gesture thresholds by the direction in which the fingers move. Consider that a user may be inclined to gesture fingers farther when moving them forward than when moving them backward; the gesture level computation would ideally accommodate a user's individual inclinations. The gesture system may also employ any of the possible distance measures, even in combinations. However, at least for flat touch-sensitive surfaces, using a strictly linear distance between a measurement origin and a sampling point is effective.

7.7.1.3 Gesture Level Examples

Figures 23, 24A, 24B, 24C:
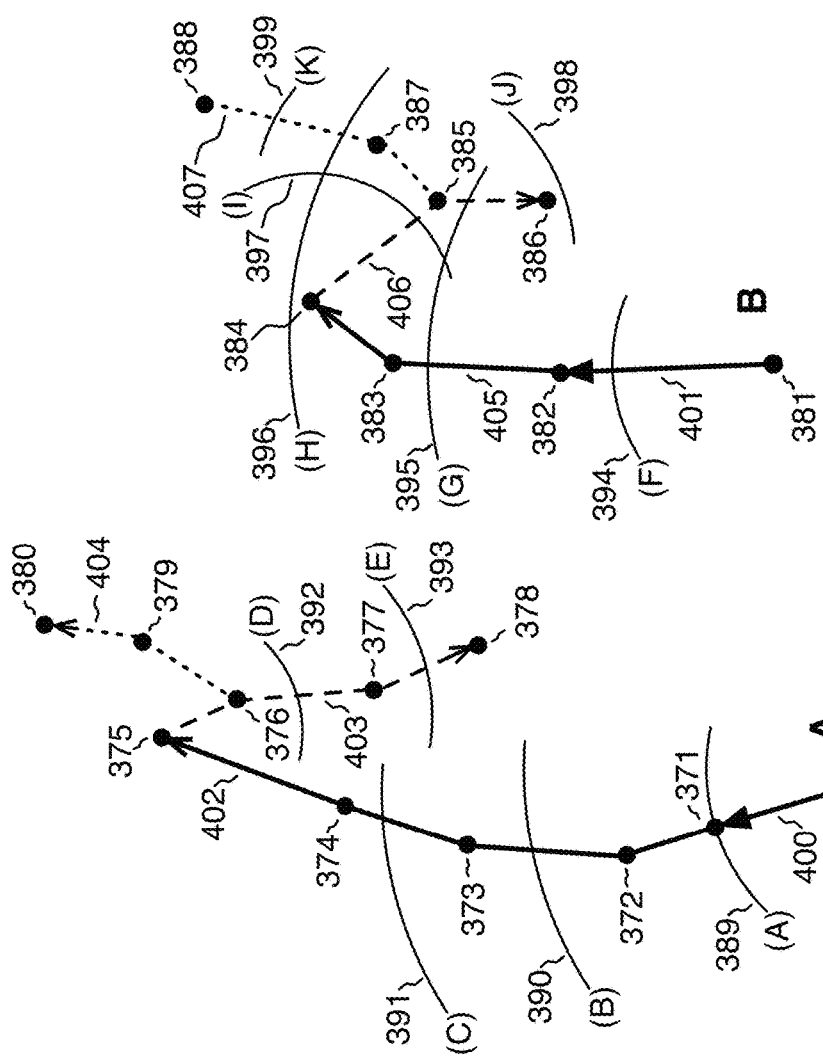
FIG. 23 depicts multiple paths for two fingers, representing either a gesture of just one finger or a gesture with both fingers.
FIGS. 24A-24C are tables exemplifying how the paths of FIG. 23 can be interpreted as characters.

FIG. 23 illustrates multiple possible gestured paths for each of two fingers identified as A and B. 'A' and 'B' each appear next to the starting location, 370 or 381 respectively, of a branching tree of paths. Each branching tree of paths, or "path tree," depicts multiple paths that a single finger may travel as part of a gesture, with each branch indicating where one possible path deviates from another. The starting location, 370 or 381, represents a measurement origin for each of the associated finger's possible paths. The labels 'A' and 'B' also identify their associated path trees.

Each path tree of FIG. 23 has three legs, 402-404 or 405-407, connecting numbered points 370-388. The first leg, 402 or 405, is shown as a solid line, the second leg, 403 or 406, is a dashed line, and the third leg, 404 or 407, is a dotted line that originates midway down the dashed leg 403 or 406. Only the first leg, 402 or 405 respectively for fingers A or B, is relevant to the present discussion; the second and third legs depict "backbrushing," which is described later. Arrows represent the direction of travel of a finger. The solid arrow 400 or 401 originating at each measurement origin, 370 or 381, represents an initial slide vector. Three arcs, 389-391 or 394-396, partition the first leg of each finger's path. Each arc represents a distance from the measurement origin 370 or 381 corresponding to a minimum distance for a gesture level. In addition to being labeled with detail numbers, each arc is labeled with a parenthesized letter that represents the distance of the arc from its associated measurement origin.

The tables of FIGS. 24A-24C indicate how to map gesture level distances to user requests for purposes of the example of FIG. 23. The user requests in this case are unparenthesized letters and ampersand. The dashed entries in the tables indicate conditions that cannot arise. Each row of a table represents a gesture level, indicated to the left of the row as "GL" followed by a gesture level integer. Each column of a table represents a "backbrush level," which for purposes of the present example is 0 ("BL 0"), meaning that the gesture does not "backbrush." "Backbrushing" and "backbrush level" are described later. The tables assume that gesture level and backbrush level are the only gesture parameters. Table 24A applies to a gesture involving only finger A, table 24B applies to a gesture involving only finger B, and 24C applies to a sweep involving both fingers A and B. Consider the following scenarios:

1) Finger A gestures alone and lifts at point 375. The distance from point 370 to point 375 exceeds distance (c) of arc 391. Cross-referencing ">(c)" and "BL 0" in the table in FIG. 24A indicates that this gesture has gesture level 3 ("GL 3") and inputs the character 'G'.
2) Finger B gestures alone and lifts at point 384. The distance from point 381 to point 384 is less than distance (h) of arc 396 but greater than distance (g) of arc 395. The table in FIG. 24B indicates that this gesture has gesture level 2 ("GL 2") and inputs the character 'M'.
3) Fingers A and B together perform a sweep gesture, lifting at points 375 and 384, respectively. If the gesture system assigns the gesture level of a sweep to the greatest gesture level of its gesturing fingers, then finger A provides the gesture level for the sweep, because finger A gestured at gesture level 3, while finger B only gestured at gesture level 2. The table in FIG. 24C therefore indicates that the gesture inputs the character 'Y'.
4) Fingers A and B together perform a sweep gesture, lifting at points 373 and 384, respectively. Each finger indicates a gesture level integer of 2, so the gesture level for the gesture is 2. The table in FIG. 24C indicates that this gesture inputs the character 'V'.
5) Finger A gestures alone and lifts at point 371. This is also the point at which the gesture system detected an initial slide, which must have a minimum length. Because there is a minimum distance from the measurement origin that a finger can gesture, there is also a minimum distance for the first gesture level. If point 371 is at the minimum initial slide length, distance (a) is the lowest possible gesture distance. The tables 24A-24C designate distances below this as gesture level zero, showing dashes to indicate that it is not possible to select gesture level 0. This gesture occurred at distance (a), so the table in FIG. 24A indicates that it inputs the character 'A'.
6) Finger B gestures alone and lifts at point 382. Distance (f) represents the minimum initial slide length, but the gesture system did not detect the initial slide until a greater distance away, at point 382. Distance (f) is also the threshold distance for gesture level 1, so this scenario is a level 1 gesture. Table 24B indicates that this gesture inputs the character 'J'.

7.7.2 Gesture Direction

A gesture may be parameterized by the direction in which the user performs the gesture. A "gesture direction" parameter is a gesture parameter that is a function of a direction property of the gesture. In particular, a gesture direction is a function of the range of directions in which a direction property of the gesture falls, because finger-mapped gestures distinguish among only a limited number of classes of direction. Each range of directions is called a "discrete direction," as described for directional partitionings. It is best that a gesture for which a gesture direction is being determined be lockstep, so that the gesture system may reliably assign a discrete direction to the gesture as a whole. This section describes some techniques that are available for determining a gesture's discrete direction. The techniques are described with direction angles representing directions, but they can also be applied to other representations of directions. According to a generic process, the gesture system determines a "gesture angle" for the gesture as a whole and then determines a discrete direction from the gesture angle. The discrete direction is read from a directional partitioning oriented to a reference angle that is suitable for the gesture, where the reference angle represents a previously established standard direction, such as a center-forward direction that makes sense for the gesturing fingers. The discrete direction parameterizes the gesture outcome.

7.7.2.1 Determining Direction Angles

The gesture system determines the discrete direction of a gesture from at least one direction property of the gestured paths of the gesture. The generic process described here determines one or more direction angles representing one or more directions of the gesture and then determines a discrete direction from the direction angle or direction angles. A direction angle can be determined separately for each finger or collectively for a group of fingers.

There are many ways to assign a direction to each finger, but the simplest is to use the direction angle of one of the distance vectors of the finger. The first useful distance vector is that of the point at which the finger is found to exceed a gesturing threshold, assuming the presence of a gesturing threshold. The last useful distance vector is that of the point at which the finger lifts from the gesture surface. The angles of any of these distance vectors suffice, but the gesture system should be consistent with the points relative to which it determines the distance vector. When determining a direction angle for a group of gesturing fingers, the gesture system can use a vector that originates at a midpoint between starting points for the fingers and that ends at a midpoint between ending points of the fingers. FIGS. 16 and 17 illustrate determining direction angles for individual fingers and for the gesture as a whole, respectively.

If the gesture system constrains the directions of lockstep gestures, the direction angle assigned to a finger can be the angle of the finger's distance vector at nearly any time, including the time at which the finger lifts. A gesture system that supports multiple facets in different coordinate systems should assign "forward-relative" direction angles to the fingers for use in determining the gesture's discrete direction, unless the gesture system knows the relative orientations of the facets. Forward-relative angles are discussed later in the specification.

In practice it appears that it is best to wait for a finger to travel a bit beyond the distance at which it exceeds the gesturing threshold before determining the finger's direction angle. That is, the gesture system should determine the direction angle of a finger after the finger's distance measure equals or exceeds a minimum distance that is greater than the gesturing threshold distance, for reasonable gesturing thresholds. This distance is the "direction assignment distance." A gesture system can employ a direction assignment distance even in the absence of a gesturing threshold. Because the user may end a gesture at any point after the fingers have begun gesturing, the gesture system may have to assign a direction angle to a finger before it would normally do so. In particular, if the gesture system normally waits for a finger to travel a direction assignment distance before assigning its direction angle, and if the finger lifts before travelling this distance, the gesture system should determine a direction angle relative to the point where the finger lifted.

7.7.2.2 Determining the Gesture Angle

The gesture system most straightforwardly determines a discrete direction for a gesture from a single direction that it associates with the gesture. An angle representation of this single direction is called the "gesture angle." The gesture system computes the gesture angle from the direction angles that it determined for the gesture. The gesture angle of a stroke is normally the direction angle of the finger that performed the stroke. There are numerous ways to compute the gesture angle of a sweep.

One way to determine the gesture angle of a sweep is to use the nearest average of the fingers' direction angles, as illustrated in FIG. 16 for a two-finger gesture. The nearest average may optionally be weighted by the distance measures of the fingers. However, the most flexibly adaptive approach is to set the gesture angle to the nearest bisection of the fingers' range direction angles. For example, if the gesture is a two-fingered sweep and one finger has an angle of 40 degrees and the other an angle of 80 degrees, the gesture angle would be 60 degrees, which also happens to be the nearest average of the angles. If the gesture is a three-fingered sweep and the finger angles are 40, 43, and 80 degrees, the range of angles is 40 to 80 degrees, so the nearest bisecting angle is again 60 degrees, which this time differs from the nearest average.

Another option is to have the gesture angle be the angle of a vector located midway between where the fingers start gesturing and where the fingers complete the gesture. The interpolated distance vector is an example of this for two fingers, as illustrated in FIG. 17. For an arbitrary number of fingers, the starting location of the midway vector could be the average of the measurement origins of the fingers, and the ending location of the midway vector could be the average of the final locations of the fingers. It is also an option to simply set the gesture angle to the direction angle of one of the fingers, but if the gesture system calibrates for the different directions in which different fingers tend to move, it generally is better to infer the gesture angle from the overall direction of the gesture.

It is possible to implement the gesture system so that it determines a discrete direction for the gesture by reducing the paths of the fingers to one of a set of predetermined gesture angles. This can be done by projecting the path of each finger onto a previously established reference line associated with the finger and identifying a direction angle for the finger according to the direction along the path that the resulting projected vector points. The projected vector starts at the point on the reference line at which the measurement origin projects and points in the direction of the end of the path. The direction angle of each finger is one of the two direction angles of the reference line. Each finger may also be associated with multiple reference lines intersecting at a point. In this case, the gesture system associates the finger with the reference line having a direction angle closest to the direction angle of finger's path. The gesture system then projects the path onto that reference line and establishes a direction angle for the finger equal to the angle of the projected vector. In the case of a sweep gesture, it is also possible to project a virtual path representing the gesture onto a reference line and directly reduce the multi-path gesture to one of the angles of the reference line. These projection approaches allow gesturing fingers to indicate directions along predefined axes akin to the directions available to a finger scrolling an image on a touchscreen.

7.7.2.3 Determining the Reference Angle

In order for the gesture system to assign a discrete direction to a gesture, it must first establish which direction is forward for the gesture. It is possible to establish a forward direction for the gesture as a whole because the fingers move forward in roughly the same direction. Establishing the gesture's forward direction allows the backward direction and other directions to be established relative to it. One way to determine these ranges of directions is to use a gesture's forward direction as the reference angle for orienting a directional partitioning. The directional partitioning is oriented so that its center-forward direction is aligned with the reference angle, also orienting the discrete directions for the gesture. The value of the gesture direction parameter would then be the discrete direction that contains the gesture angle. Under another approach, the gesture system determines a discrete direction by projecting a distance vector onto a reference line having angles that indicate opposing directions of movement, such as onto a reference line representing forward/backward movement. In this case, the discrete direction is given by the direction in which the projected vector points along the reference line. This approach also has a "reference angle," defined as the angle for forward movement along the forward/backward reference line. Regardless of the approach implemented, the direction of forward movement must first be established. This section describes methods for establishing this direction, expressing the direction as a reference angle.

Figure 27C:
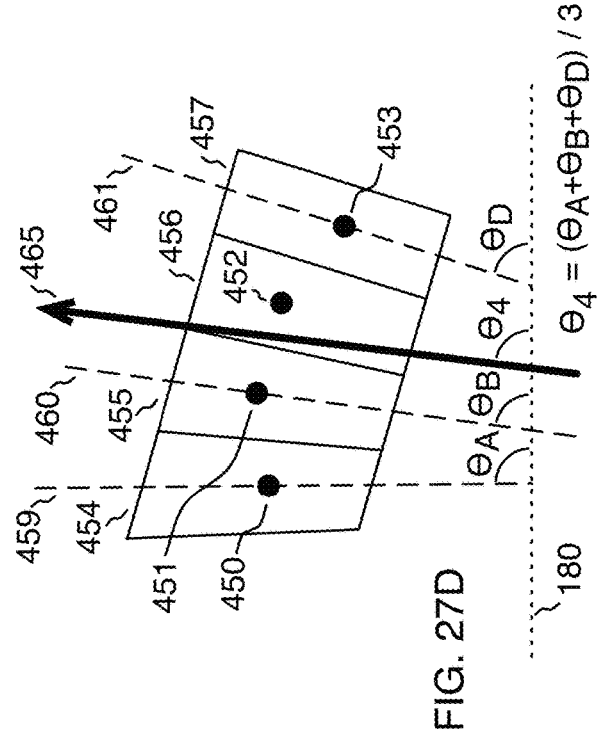

FIGS. 27A-27D illustrate some of the possible reference angles that a gesture system may use. In these figures, the points 450-453 represent rest locations, the lines 462-465 represent forward directions for the gesture, the angles $\theta_1$, $\theta_2$, $\theta_3$, and $\theta_4$ represent reference angles, and the angles $\theta_A$, $\theta_B$, and $\theta_D$, represent forward angles for fingers. The simplest reference angles are constant, as in FIG. 27A. For example, the reference angle $\theta_1$ can be specific to the host or the touch device and hence constant across gestures. A constant reference angle is reasonable for devices that constrain the user's hand to a particular position and orientation, such as a smartphone with a small screen. FIG. 27B shows an example of a computed reference angle. The reference angle $\theta_2$ is the angle perpendicular to the orientation line 458 of a hand calibration, with the angle $\theta_2$ pointing in the general direction that different finger forward angles would point. Under this approach, the reference angle is constant for a particular finger map, which is useful when finger maps can vary in orientation. FIG. 27C shows another reference angle $\theta_3$ that is constant for a finger map. $\theta_3$ is the nearest bisection of the range spanned by forward angles for all of the non-thumb fingers, which is the bisection of the angles $\theta_A$ and $\theta_D$ at the ends of the range. FIG. 27C shows the range as spanning an arc length of λ. This latter approach defines the forward direction of a gesture as a function of the forward directions of the individual fingers.

Figure 27D:
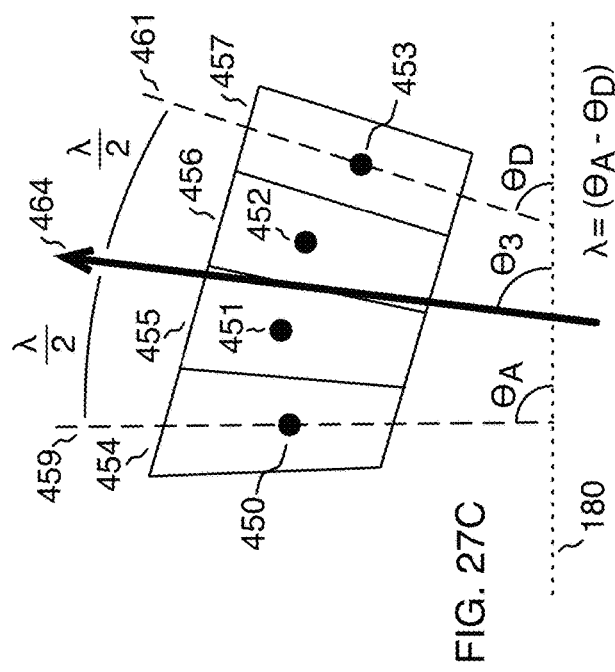

The gesture's reference angle represents the forward direction of the gesture, so it is most effective to establish this forward direction as a function of the forward directions of the fingers that perform the gesture. If the forward directions are all identical, the reference angle is the angle of the forward direction. Otherwise, a hand calibration can provide the finger forward directions as forward angles for each finger identity. In this case, when the gesture is a stroke, the reference angle of the gesture is just the forward angle of the finger that performed the stroke. When the gesture is a sweep, the various ways for determining the gesture angle as a function of finger direction angles may also be employed for determining the gesture's reference angle as a function of the finger forward angles. For example, the reference angle can be the nearest average of the forward angles of the fingers, and this average can optionally be weighted by the fingers' distance measures. FIG. 27D illustrates the averaging of forward angles $\theta_A$, $\theta_B$, and $\theta_D$ for three fingers, yielding the reference angle $\theta_4$. The dashed lines 459-461 represent the channel lines for these fingers. Analogously to the best approach for determining the gesture angle, however, it is probably most helpful to the user for the gesture system to set the gesture's reference angle to the nearest bisection of the range of angles spanned by all forward angles for the fingers of the selecting finger set.

On multi-faceted devices whose facets use different coordinate systems, the forward directions of different fingers may not be directly comparable. Recall that the convention in this specification is for the direction angle to be determined relative to the positive x-axis; the x-axes of different facets may not physically coincide on the touch device. In this scenario, it may not make sense to compute the gesture's reference angle as the average of finger forward angles. If the relative orientations of the facet x-axes are known, the forward directions can be averaged by first adjusting them according to the orientations of the x-axes. If the relative orientations of the facet are not known, such as if they are configured in ways not communicated to the gesture system, the gesture system can instead compute a "forward-relative" direction angle for each finger and then average the forward-relative angles to produce an angle for the gesture overall, as explained below.

7.7.2.4 Determining the Discrete Direction

The discrete direction value of a gesture direction parameter can be determined from the gesture's direction, the direction of forward movement, and the relative orientations of the various discrete directions to the direction of forward movement. According to the generic process being described here, once both the gesture angle and the reference angle are known, the gesture's discrete direction can be determined from a directional partitioning. The directional partitioning contains at least the gesture angles that are possible for the user to input. If the touch device interprets gestures for any direction available for gesturing, the directional partitioning contains all possible direction angles. If the touch device treats some directions as invalid, the gesture system must distinguish valid directions from invalid directions, so the invalid directions can be considered to belong to a discrete direction that designates them as invalid. Some touch devices may restrict the movement of the finger or limit the directions of movement that can be detected, in which case the gesture system can get away with a directional partitioning that contains only a few directions.

The choice of directional partitioning depends on the requirements of the gesture system. The half-plane partitioning shown in FIG. 25A is sufficient for a gesture system that only recognizes forward- and backward-moving gestures. The quarter-plane partitioning shown in FIG. 25C may be the most prudent for recognizing four distinct directions, because it gives the user the maximum possible room for error when selecting a direction, such that any further apparent error in a direction is reasonably interpreted as an intentional selection of a different discrete direction. A gesture system may opt for a variant of the bow-tie partitioning of FIG. 25B or a variant of the half-symmetric four-way partitioning of FIG. 25D to require that the user employ care with selecting certain discrete directions, in order to reduce the chance that these directions will be selected by accident. These latter two directional partitionings may be useful for reserving certain discrete directions for more consequential user requests. The gesture system can employ the same directional partitioning in every gesture, perhaps orienting it for each gesture, but it is also an option to vary the directional partitioning as a function of the identities of the gesturing fingers.

Technically, the gesture system could decline to recognize gestures having certain discrete directions, for example by requiring that all gestures move forward or backward and that none move left or right. Similarly, the gesture system could opt to only detect two discrete directions and require that all valid gestures be performed in just one of them, such as requiring that all directions be in the BACKWARD range despite also detecting directions in the FORWARD range. However, the value of the limitations is unclear, except possibly to force the user into a gesturing pattern that minimizes user error. Hence, the parameter values available to a gesture direction parameter normally include each discrete direction that the gesture system recognizes.

FIG. 13 illustrates determining the discrete direction of a stroke according to an oriented partitioning. The oriented partitioning has a center-forward angle of approximately $\pi/2$. The finger lifts at point 175 at distance vector 178. Both the initial slide vector 176 and the distance vector 178 indicate a discrete direction of FORWARD, so regardless of the gesture angle $\phi_1$, $\phi_2$, or $\phi_3$ that the gesture system uses, this is the discrete direction of the gesture. The discrete direction determined would be the same even if the gesture were to end with a "backbrush," which is described later.

FIGS. 16 and 17 illustrate the determination of sampling angles for identifying the discrete direction of a two-fingered sweep. The paths of the fingers in FIG. 16 are identical to the paths of the fingers in FIG. 17. Finger A lifts at point 204. Finger B is still touching at this time at point 209. The distance vectors for points 204 and 209 are 216 and 218, respectively. In FIG. 16, the sampling angle is calculated as $\phi_{AB2}$, which is the nearest average of the angles of the distance vectors 216 and 218. FIG. 17 depicts interpolated distance vectors. Point 212 is the midpoint between points 200 and 205, point 213 is the midpoint between points 201 and 207, and point 214 is the midpoint between points 204 and 209. In FIG. 17, the sampling angle is given as angle $\phi_{AB4}$, which is the angle of the interpolated distance vector 220 at the time finger A lifts. This figure does not depict the process of determining the oriented partitioning with which to compare the sampling angle. FIGS. 27A-27D show several ways that a reference angle can be chosen for orienting a directional partitioning. The directional partitioning to orient can be one that the gesture system universally applies across all fingers, it can be a directional partitioning associated with one of the fingers labeled A and B in FIGS. 16 and 17, or it can be a directional partitioning derived from those individually associated with fingers A and B. The discrete direction determined would be the same even if the gesture were to end with a "backbrush," which is described later.

It is possible to implement a gesture direction parameter so that it is a function of multiple discrete directions determined for a gesture from multiple gesture angles. For example, the gesture system can determine a discrete direction separately for each finger and then average the discrete directions together, selecting a discrete direction for the gesture as the discrete direction nearest to this average. Representing discrete directions as integers facilitates this approach. Alternatively, the gesture system can select one of multiple computed discrete directions without combining them. When computing discrete directions for each finger, it is useful to constrain the differences in directions allowed among the fingers, such as to enforce lockstep gestures. For example, the gesture system may require that all fingers indicate the same discrete direction.

Finally, consider a gesture system that projects paths onto reference lines for purposes of determining the discrete direction of a gesture. This reduces each path to one of a set of predefined gesture angles. Each gesture angle corresponds to a discrete direction, so the directional partitioning of the generic process need only contain these few predefined gesture angles. The direction of the vector that results from the projection identifies the discrete direction. For example, if the gesture system hard codes the FORWARD and BACKWARD discrete directions to represent directions along the y-axis, the direction of the gesture can identify the discrete direction simply according to whether the y-value at the end of a path is greater than the y-value of the start of the path. As this example makes clear, it is not necessary to represent directions as angles, it is not necessary to represent discrete directions as ranges of multiple directions, and it is not necessary to represent a collection of discrete directions in any structure resembling directional partitionings.

7.7.2.5 Forward-Relative Directions

When the user performs a sweep with fingers on multiple facets and the relative orientations of the facets are not known, the gesture system should determine gesture direction from the "forward-relative" direction of the fingers. A "forward-relative" direction is a direction determined for a finger relative to a forward direction that is associated with the finger. In particular, a generic process expressed in terms of angles determines a forward-relative angle relative to a forward angle for the finger. The forward-relative direction angle is computed in effect first by rotating the facet's coordinate system so that a vector having the finger's forward angle rotates to an arbitrary predetermined "alignment angle." It helps to visualize the alignment angle as $\pi/2$, placing the forward direction at $\pi/2$ radians. A forward-relative direction angle of $\pi/2$ then indicates a direction identical to that of the forward angle, regardless of what the forward angle happens to be for the finger relative to the coordinate system of the facet. In order to be able to compare the forward-relative direction angles of different fingers, the alignment angle must be the same for all fingers. For example, $\pi/2$ would be the forward direction for the forward-relative direction angles of all fingers. The alignment angle serves as the gesture's reference angle, although this alignment angle is only defined for comparison with the finger forward-relative direction angles.

FIGS. 28A-28G illustrate a process for determining forward-relative direction angles $\phi_{A0}$ and $\phi_{D0}$ of a two-finger sweep using an alignment angle of $\pi/2$, thus setting the forward angle in the aligned system to $\pi/2$. FIG. 28A depicts a finger map with regions 470-471 on one facet identifying fingers A and B, with regions 472-473 on another facet identifying fingers C and D, and with the barrier 478 dividing the two facets. The relative orientations of the facets are clear in the figure, but assume that the gesture system does not have this information. The dashed lines 474-477 are channel lines for the regions 470-473. $\theta_A$ and $\theta_D$ are the forward angles for the forward directions of channel lines 474 and 477, respectively. Vector 487 in FIGS. 28B-28C represents the forward direction of channel line 474, and vector 488 in FIGS. 28D-28E represents the forward direction of channel line 477.

FIG. 28A shows a finger gesturing in region 470 along points 479-481 and another finger gesturing in region 473 along points 482-484. The gesture system identifies the former finger as finger A and the latter finger as finger D. The figure depicts finger A's distance vector 485 along with this distance vector's direction angle $\phi_A$ and length X as shown in FIG. 28B. FIG. 28D also depicts finger D's distance vector 486 along with this distance vector's direction angle $\phi_D$ and length Y. FIG. 28B depicts the direction angle $\phi_A$ of finger A relative to the forward angle $\theta_A$ associated with the region 470 that it is gesturing in. FIG. 28D depicts the direction angle $\phi_D$ of finger D relative to the forward angle $\theta_D$ associated with the region 473 that it is gesturing in. FIGS. 28B and 28D help with understanding how forward-relative direction angles are determined.

FIG. 28C depicts the calculation of finger A's forward-relative direction angle $\phi_{A0}$. $\phi_{A0}$ is the angle of finger A's distance vector 485 in a coordinate system for which the forward angle is $\pi/2$. FIG. 28C depicts this as rotating the x-axis until it is perpendicular with the forward direction 487, placing the forward direction at angle $\pi/2$, and then determining the direction angle $\phi_{A0}$ of the distance vector 485 in this rotated coordinate system. FIG. 28E illustrates the same derivation for finger D, with finger D's forward-relative direction angle $\phi_{D0}$ being the angle of the distance vector 486 in a coordinate system rotated to be perpendicular to the forward direction 488. Notice that the forward-relative direction angles $\phi_{D0}$ and $\phi_{D0}$ are both relative to a forward direction of $\pi/2$ in their respective rotated coordinate systems.

FIG. 28F plots both of the distance vectors 485 and 486 according to their forward-relative direction angles $\phi_{A0}$ and $\phi_{D0}$ in the virtual coordinate system that has a forward direction at $\pi/2$, illustrated as vector 489. $\Delta$ is the nearest difference between the two angles $\phi_{A0}$ and $\phi_{D0}$. The gesture system can use this difference to test the gesture for being lockstep. The line 490 bisects the span of the angles $\phi_{A0}$ and $\phi_{D0}$, passing through the open dot 491, which represents the average end point of the vectors 485 and 486. FIG. 28G depicts the vector 492 of this average end point 491. Its angle $\phi$ is the average of the two forward-relative direction angles $\phi_{A0}$ and $\phi_{D0}$, and its length Z is the average of the lengths of two fingers' distance vectors 485 and 486, shown as lengths X and Y. As shown in FIG. 28G, the angle $\phi$ is used as the gesture angle for assigning a discrete direction to the gesture. Here it indicates the discrete direction FORWARD on the directional partitioning 493. The gesture length Z can be used for determining a gesture level for the sweep.

7.7.3 Touch Count

A "touch count" is the number of times one or more fingers touch the same spot in rapid succession before performing an action. The action may be a finger-mapped gesture, in which case the touch count further parameterizes the gesture. The action may also be a hold, as described later, further selecting the type of hold. The touch count of a finger-mapped gesture or a hold is a function of the touch counts of the individual fingers. The process of inputting a touch count of two or more is called "multi-tapping" because each touch prior to the last is a tap. Touch counts are determined from the number of paths in the touch histories of fingers rather than from properties of gestured paths, although the presence of a gestured path may contribute to a touch count.

7.7.3.1 Multi-Tapping

To perform multi-tapping, each finger performing the gesture or hold inputs a touch count. The touch count of a finger is the number of times that the finger touches the same spot within time constraints. Every finger that is touching the gesture surface has a touch count. That touch count is at least 1, a value indicating that the finger is on its first touch. For supported fingers, lifting and touching the same "spot" again increases this value by 1 with each lift and touch. Fingers that multi-tap with touch counts of 1, 2, and 3 are said to "single-touch," "double-touch," and "triple-touch," respectively. A multi-tapping finger has multiple initial touch locations in its touch history, and although any of these may be used to determine the finger's identity, a user is likely to target the first initial touch location to a region with greatest accuracy.

The touch count of a finger-mapped gesture is a function of the touch counts of its gesturing fingers. Specifically, it is a function of the touch counts of each finger of the gesture's selecting finger set. Each finger normally inputs the same touch count. If there is only one gesturing finger, the touch count of the gesture is that of the finger. If there are multiple gesturing fingers and they all input the same touch count, the touch count of the gesture is this touch count. If there are multiple gesturing fingers and their touch counts differ, the gesture system selects the touch count as a function of the touch counts of the individual fingers. For example, the gesture system can use the average touch count or the greatest touch count. The gesture system can also decline to recognize the gesture when the touch counts differ. The gesture's touch count further parameterizes the gesture and hence also the gesture outcome. As with the touch counts of fingers, gestures with touch counts of 1, 2, and 3 are called "single-touch," "double-touch," and "triple-touch" gestures, respectively.

The gesture system ideally uses a gesturing threshold to distinguish taps from gesturing. In this case, once a finger exceeds the gesturing threshold, it can no longer increase its touch count. It is also possible to identify touches according to a non-gesturing condition, such as a by detecting a touch that lasts less than a maximum amount of time, but this approach increases the odds that the gesture system will fail to distinguish taps from other gesture actions. Although a user may input any touch count by tapping any number of times, the gesture system is most pragmatic using only touch counts of at most 2 or 3, as users will likely have trouble remembering distinct meanings for arbitrarily large touch counts. To be pragmatic, the gesture system can either fail to recognize gestures having fingers with touch counts greater than a maximum touch count or it can treat all touch counts greater than or equal to a maximum touch count as equivalent.

Consider an example of a user entering a stroke. A finger that touches the gesture surface and immediately performs the stroke selects a touch count of 1 without having to do anything special; 1 is the minimum touch count. To perform stroke with touch count 2, the finger taps a spot on the input area, lifts, and quickly touches down again on the same spot, performing the gesture from there. To use a touch count of 3, the finger quickly taps the same spot twice before quickly touching again to finally perform the gesture. In general, to input a touch count of N, a finger must input N−1 distinct touches-and-lifts before touching again to begin gesturing.

7.7.3.2 Determining a Touch Count

In order to allow multi-tapping, the gesture system must record the spot that a finger touches. Here are three possible ways to define the spot:

1) The spot is a circle centered on the finger's initial touch location, having some pre-specified radius. The user increases the touch count by touching a finger again in this spot. After the second touch, the finger likely has an initial touch location different from the initial touch location of its first touch. The gesture system may continue to employ the original spot for detecting subsequent touches, or it may establish a new spot centered on each subsequent initial touch location, allowing the finger to drift more with repeated touches.

2) The spot is the input region that contains the initial touch location of the finger's first touch. To increase the touch count, the user need only touch again on the same region. This approach assists a user who is envisioning a lockstep gesture while inputting a touch count. The finger or fingers will likely be in motion for the lockstep gesture by the final touch of the multi-tapping, placing at least the final touch at some distance from the initial touch.

3) The spot is the entire input area. When the host provides finger identities, the gesture system need not monitor for subsequent touches according to previous touch locations, because the gesture system already knows which finger is touching. It is possible to use this approach when the host does not provide finger identities, provided that the gesture system does not support multi-touch sweep gestures, because the touch count can apply to the next gesture to be performed, even if several fingers contributed to the touch count. Using the input area as the touch spot is likely incompatible with the presence of user interface elements on the input area that are activated by touching without gesturing.

On a finger map, the ideal solution combines the first two approaches, increasing the touch count either when a finger touches within a radius of a previous touch or when a finger touches the same input region again. By itself, the first approach does not handle rapid data entry well, and by itself, the second approach is prone to error when the user is touching close to a boundary between regions, where the user might accidentally select different regions on successive touches.

7.7.3.3 Delineating Multi-Tap Gestures

Multi-tapping complicates gesture detection because the lifting of fingers normally delineates gestures. The following constraints allow a gesture system to distinguish sequential gestures when supporting multi-tapping:

1) A finger that exceeds a gesturing threshold can no longer increase its touch count. This provides a clear delineation between gestures, as otherwise the gesture system might merge sequential gestures together by having a subsequent intended gesture actually just increase the touch count of the previous gesture.

2) If after a finger has touched and lifted, a finger of a finger identity that is not registered as having previously touched for the present gesture itself touches and lifts, odds are that the new finger is beginning a new gesture, so best practice is to assume that multi-tapping is no longer in progress for the previous gesture. This forces the previous gesture to complete and allows a subsequent gesture to begin. This also forces the user to ensure that when performing a sweep multi-tap, all tapping fingers must be simultaneously touching before any tapping finger lifts, at least for the first tap of the gesture.

3) A finger that has touched, lifted, and remained lifted for more than a specified period of time can no longer increase its touch count. This allows a user to abort a gesture simply by failing to complete the gesture within a reasonable time. It also enables the gesture system to ignore random non-gesturing touches that the user did not intend to have meaning. The specified period of time is called the "maximum multi-tap up time."

The gesture system should also implement the following constraint:

4) A finger that is touching the gesture surface for more than a specified period of time can no longer increase the touch count. Technically, there is no design conflict with subsequently increasing the touch count, but enforcing a time limit on individual touches may help the user to remember to abide by the time limit that exists on lifts after touching.

Constraints (3) and (4) together impose a minimum rate at which the user must perform multi-tapping to increase a touch count. Since most users are familiar with double-clicking on a mouse or on a touchpad, which generally also require tap input at a minimum rate, most users should find it natural to have to multi-tap at a minimum rate.

FIGS. 29A-29H illustrate the process of detecting a multi-tap gesture and counting touches by combining a tap radius with a tap region, allowing the user to increase the touch count by tapping within either the tap radius or the original region. Each figure depicts the same finger map having three regions 500, 501, and 502, corresponding to finger identities A, B, and C, respectively. A solid dot (e.g. point 503 in FIG. 29A) represents a location where a finger is touching. An open dot (e.g. point 503 in FIG. 29B) represents a location that a finger previously touched. All dots 503-508 are numbered in the order in which their indicated locations are touched. An arrow connecting dots (e.g. from points 506 to 507 in FIG. 29H) indicates a finger's direction of travel. The FIGS. 29A-29H depict a series of input events on the finger map.

Figure 29A:
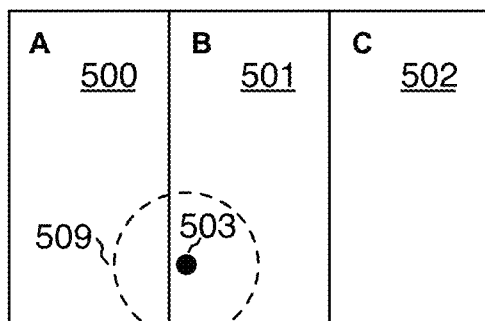
FIGS. 29A-29H depict a sequence in which a finger performs a multi-tap stroke gesture.
Figure 29E:
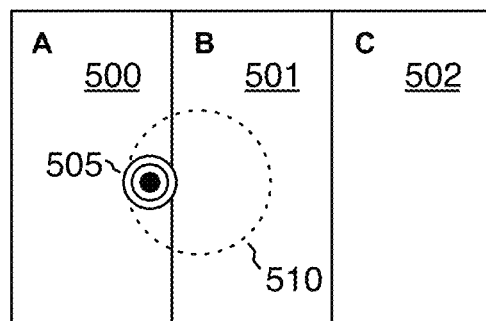
Figure 29B:
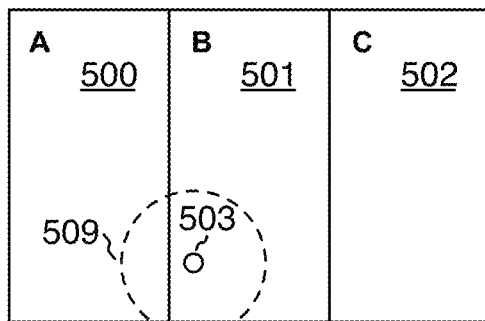
Figure 29F:
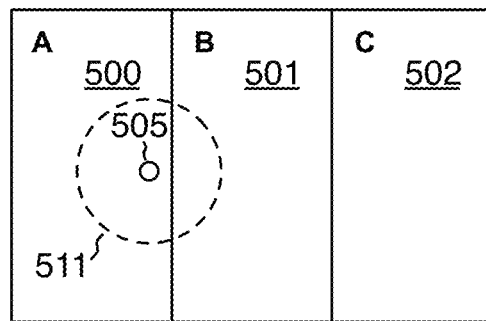
Figure 29C:
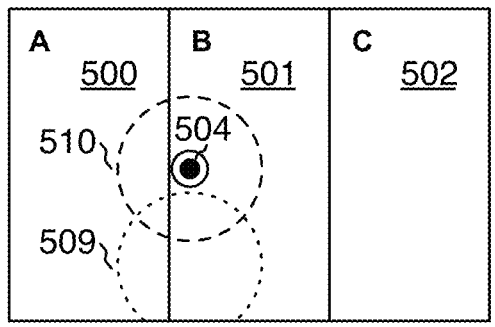
Figure 29G:
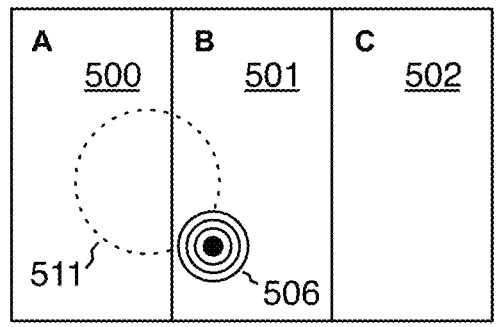
Figure 29D:
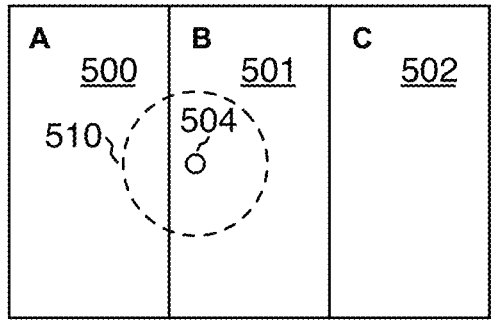
Figure 29H:
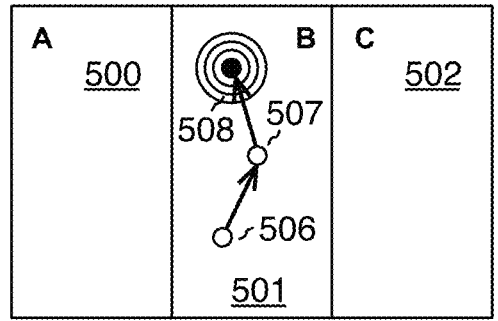

In FIG. 29A, a finger touches at point 503 in region 501, and in FIG. 29B, the finger lifts. The dashed circle 509 indicates a radius around the point 503 where the finger touched. In FIG. 29C, a finger touches at point 504 outside of the radius 509 but within the same region 501, doing so in less time than the maximum multi-tap up time. Because the finger is in the same region 501, the touch count increases to 2, indicated by the single circle around the dot 504 in FIG. 29C. In this particular example, a new radius 510 is established around the new touch location 504. The finger lifts in FIG. 29D and touches again quickly enough in FIG. 29E at point 505. This time it touches in region 500, outside the original region 501. However, because it is inside the previous tap radius 510, the touch count increases again, now to 3, depicted with another concentric circle at point 505. The finger lifts again in FIG. 29F, which depicts a radius 511 around point 505, and it touches again in FIG. 29G at point 506. Point 506 is outside the previous tap radius 511, but it does touch within the original region 501, so the touch count increases yet again, now to 4, illustrated with another concentric circle around point 506. As FIG. 29H depicts, the finger subsequently remains touching and performs a gesture along points 506-508. When the gesture completes, it will be further parameterized with a touch count of 4.

7.7.3.4 Multi-Finger Touch Counts

When multiple fingers contribute to the same finger-mapped gesture, the touch count of the gesture itself is a function of the touch counts that the fingers of the selecting finger set have at the time the selecting finger set is established. If all of the fingers have the same touch count, the gesture itself is assigned this touch count. When the fingers have different touch counts, the touch count of the gesture should be the highest of the touch counts. Selecting the highest touch count requires that at least one finger sufficiently perform the gesture, whereas selecting the lowest touch count requires that all fingers sufficiently perform the gesture. It is best for the gesture system to decline to recognize a gesture if the touch counts differ by too much, because the more internally inconsistent the gesture, the more likely the gesture system is to misidentify the gesture that the user intended. It is reasonable to allow touch counts to differ by at most one from the maximum touch count input and to treat the gesture as unrecognized otherwise.

It is also possible to parameterize a finger-mapped gesture according to the touch counts of the fingers separately for each finger identity. For example, given two sweeps having the same gesture level, a sweep having an index finger at touch count 2 and a middle finger at touch count 1 could yield a different gesture outcome than a sweep having an index finger at touch count 1 and a middle finger at touch count 2. However, it is may be unreasonable to ask the user to remember different interpretations for each possible combination of touch counts, so this specification does not treat this approach further.

Figure 30A:
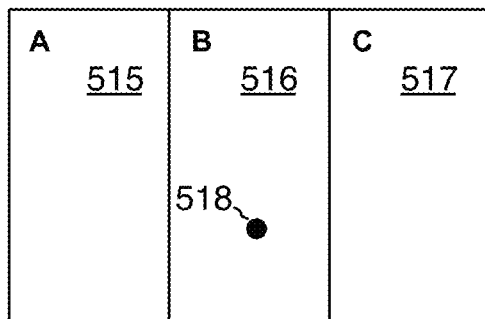
FIGS. 30A-30H depict a sequence in which two fingers perform a multi-tap sweep gesture.
Figure 30B:
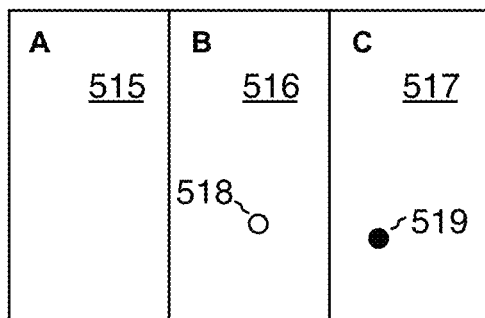
Figure 30C:
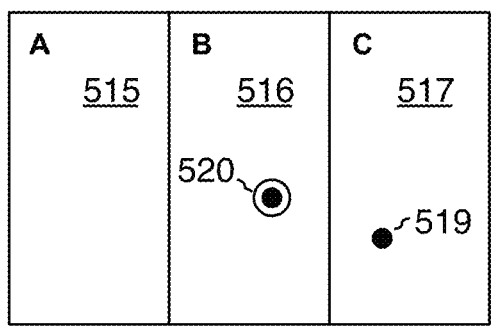
Figure 30D:
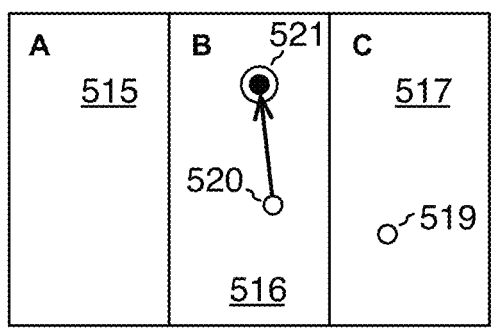
Figure 30E:
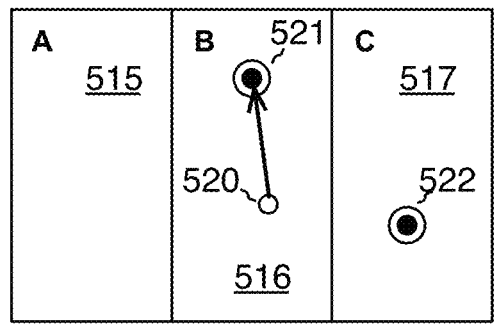
Figure 30F:
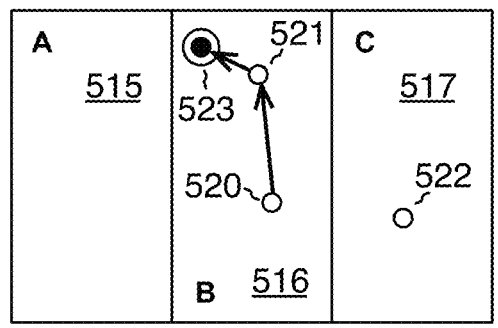
Figure 30G:
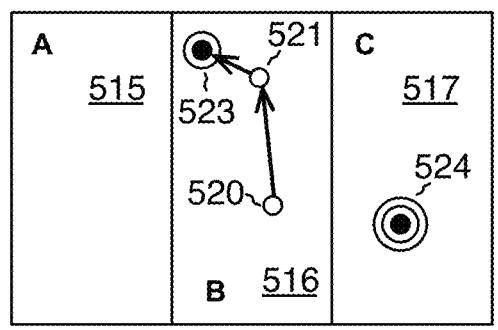

FIGS. 30A-30H illustrates a multi-tap two-fingered sweep on a finger map of three regions 515-517 identifying fingers A, B, and C. The notation used in these figures is the same as the notation used in FIGS. 29A-29H, with all dots 518-525 being numbered in the order in which their indicated locations are touched. Finger B touches at point 518 in FIG. 30A and lifts in FIG. 30B. Meanwhile in FIG. 30B, finger C touches at point 519 in region 517. The finger at point 519 remains down in FIG. 30C as finger B touches again at point 520, increasing finger B's touch count to 2. In FIG. 30D, finger B begins gesturing, travelling to point 521, while finger C lifts for another touch at point 522 in FIG. 30E. In FIG. 30E, both fingers have the same touch count, but finger B has begun gesturing and finger C has not. Even with finger B already gesturing, finger C lifts from point 522 in FIG. 30F to increase the touch count again. Finger C touches again at point 524 in FIG. 30G for a touch count of 3. Finally in FIG. 30H, finger C begins gesturing. There are now two gesturing fingers, one with touch count 2 at point 523 and the other with touch count 3 at point 525. The fingers may lift in either order to end the gesture, but neither may lift again to further increase its touch count. This gesture ends has a touch count of 3 if gesture system assigns the whole gesture a touch count equal to the greater of the two touch counts. FIGS. 30A-30H also demonstrate that fingers may increase touch counts or otherwise join a gesture in progress up until the instant that one of the gesturing fingers lifts. It is an option for the gesture system to disallow fingers from increasing touch counts after gesturing has begun.

Figure 30H:
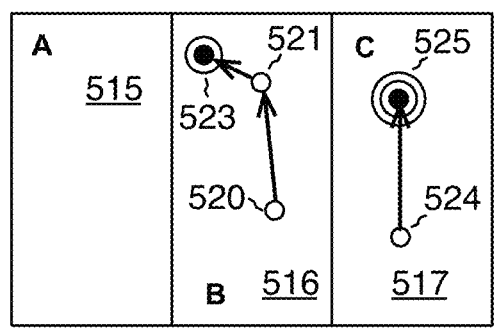

FIGS. 30A-30H can also be interpreted as representing two multi-tap stroke gestures performed at different times. For the first sequence, assume that the user only gestures in region 516 and region 517 remains empty. In FIG. 30A-30C, the user touches a finger, lifts, and touches again, establishing a touch count of 2. In the remaining figures, the user moves the finger to point 523. When the user lifts the finger, the user will have input a stroke with touch count 2. For the second sequence, assume that the user only gestures in region 517 and region 516 remains empty. The user touches the finger at point 519 in FIG. 30B, lifts the finger in FIG. 30D, and touches again in FIG. 30E for a touch count of 2. The user then lifts the finger again in FIG. 30F and touches again in FIG. 30G for a touch count of 3. In FIG. 30H, the user finally gestures the finger to point 525, indicating a stroke. Upon lifting the finger, the gesture will be a stroke with touch count 3.

7.7.4 Holds

A "hold" is a placement of relatively stationary fingers on the input area in a way that permits them to stay on the input area concurrently with gesturing fingers. Each finger participating in a hold is a "hold finger." It is possible to have multiple simultaneous holds, each with its own set of relatively stationary fingers, each performing a distinct function. When the user lifts from the gesture surface any of the fingers participating in the hold, the hold ends—though perhaps after a delay—and the function of the hold ceases. Ending a hold is called "releasing" the hold. A user may "retain a hold" across multiple gestures, if desired, before releasing it. A finger that is performing a hold is not considered to be gesturing and is not inputting a gestured path.

7.7.4.1 Hold Types

Each hold functions as a shift, an anchor, or an escape. A "shift" is a hold that further parameterizes a finger-mapped gesture; the outcome of a gesture employed with a shift is further a function of the particular shift performed. In effect, a shift selects an alternate set of gesture outcomes the way a shift key selects an alternate set of characters on a conventional keyboard. Just as there can be multiple types of shift buttons on a conventional keyboard, such as the shift key, the function key, and the control key, a gesture system can support multiple types of shift holds. The particular shift that applies is given at least in part by the identities of the fingers that are performing the shift. The shift that applies may also depend on the touch counts of the hold fingers in gesture systems that support multi-tapping.

An "anchor" is a hold that the gesture system ignores; an anchor does not further parameterize a gesture. Anchors allow the user to keep fingers on the input area without them interfering with the gesture that the remaining fingers are performing. For example, a gesture system may treat a finger identified as the thumb as an anchor and thus allow the user to keep the thumb on the gesture surface to hold the hand steady while the remaining fingers gesture. Anchors holds are helpful for keeping the hand in home position and aligned with the finger map, particularly when the thumb performs the anchor hold. An anchor hold "anchors" the hand to the finger map. Once identified as an anchor, an anchor finger may move while touching and even exceed the gesturing threshold without influencing gesture outcomes.

An "escape" is a hold that suspends finger-mapped gesturing for its duration and allows other kinds of gestures to be input instead. The gesture system detects the hold and delegates input events to another system of gesturing while still monitoring for the hold to lift. When it detects the hold lifting, it ceases to interpret input events in the other system and resumes finger-mapped gesturing. The touch count of the escape hold finger can select the particular class of gestures in which to interpret input events for the duration of the hold.

FIGS. 15A-15C depict hands performing holds. Extended fingers (e.g. 189 and 190) indicate fingers that can gesture during the holds, not necessarily all simultaneously. The arrows (e.g. 191 and 193) demonstrate directions in which gesturing fingers can move during the holds, although other directions may also be possible. The dotted circles 194-195 around fingers indicate fingers that are performing holds. The hand in FIG. 15A is performing a hold with the thumb 194 and gesturing with the remaining fingers. This could easily be either an anchor hold or a shift hold. The hand in FIG. 15B is performing a hold with the pinky finger 195 and gesturing with the remaining non-thumb fingers. The sample implementation included with this specification employs a pinky finger shift hold in this manner for inputting number characters. The hand in FIG. 15C is performing a hold with the thumb 194 and gesturing with the index finger, illustrating an escape hold. The arrows 193 indicate that the index finger is potentially free to move in any direction.

7.7.4.2 Establishing a Hold

When a finger touches the gesture surface at a location where it could be inputting a gesture, the gesture system does not yet know whether the finger represents a hold. A finger is identified as a hold under certain conditions, and before those conditions are met, the finger is only potentially a hold finger. A finger in this state is a "potential hold finger." A set of potential hold fingers represents a "potential hold" when the combination of their identities and touch counts is a valid combination for a particular type of hold, as established by the gesture system. It is an option for the gesture system to interpret any finger that touches a specific area of the gesture surface as performing a shift function, and it is an option for the gesture system to interpret any touch of a specific finger identity as performing a shift function, but these conditions preclude the finger from also possibly performing a finger-mapped gesture after touching. These fingers are not considered to be performing holds. Only finger touches that have to be disambiguated from finger-mapped gestures perform holds; hold fingers must start out as potential holds.

There are a few possible conditions that a potential hold finger must satisfy to become a hold finger, depending on the gesture system. Under one approach, a potential hold finger can only become a hold finger if it satisfies a non-gesturing condition by gesture completion. The gesture system may or may not require that the hold finger remain touching until gesture completion. Under another approach, a finger can only become a hold finger if it has not exceeding a gesturing threshold by the time the gesture completes. Because non-gesturing conditions can slow data entry, it is best to identify potential hold fingers as fingers that have not exceeded a gesturing threshold. This specification therefore generally assumes the use of gesturing thresholds with hold fingers.

Although the hold condition must be satisfied by the time the gesture completes, the gesture system may require that the hold fingers be established sooner. For example, the gesture system could interpret a potential hold as a hold at the time some finger exceeds the gesturing threshold at the start of the gesture, although this approach provides the user with no wiggle room for coinciding holds with initiating gestures. It also does not allow the user to use the short time spent performing the gesture to recall whether the gesture requires a hold and thus perform the hold before completing the gesture. In some gesture systems, it may be possible for the user to indicate different holds over the course of the gesture, requiring the gesture system to select one of them. The gesture system could interpret the first simultaneous set of potential hold fingers to occur during the gesture as the hold fingers, or it could interpret the last simultaneous set as the hold fingers. If a hold can have at most one finger, then either the first or the last potential hold finger of the gesture would become the hold finger. If a hold can consist of multiple fingers, the gesture system could instead identify the largest number of simultaneously touching potential hold fingers as the hold fingers of the gesture, regardless of whether they formed the first or last hold of the gesture. However, if the hold fingers can input a touch count to further select the shift mode, only the last potential hold fingers would become hold fingers, because previous touches would be increasing the touch count.

If any non-gesturing finger on the input area can indicate a hold, the user may often input unrecognized gestures or incorrect user requests as fingers accidentally touch and accidentally indicate holds. Consequently, it is ideal that the gesture system use the potential hold that is in place at the time the selecting finger set of fingers is determined for the gesture, which is normally when at least one of the gesturing fingers lifts. This approach forces the user to learn to synchronize holds with a specific phase of the gesture and gives the user the duration of the gesture to decide whether to apply a hold. However, in giving the user the freedom to accidentally touch the gesture surface, the user may be forced to slow the rate of input in order to properly establish a hold.

Only shift holds further parameterize the gesture. A shift hold parameterizes the gesture by the type of hold it represents, which is given by the finger identities and touch counts of the hold fingers. Under the gesture parameterization model for characterizing finger-mapped gestures, the gesture system assumes a default value for the shift hold parameter when no shift hold is active. Each value of a shift hold parameter identifies a "shift mode" of the gesture system. This makes the user request a function of the shift mode, regardless of whether the user is actively performing a shift hold. Identical gestures input in different shift modes may indicate different user requests.

It is possible for the gesture system to allow different fingers on a single input region to simultaneously contribute to both a gesture and a hold. This is especially valuable for allowing the thumb to share a region with the index finger so that the thumb may perform holds while also maximizing the space available to the index finger for gesturing. As previously explained, the gesture system should resolve finger identity conflicts among fingers by the time they begin gesturing. Because the gesture system need not resolve such conflicts for a finger until the finger begins gesturing, there need not be a conflict between gesturing and non-gesturing fingers on the same input region. The gesture system is free to assign identities to fingers that have not begun gesturing, even assigning them arbitrarily if necessary, should more than one non-gesturing finger be touching a given input region. Each of these non-gesturing fingers can contribute to a hold if they have not gestured by the time the selecting finger set is established for the gesture.

The finger maps in FIGS. 7B, 7F, and 7J-7N illustrate support for holds. The double-headed arrows (e.g. arrows 87-89) indicate regions (e.g. 75-77) supporting input by gesturing fingers, and the dots (e.g. dots 90-97) indicate regions that support holds. Assuming that these finger maps are intended for a user's right hand, the finger map in FIG. 7F might support the thumb, the index finger, and the middle finger, with the thumb being able to perform a hold, such as a shift hold. The finger maps of FIGS. 7J-7N support thumb holds alongside a four-fingered map. The finger map in FIG. 7L supports either an index finger hold or a thumb hold on the same region. FIGS. 7M and 7N show finger maps that are designed for use by both hands, with the hold region (containing dot 96 or 97) supporting both thumbs.

Figure 33A:
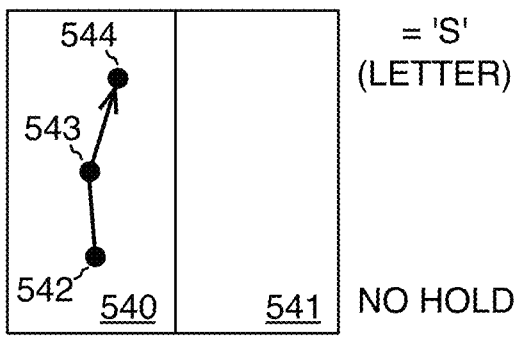
FIGS. 33A-33H depict fingers performing a variety of hold gestures.
Figure 33B:
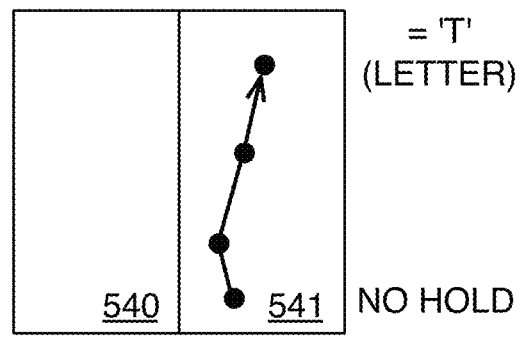
Figure 33C:
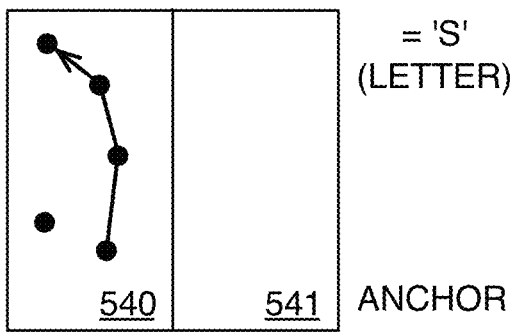
Figure 33D:
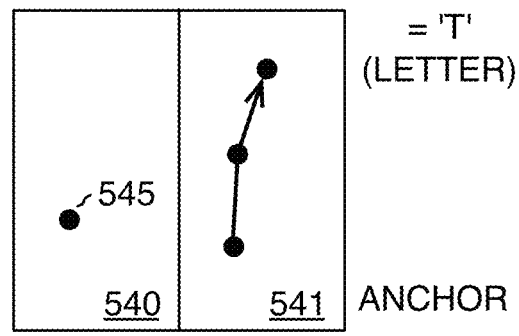
Figure 33E:
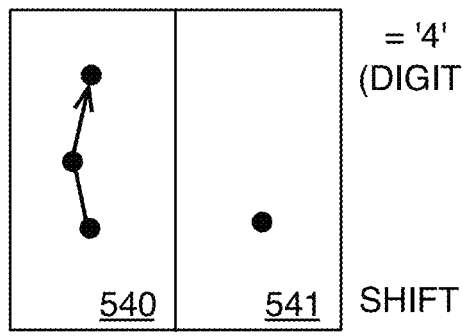
Figure 33F:
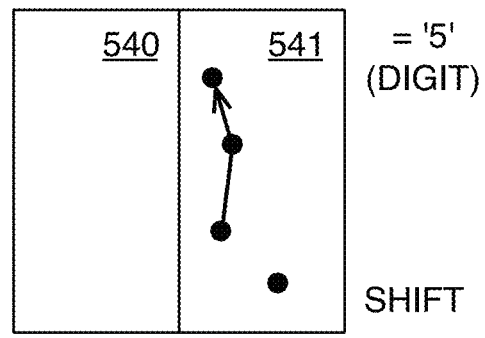
Figure 33G:
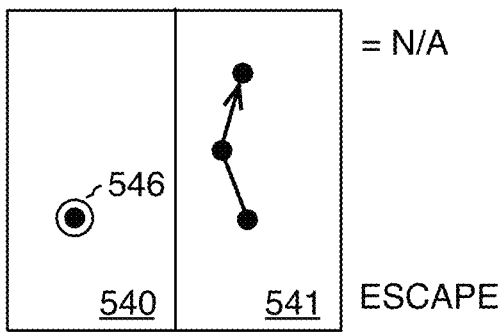
Figure 33H:
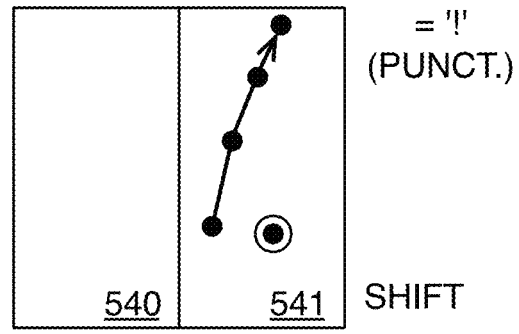

FIGS. 33A-33H depict a number of hold gestures. Each figure depicts a finger map with two input regions 540 and 541. A series of dots connected by arrows (e.g. points 542-544) indicates a stroke gesture originating in one of the regions. A dot by itself (e.g. point 545 or 546) indicates a finger performing a hold. A dot with a circle around it (e.g. point 546) is a finger with a touch count of 2 performing a hold. The resulting user request is shown to the right of each figure. Each of the depicted gestures except for that in FIG. 33G inputs a user request for inserting a character, which is shown in single quotes after the equals sign. The parenthesized word indicates the shift mode in which the session is operating. The figures show a series of gestures of a gesture session. FIGS. 33A and 33B depict normal operation without holds. FIGS. 33C and 33D depict an anchor hold in effect on region 540; a single-touch hold on region 540 has no effect on the user request. FIGS. 33E and 33F show the effect of a single-touch hold on region 541, which causes the gestures to select digits instead of letters. In FIG. 33G, an escape hold with touch-count 2 on region 540 temporarily disables finger-mapped gesturing. The gesture shown in region 541 of FIG. 33G is interpreted as something other than a finger-mapped gesture, with the touch count of the hold selecting the particular gesture system with which to interpret this gesture. When the hold finally lifts, the finger map resumes with finger-mapped gesturing. Finally, FIG. 33H shows that a hold with touch-count 2 on region 541 has a different effect from that on region 540: it causes the gestures to select user requests for inserting punctuation.

Figure 31:
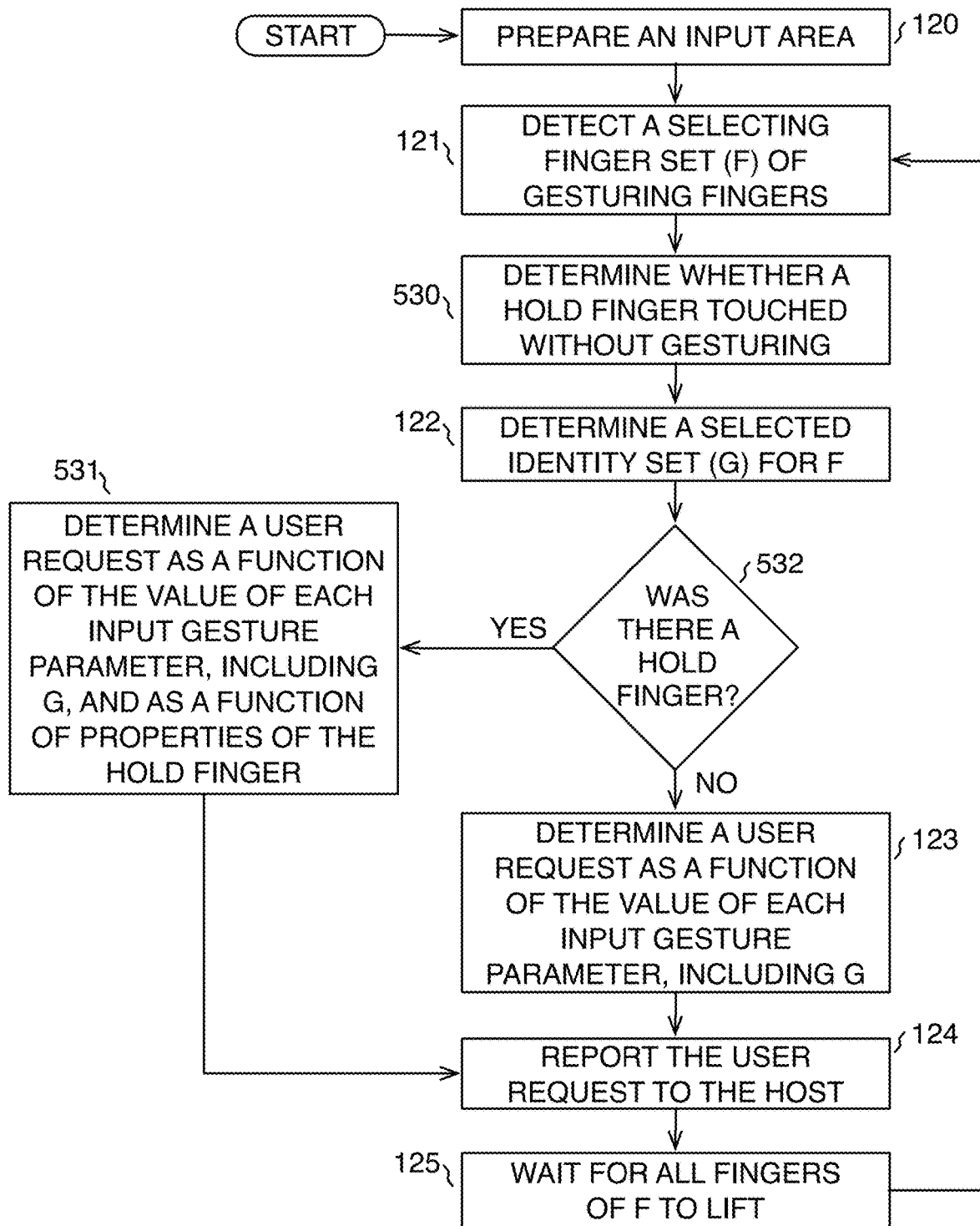
FIG. 31 depicts a process for determining user requests when holds are supported.

FIG. 31 refines the process for detecting a finger-mapped gesture with steps for handling a shift hold. In addition to determining the selecting finger set in step 121, in step 530 the gesture system determines whether a non-gesturing finger is touching and whether the finger represents a hold. For example, the gesture system could determine the finger identity of the non-gesturing finger and only recognize certain finger identities as capable of indicating holds. According to test 532, if a hold finger is detected, the gesture system determines a user request as a function of at least one property of the hold finger, in addition to determining the user request as a function of the gesture parameters, as shown in step 531. If the gesture system supports different holds for different finger identities, the user request would be a function of the hold finger's finger identity. For example, the gesture system might support a shift hold for the index finger and a separate shift hold for the pinky finger. Alternatively, the pinky finger might provide a shift hold, while the index finger provides an anchor hold; in this case, the user request will be a function of the identity of the finger performing the hold even though the anchor hold does not alter the user request that the gesture otherwise indicates. It may also be that the user request is not a function of the hold finger's identity but is a function of the hold finger's touch count. Of course, the user request could be a function of both the hold finger identity and touch count. If no hold finger is detected, the gesture system determines the user request as usual in step 123. Equivalently, the presence or absence of a hold finger may represent a shift mode, with the user request always being a function of this shift mode.

7.7.4.3 Residual Holds

There is a drawback to only establishing hold fingers at the time the user completes the gesture. While a user is rapidly entering gestures, there is a chance that the user may accidentally lift hold fingers slightly too soon, lifting them before the first gesturing finger has lifted. The more rapidly the user enters gestures, the more likely this is to happen. Even so, it is possible for the gesture system to properly infer that a hold was intended for a gesture and apply it anyway. The gesture system may accomplish this via "residual holds." Establishing a hold at the time a gesturing finger lifts provides the user with flexibility in the timing of hold initiation, and residual holds provide the user with flexibility in the timing of hold completion.

A "residual hold" is a temporary extension of a potential hold after one or more of the potential hold fingers have lifted. A residual hold starts when a potential hold finger lifts. The residual hold thereafter represents the potential hold that was in place prior to the finger lift that started the residual hold. The residual hold remains in effect for a period of time afterwards, a period of time called the "residual hold period." The potential hold itself persists until the end of the residual hold period; for the duration of this period, the potential hold is a residual hold. If the user completes the selection of a finger-mapped gesture while the potential hold (and now also residual hold) is in effect, the potential hold is interpreted as a hold, parameterizing the gesture if it happens to be a shift hold. Restricting the duration of a residual hold both allows a user to prevent a potential hold from applying to a subsequent gesture and allows a user to separate a potential hold from the completion of a gesture by enough time to keep the potential hold from applying to the gesture. For these reasons, it may be useful to allow the residual hold period to be configured for each user.

If the user is typing rapidly enough, it is possible that the user will begin and complete a new gesture before the residual hold has expired for the preceding gesture. This would mistakenly apply the residual hold to the subsequent gesture. To prevent this problem, the gesture system should only allow a residual hold to apply to the gesture that is in progress at the time the residual hold goes into effect. This simplest way to accomplish this is to cancel the residual hold whenever a finger newly touches the input area. This way, the fingers that are touching at the time of residual hold starts are the only ones that may contribute to a gesture to which the residual hold applies.

Figure 34A:
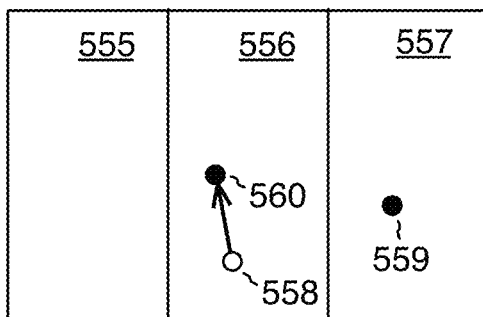
FIGS. 34A-34H depict a sequence in which fingers perform gestures with residual and locked holds.
Figure 34B:
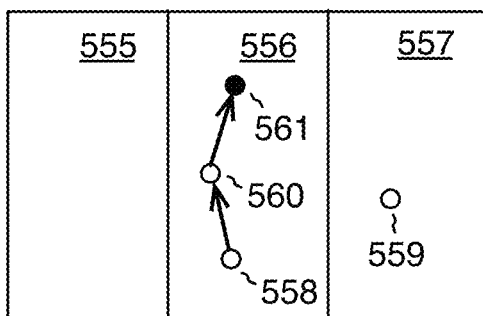
Figure 34C:
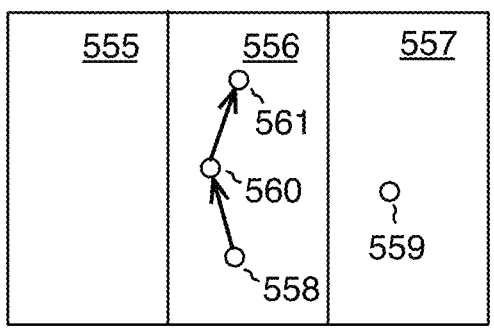
Figure 34D:
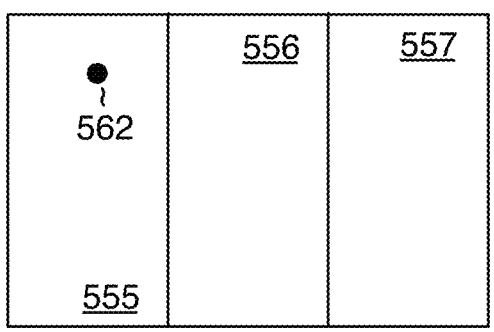

FIGS. 34A-34H illustrate holds. Each of these figures depicts a finger map of three regions 555-557. The series of figures represents a series of events. Locations 558-572 are numbered in the order in which fingers first touch the locations. A solid dot (e.g. location 560 in FIG. 34A) represents a location where a finger is touching. When two solid dots appear in a figure, two fingers are simultaneously touching. An open dot (e.g. location 558 in FIG. 34A) represents a location that a finger previously touched in its path. An arrow connecting dots (e.g. vector 573) indicates a finger's direction of travel while touching. FIGS. 34A-34D illustrate the occurrence of a residual hold. In FIG. 34A, the user has gestured a finger from point 558 to point 560, and in region 556 and the user has touched a finger at point 559 in region 557. The finger at point 559 is not exceeding the gesturing threshold. In FIG. 34B, the finger at point 559 lifts, initiating a residual hold timeout for the finger having a duration equal to the residual hold period. Meanwhile, the other finger continues to gesture in region 556. In FIG. 34C, the finger in region 556 lifts before the end of the residual hold timeout. The gesture system therefore treats the gesture in region 556 as if it had been performed with a hold in place on region 557. If holds in region 557 are interpreted as anchor holds, the gesture in region 556 indicates a user request that is not dependent on the hold. However, if holds in region 557 are interpreted as selecting a shift mode for inputting numeric characters, the gesture in region 556 indicates a numeric character. In FIG. 34D, another finger touches the input area at point 562, before the residual hold timeout has expired. However, because a residual hold only applies to a single completing gesture, the residual hold is no longer in effect.

7.7.4.4 Locked Holds

It is an option for the gesture system to "lock" the hold. A "locked hold" is a hold that persists for as long as some or all of the hold fingers remain touching the gesture surface. The fingers of a locked hold cannot be interpreted as anything other than hold fingers until all of the fingers of the hold have lifted. The user keeps the fingers of a locked hold touching as he or she inputs additional finger-mapped gestures. If the locked hold is a shift, it parameterizes each of these gestures as it did the initial gesture on which the locked hold was established, using the same shift mode.

Locked holds prevent users from having to lift hold fingers after every gesture, but more importantly, they allow hold fingers to move without breaking the hold. In particular, a finger of a locked hold remains a hold finger even if it exceeds a gesturing threshold; once a hold is locked, the user need not be concerned about keeping the hold finger stationary while otherwise gesturing, freeing the user to gesture more rapidly with the remaining fingers.

Figure 34E:
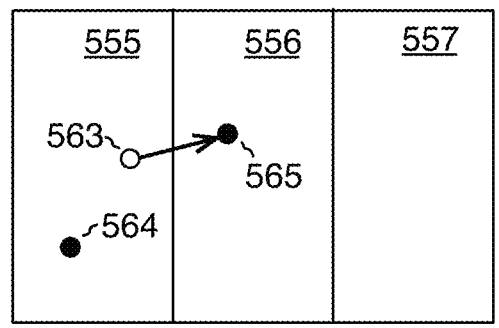
Figure 34F:
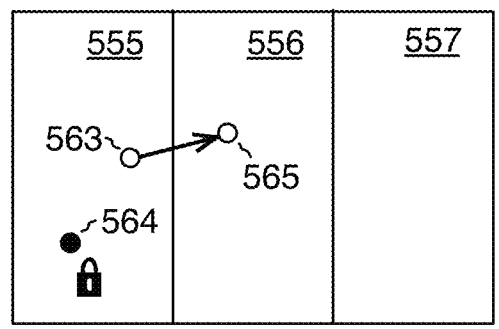
Figure 34G:
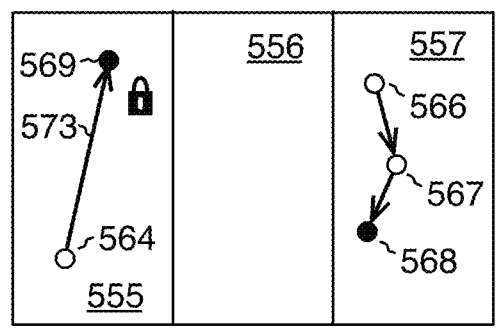
Figure 34H:
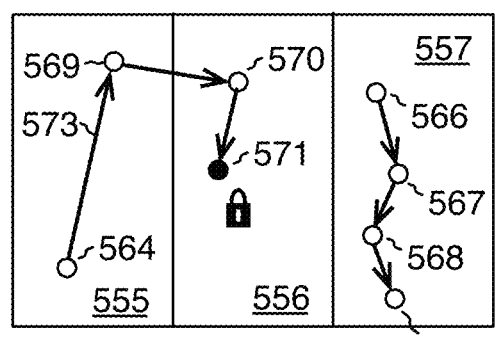

The series of FIGS. 34E-34H illustrates the user performing a locked hold. In FIG. 34E, the finger at point 564 is touching but not exceeding the gesturing threshold. Meanwhile, another finger has moved from point 563 to point 565. In FIG. 34F, the finger at point 565 lifts. Since the finger at point 564 was touching without gesturing at the time the gesturing finger at point 565 lifted, the gesture system interprets point 564 as performing a hold and locks the hold. The padlock symbol next to point 564 symbolizes the state of being locked. If the gesture system interprets holds in region 555 as anchors, the gesture that lifted at point 565 is interpreted as if the finger at point 564 were not touching. If the gesture system interprets holds in region 555 as selecting gestures that indicate punctuation characters, the gesture that lifted at point 565 indicates a punctuation character. In FIG. 34G, the locked hold remains touching as another finger starts a gesture in region 557. The locked hold finger has moved to point 569 and exceeded the gesturing threshold. In FIG. 34H, the locked hold finger has again moved significantly, but it remains touching as the finger gesturing in region 557 lifts. Even though the locked hold finger has begun gesturing, the gesture system continues to treat it as a hold. If it were an anchor hold, the gesture in region 557 would be interpreted independently of the hold. If instead the locked hold indicated punctuation characters as before, the gesture in region 557 would indicate a punctuation character.

Figure 32:
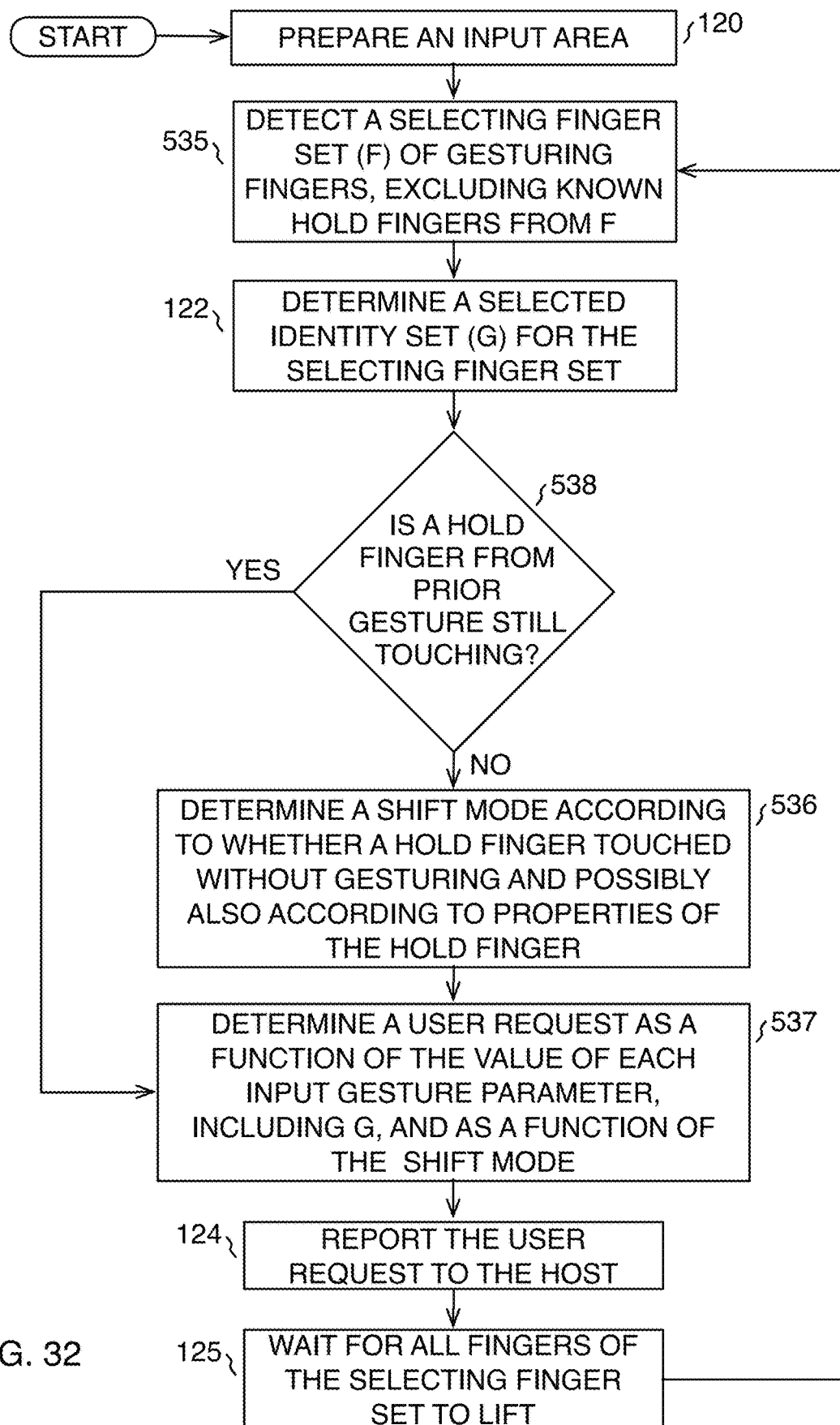
FIG. 32 depicts a process for locking holds across multiple gestures.

FIG. 32 depicts the process of receiving finger-mapped gestures refined for handling locked holds. In this depiction, the gesture system maintains a shift mode indicating the set of user requests that are available to a gesture performed in that mode. The absence of any hold finger, or the presence only of anchor modes, indicates a default shift mode. The presence of a hold finger selects a shift mode. The gesture system starts in a default shift mode and subsequently retains an indication of the active shift mode. Upon receiving a new finger-mapped gesture, as part of test 538, the gesture system ascertains whether a hold finger from a prior gesture remains touching. If a prior hold finger is found to remain touching, the gesture system skips the step 536 process of determining a new shift mode for the present gesture, leaving the previously determined shift mode unchanged. It is an option for the gesture system to fail to recognize the gesture if not all previous hold fingers remain touching. If no prior hold finger remains touching, the gesture system evaluates the shift mode according to whether the current gesture has input a new hold finger, as shown in step 536. Regardless, the gesture system determines the user request according to the gesture parameters and the resulting shift mode, as shown in step 537. There are many possible representations of the shift mode, including as a variable, as a record of active hold fingers, and as a mode-specific branch of the program logic. After issuing the user request in step 124 and waiting for the fingers of the selecting finger set to lift in step 125, the gesture system resumes gesture detection in step 535, which excludes previously established hold fingers from the selecting finger set.

A residual hold cannot be locked because all hold fingers must be touching to enact a lock; keeping the fingers touching is how a user locks a hold. However, the gesture system may extend a locked hold beyond the lifting of a hold finger by allowing locked holds to survive temporarily as residual holds.

7.7.5 Backbrushing

A "backbrush" is a gesture enhancement that further parameterizes a lockstep gesture with a second indication of distance travelled: the distance that a gesture travels after reversing its initial direction. In a backbrush, the user performs a lockstep gesture as usual, but instead of lifting the finger or fingers at the end of the gesture, the user reverses the direction of the gesture for some distance and then lifts. The length of this reversal translates into "backbrush level," indicating a range of lengths analogous to the determination of a gesture level. The gesture outcome is further a function of this backbrush level. When a user applies a backbrush to a gesture, the user is said to be "backbrushing," and a gesture so modified is said to be "backbrushed." Backbrushing is especially useful for selecting an alternate form of a character, such as for selecting the capital or accented form of a character that the gesture would normally select absent the finger action for backbrushing. For example, a gesture without backbrushing might indicate the lower case letter 'a', while the same gesture with a backbrush appended might indicate the upper case letter 'A'.

7.7.5.1 Determining Reversal Points

To determine the backbrush level, the gesture system first identifies the reversal points on the gestured paths. A "reversal point" is a point on the path of a finger at which the finger reverses directions. Prior to detecting backbrushing, the gesture system identifies a reversal point on a finger's path by keeping track of the point it determines to be the farthest point from the measurement origin. When the distance from this point to the finger's most-recent point differs by at least a minimum distance for some distance measure, the farthest point is declared the reversal point. This minimum distance is called the "minimum backbrush length." Alternatively, and not necessarily equivalently, depending on the distance measure, when the distance measure of the finger's most-recent point differs from the distance measure of the farthest point by at least the minimum backbrush length, the farthest point is declared the reversal point. Once the reversal point has been declared, the gesture is considered to be in reversal and the reversal point cannot be subsequently reassigned. If the gesture system never detects a reversal for a finger, the gesture system can consider the reversal point to be the point at which the finger lifts.

The gesture system may prevent the user from reversing a finger again after backbrushing by monitoring the finger for a subsequent reversal. To monitor for a subsequent reversal, the gesture system treats the reversal point as a virtual measurement origin and repeats the process for identifying a reversal point relative to this origin, as if no reversal point had yet been determined. However, if the gesture system subsequently detects what would be declared a reversal point, the gesture system has actually detected a second reversal, and the gesture system instead treats the gesture as unrecognized until the gesture completes. Monitoring for subsequent reversals is useful for forcing the user to properly understand backbrushing and for allowing the host to disambiguate backbrush gestures from other sorts of gestures that it might support that do allow multiple reversals. As an alternative to monitoring just the distance between a potential reversal point and the current point, the gesture system can determine backbrush levels from the lengths of extent vectors.

The approaches just described for identifying the reversal point are not compatible with retraction. Superficially, retraction and backbrushing seem incompatible because they interpret reversals of direction differently. However, there are ways to allow a gesture system to support both at once. The simplest approach requires that the gesture system start a timer with the first finger that begins gesturing in a gesture. If the user completes the entire gesture before this timer times out, the gesture system interprets backbrushing as just described. If the gesture completes after the timer times out, the gesture is not interpreted with backbrushing, allowing reversals to be interpreted as retraction. Under this approach, a user performs retraction by ensuring that the gesture has a minimum duration, so that only fast gestures can backbrush. Alternatively, the gesture system can initiate the timer for a finger when it is determined that a finger has begun backbrushing and require that, once the finger has begun backbrushing, the gesture must complete within a certain amount of time. Should the finger not complete within this amount of time, the finger is interpreted as performing a retraction rather than a backbrush. As a final alternative, the gesture system can require that a backbrush achieve the minimal backbrush length at a certain speed or greater, such as calculated by the time difference between the point of the greatest distance measure and the point of reaching the minimal backbrush length. Notice that none of these approaches is conducive to supporting retraction for the backbrushing portion of a gesture.

7.7.5.2 Initial and Reversal Lengths

The backbrush level is based on a length that the gesture is determined to have moved in a reverse direction. If the gesture also includes a gesture level parameter, the gesture system must determine two lengths for the gesture—an initial length and a reversal length—with the gesture level being determined from the initial length. As with determining the gesture length for the gesture level parameter, several approaches are available for determine the reversal length.

Under a straightforward approach, an initial distance is assigned to each gesturing finger as the distance measure between the finger's measurement origin and its reversal point, and a reversal distance is assigned as the distance measure between the reversal point and the point at which the finger lifts. The initial length of the gesture is then a function of the initial distances of the gesturing fingers, and the reversal length of the gesture is then a function of the reversal distances. Additional methods for determining the reversal length are available when a reversal point is treated as a measurement origin, because the methods explained previously for determining gesture length become available for determining reversal length. Under these methods, the finger lift points serve as the level selection points. Alternatively, the gesture system may monitor the extent vectors of the gesturing fingers. The initial and reversal lengths can be defined in terms of the lengths of the first and second extent vectors, respectively. It is an option for the gesture system to decline to recognize a gesture as a backbrush upon detecting a third extent vector.

7.7.5.3 Determining Backbrush Level

The gesture system maps different ranges of the reversal lengths to different backbrush levels. When a gesture also includes a gesture level parameter, the gesture system may opt to employ one function for translating initial lengths to gesture levels and another function for translating reversal lengths to backbrush levels. In order to simplify discussion, this specification identifies backbrush levels by integers. However, as with gesture levels, the gesture system need not identify backbrush levels by integer. It can instead identify backbrush levels by any form of enumeration or even by associating different program logic with different backbrush levels without maintaining a variable for the backbrush level. If none of the fingers of the gesture backbrush, the gesture system can either treat the gesture as one not parameterized by a backbrush level or it can treat it as one parameterized by a "default backbrush level" value. This specification uses 0 as the default backbrush level, 1 as the first backbrush level, and 2 as the second backbrush level. To be clear that the accompanying claims are not restricted to the representation of backbrush levels as integers, the claims may refer to the lowest (non-default) backbrush level length range as the "first-range" backbrush level and the second lowest length range as the "second-range" backbrush level. It is up to the specific gesture system how to handle gestures for which some fingers backbrush and some do not.

The methods for determining a backbrush level are analogous to those for determining a gesture level. The gesture system can either determine a single reversal length for the entire gesture, or it can determine multiple intermediate reversal lengths for the gesture, such as one for each finger. In the former case, the backbrush level is determined from the single gesture length, and in the latter case, an intermediate backbrush level is determined for each intermediate reversal length and a backbrush level for the entire gesture is determined from these intermediate backbrush levels.

FIG. 23 was described previously for gesture levels, but it also illustrates backbrush levels. The path tree for each finger A and B depicts three possible paths. The first path possibility (path 402 or 405) consists of only a solid leg, ending at either point 375 or 384. This is the "solid path" of a path tree. The second path consists of a solid leg followed by a dashed leg (path 403 or 406), ending at point 378 or 386. This is the "dashed path." The third path consists of a solid leg, followed by a portion of a dashed leg, followed by a dotted leg (path 404 or 407), ending at point 380 or 388. This is the "dotted path" of a path tree. Points 375 and 384 represent potential reversal points on the dashed paths 403 and 406 and on the dotted paths 404 and 407. Arcs 392 and 393 indicate distances (D) and (E) from point 375, respectively, and arcs 397 and 398 indicated distances (I) and (J) from point 384, respectively. The columns in the tables of FIGS. 24A-24C indicate distances from these potential reversal points.

Consider the following scenarios according to FIGS. 23 and 24A-24C:

1) Finger A gestures alone and lifts at point 378. Upon reaching point 376 during this gesture, the gesture detects that the finger has reversed directions and that point 375 is the farthest point so far reported. Distance (D) corresponds to the minimum backbrush length, so when the finger lifts at point 378, it clearly has exceeded that distance from point 375 while still not being the farthest point from the measurement origin 370. The gesture therefore indicates a backbrush. Since backbrushes are not detected at distances less than (D) from the reversal point 375, distance (D) is the lowest possible backbrush distance and hence the minimum distance for backbrush level 1. However, the reversal to point 378 exceeds distance (E), indicating a backbrush level of 2. Since point 375 was the reversal point, the gesture level is determined for that point, giving it a gesture level of 3 and a backbrush level of 2. The table in FIG. 24A therefore indicates that this gesture inputs the character 2) Finger A gestures alone and lifts at point 380. Upon reaching point 376 during this gesture, the gesture detects that the finger has reversed directions and that point 375 is the farthest point so far reported. Distance (D) corresponds to the minimum backbrush length, so the gesture has not backbrushed at point 376. Point 379 is the next reported point, and it is farther from the measurement origin 370 than point 375, so point 375 ceases to be a potential reversal point and there is no potential backbrush in progress. When the finger lifts at point 380, there was no backbrush, which is equivalent to a backbrush level of 0. The table in FIG. 24A therefore indicates that this gesture inputs the character 'G'.

3) Finger B gestures alone and lifts at point 386. Upon reaching point 385, the gesture system determines that point 384 is now farthest from the measurement origin 381 and so the finger is in reversal. However, by point 385 the finger has also traveled a distance from 384 greater than distance (I), indicating that the gesture is a backbrush and has a gesture level of 2. When the finger lifts at point 386, it lifts between distances (I) and (J) from point 384, giving it a backbrush level of 1. The table in FIG. 24B indicates that this gesture inputs the character 'N'.

4) Finger B gestures alone and lifts at point 388. As before, upon reaching point 385, the gesture system determines that the gesture is a backbrush. By point 388, the finger has reversed directions again by more than distance (K) from point 385, as shown by having passed arc 399. However, the preceding backbrush path had already exceeded the minimum backbrush distance (I) by point 385. The gesture system may optionally detect the path to point 388 as a second reversal. If the gesture system does not define gestures involving additional reversals, it may opt to fail to recognize this gesture.

5) Fingers A and B together perform a sweep gesture, lifting at points 378 and 386 respectively. The fingers have already been individually shown to be backbrushing upon reaching these points. The gesture levels for fingers A and B were shown to be 3 and 2, respectively, and the backbrush levels were shown to be 2 and 1, respectively. If the gesture system uses the greatest gesture level of the fingers in a sweep, the gesture level is 3, and if it uses the greatest backbrush level, the backbrush level is 2. The table in FIG. 24C therefore indicates that this gesture inputs the character '&'.

The backbrush gestures in FIG. 23 are examples of multi-level backbrushing. It is also possible for a gesture system to support only one backbrush level, so that each gesture is parameterized as either backbrushing or not, without regard to backbrush level. FIG. 23 can be interpreted as representing single-level backbrushing by equating backbrush levels 1 and 2, making the columns for backbrush levels 1 and 2 identical in each of the tables 24A, 24B, and 24C. This is equivalent to dropping the backbrush distances (E) and (J), leaving only the columns "<(D)", "<(I)", and "<(D/I)" in the tables of FIGS. 24A, 24B, and 24C, respectively.

7.7.6 Multi-Reversal

The backbrushing gesture can be generalized into a gesture parameter having an arbitrary number of reversals. These gestures are "multi-reversal gestures." A multi-reversal gesture further parameterizes the finger-mapped gesture by the number of reversals performed. Each reversal of a finger can be detected as a backbrush for the current leg of the finger's path, in which case the number of reversals is the number of backbrushes. The reversals can also be detected by counting extent vectors, in which case the number of reversals is the number of extent vectors minus one. The number of reversals is the "reversal level." If there is only one finger in the selecting finger set, the reversal level of the gesture is that of the finger. If there are multiple fingers in the selecting finger set, the reversal level of the gesture can be determined from the reversal levels of the individual fingers in one of the ways that the touch count of a gesture can be determined from the touch counts of the individual fingers.

A multi-reversal gesture can indicate both a gesture level and a backbrush level. The gesture level can be determined as usual for a backbrushing gesture, using measurement up until the first reversal. The backbrush level of a finger can be a function of the lengths of the subsequent legs of the path of the finger, such as their average, their maximum, or their minimum. This allows a user to perform a stroke or a sweep and finalize it with a tickling-like gesture of varying but intentional average length, where the average length further indicates the user request selected. Alternatively, and perhaps more intuitively for the user, the gesture level can be assigned to be a function of the lengths of all of the legs of the finger paths, so that the user is not having to distinguish the first leg from the following legs. In this case, the gesture has a reversal level but no backbrush level. It is also an option to determine the gesture level as a function of all but the last leg of each finger's path and then to determine the backbrush level from just the last legs, as usual for a backbrush gesture.

Simpler interpretations of multi-reversal gestures may be more practical. Under the simplest interpretation, all multi-reversal gestures for a particular set of finger identities yield identical gesture outcomes. This allows the user to think of selecting a user request simply by scratching the finger back and forth, without worrying about the directions or the lengths of the segments of finger movement. A slightly more capable implementation ignores gesture direction and gesture level and instead selects a user request as a function of the direction of movement of the final segment of the multi-reversal. This allows the user to think of selecting a user request by scratching back and forth and then ending the gesture in a particular direction to indicate the choice. This approach keeps the user from having to worry about the direction in which the gesture starts or the number of reversals performed. Under another alternative, a completion level can be assigned to the gesture according to the length of the final reversing segment of the gesture, and the user request can further be a function of this completion level. The latter approach is useful because it may be easier for a user to scratch the finger a number of times before consciously indicating a level for the gesture, rather than to indicate a level at the start of the gesture.

7.8 Mode Gestures

A "mode gesture" is a finger-mapped gesture that the user performs to change the mode of the gesture system for subsequent finger-mapped gestures. Different finger-mapped gestures can be assigned to select different modes. The user request that any particular finger-mapped gesture indicates is a function of the current mode of the gesture system. Whereas a shift hold is analogous to holding the shift key down on a keyboard while pressing another key, a mode gesture is analogous to pressing the "caps lock" key on a keyboard to change the characters indicated by subsequent presses of letter keys. One mode gesture might put the gesture system into a particular mode, while another might return it to the previous mode. While some mode gestures might select a specific mode, it's also possible to have a mode gesture return the gesture system to the previous mode regardless of what the previous mode was.

A mode gesture can also put the gesture system into a temporary mode that automatically ends. Analogous to features offered by some computer operating systems, a first gesture can select an accent that is to be applied to the next gesture. For example, if the first gesture selects an umlaut and the next selects the letter 'u', the indicated character is 'ü', and subsequent gestures proceed in the mode that preceded the umlaut gesture. It's also possible to require that multiple subsequent gestures be input to select the intended user request.

Other kinds of temporary modes are possible. The touch count of the gesture that selects the mode can indicate the number of following gestures that are to be interpreted within the mode. In this case, the gesture selects the mode independently of the touch count, and each subsequent gesture within the mode represents a distinct user request. This approach allows the user to select a mode for multiple gestures without having to finish by entering another gesture to end the mode. A mode can also be made temporary, ending without having to input a specialized mode-change gesture, by supporting single gestures that simultaneously indicate a user request and change the current mode. In this case, the gesture that ends the mode can institute a new mode or just return the gesture system to the mode within which the current mode was initiated.

7.9 Generic Hand Calibrations

The means so far described for determining finger identities from input regions can be generalized to encompass a variety of similar approaches. Consider that when determining a channel-based finger map, every location on the input area belongs to the region associated with the channel line nearest to the location. A channel line is a type of geometric element. The principle works for arbitrary geometric elements: every location on the input area can belong to the region associated with the geometric element nearest to the location. Each geometric element has an input region, but because input regions are only used to determine finger identities, corresponding geometric elements with finger identities makes regions unnecessary. It's sufficient to determine the identity of a finger by identifying the geometric element nearest to a location for the finger. The method used to identify the nearest geometric element can also vary.

7.9.1 Alternative Geometric Elements

Hand calibrations can be based on a variety of geometric elements other than channel lines. Consider the examples shown in FIGS. 43A-43D, each of which depicts three regions 695-706 comprising an input area. In these figures, solid dots (e.g. dots 719-724) each represent a location of a geometric element, and open dots (e.g. dots 725 and 734) each represent an arbitrary location being tested to identify the geometric element nearest to it. Solid dots that are circled (e.g. dots 719-721) represent locations on a geometric element designated as "forward locations." Solid dots that are not circled (e.g. dots 722-724) represent designated "backward locations" of a geometric element. A circled asterisk (e.g. asterisks 732 and 737) represents the average location of the forward locations of a geometric element, and an asterisk not in a circle (e.g. asterisks 733 and 738) represents the average location of the backward locations of a geometric element.

Figure 43A:
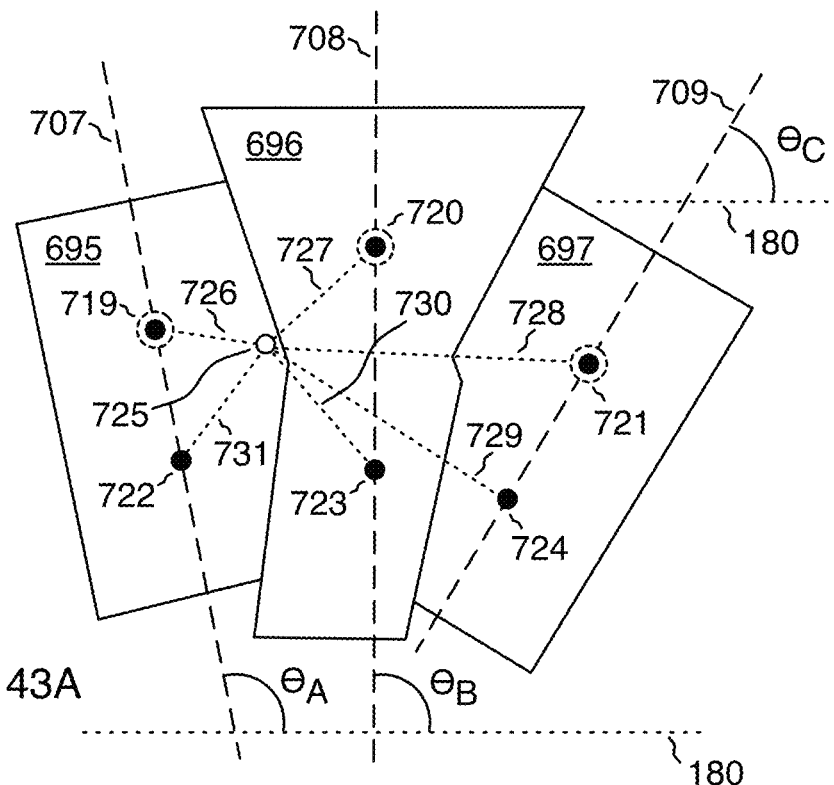
FIGS. 43A-43D depict input regions derived from points acquired via a hand calibration.

FIGS. 43A-43D depict the following geometric elements:
Two-Location Geometric Elements—FIG. 43A depicts three regions 695-697 each defined by a geometric element consisting of exactly two locations. The two locations of a geometric element represent the average forward location (e.g. location 719) to which a finger travels while gesturing and the average backward location (e.g. location 722) to which a finger travels while gesturing. The input area is partitioned so that each location on the input area belongs to the region that corresponds to the nearest geometric element. That is, for every tested location on the input area, the gesture system determines the location of a geometric element that is nearest to the test location and assigns the test location to that geometric element. Consider the dashed line segments 726-731 originating at test location 725. Line segment 726 is the shortest, which places the test location 725 in region 695.

Figure 43B:
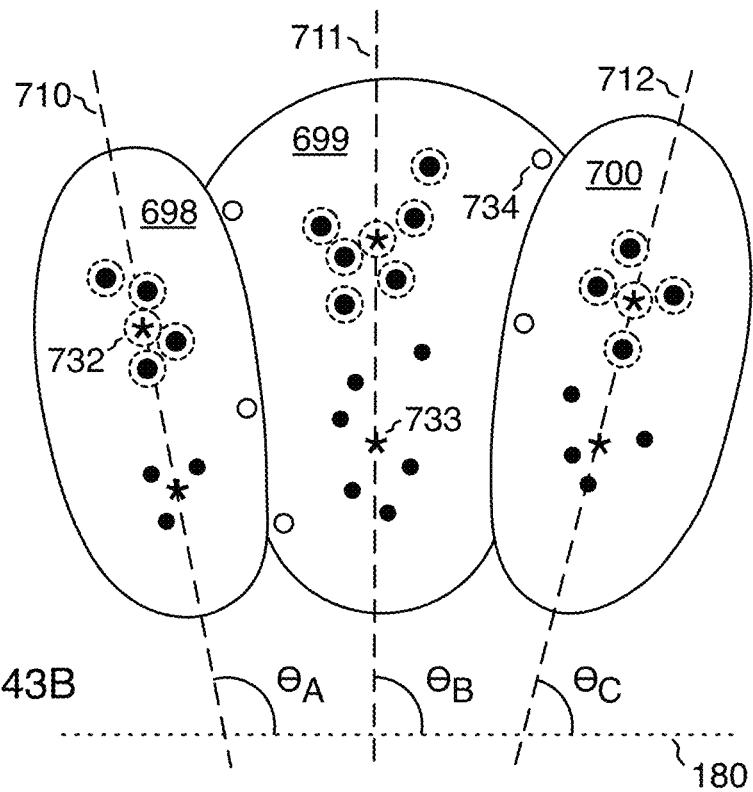

Multi-Location Geometric Elements—FIG. 43B depicts a generalization of FIG. 43A, with each geometric element consisting of an arbitrary number of locations. The input region of each of these geometric elements is the set of locations that is closer to a point in the geometric element than to any point in any other geometric element. The figure was drawn by visually estimating the boundaries between adjacent regions 698-700, rather than by computing boundaries precisely with a computer. It appears that having more points clustered together within a geometric element helps to smooth the boundaries between regions. However, it is computationally expensive to test locations (e.g. location 734) on the input area against so many geometric element locations, so the gesture system is better off first approximating these geometric elements with simpler geometric elements and then testing locations on the input area against the simpler geometric elements.

Figure 43C:
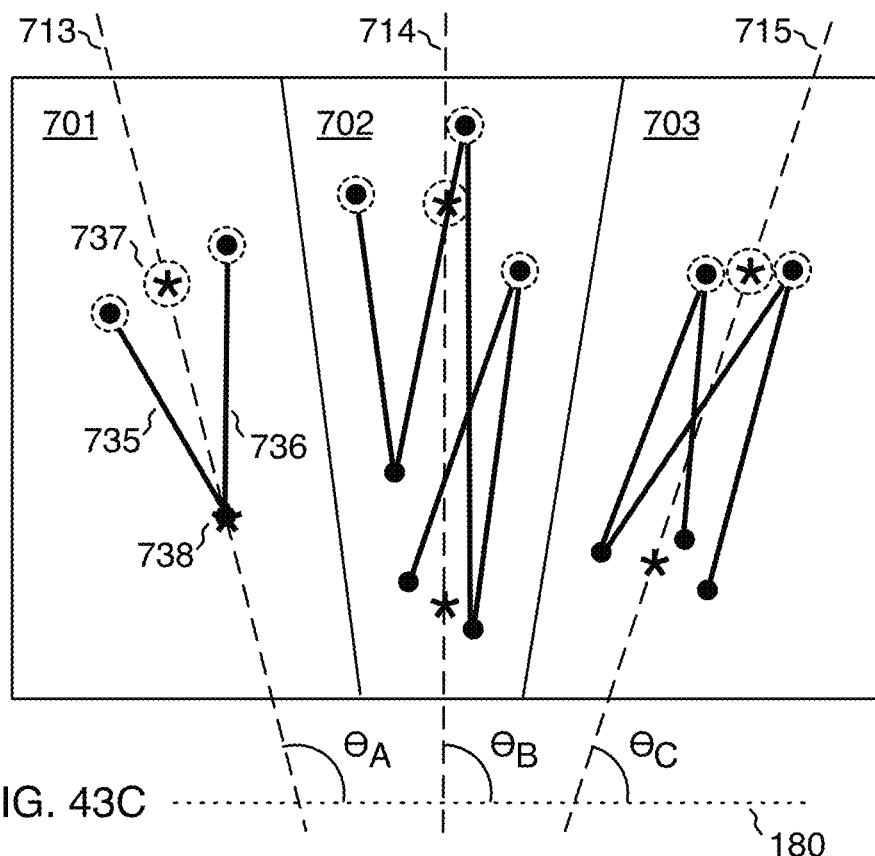

Line-Segment-Collection Geometric Elements—FIG. 43C depicts geometric elements that each consist of a collection of line segments. For example, the geometric element of region 701 consists of line segments 735 and 736. The nearest geometric element to a location on the input area is defined as the geometric element whose bisecting line 713-715 is nearest to the location. The bisecting line of a geometric element is a line (e.g. line 713) that passes through both the average location of the geometric element's forward locations (e.g. location 737) and the average location of the geometric element's backward locations (e.g. location 738). In other words, the gesture system first translates these geometric elements into channel lines 713-715 and then performs the nearness test as is standard for a channel-based finger map.

Figure 43D:
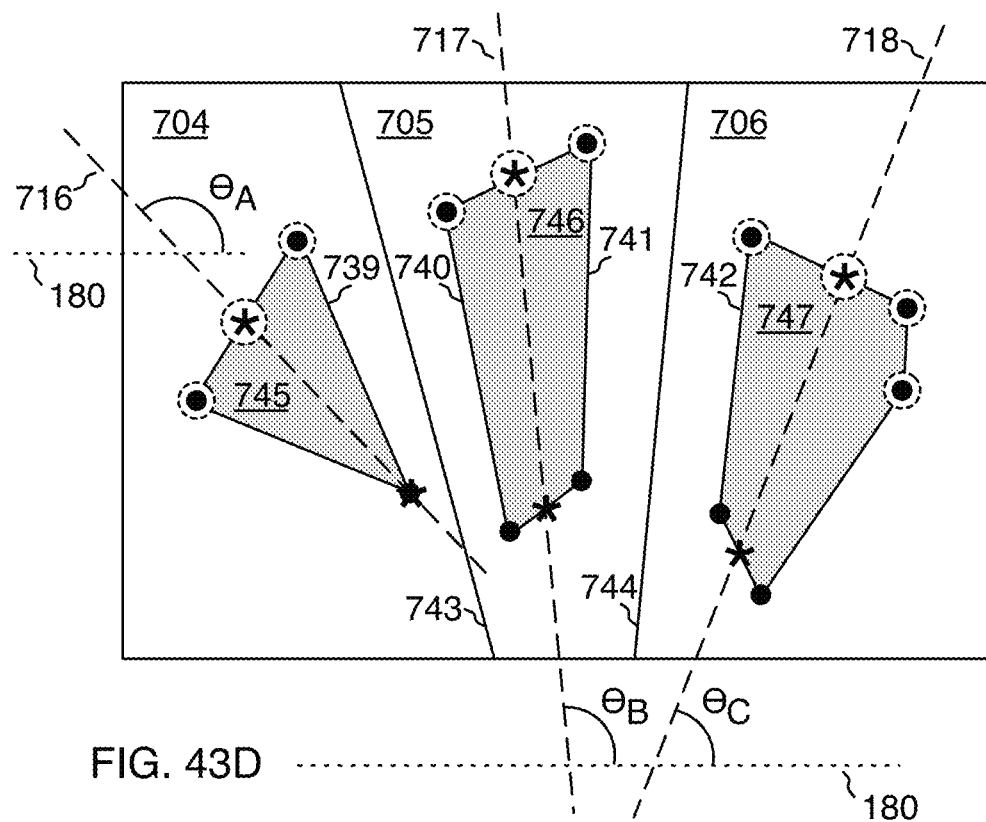

Polygon Geometric Elements—FIG. 43D depicts geometric elements 745-747 that are polygons. The region boundaries 743-744 in this figure are defined so that they bisect the space between the nearest sides of adjacent polygons. For example, boundary 743 bisects the space between polygon sides 739 and 740, and boundary 744 bisects the space between polygon sides 741 and 742. Under this approach, it is not sufficient to test a location for the nearest polygon. Instead, the nearness test can be performed by comparing locations to the input regions associated with the geometric elements. In this figure, each location on the input area is nearest to the geometric element 745-747 whose input region 704-706 contains the location. In other words, testing a location for the region that contains it is a form of testing a location for the geometric element nearest to it. Alternatively, the nearness test can be construed as testing for the nearest line that is coincident with a side of a geometric element, with the test indicating the geometric element having this side.

7.9.2 Determining Finger Identities

Each geometric element of a hand calibration corresponds to a finger identity, just as each channel line of a channel-based hand calibration has an associated finger identity. A generic means for assigning a finger identity to a finger at a location is to identify the geometric element that is nearest to the location. Because geometric elements are only constructs for determining finger identity as a function of location, they need only be virtually located on the gesture surface and need not be completely or even partially contained within the input area. However, each geometric element "applies" to a facet of the touch device, that facet being the one for which it is used to associate locations on the facet with finger identities. Every geometric element has an associated region on the facet to which it applies. All locations in that region are considered to be nearer to that geometric element than to all other geometric elements applying to the same facet.

The geometric form of a geometric element's region is called the "region form" of the geometric element. A geometric element may be identical to its region form, allowing a region to itself be considered a geometric element. In this case, a hand calibration may dynamically determine the form of the geometric element, although doing so likely entails basing the new form on fixed underlying geometric elements. For example, channel lines can either serve as geometric elements themselves or they can be used to calculate regions that are then used as the geometric elements for nearness determinations. As another example, consider the finger maps in FIGS. 7D-7L. The boundary line to the left of each region in these finger maps (e.g. any of boundary lines 82-86) could serve as a geometric element, with the nearest geometric element to a location given as the nearest geometric element to the left of that location. The gesture system could perform nearness tests with these left boundary lines, or it could use these boundary lines as the underlying geometric elements of dynamically sized quadrilateral geometric elements with which it performs nearness tests.

Figure 45A:
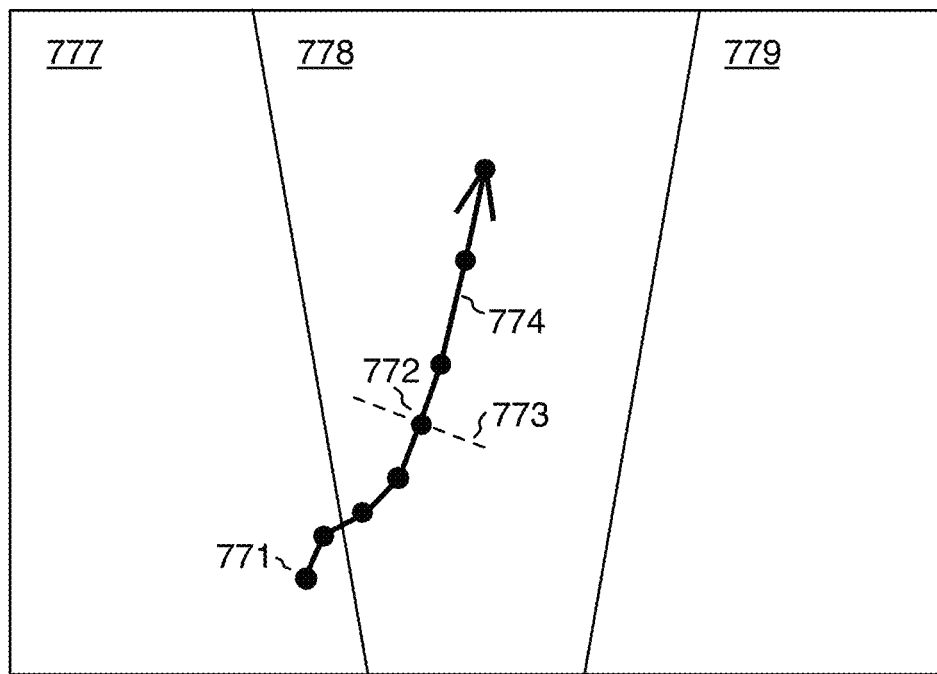
FIGS. 45A-45B depict ways to identify a finger by means other than the initial touch point.

Nearness tests can be generalized to identifying the nearest geometric element to a path of a finger, basing the tests more generally on one or more points in the paths of fingers. Basing nearness exclusively on a finger's initial touch location—or a finger's originating region—is problematic when two fingers each have an initial touch location nearest to the same geometric element, since both fingers should not be assigned the same finger identity. More sophisticated nearness tests such as the following are also possible:

1) The nearness test determines the geometric element nearest to the location on the finger's path at which a "finger identification threshold" is reached. The finger identification threshold can occur upon exceeding a minimum distance from the initial touch location or upon exceeding a minimum amount of time from the initial touch point. FIG. 45A illustrates this option on a finger map with three regions 777-779. The figure depicts the path 774 of a finger whose initial touch location 771 is in region 777. The identification threshold 773 occurs at point 772 in region 778, therefore assigning the finger to the finger identity to which region 778 or its associated geometric element corresponds.

Figure 45B:
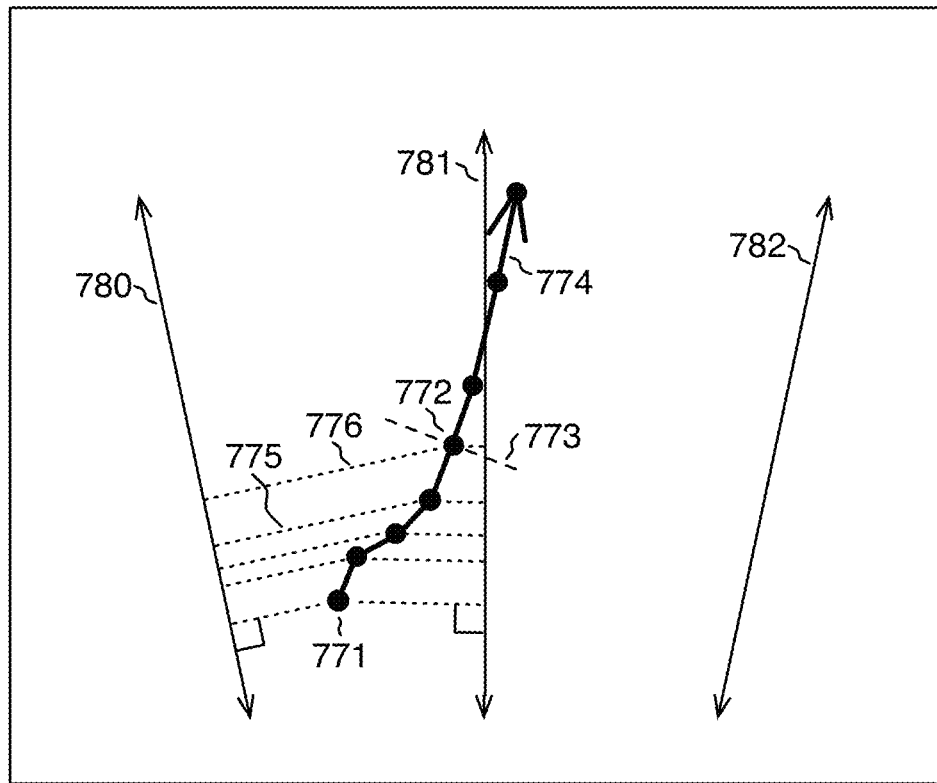

2) The nearness test determines the geometric element nearest to the path of a finger, computing nearness as a function of the distances of multiple points on the path to adjacent geometric elements. FIG. 45B illustrates this option in combination with a finger identification threshold on a finger map with three geometric elements 780-782. The dotted lines (e.g. lines 775-776) represent distances from locations on the finger's path 774 to the adjacent geometric elements 780 and 781. In this example, only the points up to and including the point 772 at the identification threshold 773 are used in the computation. The sum of the distances from the points to geometric element 780 are compared to the sum of the distances from the points to geometric element 781. In this case, the sum for geometric element 781 is less than that for 780, indicating that the finger's path is nearest to geometric element 781.

3) The nearness test determines the geometric element nearest to the majority of points on a path, according to the count of points, either for the entire path or for the portion of the path up to an identification threshold.

4) The nearness test determines the geometric element nearest to the average of the points on the finger's path or nearest to a midpoint on the finger's path.

5) The nearness test determines the geometric element whose region contains the longest length of the finger's path.

In addition to determining the nearest geometric element to a finger's path, the gesture system can determine the second-nearest geometric element to a finger's path. This is the geometric element to which the finger's path is nearest assuming that the nearest geometric element does not apply to the facet. The second-nearest geometric element can be used for conflict resolution when multiple fingers are nearest to the same geometric element. It is possible that multiple geometric elements will be equally nearest to a path or equally second-nearest to a path, in which case the gesture system can choose one of the geometric elements by arbitrary logic or else just decline to recognize the gesture. FIG. 19 illustrates a generic process for performing conflict resolution with arbitrary geometric elements. It determines the geometric elements that are nearest to each finger of the selecting finger set in step 270 and handles two-finger conflicts analogously to the handling of conflicts for geometric elements that are identical to their input regions, except that geometric elements are identified by nearness tests and not necessarily by the input region in which each finger has an initial touch location. Steps 271 and 272 handle the case in which the fingers are nearest the same geometric element, and step 273 handles the case in which the fingers are nearest to different geometric elements. It is not necessary that a gesture system perform conflict resolution.

The process for detecting finger-mapped gestures can be refined for hand calibrations that determine finger identities from geometric elements. FIG. 10 depicts this process. It is a refinement of FIG. 9. In step 130, the user first provides a hand calibration specifying properties of geometric elements. In step 131, a finger map is prepared from the geometric elements, with this finger map forming the input area. After detecting the selecting finger set in step 121, the gesture system determines the selected identity set in step 132 from the selecting finger set based at least in part on the nearness of fingers of the selecting finger set to the geometric elements. It is possible for the host to provide some of the finger identities, so the entire selecting finger set need not be determined according to the nearness of fingers to geometric elements. The remainder of the process, steps 123-125, proceeds as in the general case of FIG. 9.

When the host provides all of the finger identities, geometric elements are not needed to identify the fingers. In such a gesture system, a finger of any finger identity may begin gesturing anywhere on the entire input area. However, the input area is itself a geometric element. A solution that determines finger identities by nearest geometric element and a solution that receives finger identities from the host therefore have the following property in common: a geometric element can be associated with each finger identity such that a finger of that finger identity may begin gesturing at any location of the geometric element. When the host provides finger identities, this geometric element is the input area and all finger identities are associated with the same geometric element. When finger identities are determined by nearest geometric element, this element is the input region of the geometric element. In each case, this common property identifies an "isogeometric element." An "isogeometric element" of a finger identity is a geometric element in which a finger may begin gesturing at any location in the geometric element and indicate that finger identity. A geometric element that "specifies" a finger identity is an isogeometric element of the finger identity. The input region of a geometric element corresponding to a finger identity therefore specifies the corresponding finger identity, and the input area specifies each host-provided finger identity.

7.9.3 Properties of Hand Calibrations

The properties of channel lines and input regions can be generalized to geometric elements. As with channel lines and input regions, geometric elements are able to share a facet, to be positioned on a facet relative to other geometric elements, to form correspondence series, and on permitting touch devices, to be oriented relative to a facet. Hand calibrations based on geometric elements in general can therefore employ these properties in finger maps. Geometric elements generalize finger-mapped gesturing to work with a broad variety of hand calibrations. The generalization includes both channel-based hand calibrations and input regions not based on underlying geometric elements.

Any geometric element can be associated with a position on the gesture surface, and geometric elements can be positioned relative to one another. The portion of a geometric element that marks its position is immaterial. For example, the position of a geometric element might be given by the location of its center or by the location of a particular corner of the geometric element. A hand calibration for a finger map specifies the relative positions of geometric elements and perhaps also their locations on the gesture surface; specific locations necessarily convey relative positions. This information allows a hand calibration to be positionable, orientable, and sizable on the gesture surface, making a hand calibration is a generically reusable characterization of a hand.

Geometric elements can be approximated as channel lines so that the input regions can be computed in the simple fashion of channel-based finger maps. FIGS. 43A-43D illustrate computations of approximate channel lines 707-718 for a variety of geometric elements. A channel line can be approximated for any given geometric element as a line that passes through the average location of the forward locations and the average location of the backward locations, requiring that geometric elements have designated forward and backward locations. For example, channel line 707 passes through the average forward location 719 and the average backward location 722 of input region 695, and channel line 713 passes through the average forward location 737 and the average backward location 738 of input region 701. A forward direction can also be associated with each geometric element for purposes of orienting directional partitionings and possibly also for determining discrete directions. As usual, the forward direction can be given by a forward angle. Being lines, each approximated channel line has two angles of characterization, differing by $\pi$ radians. The forward angle is the angle that points roughly in the direction of the average forward location. FIGS. 43A-43D depict the forward angles as $\theta_A$, $\theta_B$, and $\theta_C$.

Forward directions that are used to determine channel lines or otherwise shape input regions need not dictate the forward directions of gestures. Consider FIG. 38. The fingers tend to gesture along the channel lines 663-666. Each finger gestures with a different forward direction, suggesting that the gesture system could determine the discrete direction in which each finger gestures separately for each finger by orienting a directional partitioning to the finger's forward direction. However, this extra work may not be necessary when the host dictates the top and bottom of the gesture surface. The gesture system can properly identify forward and backward directions for fingers gesturing along channel lines 663-666 simply by monitoring whether a gesture ends closer to the top or the bottom of the gesture surface compared to where the gesture began. For example, the gesture system could determine the direction of the gesture simply by examining the change in the values of the vertical y-coordinates of the fingers during the gesture. In this case, the gesture system may employ per-finger forward directions to establish a finger map, but it uses a constant forward angle for the gesture as a whole, as illustrated with reference direction 462 and reference angle $\theta_1$ in FIG. 27A, and a directional partitioning is oriented to the reference direction 462.

7.9.4 Variety of Possible Hand Calibrations

A hand calibration is most abstractly a characterization of a hand that distinguishes it from another hand by establishing at least one relationship among finger identities for fingers of the hand. The relative spacing of geometric elements for finger identities, the orientations of geometric elements, and the forward directions of finger identities are the most important characteristics. Orientations and forward directions are ideally associated, leaving two primary characteristics: spacing and direction. This abstract definition allows for a broad variety of possible hand calibrations. A hand calibration can be as simple as a number specifying the spacing between fingers, or it can be detailed like a collection of channel line segments and rest locations.

It is possible to define the relative spacing and directions of every two adjacent fingers of a hand, but this is unnecessary. The touch device may require that the user employ a hand in a way that reduces the number of characteristics required for a hand calibration. Consider FIGS. 4A-4D. The barrier 19-22 between two fingers in any of these figures forces the hand into a particular orientation and likely eliminates the need to determine the relative positions and relative directions of fingers that are immediately adjacent to the barrier. In addition, the characteristics of some fingers may reasonably be inferred from the characteristics of other fingers.

Figure 46A:
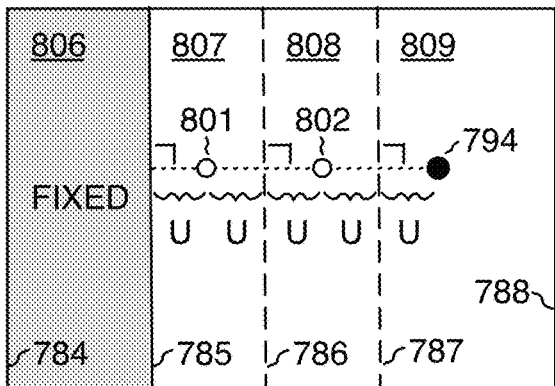
FIGS. 46A-46F depict some ways to derive input regions from partial hand calibrations.

FIGS. 46A-46F depict a variety of ways to infer the spacing between geometric elements in a finger map. Each figure depicts a different kind of hand calibration for the same set of regions 806-809, with each hand calibration positioning the geometric elements and input regions of a finger map. Hard-coded boundaries between regions are given as solid lines 784, 785, 788, 792, and 793, while dashed lines (e.g. lines 786-787 and 789-791) indicate derived boundaries between regions. Each solid dot 794-800 represents a specified position for a geometric element. Each open dot (e.g. dots 801-804) represents an inferred position for a geometric element. Each dotted line (e.g. line 805) indicates an orientation line along which the gesture system distributes geometric elements. The letter U denotes a unit length inferred from the provided geometric element positions. The figures depict hand calibrations as follows:

FIG. 46A. This finger map forces the user to place a finger in the predefined region 806, whose size and position are fixed. Only a single position 794 for a geometric element is specified. The remaining geometric element positions 801-802 are evenly distributed between the fixed region 806 and the provided position 794.

Figure 46B:
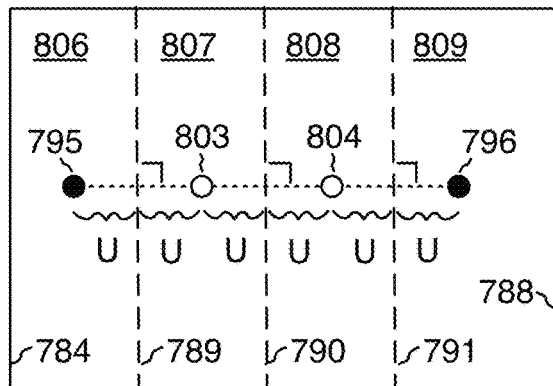

FIG. 46B. Here the positions for the geometric elements 795-796 at the ends of an correspondence series are specified. The positions 803-804 of the intervening geometric elements are interpolated and evenly distributed.

Figure 46C:
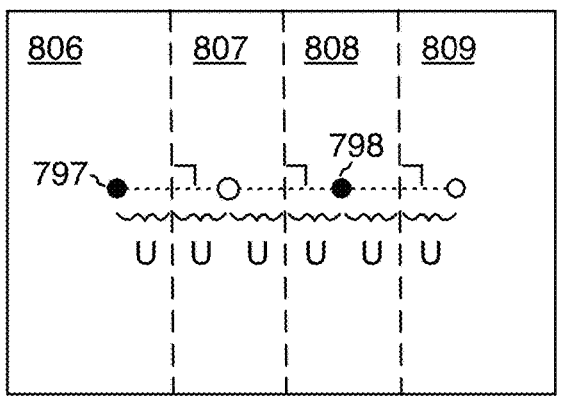

FIG. 46C. This finger map depicts both interpolating and extrapolating positions for geometric elements, given the positions 797-798 of two provided geometric elements.

Figure 46D:
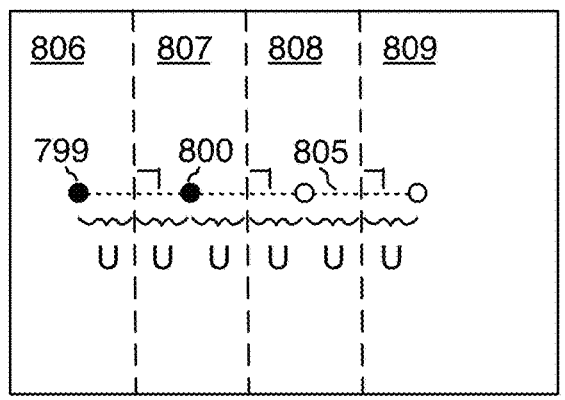

FIG. 46D. This finger map makes it clear that it's possible to extrapolate multiple geometric elements distant from the ones for which positions are specified. Positions 799 and 800 are here specified for input regions 806 and 807, respectively. This approach may introduce too much error to be effective.

Figure 46E:
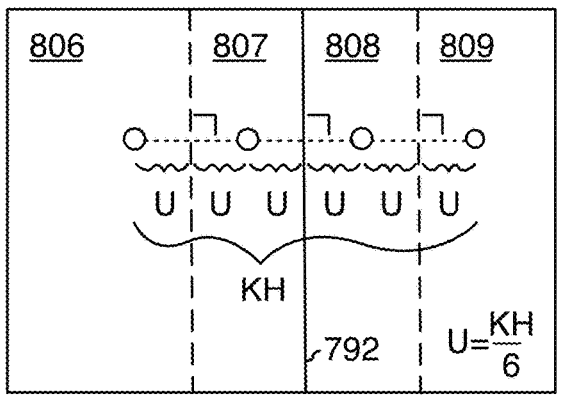

FIG. 46E. This finger map demonstrates defining four input regions 806-809 from a single characterizing value H, which represents the hand width of the finger map in arbitrarily selected units. The constant K converts those units to a distance appropriate for the touch device. The input regions 806-809 must be positioned relative to some fixture. This finger map is centered on the surface allocation, which is equivalent to fixing boundary 792.

Figure 46F:
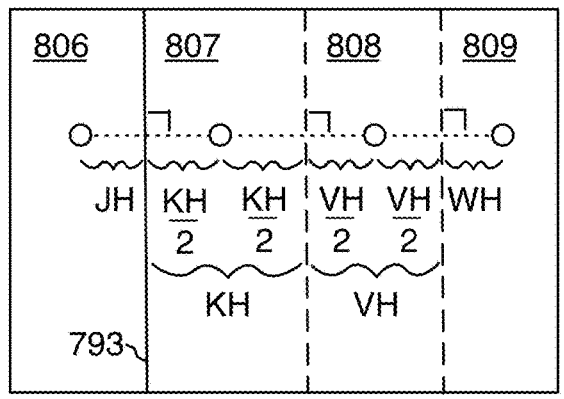

FIG. 46F. This finger map specifies the relative sizes of each input region via the constants J, K, V, and W. The finger map is otherwise analogous to the finger map of FIG. 46E, requiring only that a single value H be specified. The finger map is illustrated here with a fixed boundary 793 between regions 806 and 807.

FIGS. 46A-46F also suggest the variety of ways there are to describe the position of a geometric element. Recall that a solid vertical line represents an unchanging boundary of a region. For example, in FIG. 46B, region 806 has a fixed left boundary 784 and region 809 has a fixed right boundary 788. If the positions of the regions were given by locations for their left boundaries, the position of region 806 in this figure would never change, but the position of region 809 would change, because its left boundary is the varying boundary 791. However, if region positions were given by the right boundaries, the position of region 809 would never change because its right boundary is the fixed boundary 788, unlike the position of region 806, which would be given by the varying right boundary 789. Consider also FIG. 46E, in which the boundary 792 between regions 807 and 808 is fixed. If the position of a region were given by a location for its left or right boundary, only one of these two regions would have a fixed position. In each of these scenarios, at least one boundary of each region changes as hand calibrations vary, except for regions that are completely fixed, demonstrating that hand calibrations position regions relative to one another.

FIGS. 47A-47F depict a variety of ways to infer forward directions for a series of finger identities, expressing forward directions as angles. Each figure depicts the forward angles of a hand calibration for four fingers, with each figure depicting a different kind of hand calibration. The vectors 815-818 represent the forward directions associated with each finger, where the angle of a vector is the forward angle of the forward direction. The mathematical expression next to each forward angle indicates the value of the forward angle in radians. Bold vectors (e.g. vector 815 in FIG. 47A) represent predetermined, fixed angles. When a figure depicts a vector as a solid line (e.g. vectors 815 and 818 in FIGS. 47A and 47B), the figure's hand calibration specifies the vector's associated forward angle. When a figure depicts a vector as a dashed line (e.g. vectors 816-817 in FIGS. 47A and 47B), the forward angles associated with the vector are inferred. The angle denotes a unit arc inferred from provided angles. The dotted line 819 in each figure represents an orientation line, which can have a fixed orientation relative to the touch device or can be oriented to coincide with positions provided for geometric elements, if the hand calibration associates geometric elements with finger identities. The bold vector 820 represents a perpendicular to the orientation line 819 and serves as a fixed angle relative to which the forward angles are computed. The figures are as follows:

- FIG. 47A. This gesture system forces the user to gesture a finger along a channel line coincident with vector 815. The forward angle of vector 818 is the only forward angle specified. The forward angles for the intervening vectors 816-817 of the series are inferred and spaced equally apart across the range of angles between vectors 815 and 818.
- FIG. 47B. Here forward angles are specified for the vectors 815 and 818 representing end-of-series finger identities. The forward angles of the intervening vectors 816-817 are interpolated and evenly distributed between the angles of vectors 815 and 818.
- FIG. 47C. This hand calibration depicts both interpolating and extrapolating forward angles, given the two specified forward angles of vectors 815 and 817.
- FIG. 47D. This hand calibration makes it clear that it is possible to extrapolate multiple forward angles that are not between the forward angles specified. In this figure, the forward angles for vectors 815 and 816 are given, while the forward angles for vectors 817 and 818 are extrapolated. This approach may introduce too much error to be effective.
- FIG. 47E. This hand calibration demonstrates defining four forward angles from a single characterizing value $\lambda$, which is the length of the arc that the forward angles are to span, given in arbitrarily selected units. The constant K converts these units to an angle. The forward angles must be oriented relative to an orientation line 819. In particular, the orientation is done relative to a perpendicular 820 to the orientation line.
- FIG. 47F. This hand calibration specifies the relative lengths of arc of the forward angles via the constants J, K, and V. The hand calibration is otherwise analogous to FIG. 47E, requiring only that a single value $\lambda$ be specified. The angles $\delta$, $\zeta$, and $\xi$ shown in the figure are intermediate angle calculations. The forward angles in this figure are also oriented relative a perpendicular 820 to the orientation line 819.

This specification has described numerous ways to establish a hand calibration. To "establish" a hand calibration is to create a new hand calibration according to the characteristics of a hand, to select from multiple previously existing hand calibrations according to the characteristics of a hand, or to indicate a hand calibration by refining a previously existing hand calibration. Calibration gestures are particularly convenient techniques for establishing hand calibrations.

7.10 Gesture Properties

Finger-mapped gestures are characterized by a few important properties. In order to maximize the accuracy with which users can rapidly gesture, gesture parameters should exhibit "position independence" to eliminate the need for users to carefully target where fingers begin and end gesturing. "Form dependence" is a way to provide a level of position independence by ensuring that the gesture outcome actually depends on how the fingers travel while gesturing in a way that is at least in part independent of where gestures start or end. "Longitudinal selectability" ensures that a user can input a variety of gestures by extending and flexing the fingers while keeping the hand stationary on the gesture surface. By not requiring the whole hand to move to input gestures, the user need not constantly reposition the hand between gestures, allowing for a rapid rate of gesturing. "Longitudinal bias" associates stationary-hand gestures with the user requests that should be input most rapidly, thus ensuring that the gesture system takes advantage of the property of longitudinal selectability. Finally, finger-mapped gesturing can be made especially efficient using "gesture length accommodation" to size the input area to accommodate rapid patterns of gesturing.

7.10.1 Position Independence

In order to allow the user to gesture rapidly without having to look at the fingers, the gesture system should maximize the amount of flexibility that users have for where fingers can start and end gestures on the gesture surface while still indicating the correct gesture. Ideally, finger-mapped gestures should be independent of their positions except as needed to specify finger identities. This property is called "position independence." Consider two gestures that are identical in form but start in different locations, thus also ending in different locations. The two gestures should yield the same user request even if one gesture begins at the bottom of an input region and the other begins at the top, although in this example they may have to travel off of the input area to complete the gesture. Likewise, they should yield the same user request if only one ends outside the input area, if only one crosses region boundaries, or if one ends in a different input region. Position independence gives the user maximum room to vary where identical gestures are input while still indicating the desired user request. To provide a gesture with position independence, the values of the gesture parameters other than the selected identity set should themselves be determined in a position-independent way, except to the extent that they depend on the selected identity set.

Although position independence is ideal, it turns out that it is too constraining to require that finger-mapped gestures be position-independent. Consider that a gesture system may superimpose multiple gestures on the same input area so that it can interpret gestures differently depending on where the gestures start and end. For example, a gesture system might make application functions available via long unwieldy gestures that start in the input area, perhaps according to input regions, and end somewhere outside the input area. If the gesture parameters include an indication of the portion of the gesture surface in which a gesture ends, gesture level can be determined as a function of where the gesturing fingers end. This makes it possible to provide two different determinations of gesture level depending on whether the gesture represents an application function; users could input application functions at gesture levels that are much longer than those used for inputting text. It may be debatable whether such application gestures are distinct from position-independent gestures that are also available. If these two forms of gestures were not considered to be separately parameterized, gesture level would be a function of where the gesture ends and hence not independent of position. The potential for superimposing gestures complicates assertions about position independence.

"Positional side gestures" are another example of gestures that a gesture system may support in addition to position-independent gestures. In a "positional side gesture," a region's longitudinal axis is divided into multiple subregions and gesturing left or right selects a user request as a function of the subregion in which the gesture begins. In order to also support efficient finger-mapped gesturing, such a gesture system should not distinguish the user requests of forward and backward gestures as a function of subregion, as otherwise the user would have to frequently look at the fingers to ensure that they were starting gestures in the correct subregion. Even so, the gesture system could employ a gesture parameter that identifies the originating subregion so that gestures are not position-independent, while still making all user requests assigned to forward and backward gestures identical for all originating regions. Once again, it is arguable whether positional side gestures are separate gestures or simply parameterizations of forward and backward gestures.

It is apparent that forward and backward gestures should at least be "origin-independent," meaning that they should be independent of their starting locations. If they were not origin-independent, users would be somewhat randomly selecting user requests as the fingers stray during sessions of longitudinal gesturing. Even so, forward and backwards gestures can depend on their originating locations in ways that do not significantly affect the user. Consider a gesture system in which a gesture level 2 threshold has a length of 100 pixels for gestures that originate in the top half of an input area and a length of 101 pixels for gestures that originate in the bottom half of an input area. Users are unlikely to notice a one-pixel difference in the behaviors of the top and bottom halves of the input areas, and yet identical gestures of length 100 pixels produce different results depending on where they originate in the gesture area. Perhaps the most that can be said is that forward and backward finger-mapped gestures are substantially origin-independent.

The ideal of position independence does not suggest that all forward and backward gestures that are identical in form and finger identity should yield a user request when any of the gestures can yield a user request. It only suggests that the user requests should be identical when they do yield user requests. Consider that either the operating system or the gesture system may preclude a gesture from yielding a value if it exceeds certain boundaries, such as the boundaries of the input area. Consider also that input regions are designed to accommodate the forward and backward movement of fingers, so it is reasonable for a gesture system to fail to recognize a forward or backward gesture that ventures into an adjacent region before completing. FIGS. 35A-35D and 36A-36D illustrate position-independent gestures and are explained below.

Although it is unreasonable to require that gesture parameters be position-independent, gesture level, gesture direction, and backbrush level are well-suited for implementation as position-independent gesture parameters, because these gesture parameters are defined in terms of the forms of the finger paths. However, to be useful, these gesture parameters must be implemented as substantially origin-independent. Touch counts and shift holds are position-independent because they are only dependent on position through dependence on the selected identity set.

7.10.2 Path, Vector, and Form Dependence

There are many ways to parameterize a gesture, including input by means other than the gesture itself. Finger-mapped gestures require that the user move at least one finger on the gesture surface to select a value for at least one gesture parameter other than the finger identities. At least one of these gesture parameters must take advantage of the fact that the fingers have traced paths. Specifically, each finger-mapped gesture includes at least one "path-dependent" gesture parameter. A path-dependent gesture parameter is a gesture parameter whose value is a function of a path of at least one finger of a gesture's selecting finger set. "Path dependence" just ensures that what the fingers do while gesturing helps determine the gesture outcome.

The property of "vector dependence" is stronger than path dependence. A "vector-dependent" gesture parameter is a gesture parameter whose value is at least in part determined from the relative locations of distinct points in a path of at least one finger of a gesture's selecting finger set. Recall that a "vector" represents the location of one point relative to another; the value of a vector-dependent gesture parameter is dependent on the properties of at least one vector of a path of the gesture. A vector-dependent gesture parameter is therefore at least partly dependent on the forms of the paths of the gesturing fingers, regardless of where the paths are on the gesture surface, thus imparting the gesture parameter with a degree of position independence.

Gesture level, gesture direction, and backbrush level can be implemented as vector-dependent gesture parameters. These gestures parameters require that one or more fingers travel at least some distance, and the values of these gesture parameters depend on the relative locations of points in the path or paths traveled. In the cases of gesture level and gesture direction, the relative locations of the first and last points of a path generally determine the value of the parameter. The value of a backbrush level parameter depends on whether a finger reverses direction during the gesture, and reversals can be detected according to the relative positions of distinct points. The gesture system only implements a gesture parameter in a vector-dependent way if it computes the values of the gesture parameter from at least one vector in the path of at least one finger.

Touch counts, shift holds, and shift buttons cannot be implemented as vector-dependent gesture parameters. The value of a touch count parameter depends on the number of times a finger touches and not on the path that a finger travels while it touches. Whether or not a tap occurs during a touch count does depend on whether the finger follows a path, but the value of the touch count is not dependent on any single path. A shift hold is not a vector-dependent gesture parameter because its value only depends on the actions of one or more fingers not in the selecting finger set. Likewise, pressing a user interface button concurrently with performing a gesture may influence the gesture outcome and thus serve as a gesture parameter, but the button is not vector-dependent.

The property of "form dependence" is even stronger than vector dependence. A "form-dependent" gesture parameter is a gesture parameter whose value is determined at least in part from the form of at least one path of the gesture's selecting finger set. All vector-dependent gesture parameters are form-dependent, but not all form-dependent parameters need be vector-dependent. It may be possible to compute the value of a gesture parameter through analogue means or via table look-ups not requiring the computation of vectors. In a most abstract sense, gesture level, gesture direction, and backbrush level can all be implemented as form-dependent gesture parameters that are not vector-dependent by indexing all possible paths directly to the parameterizations of the associated gestures. Whether a gesture parameter is form-dependent or only vector-dependent, it is still possible to further determine the gesture parameter as a function of a position-dependent property of the gesture. However, the more form-dependent the gesture parameters are, the more efficiently the user is likely to be able to input the gestures.

FIGS. 35A-35D and 36A-36D illustrate gestures being performed on finger maps. These gestures are both position-independent and vector-dependent. Each finger map has three input regions 575-577 identifying fingers A, B, and C. One or two finger paths are drawn on each finger map, each finger path designated by a series of dots connected by arrows (e.g. the path from points 578 to 579, points 594 to 595, and points 596 to 597). The arrows indicate the finger's direction of travel. The first dot (e.g. points 578, 594, and 596) in an arrow-connected series represents the finger's measurement origin. The last dot (e.g. points 579, 595, and 597) in an arrow-connected series represents the location at which the user lifted the finger from the gesture surface. The dashed lines (e.g. partitioning lines 585 and 600) partition the directions into a quarter-plane partitioning relative to a measurement origin (e.g. points 578 and 605). Each circle (e.g. circles 583, 584, 601, and 602) centered on a measurement origin depicts a minimum distance for a gesture level. The innermost circle (e.g. circles 583 and 601) represents a gesturing threshold distance, so a finger must travel outside this circle to register as gesturing in these examples. This is also necessarily the minimum distance for gesture level 1. Single quoted letters (e.g. 'D' 586 and 'N' 603) represent user requests. Each user request is associated with a gesture level/discrete direction combination.

Figure 35A:
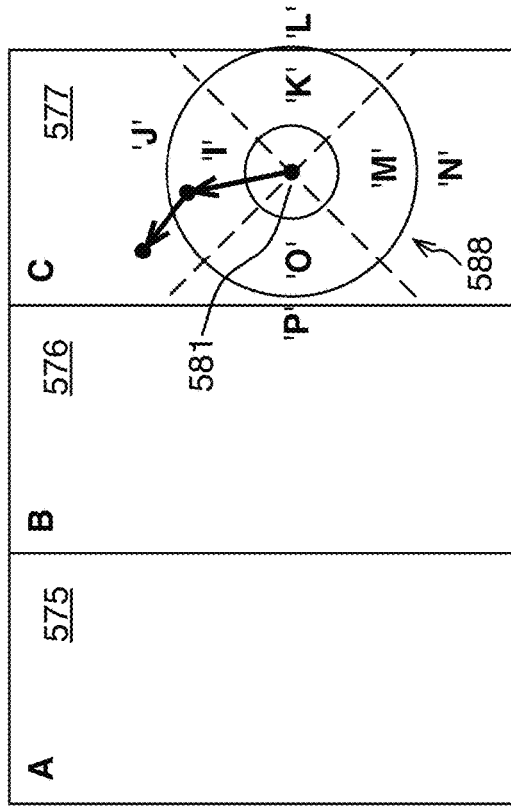
FIGS. 35A-35D depict stroke gestures that are position-independent and vector-dependent.

The finger maps of FIGS. 35A-35D depict strokes whose paths all have identical forms but start at different locations. The number of points in a path and their relative locations are the same in all of the finger paths. Each figure illustrates the process of determining a discrete direction and a gesture level for the gesture using a graphical shorthand called a "target." A "target" is a set of concentric circles that are centered on perpendicularly intersecting dashed lines. For example, the target 587 consists of the concentric circles 583 and 584, and they are centered on the intersecting dashed lines marked as 585. The concentric circles represent distances from the measurement origin of the gesture. In FIG. 35A, the measurement origin 578 is at the center of the concentric circles 583-584. The distance from the measurement origin 578 to the inner circle 583 represents the gesturing threshold distance. The space between the inner circle 583 and the outer circle 584 is the range of distances associated with gesture level 1. The space outside of the outer circle 584 is the range of distances associated with gesture level 2. The gesture of FIG. 35A starts at the measurement origin 578 and ends at a location 579 in the gesture level 2 range of distances from the measurement origin 578. This gesture is therefore a gesture level 2 gesture. This figure associates gesture level 2 with each of the characters 'B', 'D', 'F', and 'H'. However, the intersecting dashed lines 585 represent a quarter-plane directional partitioning of the directions that start at the measurement origin 578. These dashed lines 585 partition the space of possible directions into four discrete directions. For example, one discrete direction of target 587 includes the characters 'E' and 'F'. The gesture of FIG. 35A ends in the discrete direction that corresponds to the letters 'A' and 'B'. The gesture level indicated one of the letters 'B', 'D', 'F', and 'H', while the discrete direction indicated one of the letters 'A' and 'B'. The only letter that both parameters together select is 'B', so according to target 587, the gesture of FIG. 35A is a request to input the letter 'B'.

Figure 35C:
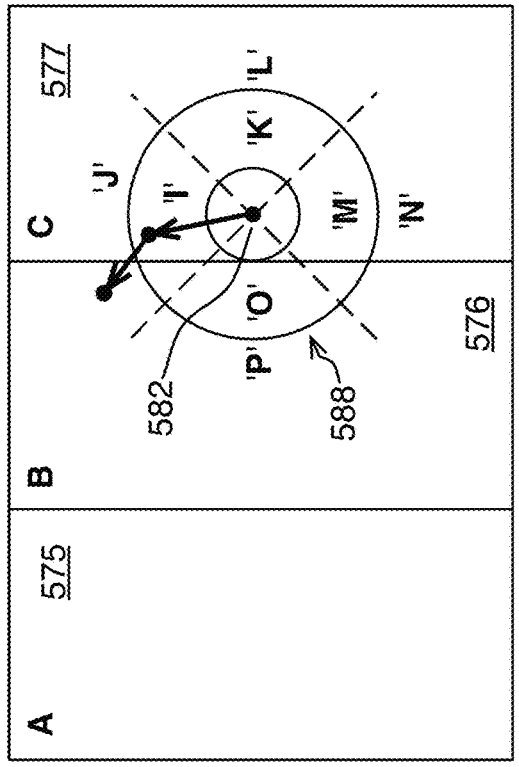
Figure 35B:
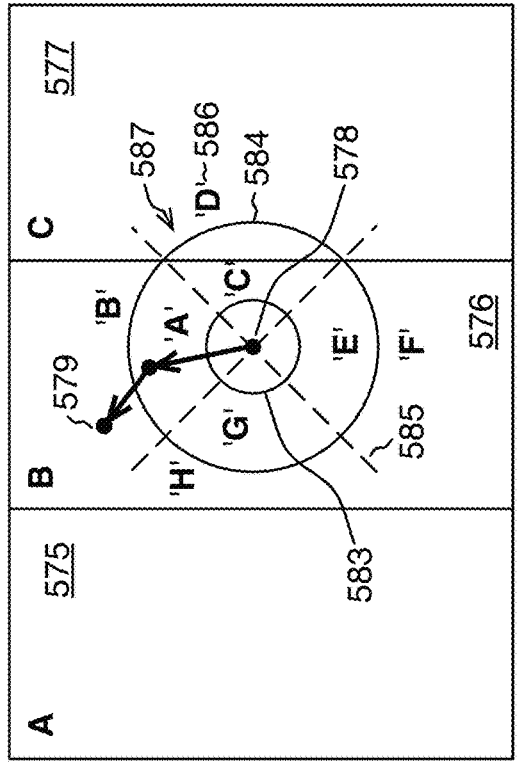
Figure 35D:
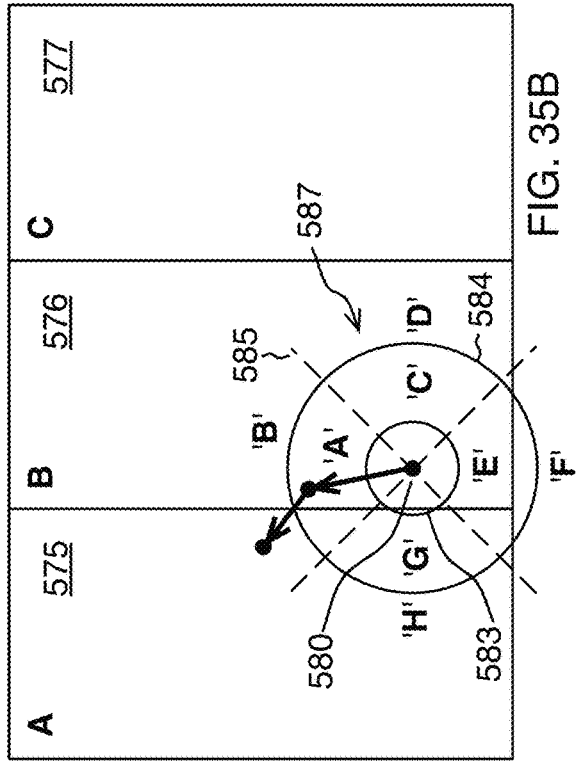

FIGS. 35A-35D use targets 587 and 588 to illustrate position-independent stroke gestures. In FIGS. 35A and 35B, the finger path begins in the same input region 576, indicating finger B, but in two different locations 578 and 580. The directional partitioning 585 is the same, and the gesture levels 583-584 are the same on each of the figures, mapping the same discrete directions and gesture levels to the same user requests. Both strokes thus indicate the user request 'B' according to target 587. FIGS. 35C and 35D depict the same finger path in region 577, again starting at different locations 581 and 582. Although the form of the path is the same as that of FIGS. 35A and 35B, a different finger is performing the gesture, finger C, so the discrete directions and gesture levels of this gesture can map to different user requests, as illustrated in target 588. The finger paths begin at different locations of region 577 in FIGS. 35C and 35D, but the gestures in these figures still indicate the same user request—the character 'J'—because the gesture direction and the gesture level are here position-independent for identical finger identities.

The finger maps of FIGS. 36A-36D depict two-fingered gestures for which the paths of different figures differ in starting location but have identical forms. The directional partitioning 600 and gesture level distances 601-602 together define targets 604 and 608, which differ only in the user requests that they indicate. FIGS. 36A-36D use targets 604 and 608 to illustrate translating gesture parameters to user requests. The vector between the open circles (e.g vector 607 between open circles 605 and 606) represents a vector interpolated between the finger paths shown in the figure. This is an "interpolated distance vector," which as previously explained, is one of several possible approaches to assigning a direction and length to a two-fingered finger-mapped gesture. The figures use this approach because it conveniently represents the direction and gesture level of a two-fingered gesture visually as a single vector. The forms of the finger paths are identical from figure to figure, yielding the same interpolated distance vector 607 in different locations, depending on the figure. It would have been equally valid to determine the gesture parameters by other means, such as by using a gesture angle that is the average of angles of the fingers' distance vectors, and such as by using a gesture length that is the average of the fingers' distance vectors.

Figure 36A:
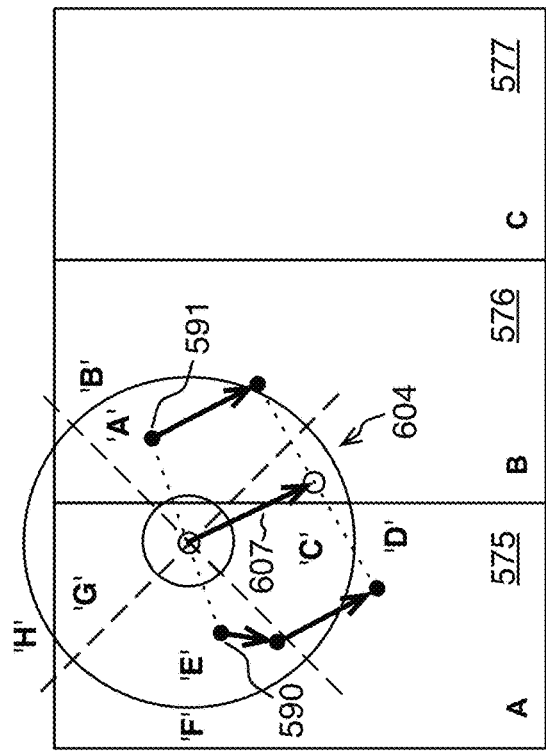
FIGS. 36A-36D depict sweep gestures that are position-independent and vector-dependent.
Figure 36B:
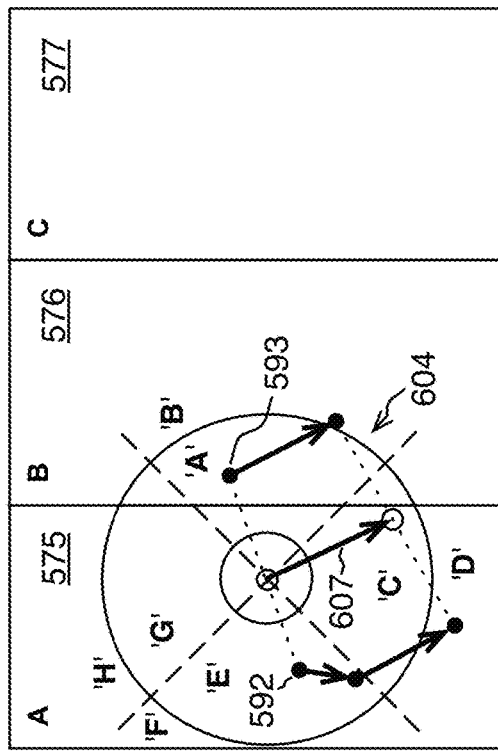
Figure 36C:
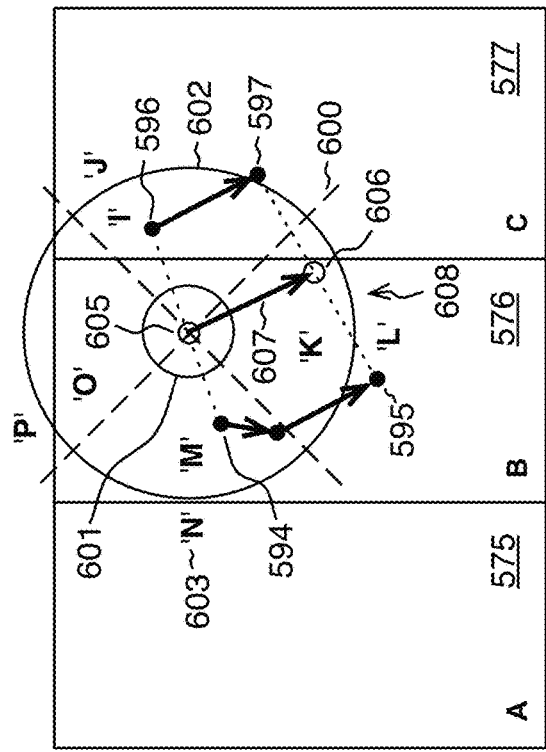
Figure 36D:
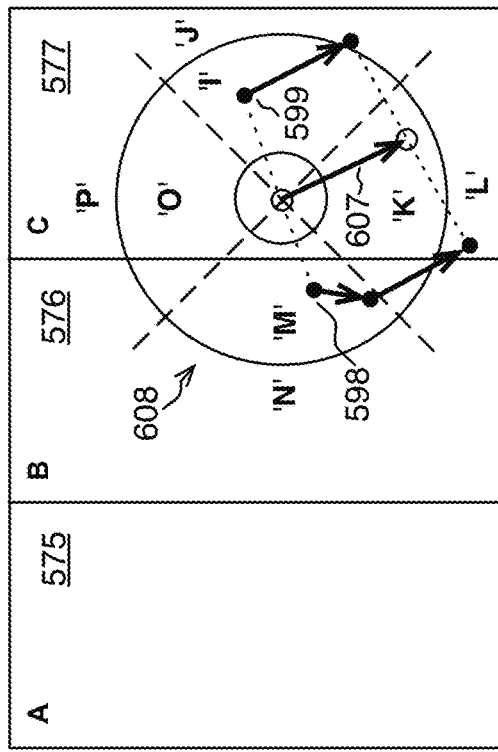

In each of finger maps of FIGS. 36A and 36B, one finger originates on region 575 and the other on region 576, associating them with finger identities A and B and target 604. In FIG. 36A, the fingers start at points 590 and 591, and in FIG. 36B, the fingers start at points 592 and 593, but because the finger paths are identical in form, the gestures in these two figures both yield an interpolated distance vector 607 ending in the same parameterization of target 604. This parameterization indicates user request 'C'. When these same finger paths are positioned to originate in regions 576 and 577, as in FIGS. 36C and 36D, the fingers have different finger identities B and C. This potentially changes the user requests to which the gestures translate, because the mapping of discrete directions and gesture levels to user requests depends on the combination of finger identities. Target 608 reflects this difference in user requests. FIG. 36C has the paths originating at points 594 and 596, and FIG. 36D has the paths originating at points 598 and 599. According to these latter two figures and target 608, these gestures both indicate a request to input the character 'K'. Because the gestures depicted here are position-independent, geometrically translating the finger paths to the new locations does not change the resulting user request, provided that the fingers still originate in the same regions.

Although the targets in FIGS. 35A-35D and 36A-36D uniformly distribute characters among gesture levels and discrete directions, such distributions are not ideal for finger-mapped gestures. These figures and other figures in this specification only depict targets that map gesture parameterizations to user requests in order to simplify the graphical representation and to assist with making the correlation between gesture parameterizations and user requests clear.

7.10.3 Longitudinal Selectability

"Longitudinal selectability" is perhaps the most important property of finger-mapped gestures for providing gesturing efficiency. Longitudinal selectability allows a hand to remain stationary while the fingers only gesture longitudinally to select among user requests, allowing the fingers to input a rich variety of user requests despite only moving along paths that approximate lines. Finger-mapped gestures provide longitudinal selectability by supporting "longitudinally selectable" gesture parameters. A "longitudinally selectable" gesture parameter is a gesture parameter that distinguishes among multiple parameter values in a gesture for which one or more fingers travel along a set of longitudinal paths that are available to the hand from a hand position. Longitudinal selectability can be defined geometrically in a way that should apply to the hands of a majority of users by defining it in terms of both "linear multi-selectability" and "longitudinal conformance."

7.10.3.1 Linear Multi-Selectability

Longitudinal selectability requires that the user be able to input multiple parameter values for a gesture parameter despite gesturing the fingers only along paths that approximate lines. This property is called "linear multi-selectability." Its definition is based on the linear directions in which fingers can travel and on a set of "multi-selectability criteria" for gestures.

As suggested by the illustrations of longitudinal paths 615-618 in FIGS. 37A-37B, longitudinal paths are lines or approximately lines, at least over the spans of distances that are useful for efficient finger-mapped gesturing. Each longitudinal path can also be associated with a linear direction representing the opposing directions of its approximating line. In a linearly selectable gesture system, each finger that can gesture has at least one longitudinal path available to it. It is possible to select a longitudinal path for each finger and to associate a linear direction approximation of the longitudinal path with the finger's finger identity. An association of a linear direction with a finger identity is called a "linear association," so a set of linear associations may represent the forward and backward directions that are available to a set of finger identities. The gesture system need not represent linear associations as delineated entities. Linear associations are inherent to gestures because the gesture system associates finger identities with gestured paths and because a gestured path can be characterized by one or more approximating slopes; at least one linear association characterizes every possible gestured path.

One approximation of a linear direction of a path is the path's "simple linear direction." The "simple linear direction" of a path is the linear direction represented by the path's "simple direction." The "simple direction" of a path is the direction of a vector that originates at the initial touch location of the path and terminates at the path's final location. For example, in FIG. 40A, a finger gestures a path starting at location 635, passing through location 636, and ending at location 637. The vector 638 from the starting location 635 to the ending location 637 defines the path's simple direction. The angle $\phi$ is thus a representation of the path's simple linear direction, as is the line 639. The set of "simple linear associations" of a gesture is the set of linear associations in which the simple linear direction of the gestured path of each finger of the gesture's selecting finger set is associated with a distinct finger identity of the gesture's selected identity set. A simple direction and a simple linear direction characterize a gestured path regardless of whether they are determined.

Longitudinal selectability depends on the availability of gestures that meet a set of "multi-selectability criteria." Given an input area, a set of linear associations, and a gesture basis, the multi-selectability criteria for a gesture are as follows:

1) The initial touch location of each finger of the gesture's selecting finger is in the input area.
2) For each finger of the gesture's selecting finger set, the simple linear direction of the finger's gestured path is a linear direction of a distinct linear association of the set of linear associations, and the gesture's selected identity set is the set of finger identities of these distinct linear associations.
3) The gesture basis characterizes the gesture. That is, the gesture's selected identity set is identical to the characteristic identity set of the gesture basis, and values are determined for at least the gesture parameters of the gesture basis.

A gesture parameter of a gesture basis is "multi-selectable" on a set of linear associations within an input area if, and only if, the gestures of the gesture basis that satisfy all of the multi-selectability criteria together distinguish among multiple values for the gesture parameter. Recall that a gesture basis is a characterization of a class of similar gestures. It is possible to characterize the forward and backward gestures of a gesture system with a set of gesture bases so that, for a given input area and some set of linear associations, each gesture parameter of each gesture basis is multi-selectable on the set of linear associations within the input area. It is therefore useful to extend multi-selectability to gesture bases and sets of gesture bases. Formally, a gesture basis is "multi-selectable" on a set of linear associations within an input area if, and only if, each gesture parameter of the gesture basis is multi-selectable on the set of linear associations within the input area. A set of gesture bases is "multi-selectable" on a set of linear associations within an input area if, and only if, each gesture basis of the set of gesture bases is multi-selectable on the set of linear associations within the input area. An assertion that a gesture parameter, a gesture basis, or a set of gesture bases is multi-selectable on a set of linear associations is in part an assertion that it is possible to gesture fingers so that the simple linear directions of their paths are linear directions of the set of linear associations, but it is not an assertion that the gesture system must determine either linear directions for the gestured paths or linear directions of the set of linear associations.

Because a simple linear direction can be established for any gestured path, the multi-selectability criteria do not require that fingers gesture along lines or approximate lines, and yet if a gesture parameter cannot be input by gesturing along lines or approximate lines, the gesture parameter would not be useful for longitudinal gesturing. Due to the diversity of possible device facet morphologies, and due to the variety of possible gesture parameters, it is difficult to exactly characterize the class of gesture parameters for which multiple values can be selected while gesturing the fingers along lines or approximations of lines. In particular, it is difficult to pragmatically define what it means to be an approximation of a line. However, it is possible to define specific classes of gesture parameters that make sense for lines or line approximations without requiring that a device be able to input gesture parameters of the class along lines or approximations of lines. When a gesture parameter of one of these classes is multi-selectable on a set of linear associations, the gesture parameter is said to be "linearly multi-selectable" on the set of linear associations and the gesture parameter is said to exhibit "linear multi-selectability."

This specification defines several classes of gesture parameters that support linear multi-selectability. In particular, gesture level, gesture direction, backbrush level, and multi-reversal are general classes of gesture parameters that provide linear multi-selectability. Gesture direction provides linear multi-selectability when there is a linear direction for which opposite gesturing directions indicate distinct discrete directions, while the remaining parameters inherently support linear multi-selectability, provided that the gesture system does not explicitly preclude interpreting these gesture parameters along lines or paths that approximate lines. The two distinct discrete directions that are implicit with a multi-selectable gesture direction parameter of a gesture basis are each said to be "opposite" the other "in" the gesture basis. Although the gesture system is able to distinguish parameter values of a multi-selectable gesture parameter on a set of linear associations, it need not associate each possible gesture parameterization with a user request, nor need it always associate distinct gesture parameterizations with distinct user requests.

7.10.3.2 Longitudinal Conformance

The definition of "multi-selectability" does not constrain the linear directions over which gesture parameters are multi-selectable. The most efficient gestures are those in which the gesturing fingers travel the longitudinal paths available to a hand in a hand position. A gesture in which the fingers move strictly along longitudinal paths is called a "longitudinal gesture," and all other gestures are called "lateral gestures." A gesture system should be characterizable by gesture bases that are multi-selectable on a set of linear associations whose linear directions approximate the forward and backward directions of longitudinal gestures. The property of "longitudinal conformance" restricts linear directions to ranges of directions that seem reasonable for the longitudinal gestures that most people's hands should be able to input.

As fingers gesture longitudinally, they move along linear directions that are roughly perpendicular to the left-to-right orientation of the hand. For a hand in finger-mapping posture, the fingers are moving roughly perpendicular to a line that rest locations of the fingers would approximate were the user to rest the fingers on the input area. The orientation line of a hand calibration provides a good estimate of this left-to-right line. It is possible to define longitudinal gestures in terms of the orientation line, but doing so suggests the presence of a hand calibration that provides rest locations for the end-of-series fingers, whereas longitudinal gestures are roughly perpendicular to the left-to-right orientation of the hand regardless of whether this information has been provided. Instead, it more generally applicable to define the directions of longitudinal gestures in terms of the orientation lines that are potentially available to a hand.

Under this approach, the directions of longitudinal gestures are expressed in terms of the rest locations that are potentially available to the fingers at the ends of the series of fingers that can gesture, regardless of whether the gesture system has actually determined the rest locations. The gesture system establishes a series of finger identities for the fingers of a hand, with the ends of the series representing the fingers that are farthest apart. These are the finger identities that the gesture system associates with gesturing fingers. This information is sufficient to define longitudinal conformance. A set of linear associations is "longitudinally conformant" with a series of finger identities in an input area if, and only if, all of the following criteria are satisfied:

1) There are locations $R_1$ and $R_2$ in the input area and there are end-of-series finger identities $I_1$ and $I_2$ of the established series of finger identities, such that the gesture system is able to detect a finger of identity $I_1$ touching at location $R_1$, and such that the gesture system is able to detect a finger of identity $I_2$ touching at location $R_2$.
2) Each linear direction of the set of linear associations can be characterized by a direction angle that is within 25 degrees of a direction angle for a line perpendicular to a line through $R_1$ and $R_2$.

Figure 39A:
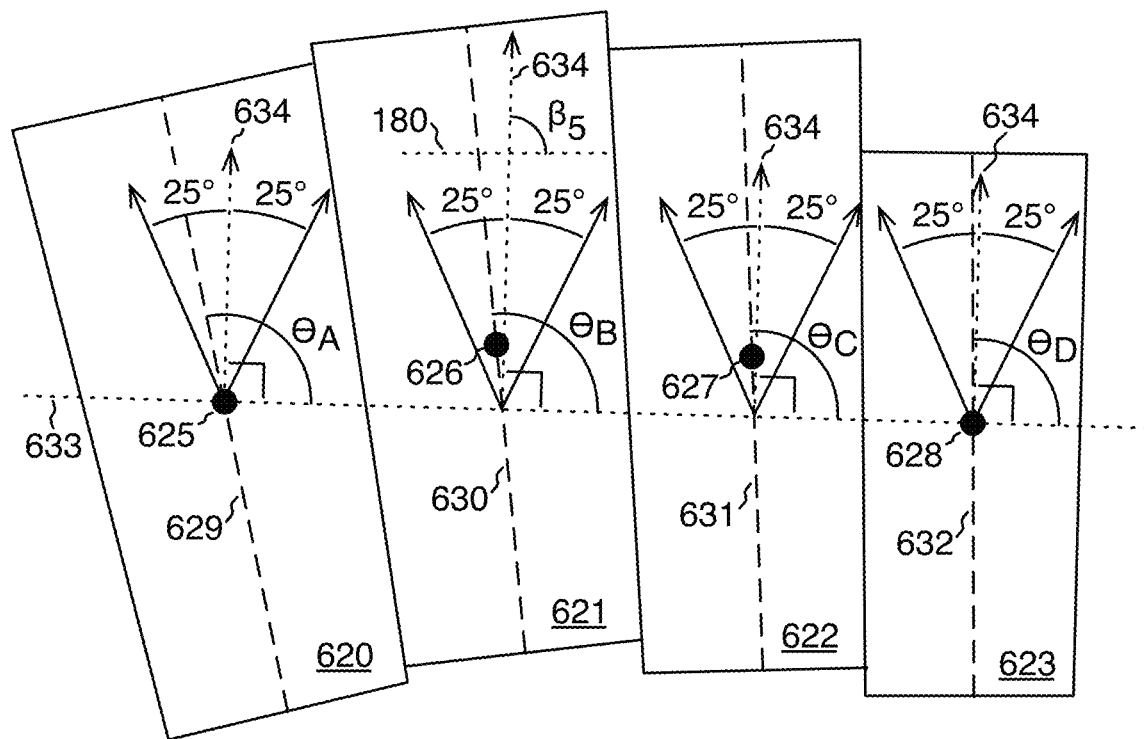
FIGS. 39A-39B depict longitudinally conformant linear directions.
Figure 39B:
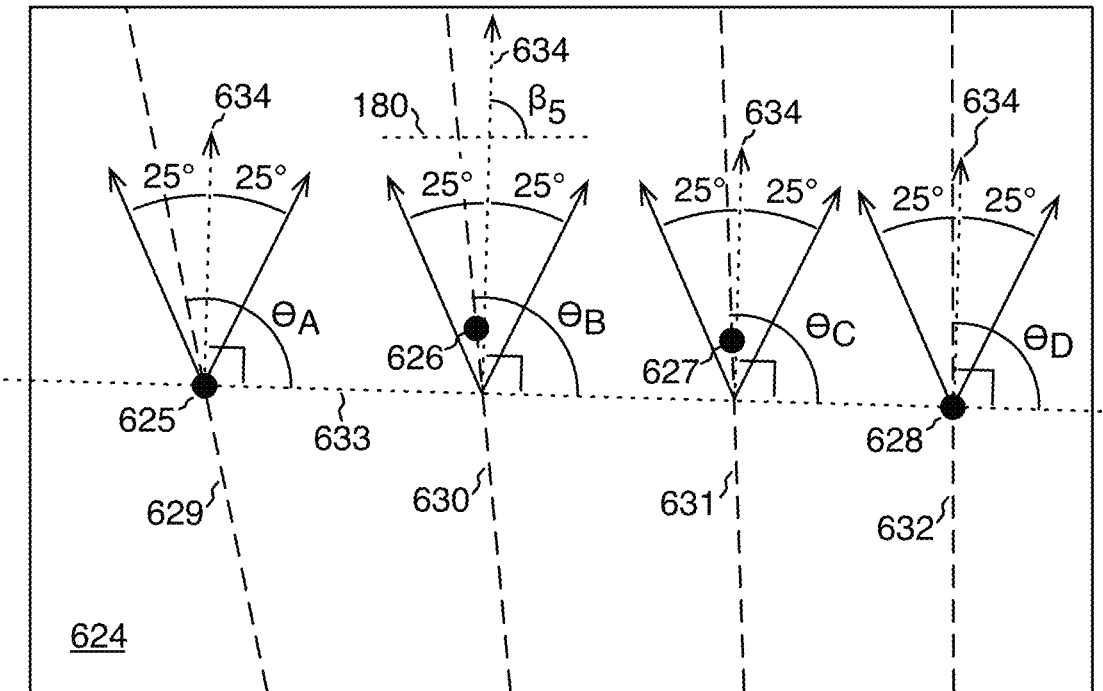

FIGS. 39A-39B illustrate this definition of "longitudinal conformance." The input area of FIG. 39A is partitioned into regions 620-623, while the input area 624 of FIG. 39B is not. Each of these figures depicts a set of possible rest locations 625-628 and dashed lines 629-632 that pass through the possible rest locations 625-628. Each dashed line 629-632 represents a linear direction. Under one interpretation of these figures, the dashed lines 629-632 depict linear directions that approximate gestured paths. In this case, it is possible that a finger may gesture along a dashed line, but it also possible that a finger of the appropriate finger identity may gesture along a different path, one that has a simple linear direction identical to the linear direction of the dashed line. Under another interpretation of FIGS. 39A-39B, each dashed line 629-632 is a channel line representing the expected or average forward and backward directions of gesturing fingers. The figures show a possible orientation line 633 passing through the rest locations 625 and 628 for the fingers associated with the end-of-series finger identities. They also show a perpendicular line 634 to the orientation line 633, with the angle $\beta_5$ characterizing the perpendicular 634. The angles $\theta_A$, $\theta_B$, $\theta_C$, and $\theta_D$ characterize the linear directions of the dashed lines 629-632, and in all cases these linear directions are within 25 degrees of the perpendicular 634. The linear directions that the dashed lines 629-632 represent are therefore all longitudinally conformant by the above definition, for this particular selection of rest locations 625-628.

The preceding definition is only a basic definition of "longitudinal conformance." The definition helps restrict the range of linear directions that are considered longitudinal, but it is not ideal, because a hand in a hand position gestures longitudinally with respect to a narrow range of possible orientation lines, whereas this definition includes the longitudinal linear directions of all possible orientation lines for all possible end-of-series rest locations. An observation helps to refine this definition: were the user to position the hand at the top or the bottom of the input area, the user would have to focus attention on the input area to be able to accurately start gestures within the input area. Effective use of the input area requires the user to place the fingers at a distance from the top and bottom. It is therefore reasonable to expect margins between the rest locations and the boundaries of the input area. Establishing these margins reduces the space of possible rest locations and thus further restricts the range of directions that are considered longitudinal.

Additional constraints can be added to the basic definition of longitudinal conformance to assert margins. One constraint helps to ensure that a finger can gesture the distances necessary to input gesture level thresholds while minimizing the risk of starting gestures outside of the input area. A set of linear associations is "longitudinally conformant" with a series of finger identities in an input area for Nth-level margins if, and only if, longitudinal conformance criteria (1) and (2) are satisfied and the following criteria are also satisfied:

3) There is a linear direction $D_1$ and a gesture level N threshold length $M_1$ for finger identity $I_1$ such that $R_1$ is at least a distance of $M_1$ from a boundary of the input area in each direction of $D_1$ along a line through $R_1$.
4) There is a linear direction $D_2$ and a gesture level N threshold length $M_2$ for finger identity $I_2$ such that $R_2$ is at least a distance of $M_2$ from a boundary of the input area in each direction of $D_2$ along a line through $R_2$.
5) Each of the linear directions $D_1$ and $D_2$ can be characterized by a direction angle that is within 25 degrees of a direction angle for a line perpendicular to a line through $R_1$ and $R_2$.

For example, when a set of linear associations is longitudinally conformant with a series of finger identities in an input area for second-level margins, $M_1$ is the minimum length of the second-range gesture level for finger identity $I_1$, and $M_2$ is the minimum length of the second-range gesture level for finger identity $I_2$. Likewise, third-level margins correspond to third-range gesture levels.

This definition of "longitudinal conformance" also has some shortcomings. First, the definition does not distinguish the top and bottom of the input area because "top" and "bottom" may be hard to delineate for some irregular or curved boundary input areas. This shortcoming is difficult to work around generically. Another shortcoming is that the definition is only applicable to gesture systems that use gesture level. The definition can be generalized by establishing margins that are independent of gesture level. A convenient way to do this is to use margins that are a percentage of the hand breadth. Fortunately, the definition of longitudinal conformance assumes rest locations and so can also assume a hand breadth equal to the distance between those rest locations.

Under a generalization definition, a set of linear associations is "longitudinally conformant" with a series of finger identities in an input area for N-percent margins if, and only if, longitudinal conformance criteria (1) and (2) are satisfied and the following criteria are also satisfied, where M is a length equal to N percent of the distance between locations $R_1$ and $R_2$:

6) There is a linear direction $D_1$ such that $R_1$ is at least a distance of M from a boundary of the input area in each direction of $D_1$ along a line through $R_1$.
7) There is a linear direction $D_2$ such that $R_2$ is at least a distance of M from a boundary of the input area in each direction of $D_2$ along a line through $R_2$.
8) Each of the linear directions $D_1$ and $D_2$ can be characterized by a direction angle that is within 25 degrees of a direction angle for a line perpendicular to a line through $R_1$ and $R_2$.

For example, when a set of linear associations is longitudinally conformant with a series of finger identities in an input area for 15% margins, M is 15% of the length between locations $R_1$ and $R_2$. In the absence of a hand calibration that specifies gesture level thresholds, it is reasonable to assume that a gesture level 2 threshold would be at least 15% of the length of the hand breadth. However, this generalized definition of longitudinal conformance can be employed whether or not the gesture system uses gesture levels. A finger map consisting of a row of four contiguous square input regions, with rest locations centered in the squares, employs a margin of just below 18.4% for the 25-degree range around the perpendicular to the orientation line. A margin of 20% thus strongly asserts that the input area or input regions should generally be taller than they are wide, and a margin of 28% asserts that the input area or input regions should generally be more than 1.5 times taller than they are wide. Note that this generalized definition of longitudinal conformance and the "Nth-level" definition do not necessarily limit linear directions to the same set of ranges.

In the above criteria for the various definitions of longitudinal conformance, the gesture system need not specify or determine either of locations $R_1$ or $R_2$, and it need not specify or determine the assumed orientation line through locations $R_1$ or $R_2$. The gesture system also need not specify or determine either the line perpendicular to the assumed orientation line or the direction angle for this perpendicular line. The gesture system likewise need not specify or determine either of linear directions $D_1$ or $D_2$, and it need not specify or determine a hand breadth or a percentage length of the hand breadth. The above criteria cite these measures for the purpose of describing geometric properties of linear directions that should be longitudinal for most people's hands.

Figure 40A:
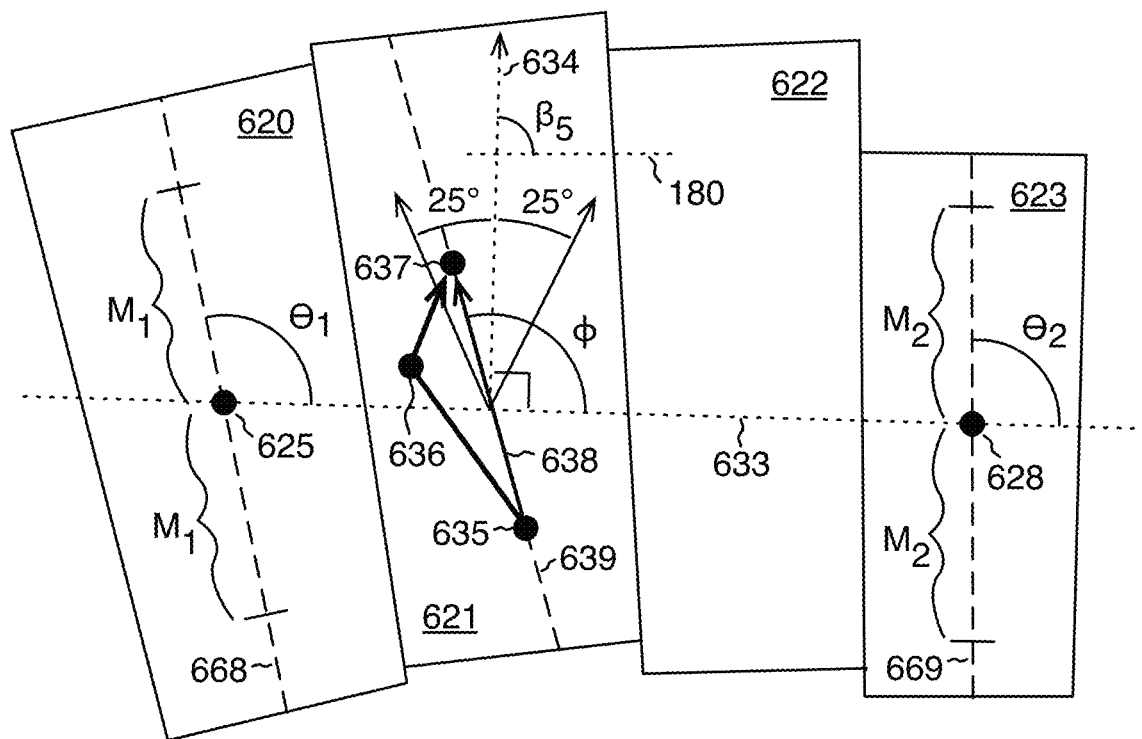
FIGS. 40A-40B depict longitudinal conformance based on margins.
Figure 40B:
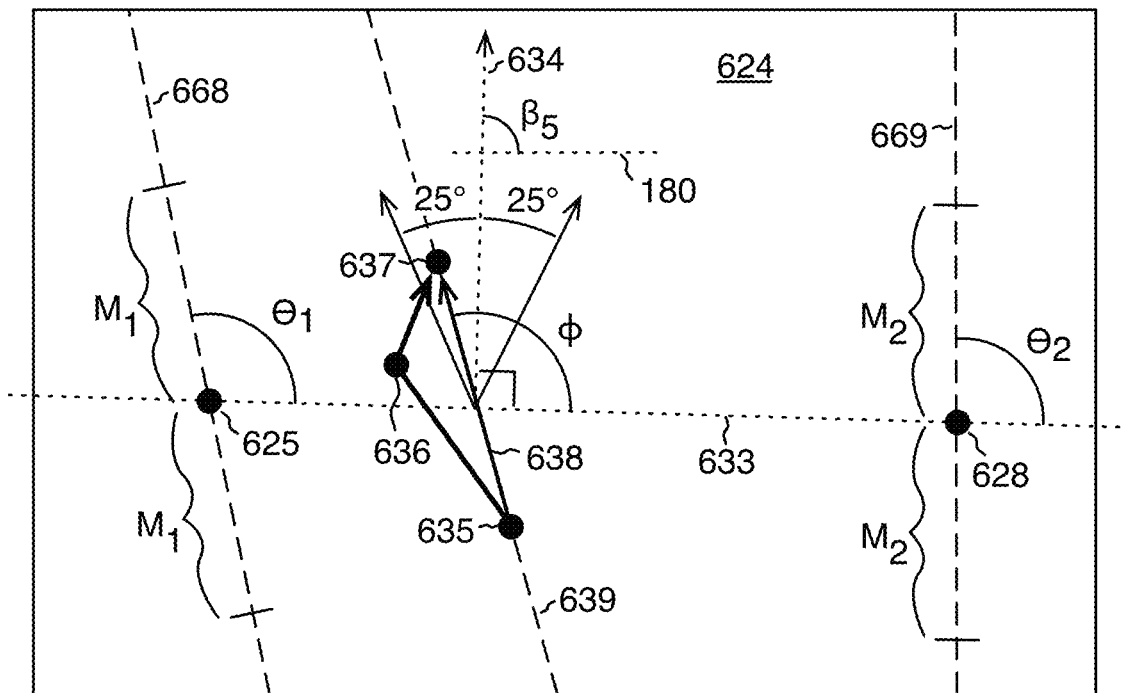

FIGS. 40A-40B illustrate the criteria for determining longitudinal conformance using margins. FIG. 40A illustrates the criteria for a finger map of input regions 620-623, and FIG. 40B illustrates the criteria for an input area 624 for which the host provides finger identities. A possible orientation line 633 passes through possible end-of-series rest locations 625 and 628. The dashed lines 668-669 passing through the rest locations 625 and 628 correspond to linear directions $D_1$ and $D_2$ in the longitudinal conformance criteria, each representing a linear direction along which margins are measured. Each dashed line 668-669 may represent a channel direction for its respective finger identity, but each can also represent any linear direction that is within 25 degrees of a perpendicular 634 to the orientation line 633. Neither figure depicts this latter constraint, but the constraint requires that the angles $\theta_1$ and $\theta_2$ each be within 25 degrees of angle $\beta_5$. $M_1$ and $M_2$ are lengths for the margins for rest locations 625 and 628, respectively. Rest location 625 is at least a distance of $M_1$ from boundaries of the input area along both directions of the linear direction that dashed line 668 represents, and rest location 628 is at least a distance of $M_2$ from boundaries of the input area along both directions of the linear direction that dashed line 669 represents. The possible orientation line 633 thus satisfies the margin requirements for its rest locations. Both FIGS. 40A and 40B depict a gestured path through locations 635-637 and a distance vector 638 for the gestured path. The simple linear direction of the path is the linear direction of this distance vector 638. The dashed line 639 represents this simple linear direction, as does the direction angle $\phi$ for the vector 638. $\phi$ falls within 25 degrees of the perpendicular 634 to the orientation line 633, whose rest locations 625 and 628 have proper margins with boundaries of the input area, and therefore the path through locations 635-637 is considered to have a longitudinally conformant linear direction.

Unless the device restricts a finger to a specific path, it is likely that the longitudinal path along which any finger gestures will vary slightly from gesture to gesture. A set of gesture bases should therefore be multi-selectable on at least one set of linear associations. The definitions of longitudinal conformance do not require that fingers be able to gesture both forward and backward and are compatible with gesture systems that only recognize forward gestures or backward gestures. On some devices, it may even be that all linear directions are longitudinally conformant. Consider FIG. 37B, which shows an input area for which the host may provide finger identities. If the host designates the top and bottom of the input area but allows the hand to take any orientation, only the strictly horizontal direction cannot be longitudinally conformant, provided that the input area is large enough to accommodate the appropriate margins. If the host does not designate top and bottom, it is possible that any orientation of the hand may be valid. Imagine a device that extends the boundaries of the input area 624 in FIG. 39B to accommodate the entire page, allowing for any orientation of the possible rest locations 625-628. If the device can detect any finger identity in any location, any two locations are potentially the end-of-series rest locations 625 and 628, making all linear directions longitudinally conformant on this device.

7.10.3.3 Longitudinally Selectable Parameters

A set of gesture bases may be multi-selectable on a set of linear associations, and a set of linear associations may be longitudinally conformant with a series of finger identities. When a set of gesture bases is multi-selectable on a set of linear associations that is longitudinally conformant with the series of available finger identities of the set of gesture bases, the set of gesture bases represents a collection of gestures that can be input on longitudinal paths while selecting among multiple values for each gesture parameter of a gesture. When multiple values for a gesture parameter of a gesture can be input while restricting the gesture to longitudinal paths, the gesture parameter is said to be "longitudinally selectable." This "longitudinal selectability" property of gesture parameters is crucial for the rapid input of finger-mapped gestures. Gesture parameters have to be specifically designed for longitudinal selectability, making the selection of gesture parameters available to the gesture system central to the ability of the gesture system to provide rapid data entry.

Consider FIGS. 8A and 8B, which depict longitudinal gestures selecting among multiple values for both a gesture level parameter and a gesture direction parameter. Each of these figures shows a finger map. The dots in dashed circles 104-107 on each finger map represent finger rest locations, and the lines 108-111 that pass through the rest locations 104-107 represent longitudinal paths along which the fingers can travel. The paths depicted happen to be lines. Their linear directions are longitudinally conformant with the series of finger identities given as the index, middle, ring, and pinky fingers. FIG. 8A depicts single-finger strokes, and FIG. 8B depicts two-finger sweeps of adjacent fingers. The solid heavy lines 108-111 in FIG. 8A and the solid heavy lines 112-114 in FIG. 8B each indicate the direction and length of a gesture as a whole and are referred to as "direction/length" lines. Because the gestures of FIG. 8A are strokes, the direction/length lines of this FIG. 108-111 pass through the rest locations 104-107. Because the gestures of FIG. 8B are two-finger sweeps, its direction/length lines 112-114 are on the boundaries between the input regions 100-103 of each pair of fingers that contributes to a gesture.

FIGS. 8A and 8B both illustrate the longitudinal selectability of the gesture level and gesture direction parameters. The graphical notation shows each gesture selecting among multiple parameter values for each of the two gesture parameters. Dotted line segments (e.g. 115-118) partition the direction/length lines at the boundaries between gesture level threshold lengths for each direction of movement of the fingers. For example, a finger in the pinky finger input region 103 of FIG. 8A can select between inputting 'S' and 'T' by gesturing forward either a distance greater than or a distance less than the distance from the rest location to the dotted line boundary 115 between the 'S' and the 'T', respectively, after having initiated the gesture at point 107. Similarly, according to FIG. 8B, if fingers in the middle and ring finger input regions 101-102 initiate a gesture at points 105-106 and gesture a backward sweep, they select among '5', '6', and '7' according to a combined distance of travel calculated for the two fingers, delimited by the dotted lines 117-118. These two figures depict the lengths of gestures according to the direction of travel of the gesturing fingers, regardless of where the fingers start gesturing in the input regions 100-103. There is no requirement that the fingers start at the rest locations 104-107, and the distances depicted (e.g. 115-118) do not inherently partition the regions along fixed boundaries.

7.10.4 Longitudinal Bias

A gesture system can take advantage of the efficiency of longitudinal gestures without requiring that all gestures be longitudinal, because only the user requests that are best input rapidly should be available as longitudinal gestures. User requests that can be input less rapidly can be made available as lateral gestures. Normally the most frequently input user requests are those that should be input rapidly, but it is reasonable to associate even high frequency user requests with lateral gestures when the user requests represent delimitations of the data being input. Each user request intended for rapid input should only require gesturing by a single hand, parameterized by finger identities from a single hand, because it can be difficult for users to coordinate together the fingers of different hands. A gesture system that disproportionately associates longitudinal gestures with the user requests that should be input most rapidly is said to exhibit "longitudinal bias."

The forward and backward directions in which fingers travel may vary from hand to hand for a given hand position, so the directions of longitudinal bias may also vary from hand to hand. Longitudinal conformance, as previously defined, establishes a direction of bias that should suffice for the majority of users. In particular, the gesture system may establish longitudinal bias by disproportionately associating user requests with gestures that traverse paths having simple linear directions found in a set of linear associations, where the set of linear associations is longitudinally conformant with a series of finger identities of the gesture system, for some definition of "longitudinally conformant." These gestures are longitudinal gestures under the selected definition of longitudinal conformance, and they travel longitudinal paths also established by this definition. The gesture parameterizations available to these longitudinal gestures are called "longitudinal parameterizations."

The gesture system establishes longitudinal bias by predominantly associating longitudinal parameterizations with user requests that should be available for rapid input. To make many user requests available for rapid input, the gesture system will have to associate many user requests with longitudinal gestures. A longitudinal gesture of any given combination of finger identities can reasonably select from at least four gesture parameterizations, as illustrated in FIGS. 8A, 8B, 61A, and 61B for parameterizations including gesture level and gesture direction.

Consider a gesture system that inputs characters. Most text that users enter is made of words consisting of letters, so requests to input letters should be among those that longitudinal gestures represent. Letters vary from alphabet to alphabet, and alphabets vary in size, with some alphabets potentially having hundreds of letters that vary by their diacritical marks. It is not necessarily pragmatic to have longitudinal gestures for all possible letters, but it is reasonable to have them for a majority of letters of a basic alphabet. A normal distribution of an alphabet across both longitudinal and lateral gestures would associate roughly an equal number of letters with each of the two classes of gesture, because varying direction is a simple and fast way to select among letters. To establish a longitudinal bias, longitudinal gestures would have to represent a significant majority of the letters, so that longitudinal parameterizations indicate a significant majority of letters. What constitutes a significant majority is somewhat arbitrary. It suffices for longitudinal parameterizations to represent at least two-thirds of the alphabet. That is, longitudinal parameterizations should indicate requests to input at least two-thirds of the letters of a basic alphabet. In an alphabet with 26 letters, such as the English alphabet, longitudinal parameterizations should indicate at least 18 letters. The fewer the number of finger identities, the more significant this restriction is. In particular, this restriction is significant at four finger identities or fewer for longitudinal gestures.

When the direction of a gesture is able to select a letter, it seems reasonable to allocate letters to the four most readily selected directions—forward, backward, left, and right. It also seems reasonable that only after allocating letters to all of these directions would one look for ways to allocate more than one letter in a given direction. For example, only after already allocating letters to the forward, backward, left, and right directions would one consider finding a way to make more than one letter available forward or backward. Yet, finger-mapped gestures are most efficient in the forward and backward directions, suggesting that there is no need to map letters to left and right directions. In particular, it is a surprising feature of finger-mapped gesture systems that it is most efficient to allocate multiple letters in each of the forward and backward directions before assigning letters to left and right directions. One way to express this property is to say that the gesture system assign at least two distinct letters to a forward or backward direction before associating any letter at all with a left or right direction. For example, such a gesture system could have two letters available to the forward direction while having no letters available to any direction that is left of the forward and backward directions. Similarly, two letters could be available to the forward direction while no letters are available to any direction that is right of the forward and backward directions. The same property is expressed by replacing the forward direction with the backward direction in these examples. Several figures in this specification (e.g. FIGS. 35A-35D and 36A-36D) show letters being assigned equally to all four directions in order to provide a simple representation of user requests associated with those directions. However, to provide gesturing efficiency, the accompanying sample implementation only associates letters with the forward and backward directions, as shown in FIGS. 61A-61B. Similarly, FIGS. 8A-8B also illustrate gesturing only in the forward and backward directions to input any letter of the English alphabet.

Another approach has longitudinal parameterizations indicating at least a certain number of the most frequently used letters of a language. For example, the sample implementation provided in this specification associates the seven most frequent letters of the English language with longitudinal parameterizations. These letters are A, E, I, N, O, S, and T. These seven letters are actually mapped to seven of the fastest-to-input gestures, which are stroke gestures of gesture level 1. Other languages should also map the most frequently entered letters to the fastest-to-input finger-mapped gestures. According to the charts in the Wikipedia entry for "Letter frequency," among the Romance languages English, French, German, Italian, Portuguese, and Spanish, the most frequently input ten letters are A, D, E, I, L, N, O, R, S, and T. Under a generic rule for Romance languages, longitudinal parameterizations should indicate at least seven of these ten letters.

Letters typically come in lower case and upper case forms, but this treatment of longitudinal bias is independent of letter case. For clarity, the claims that accompany this specification indicate letters in upper case form, but as used in the claims, a "letter" selected from a group of letters is any representation of a letter that appears in the group. Representations for a letter include its upper case form, its lower case form, and an abstract representation that is independent of letter case. The letters of a set of letters are "distinct" if, and only if, no two letters of the set are representations for the same letter of the group from which the letters were selected. In particular, two letters are "distinct" if, and only if, the letters are not representations for the same letter of the group.

Punctuation symbols can be more frequently input than many letters, so it beneficial to also associate them with longitudinal parameterizations. However, most punctuation symbols serve as delimiters in text, so it may be helpful to break the flow of input by associating some of them with lateral gestures, regardless of whether there are also longitudinal parameterizations for the lateral gestures. For example, dashes and carriage returns are usefully implemented as right- and left-moving gestures, respectfully. The space character is typically more common than any letter and so should be available as a longitudinal gesture in order to maximize the rate of input, but it is also helpful to implement the space as a lateral gesture in order to suggest spacing apart adjacent words. There may be a need to balance mnemonic value with the rate of data input.

7.10.5 Gesture Length Accommodation

User input can be made still more efficient by sizing gesturing areas to accommodate the patterns of gesturing that each finger is likely to perform. Although finger-mapped gestures can end outside the input area on touch devices that allow it, there are benefits to improving the odds that gestures end in the input area. Consider a user gesturing a finger forward to input a stroke. If the stroke ends outside the input area, the user must first reposition the finger above the input area again to begin another gesture with the finger. Assume that the forward gesture instead ends on the input area and that the finger begins its next gesture from this location. If the subsequent gesture is a backward gesture, the finger moves closer to the location where the forward gesture started. This location is also on the input area, so after performing the backward gesture, the finger likely remains above the input area once again positioned for the next gesture. A gesture system can therefore improve gesturing efficiency by sizing the input area to accommodate the lengths of gestures according to where fingers gesture on the input area.

7.10.5.1 Longitudinal Lengths

The simplest way to accommodate gestures is to ensure that a gesture can start and end in the input area. This constraint allows a finger to repeatedly gesture in opposite directions by starting each gesture where the previous gesture ended. However, the input area should be sized to accommodate longitudinal gestures, since these are the gestures intended for rapid input. In particular, the input area should be sized to accommodate anticipated gesturing patterns of longitudinal gestures. A gesturing pattern involves a sequence of gestures and the locations at which the gesturing fingers start and end the gestures on the input area during the sequence. Gesturing forward with a finger, lifting the finger, placing the finger at the location where it lifted, and then gesturing backward is an example of a longitudinal gesturing pattern. Each gesturing pattern requires a minimum length of input area in which to perform the pattern. Accommodating longitudinal gesturing patterns thus entails establishing a minimum length of the input area in at least one longitudinal linear direction. The longitudinal linear directions are those that are longitudinally conformant with a series of finger identities of the gesture system.

When an input area is a finger map, each input region of the finger map should accommodate the gesturing patterns of its associated finger. Consider a finger that begins a gesture in an input region, lifts at a location on the input area, and then inputs a second gesture beginning at the location where the finger lifted. Barring potential finger identity reassignment via conflict resolution, the two gestures only indicate the same finger identity if the location where the second gesture begins is in the input region where the first gesture began. In order to accommodate the gesturing pattern, the first gesture should begin and end in the same input region. This constraint is sufficient to accommodate many gesturing patterns, but it does not ensure the accommodation of longitudinal gesturing patterns. Accommodating longitudinal gesturing patterns on input regions requires establishing minimum lengths of the input regions along at least one longitudinal linear direction, possibly a along different longitudinal linear direction for each input region.

A length of an input area or input region in a longitudinal linear direction is called a "longitudinal length" of the input area or input region. The minimum length that a gesturing pattern requires is called the "accommodation length" of the gesturing pattern. Accommodation lengths may vary from finger to finger, because different fingers may gesture over different distances. A gesture system most generally accommodates gesturing patterns by ensuring that the longitudinal lengths available to finger identities are at least the accommodation lengths of the gesturing patterns for the finger identities. However, the input area need not accommodate the gesturing patterns of fingers for hands in every possible hand position. Some positions of a hand may leave a finger with little room for longitudinal gesturing and may be inappropriate for rapid data entry. To accommodate gesturing patterns, the gesture system need only provide one hand position. Even so, the more hand positions there are that accommodate gesturing patterns, the easier gesturing may be for the user.

FIGS. 39A-39B and 40A-40B provide examples of longitudinal lengths for input regions and input areas. As previously explained, the dashed lines 629-632 and 639 in these figures represent longitudinally conformant linear directions. The dashed lines 629-632 in FIG. 39A each pass through a location 625-628 on their respective input regions 620-623 and thus depict lengths of their respective input regions 620-623 along longitudinal linear directions. Each of these dashed lines 629-632 can therefore be considered a longitudinal length of an input region. Similarly, the dashed lines 629-632 representing the same linear directions each pass through a location 625-628 in the input area 624 of FIG. 39B and thus can be considered longitudinal lengths of the input area 624. In FIGS. 40A-40B, the dashed line 639 represents the linear direction of a gesture through locations 635-637. According to these figures, this linear direction is longitudinally conformant, and so the dashed line 639 through locations 635 and 637 can be considered to be a longitudinal length. In FIG. 40A, dashed line 639 provides a longitudinal length of the input region 621, while in FIG. 40B, it provides a longitudinal length of the input area 624.

Accommodating gestures entails ensuring that subsequent gestures can start near where previous gestures end. This requires that each subsequent gesture be able to indicate the finger identity of the previous gesture. Accommodating a gesture that indicates a finger identity therefore requires that the gesture be able to start and end in an isogeometric element for the finger identity. In particular, to accommodate a gesture, each finger of the gesture's selecting finger set must start and end the gesture in a geometric element that specifies a distinct finger identity of the gesture's selected identity set, although it is possible for one geometric element to specify all of the finger identities. For example, if the gesture is a stroke, the finger starts and ends in a geometric element that specifies the finger's finger identity. On a finger map, this geometric element is the input region for the finger identity. When the host provides finger identities, this geometric element is the entire input area. Similarly, the longitudinal length available to a finger identity is the length along a longitudinal direction of a geometric element that specifies that finger identity. Input regions and input areas are the isogeometric elements that have the longitudinal lengths.

7.10.5.2 Accommodation Lengths

The accommodation lengths required for efficient gesturing depend on the types of gestures being accommodated. Gesture level and gesture direction are the most efficient gesture parameters, so it is best for the gestures that are intended for rapid input to use at least one of these two parameters. Moreover, to make these gestures as fast to input as possible, the gestures should not require the user to perform additional gesturing for additional gesture parameters. If a gesture only implements gesture direction, the accommodation length can be quite short, such as the length of a gesturing threshold distance. Accommodating gesture length is therefore mainly an issue of accommodating lengths of the gesture level parameter. When a gesture system supports varying gesture level thresholds, the gesture system should accommodate at least the shortest gesture level thresholds, since these are more amenable to rapid input.

The inventor has found that when repeatedly gesturing a finger in the same direction, a finger tends to either start at its rest location or slightly opposite the rest location from the direction in which the finger will gesture. A finger gesturing forward tends to start just below (backward of) the rest location, and a finger gesturing backward tends to start just above (forward of) the rest location. However, when a finger gestures in one direction and then gestures in the opposite direction, the finger tends to start the second gesture at or near the location where it ended the previous gesture. A gesture system that allows the user to gesture in both forward and backward directions therefore benefits from ensuring that the input area has a longitudinal length that accommodates the full length of a gesture. In addition to sparing the user from having to carefully target fingers to the input area when alternating the direction of successive gestures, this increases gesturing speed because a finger only needs to lift briefly before touching again at or near the location where it had lifted.

There are a variety of ways to compute the minimum length that accommodates gestures inputting gesture levels. The inventor estimates that when gesturing at two gesture levels, a finger tends to indicate gesture level 2 by travelling at least 50% farther than it travels to indicate gesture level 1. FIG. 41A depicts two gestures. The first gesture 640 has length $G_1$ and gesture level 1. The second gesture 641 has length $G_2$ and gesture level 2. The second gesture 641 is 50% longer than the first 640. Assuming that users gesture at gesture levels 1 and 2 with these average lengths, users will intend to indicate gesture levels 1 and 2 even when gesturing at slightly above and below these lengths. The threshold distance for gesture level 2 should therefore be halfway between these two lengths. The figure indicates this level 2 threshold distance as $L_2$, whose value is $1.25G_1$. The length $L_2$ is the minimum length of a level 2 gesture, and the length $G_2$ is an average gesture level 2 length, at least for users who strive to minimize the length of level 2 gestures. Because a gesture level parameter supports at least two gesture levels, these two lengths are useful for computing various possible accommodation lengths for accommodating gesture level.

FIGS. 41B and 41C depict a user gesturing forward with one finger and then gesturing backward with the same finger starting at the location where the previous gesture lifted from the gesture surface. For example, in FIG. 41B, a finger may gesture along path 642, lift at location 643, touch again at location 643, and gesture in the opposite direction along path 644. The length of each gesture in FIG. 41B is the minimum gesture level 2 length $L_2$. In order for the finger to gesture both ways on the input area without having to re-target the input area, the accommodation length must therefore be at least $L_2$ for the finger. This is the minimal useful accommodation length. It is more practical to assume that the user gestures at the average level 2 length $G_2$ and also that the user will only touch near the location where it previously lifted and not necessarily exactly at that location. This is the scenario that FIG. 41C depicts. The figure assumes that the error in touch location is the same as the error available to the ending locations of the average gesture level 1 and gesture level 2 lengths, as shown in FIG. 41A. This error is $¼G_1$. The accommodation length for this gesturing pattern is consequently $1.6L_2$. This gesturing pattern captures the user beginning backward gestures at the top of the input area and forward gestures at the bottom of the input area, which would require the user to actively aim for the top or bottom of the input area when the input area only accommodates this length. It is possible for the user to do this, but it is not ideal.

Fingers tend to start gesturing at their rest locations after a pause in gesturing, and they tend to start gesturing near the rest locations when repeatedly gesturing in the same direction. In order to accommodate a gesture that follows a gesture that starts near rest locations, the accommodation length must be at least twice the gesture level 2 threshold. FIG. 41D depicts this minimal scenario, illustrating an accommodation length of $2L_2$, which does not give the user room to error in the length of the gesture or in the placement of the fingers. FIG. 41E allows the user room to error in gestures that start near the rest location, accommodating at least length $2G_2$, or $2.4L_2$, which is twice the minimal average length of gesture level 2. This length assumes that the user can place the finger closely to where the previous gesture ended. Also allowing for placement error around the rest location suggests a minimal accommodation length of $2.8L_2$. However, FIG. 41E does not account for the apparent tendency of fingers to start slightly opposite the rest location from their intended direction of travel. FIG. 41F illustrates this scenario. Excluding placement error, the accommodation length is once again $2L_2$, or twice the length of the gesture level 2 threshold. Including a placement error of $±¼G_1$ suggests a minimal accommodation length of $2.4L_2$. Under these computations, the accommodation length varies from $L_2$ to $2.8L_2$, with the lengths $2L_2$ and $2.4L_2$ each making two appearances among the useful calculations.

Accommodating gesture levels of 3 or greater would entail similar calculations. It is reasonable to place each average gesture level length at 50% greater than the average length of the previous gesture level. As the number of gesture levels increase, the gesture lengths that are required to confidently indicate the gesture levels increase rapidly. In addition to the increased difficulty of learning many gesture lengths, long gestures are not well suited for rapid data input. While there may be benefit to sizing input areas to accommodate gesture level 3 gestures, there likely is not much benefit to sizing for gesture levels 4 and greater. At a minimum, gesture systems employing gesture level should accommodate gesture level 2, regardless of how many gesture levels are available. The longer that the longitudinal lengths available to gesturing fingers, the more flexibility the user has for error, and hence the faster the user can accurately input data. An accommodation length of at least 2 cm appears to be sufficient for entering gesture level 2 gestures.

7.10.5.3 Accommodation by Design

As with the linear directions of a set of longitudinally conformant linear associations, a touch device need not compute accommodation lengths to accommodate gesturing patterns. A touch device can instead accommodate the lengths of gesturing patterns by design. For example, when the input area has a longitudinal length for some linear direction available to a finger of a finger identity and this longitudinal length is at least the threshold length of a particular gesture level, the touch device accommodates a finger of that finger identity inputting a gesture of the particular gesture level along that longitudinal length and linear direction, regardless of whether the gesture system has specified or determined the longitudinal length or the linear direction. Assertions about longitudinal lengths and accommodation lengths convey measures of the input area for purposes of establishing geometric properties of the input area. It is significant and surprising that it is beneficial to size an input area or input region to ensure that gesture level gestures end in the input area or input region, because gesture level is based on gesture length and the length of the gesture is independent of whether the gesture ends in the input area or input region.

The observation that fingers tend to gesture forward from slightly backward of their rest locations and backward from slightly forward of their rest locations suggests a design under which regions need not individually accommodate gesture lengths. Consider FIGS. 61A and 61B, which illustrate a mapping of gesture parameterizations to characters for the sample implementation included in this specification. The sample implementation explains these figures, but for present purposes it need only be understood that the characters above the dashed line 1000 are input by gesturing forward and those below the dashed line 1000 are input by gesturing backward from anywhere within the respective vertical regions 994-997. In the context of the sample implementation, each of FIGS. 61A and 61B represents a single finger map, but it also is possible for each figure to represent two distinct finger maps 1001 and 1002. One of the two distinct finger maps 1001 consists of the portions of regions 994-997 that are above the dashed line 1000, and the other finger map 1002 consists of the portions of regions 994-997 that are below the dashed line 1000. The characters available to the finger map above the dashed line 1000 are those listed in the finger map below the dashed line 1000, and vice versa. For example, to input the letter 'a' the user starts the gesture with the index finger in the leftmost region 994 of the top finger map 1001 and gestures a short stroke downward. Because the height available to the fingers is now split across two finger maps 1001-1002, the two finger maps together can be designed to accommodate gesture lengths rather than each finger map individually. The main drawback to this approach is that the user must accurately learn to have fingers start gestures in the appropriate finger map. This drawback can be avoided by making the gestures available to the top and bottom finger maps identical, but then both finger maps would be acting together as a single finger map and not as two finger maps.

7.11 Calibration Gestures

Of the many ways to input a hand calibration, calibration gestures are particularly convenient. A "calibration gesture" is a gesture that the user performs with the hand on the gesture surface to specify properties of a new hand calibration directly from measurements of the hand. A calibration gesture can specify a new hand calibration from scratch, or it can specify adjustments to a previous hand calibration. In the latter case, the calibration gesture may act upon an existing finger map, employing the finger map to determine the identities of some or all of the fingers of the calibration gesture. Because a hand calibration potentially specifies the position and orientation of a hand in addition to the relative characteristics of a hand, calibration gestures include gestures that reposition and reorient finger maps.

7.11.1 The Calibrating System

A calibration gesture may either position an input area 8 on the available gesture surface or position it more locally on a provided surface allocation. When a calibration gesture positions an input area on the available gesture surface, it selects the position of the surface allocation. A gesture system 7 as defined in this specification does not do this, so a gesture detection system of the host 4 called a "surface monitor" 5 implements the gesture instead. When a calibration gesture only positions an input area on a provided surface allocation, a finger-mapped gesture system may implement the gesture. The entity that implements calibration gestures—whether it is the surface monitor or a finger-mapped gesture system—is called the "calibrating system" 6.

The surface monitor is responsible for receiving calibration gestures that position an input area on the gesture surface available to a touch device. The host acquires a hand calibration from the calibration gesture, establishes an appropriate surface allocation, and instantiates a gesture session on that surface allocation using the hand calibration. The hand calibration specifies enough information to define a finger map, so the host can optionally constrain the surface allocation to just the input area that the finger map requires, possibly allocating the remaining area for other purposes. The gesture system then establishes a finger map in accordance with the hand calibration.

The gesture system may provide services to the host that allow the surface monitor to input a calibration gesture that leverages its existing finger map. If the surface monitor allows users to input calibration gestures on top of established input areas, it must either preclude gesture conflicts by the design of the calibration and finger-mapped gestures allowed or else provide a means for resolving conflicts. Regardless, calibration gestures are ultimately delegated to a particular calibrating system for input and processing.

The calibrating system inputs a calibration gesture in order to acquire a hand calibration. The hand calibration of a calibration gesture characterizes a correspondence series of at least two non-thumb fingers of a particular hand. This correspondence series is called the "full non-thumb series" of the hand calibration. For example, a hand calibration that includes all four fingers and optionally the thumb specifies a full non-thumb series of four fingers corresponding to non-thumb finger identities. The calibration gesture should also indicate whether it is for the left or right hand, so that the hands can be characterized separately. If a calibration gesture is performed for one hand and a hand calibration is not yet available for the other hand, the gesture system can default both hands to the newly input hand calibration. Distinguishing the hand facilitates allowing different hands to input the same user requests or different user requests to be available to different hands.

Some calibration gestures specify more information than others. For example, one calibration gesture may only provide finger rest locations, while another also provides finger forward directions. When the user inputs a partial hand calibration, the calibrating system can assume defaults for the unspecified values, or if possible, estimate remaining values from the values that are provided. If the calibrating system already has a pre-existing hand calibration for a hand, it can merge the pre-existing hand calibration with the new hand calibration. The calibrating system may even maintain different hand calibrations for the left and right hands. If the calibrating system maintains hand calibrations for multiple users, it can guess the user by finding the pre-existing hand calibration that most closely approximates the newly entered hand calibration, though the user should be given a chance to confirm the guess. To indicate or confirm the user performing a calibration gesture, it may be best for a multi-user system to require users to input an identifier or password immediately after performing the gesture. The calibrating system may also attempt to recognize the user from the characteristics of the calibration gesture itself.

7.11.2 Two-Finger Calibration Gestures

The simplest calibration gesture is a placement of two fingers of the full non-thumb series on the gesture surface. The identities of the two fingers must be known in advance, so that the calibrating system can infer the locations of the remaining fingers, whether by interpolation or by extrapolation or both. The hand calibration is most reliable when the locations are for the end-of-series fingers and the intervening fingers are interpolated.

Assume the ideal case that the finger identities are for the end-of-series fingers of the full non-thumb series. The end-of-series locations are sufficient to specify the spacing and orientation of the hand calibration, but they are not sufficient to specify whether the hand calibration is for the left or right hand or to distinguish the forward or backward directions of finger movement. The most straightforward way to distinguish the forward and backward directions is to either hardcode the distinctions or to receive the information from the touch device. Most smartphones and tablets automatically reorient top and bottom as the user orients the device, so it is reasonable for the gesture system to designate the forward and backward directions as the device indicates. When top and bottom are known for a device, so are left and right.

On devices for which left and right are known, the calibration gesture can indicate whether it is for the left or right hand via an asymmetry in the gesture. One such calibration gesture is the "hand selection slide." To perform a hand selection slide, the user places on the gesture surface the two fingers that the calibration gesture requires and moves them as a unit a distance in a direction. The direction that the fingers move indicates whether it is for the left or right hand. For example, moving left might indicate the a hand calibration for left hand and moving right might indicate a hand calibration for the right hand. In order to allow this gesture to be performed on top of an input area that allows sweeps, either the gesture system must not recognize two-fingered sweeps directed left or right, or the fingers of the hand selection slide must be spaced apart at least a certain distance greater than the distance that the gesture system allows for the fingers of a sweep. Otherwise the calibration gesture might be interpreted as a sweep, or vice versa.

Another way to indicate the left or right hand is determine it from the last of the two fingers to touch. For example, if the finger on the left is the last finger to touch, the hand calibration could be for the right hand, and it could be for the left hand otherwise. However, a gesture that only involves touching two fingers without moving them is hard to distinguish from accidental touches or intentional attempts to select user interface components.

7.11.3 The Drumming Gesture

A more general and more natural gesture that uses the order in which fingers touch is called "drumming." To perform a drumming gesture—to "drum"—the user strives to touch each finger of the full non-thumb series to the gesture surface, while being sure that a finger near a designated end of the series is among the first or last fingers to touch, depending on the calibrating system. The calibrating system establishes a correspondence series for the fingers according to the relative positions of the finger touches. For example, if the last finger to touch must be closer to the index finger than the pinky finger, the user strives to drum the fingers starting with the pinky finger and ending with the index finger, and the last finger identifies the index finger and hence all of the remaining fingers according to their locations relative to the index finger. The touch locations may also serve as rest locations for the fingers in a hand calibration.

7.11.3.1 Recognizing Drumming

The calibrating system recognizes a drumming gesture by attempting to interpret a hand calibration from a series of finger touches that could be a drumming gesture. The calibrating system detects a sequence of finger touches, attempts to order them into a series according to their relative locations on the gesture surface, and attempts to identify one of the end-of-series fingers as having a particular finger identity based on the temporal order in which the fingers touched. Having an order for the finger touches and having the identity of a finger at one end of the series together establishes the finger identities for the remaining finger touches, therefore establishing a correspondence series for the finger touches and their fingers. A drumming gesture can span multiple facets, as long as the relative placement of the facets is known so that a correspondence series can be established.

Assume that the last finger to touch identifies the end-of-series finger nearest to it. For example, the last finger to touch may indicate that the nearest end-of-series finger to it is the index finger. The last finger to touch may even identify itself as the index finger. The user drums the fingers starting with fingers near the pinky finger and ending with fingers near the index finger. This information is not sufficient to indicate whether the user drummed with the left hand or the right hand, but given a left-and-right sense for the gesture surface, the order determined for the finger identities does indicate the hand used and hence which hand is being calibrated.

When the gesture surface has designated left and right sides and the left-to-right direction is parallel to a coordinate axis, the most straightforward way to determine an order for the correspondence series is to sort touch locations of the fingers by their coordinate values for that axis. This approach works when the knuckles of the hand are parallel or nearly parallel with this axis, but consider that when holding a tablet with the left hand, one orients the tablet relative to one's eyes and body, placing the right hand at rest on the tablet with the knuckles at an angle relative to the edge of the tablet. In this orientation, the hand is presumably at an angle relative to the left-to-right axis. Assuming that the left-to-right axis is the x-axis, adjacent fingers need not have sequential x-coordinate values if the fingers are not touching at locations along a straight line, such as when some fingers are positioned ahead of others. Hence, while it is sometimes possible to sort the fingers into a series strictly by a coordinate value, the approach is not very reliable.

A more reliable approach to ordering the fingers into a series sorts the fingers by the relative distances between their touch locations. Under this approach, the calibrating system calculates the distance between the touch locations of every two fingers of the drumming gesture. The pair of fingers that are farthest apart are designated the end-of-series fingers. The calibrating system chooses one of the end-of-series fingers, and the remaining fingers are sorted in the series according to their distances from the designated end-of-series finger, with the fingers nearer to the designated finger being sorted nearer in the series to the designated finger.

Once the fingers have been ordered into a series, the calibrating system assigns them finger identities. Assume that the finger identities are assigned according to the last finger to touch. When there are only three fingers in the series, an end-of-series finger must be the last to touch because the middle of the three is not nearer to one end of the series, according to the order of fingers within the series. When there are four fingers in the series, any finger can be the last to touch because each finger is closer to one end of the series. The finger that is last to touch indicates its near end of the series. The nearness of a finger to an end-of-series finger can be expressed in terms of the number of fingers within the series between the finger and the end-of-series finger, where a number of fingers equal to zero indicates that the finger is one of the end-of-series fingers. The gesture system designates the nearest end-of-series finger as representing a particular finger identity and assigns finger identities to the remaining fingers of the series in finger identity order. For example, the gesture system may require that the user drum four fingers so that the last finger to touch is closer to the index finger than the pinky finger. When the user drums the fingers, the last finger to touch then identifies the end-of-series finger nearest to it in the series as the index finger. When the last finger to touch is an end-of-series finger, the end-of-series finger "closest" to it is itself. Once the index finger is assigned, the remaining fingers are assigned in order as the middle finger, the ring finger, and the pinky finger. The series is now a correspondence series.

A number of options are available to the drumming gesture. It is an option for the calibrating system to instead identify an end-of-series finger from the first finger to touch, from the second finger to touch, or from the second-to-last finger to touch. The finger that identifies the end-of-series finger is called the "indicator finger." The calibrating system may also require combinations of the touches to occur in a particular order before recognizing the gesture as a valid drumming gesture, such as requiring all of the fingers of the correspondence series to touch in the order of their associated finger identities. This latter constraint maximizes the probability that the calibrating system recognizes a drumming gesture with finger identities in the order that the user intended, but the constraint is onerous and slows the user's performance of the gesture. A more pragmatic way for the calibrating system to ensure that it has received the intended drumming gesture is to require that the indicator finger be an end-of-series finger. In this case, finger identities are determined according to either the first finger or the last finger to touch during the drumming gesture. Using the last finger to touch, whether or not it is an end-of-series finger, is a good compromise between accurately detecting the drumming gesture and giving the user some room to error in the process of attempting to make the last finger an end-of-series finger. The inventor has also found it most natural to drum starting on the pinky finger side and ending on the index finger side.

Once the correspondence series is determined, the calibrating system can identify the drumming hand as either the left hand or the right hand. The most reliable approach to identifying the hand assumes that the gesture surface has designated left and right sides. In this case, there is a leftmost end-of-series finger and a rightmost end-of-series finger. If the leftmost end-of-series finger identity is nearer to (or identical to) the pinky finger than the rightmost finger, the hand is the left hand. If the leftmost end-of-series finger identity is nearer to (or identical) to the thumb than the rightmost finger, the hand is the right hand. For example, if the gesture system uses four gesturing fingers and the leftmost end-of-series finger is the index finger, the hand is the right hand.

If the gesture surface does not have designated left and right sides, then absent additional information, the calibrating system does not know which direction on the gesture surface the hand is facing. A left hand drumming on the gesture surface may be indistinguishable from a right hand drumming with fingers aimed in the opposite direction. One possible way to identify the hand under these circumstances is to assume that fingers central on the hand touch at locations more in the forward direction than the end-of-series fingers. This distinguishes the forward and backward directions of finger movement. This information together with the order of the finger identities determines the left or the right hand. For example, if the forward direction is in the direction of the negative y-axis and relative to this forward direction the rightmost end-of-series finger identity is the index finger, then the hand is the left hand. A simple way to determine the forward direction for a series of fingers is to count the finger touches on each side of a line that coincides with locations of the end-of-series fingers. The side of the line with the most touches represents the forward direction. However, this approach is unreliable in gestures systems that support gesture direction because in these systems the ideal finger mapping posture places all of the fingers along a line, perhaps inclining the user to drum the fingers roughly along a line.

The calibrating system recognizes a drumming gesture when both (a) the number of fingers touching is at least the required number of drumming fingers and (b) a subset of the fingers that are touching satisfies the constraints of the drumming gesture. When the constraints are lax such that fingers touching in any order can indicate a drumming gesture for one of the hands, the drumming gesture is likely incompatible with other gestures having an equal number of finger touches. Lax constraints can also preclude an anchor finger from touching during the drumming gesture. In particular, the user may want to provide a thumb anchor with the drumming gesture in order to reliably anchor the hand to the finger map that results from the drumming gesture. Constraints are not needed to allow an anchor thumb to touch after the drumming gesture has completed, but constraints are needed to allow the thumb to touch immediately prior to the gesture or during the gesture. The following two constraints are together sufficient to allow the thumb to touch either (a) immediately prior to the gesture or (b) after the first finger of the drumming gesture touches but before the second finger of the drumming gesture does:

1) The end-of-series fingers of the correspondence series cannot be immediately sequential in time. More specifically, a finger of the correspondence series must touch after the finger at one end of the correspondence series and before the finger at the other end.
2) The first and last fingers of the correspondence series to touch must be on opposite sides of the correspondence series. Hence, if there are only three fingers in the series, they must touch in order, and if there are four fingers in the series, the first and last fingers to touch cannot be adjacent if either of them is an end-of-series finger.

These constraints also allow the calibrating system to properly recognize the drumming gesture for most of the combinations of finger touches when the thumb touches after the second finger of the drumming gesture to touch but before the third finger to touch. These constraints together eliminate some combinations of finger touches that might otherwise be recognized as drumming gestures, but these other combinations are unlikely. It may actually benefit the user to enforce the above constraints regardless of whether there is a need to support a thumb anchor, in order to reduce the incidence of improperly recognizing drumming gestures. Note that these constraints are independent of the particular finger that the calibrating system uses to determine an end-of-series finger identity for the purpose of assigning finger identities.

It may also be important for the calibrating system to distinguish the drumming gesture from finger mapped gestures. If none of the fingers of the drumming gesture is allowed to exceed a gesturing threshold, or if the drumming gesture requires more fingers than are allowed in a sweep gesture, the drumming gesture can be performed without conflict on top of an existing finger map as a way of recalibrating and repositioning the finger map.

Once the calibrating system has finger identities for the drumming fingers, it can assign rest locations to the finger identities. The assignment that is most adapted to the user's hand is to set the rest location for a finger identity to a location of the finger having that finger identity in the drumming gesture. FIGS. 46A-46F, explained previously, illustrate ways to assign rest locations with fewer fingers, such as by extrapolating or interpolating from two fingers. The gesture system creates a finger map from these rest locations, thus calibrating the finger map.

Figure 48:
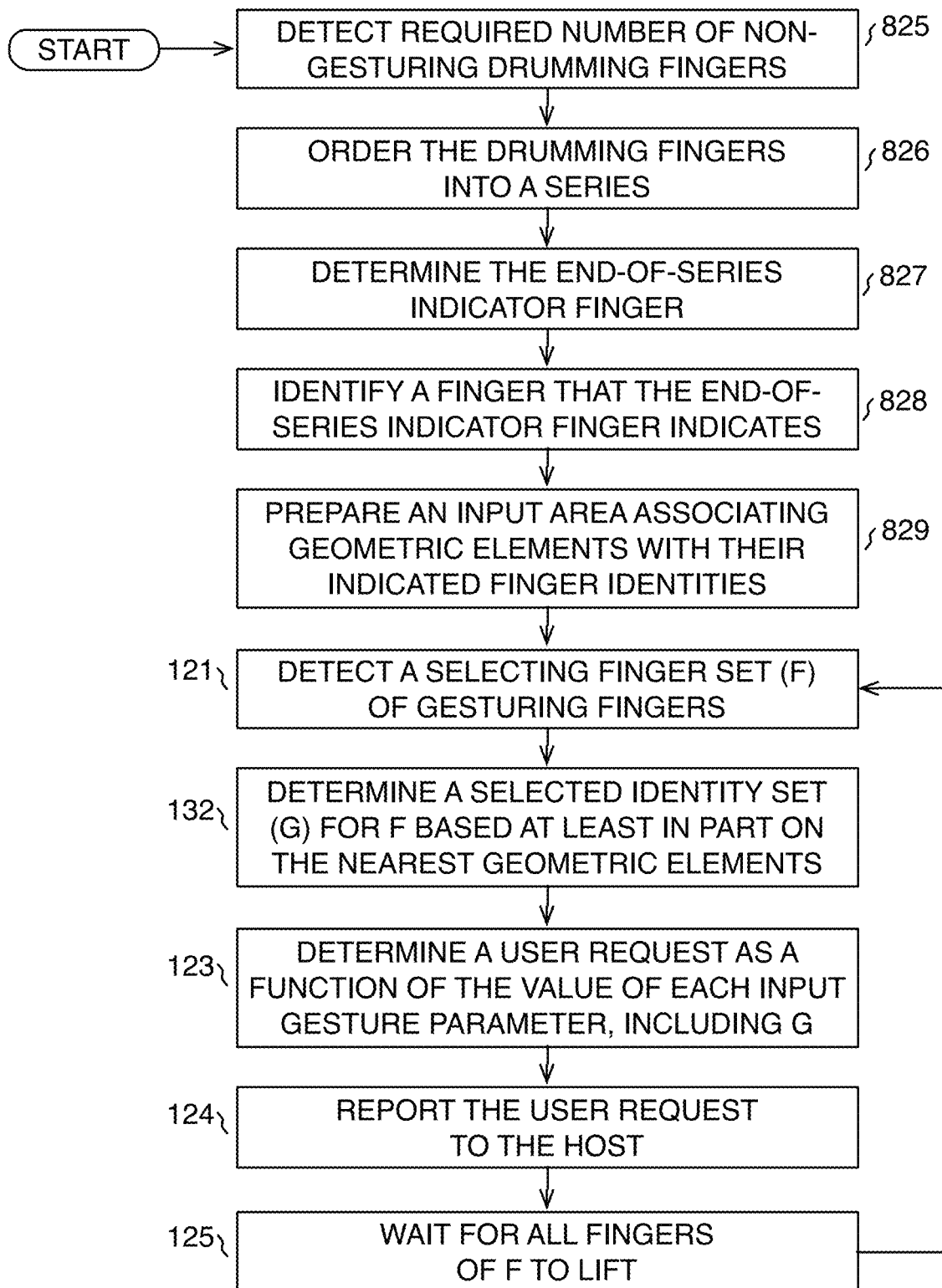
FIG. 48 depicts the general process for receiving drumming gestures to calibrate an input area for finger-mapped gesturing.

FIG. 48 illustrates the steps for processing a drumming calibration gesture in the context of receiving finger-mapped gestures. In step 825, the calibrating system first detects the required number of drumming fingers. If the drumming is being performed on top of an existing finger map, the gesture system may distinguish drumming fingers from fingers of a selecting finger set by ensuring that drumming fingers are not gesturing. In step 826, the drumming fingers are ordered into a series according to the relative positions of their touch locations. The calibrating system requires that the user indicate the sense of the hand by completing the drumming either closer to the index finger or to the pinky finger. The sense of the hand is determined according to an indicator finger, such as the first finger to touch or the last finger to touch. The calibrating system determines the indicator finger in step 827. In step 828, the indicator finger establishes the finger identities of the end-of-series fingers nearest and farthest from it; identifying one end-of-series finger implicitly identifies the other, so this is equivalent to identifying one of the end-of-series fingers. This information allows the gesture system to associate each drumming finger with a finger identity. Finally, in step 829, the calibrating system prepares an input area of geometric elements that are spaced so that the drumming fingers have each touched its own input region, with each geometric element corresponding to the finger identity associated with the drumming finger that touched its input region. The gesture system may subsequently receive gestures on this finger map.

7.11.3.2 Examples of Drumming

Figure 49A:
FIGS. 49A-49H depict a sequence for one scenario of establishing a finger map using the drumming calibration gesture.
Figure 49E:
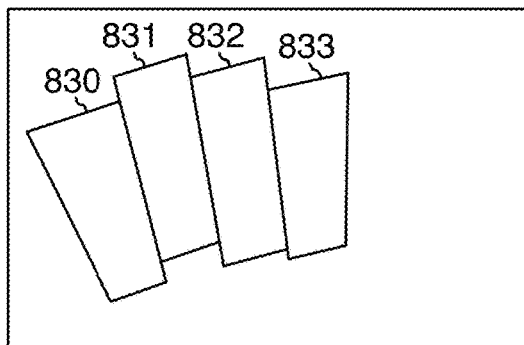
Figure 49B:
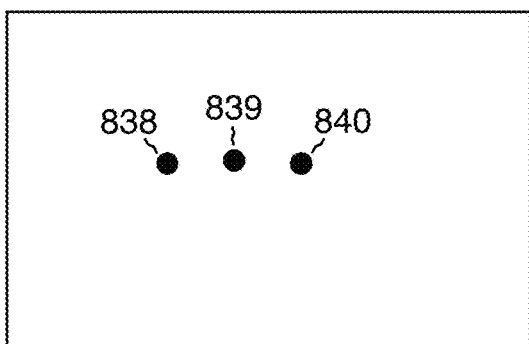
Figure 49F:
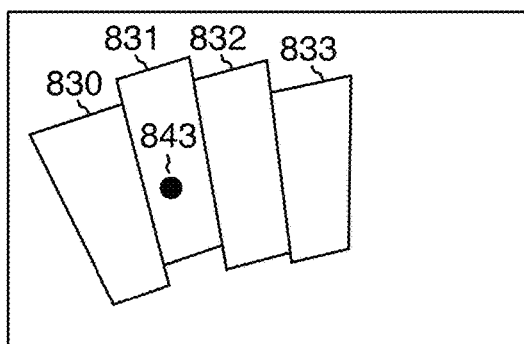
Figure 49C:
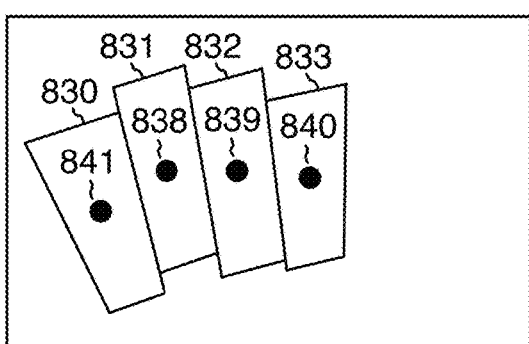
Figure 49G:
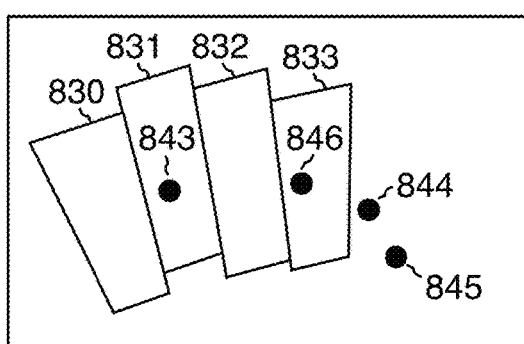
Figure 49D:
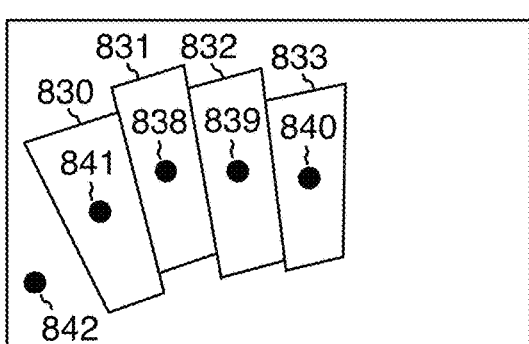
Figure 49H:
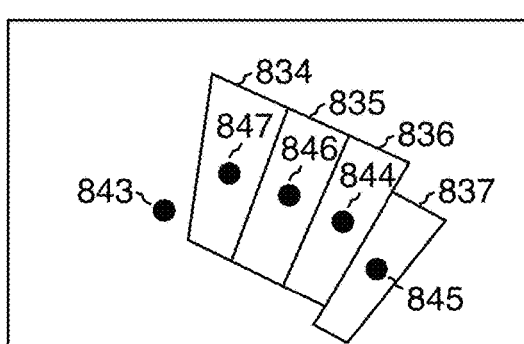

FIGS. 49A-49H illustrate two examples of inputting the drumming gesture with four fingers on a gesture surface having left and right sides, where the last finger to touch must be the index finger. Each of the eight figures depicts the gesture surface of a touch device. Dots 838-847 represent the locations of finger touches, numbered in the order in which fingers touch the locations except as otherwise described. Assume that the x-axis is the horizontal and increases from left to right. The gesture surface starts as shown in FIG. 49A, with no finger map being active yet. In FIG. 49B, three fingers touch the gesture surface in any order at locations 838-840. In FIG. 49C, a fourth finger touches the gesture surface at location 841. Among all the locations 838-841, the distance between locations 840 and 841 is greatest, making the fingers at these locations end-of-series fingers. The finger at location 841 is therefore an end-of-series finger that was last to touch to one side of three other fingers, making the gesture a drumming gesture. Because location 841 has a lower x-coordinate value than location 840, it is to the left of the other fingers, making it the index finger of the right hand. The drumming gesture therefore specified a hand calibration for the right hand. Had location 841 landed to the right of locations 838-840, the drumming gesture would have specified a hand calibration for the left hand. The host allocates a surface allocation to the gesture system, which generates the depicted finger map of regions 830-833. The finger map depicts each finger location 838-841 as a rest location centered in its associated input region 830-833 and is now available for gesture input. The drumming gesture only provides the rest locations 838-841 for fingers in the hand calibration; the shapes and forward directions of the input regions 830-833 are borrowed from information provided by a previous hand calibration. In FIG. 49D, the right thumb touches at point 842 with no effect, because this system calibrates after four fingers have touched, making the calibration complete prior to the thumb touching.

The second example of drumming in this sequence begins with FIG. 49E. The fingers that produced the finger map have lifted, but the finger map remains behind as input regions 830-833 and is available for finger-mapped gesturing. In FIG. 49F, a finger touches at location 843. This finger happens to be the right thumb, but the calibrating system does not know this yet. Fingers 844, 845, and 846 touch in FIG. 49G, some on the finger map, some off, in any order, except that the rightmost finger at location 845 is not the last to touch. Had location 845 been the last to touch, the gesture would have indicated a hand calibration for the left hand analogously to the right hand gesture of FIG. 49C. Because a finger between the farthest separated locations was the last to touch, the gesture monitor does not yet recognize a gesture. However, in FIG. 49H, a fifth finger touches at location 847. This finger is an end-of-series finger of the group of four fingers at locations 844-847 and is farthest from location 845 in the group, with three fingers on one side of it in the series. The calibrating system therefore concludes that the gesture is a drumming gesture. Because the x-coordinate of location 847 is less than that of location 845, the gesture again specifies a hand calibration for the right hand. The calibrating system terminates the gesture session of the previous finger map and starts a new gesture session for the new hand calibration using a new finger map with input regions 834-837. The new finger map has a new orientation, a new position, and a slightly smaller size than the previous finger map. In addition, the rest locations are in slightly different relative positions, changing the shapes and positions of the input regions 834-837. Five fingers were input by the time the four-finger drumming gesture was recognized, so the finger at location 843 is assumed to be the thumb and remains ignored.

Figure 50A:
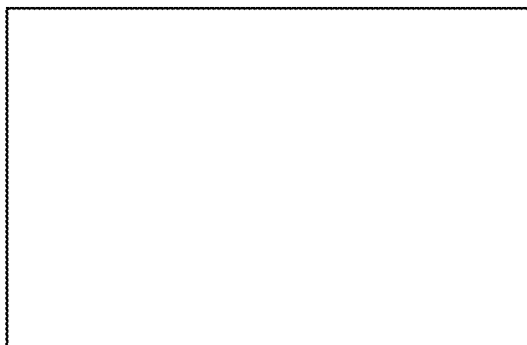
FIGS. 50A-50H depict a sequence for another scenario of establishing a finger map using the drumming calibration gesture.
Figure 50E:
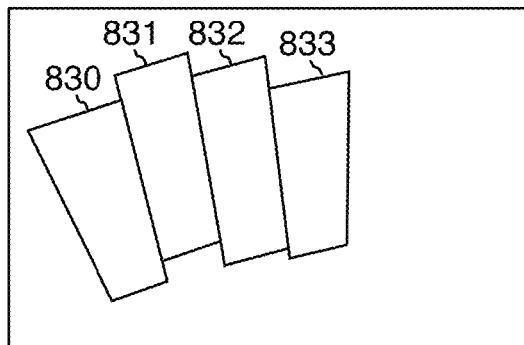
Figure 50B:
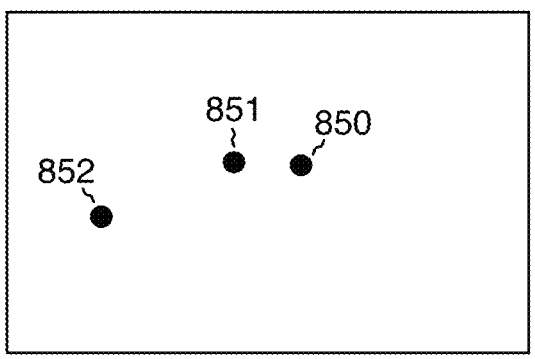
Figure 50F:
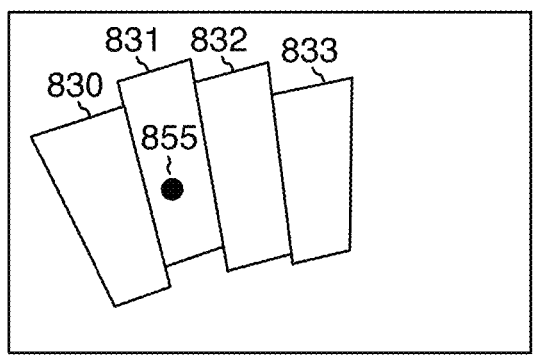

FIGS. 50A-50H also illustrate two examples of using the drumming gesture with four fingers on a gesture surface with left and right sides, but in these examples, the last finger to touch must be either the index finger or the middle finger. Moreover, the first and last fingers to touch must be on opposite sides of the correspondence series. The locations touched 850-859 are the same as those in FIG. 49A-49H, but they touch in a different order and are numbered accordingly. The gesture surface again starts without a finger map, as illustrated in FIG. 50A. In FIG. 50B, three fingers touch the gesture surface in any order at locations 850-852. By FIG. 50C, four fingers have touched in series. The last finger touched at location 853, thereby indicating that the end-of-series finger nearest to it is the index finger. That nearest finger has location 852. The fingers at locations 853, 851, and 850 are therefore designated the middle, ring, and pinky fingers, respectively, and the hand is again designated the right hand. The drumming gesture is now complete, and a finger map with regions 830-833 is available for use.

Figure 50C:
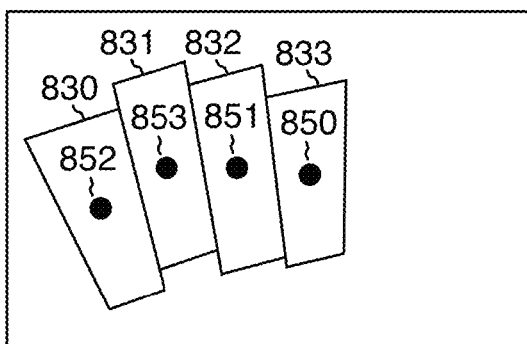
Figure 50G:
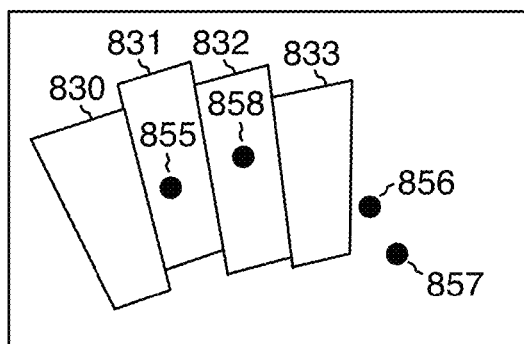
Figure 50D:
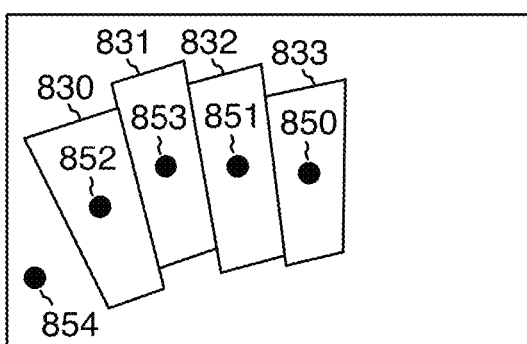
Figure 50H:
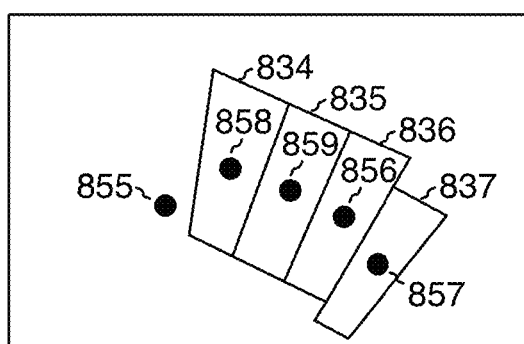

While the finger map of FIG. 50C is in place, the thumb touches at location 854 in FIG. 50D. The finger map remains unchanged. However, the thumb lifts in FIG. 50E and touches at location 855 in FIG. 50F. Additional fingers proceed to touch at locations 856-858. By FIG. 50G, four fingers are touching, with the finger at location 858 designating the finger at location 855 as an end-of-series finger. The calibrating system orders the fingers into a series, but it finds that the first finger to touch (at location 855) and the last finger to touch (at location 858) are on the same side of the series, so the calibrating system declines to recognize a drumming gesture yet. In FIG. 50H, another finger touches at location 859. The number of fingers touching is at least the minimum required of a drumming gesture, so the calibrating system again attempts to recognize a drumming gesture. Two correspondence series are possible, one for the fingers at locations 855, 858, 859, and 856, and one for the fingers at locations 858, 859, 856, and 857. The former series does not satisfy the drumming constraint, but the latter series does. The calibrating system therefore recognizes the latter series as having performed a drumming gesture.

7.11.4 The Squeeze Gesture

If the device does not indicate left and right, or if the user is to be allowed to specify hand calibrations at arbitrary orientations, the calibrating system must receive additional input that specifies a direction indicating which way is left or right, top or bottom. Normally this entails asking the user to do something extra. For example, the fingers could drum to indicate the left or right hand, and then before lifting, drag all at once in the same direction to indicate the forward direction. This gesture is cumbersome by virtue of requiring two distinct steps. In an ideal gesture, the user should be able to approach a touch device from an arbitrary angle and specify a hand calibration in a gesture with a single motion that amounts to little more than touching the gesture surface. Fortunately, there is such a gesture: the "squeeze" calibration gesture. The squeeze gesture is a natural way to provide all of the information necessary for specifying a hand calibration on arbitrary gesture surfaces. In particular, it provides a "hand distinction" to distinguish the left and right hands and enables the calibrating system to determine finger identities and finger forward directions.

7.11.4.1 Recognizing a Squeeze

A user performs a squeeze gesture by placing the thumb and non-thumb fingers on the gesture surface, placing them in any temporal order, but placing them so that the hand is slightly open. The non-thumb fingers are slightly more apart from the thumb than one would have them for drumming. The squeeze gesture should include each finger that can participate in a finger-mapped gesture. The user then performs a quick, short squeezing action with the touching fingers while they touch, bringing the non-thumb fingers closer to the thumb and the thumb closer to the non-thumb fingers, although not necessarily moving thumb and non-thumb fingers directly towards each other. The user finishes the squeezing action with the fingers at their preferred rest locations. This gesture feels like a single squeezing motion that just happens to be done while touching the gesture surface, as if gently grabbing something insubstantial.

Figures 52A, 52B:
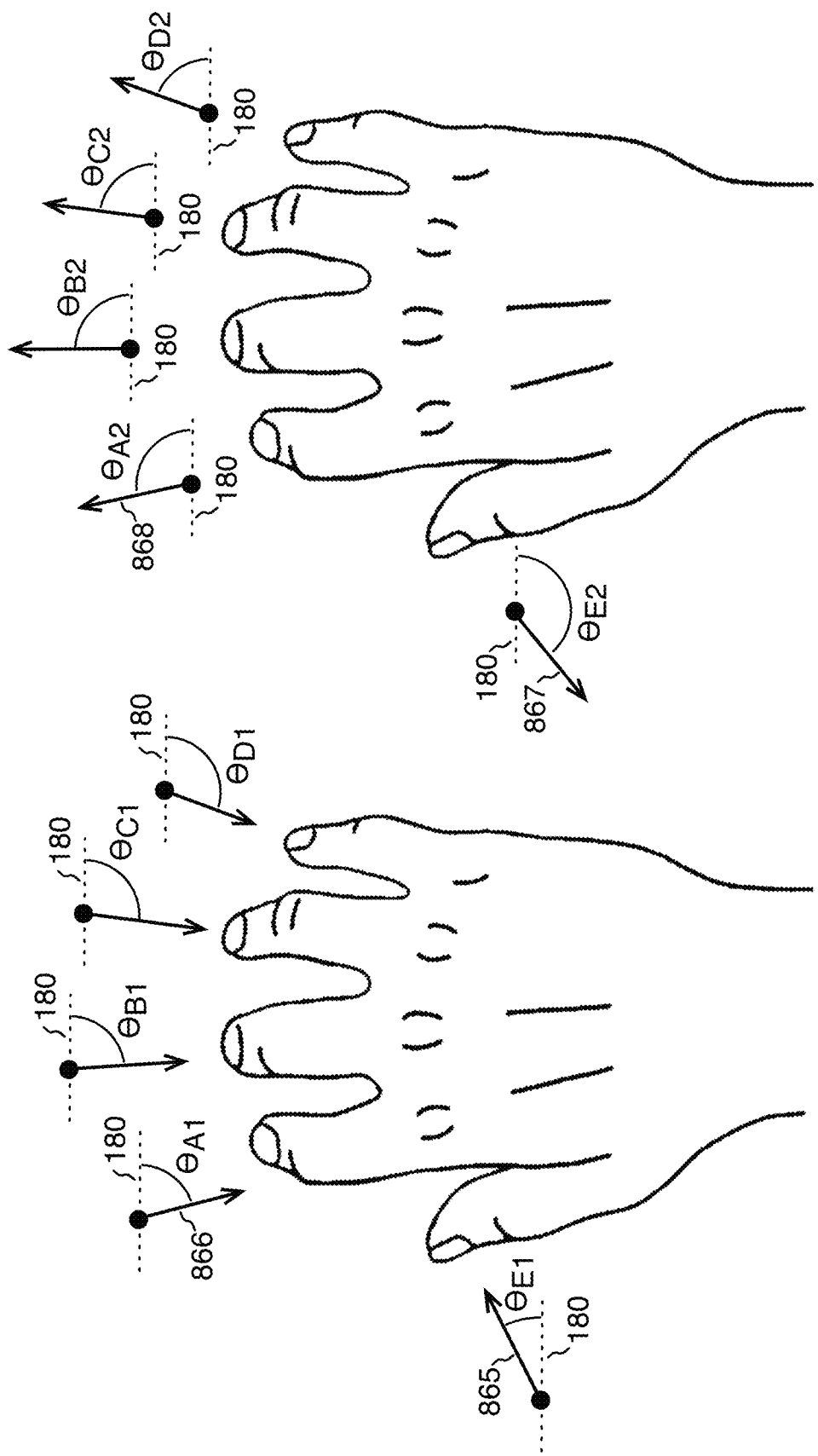
FIGS. 52A-52B depict hands performing squeeze calibration gestures.

FIG. 52A shows a hand performing a squeeze gesture, with arrows (e.g. arrows 865-866) exemplifying the directions in which the fingers may move. The direction angles of adjacent non-thumb fingers are roughly parallel. In the figure, these are angles $\theta_{A1}$, $\theta_{B1}$, $\theta_{C1}$, and $\theta_{D1}$. The direction angle of the thumb $\theta_{E1}$ can reasonably be expected to differ from the direction angles of the other fingers by at least $\pi/3$ radians by class equivalence. A calibrating system that detects five fingers gesturing in this arrangement can reasonably assume that the gesture is a squeeze gesture. It is possible that the user may not move some of the fingers enough during the gesture for them to be considered intentionally moving. It is also possible that the user will fail to touch some of the fingers during the gesture. As long as the thumb is not among the missing fingers, the calibrating system may still be able to identify the gesture as a squeeze. It is sufficient to register three fingers moving in this arrangement, provided that at least one of the fingers is the thumb. Even so, the more fingers registered as moving, the more accurately the gesture is detected, and it may be unintuitive for a user to perform the squeeze gesture without involving all of the fingers of a hand anyway. It is also possible to perform a squeeze gesture on multi-faceted devices, and most readily on two-faceted devices, such as those of FIGS. 4A-4D. To reliably identify a gesture that spans device facets, the calibrating system should know the relative positions of the facets.

The squeeze gesture involves fingers moving over a distance, so the calibrating system should employ a gesturing threshold to distinguish accidental finger movement from intentional finger movement. In order to distinguish the squeeze from other gestures, the calibrating system should establish a minimum number of fingers that must simultaneously touch the gesture surface after having exceeded a gesturing threshold. After the calibrating system detects these fingers, the user signals completion of the squeeze gesture in any of myriad possible ways. For example, the user can signal completion by lifting at least one of the gesturing fingers, by subsequently tapping at least one of the gesturing fingers, or by holding the gesturing fingers relatively stationary for a timeout period, with none of the fingers travelling more than a maximum distance during this period. Upon detecting the completion of the squeeze gesture, the calibrating system has a "start location" and an "end location" for each finger. A finger's start location is a location representative of the start of the gesture, such as the finger's initial touch location, such as the location at which the finger began gesturing, or such as the location that the finger had the instant when all of the fingers of the gesture were first detected to be simultaneously touching the gesture surface. A finger's end location is a location representative of the end of the gesture, such as the location of the finger at the time the gesture completed. For example, FIG. 53B depicts the actions of fingers inputting a squeeze gesture, with locations 875-879 depicting finger start locations and locations 880-884 depicting finger end locations.

If the calibrating system does not recognize any other gestures involving the number of fingers required for the squeeze gesture, it can recognize the squeeze gesture by the number of fingers alone. However, it is best to look for additional characteristics of the squeeze gesture anyway, in order to eliminate accidental user input or improper squeeze gestures that would yield an incorrect hand calibration. The most basic characteristic of the squeeze gesture is that it involves a thumb and a correspondence series of non-thumb fingers. If the thumb can reasonably be distinguished from a series of other fingers, the gesture likely consists of the fingers of a single hand. The following are some techniques for distinguishing the thumb:

1) The calibrating system produces a sum for each gesturing finger by adding up all the distances between that finger's start location and the start locations for the other gesturing fingers. The finger with the greatest sum can be identified as the thumb. To confirm that this finger is the thumb, its sum can be tested to ensure that it is greater than the next greatest sum by at least a certain percentage. Alternatively, the sum can be greater than the average of the sums of the remaining fingers. The thumb can also be identified from the end locations of the fingers or from some combination of start and end locations, but because the fingers are farthest apart at the start locations, with the thumb well separated from the index finger, the start locations are the most reliable.

2) The thumb can be identified as the finger having the greatest distance from any adjacent finger, according to the start locations. To confirm that this finger is the thumb, the distances between adjacent fingers can be compared, and the thumb can be required to have an adjacent distance that is greater than the adjacent distances between other fingers by at least a certain percentage. It is also an option to compare the adjacent distance of a potential thumb to the average of the adjacent distances for the remaining fingers.

3) The thumb can also be identified as the outlier finger after finding a best fit to a line for a number of finger locations equal to one less than the number of gesturing fingers. The calibrating system can use either start locations or end locations. Start locations benefit reliability because the thumb is farther from the other fingers, but end locations also benefit reliability because the non-thumb fingers tend to line up at the end of the squeeze. To confirm that the finger is a thumb, the potential thumb can be tested for a distance from the fitted line that is greater than the maximum or average distance of the remaining fingers to the fitted line. Comparisons can also be made with a standard deviation.

4) Yet another way to identify the thumb is to assume that the distance vectors of the non-thumb fingers can be ordered into a series for which adjacent distance vectors have angles differing by less than $\pi/4$ radians, $\pi/6$ radians, or some other suitably small angle. After identifying the non-thumb fingers, the remaining finger is the thumb. To increase confidence that the resulting finger is the thumb, the calibrating system can require that the angle for the distance vector of the potential thumb be different from the distance vector angles of the remaining fingers by at least a certain amount by class equivalence. $\pi/3$ radians is a reasonable minimum difference.

If the host provides a finger identity for the thumb, the calibrating system does not need to perform any of the above tests. If the host does not identify the thumb but the calibrating system is aware that it has received a valid squeeze gesture, the calibrating system can still employ any of these techniques for distinguishing the thumb from the remaining fingers, even if it does not test to confirm the presence of the thumb. It is also possible to identify the thumb from a combination of the above procedures or from like procedures. Determining that a thumb is present with the proper number of fingers increases confidence that the gesture is a squeeze gesture.

The calibrating system can also increase confidence that it has received a squeeze gesture by checking the non-thumb fingers to see whether they can be ordered into a series according to locations for the fingers during the gesture. The calibrating system can also confirm that the thumb moves towards the hand during the squeeze gesture instead of away from the hand. The location of the hand can be given by a "hand location." The hand location is any location that represents the position of the palm or the series of non-thumb fingers. It can be a location for any non-thumb finger, but if the hand location is too close to the thumb, the test may be uninformative or provide a false result. It's better to use a location for a finger that is at a distance from the thumb or to use an average of locations for several non-thumb fingers. If the thumb's end location is closer to the hand location than the thumb's start location, the thumb has moved towards the hand.

7.11.4.2 Squeeze Calibration

A user performs a squeeze gesture in order to input a hand calibration. In particular, the squeeze gesture can identify the fingers, establish finger rest locations, determine a forward direction for each finger, and indicate the left or right hand. A value that identifies the left hand or the right hand is called a "left/right hand identity." The values determined for the hand calibration from a squeeze gesture depend on the requirements of the calibrating system.

At a minimum, the hand calibration depends on identifying one of the fingers as the thumb. If the host does not directly identify the thumb, the calibrating system can identify the thumb via one of the techniques described above for recognizing a squeeze gesture. The hand calibration may also require finger identities for the non-thumb fingers. If these identities are not given, the calibrating system can identify the index finger as the finger nearest to the thumb according to the finger start locations. Even if the squeeze gesture does not employ an index finger, it suffices to identify the finger nearest the thumb as the index finger for purposes of this discussion. The index finger can also be identified from the finger end locations, but the identification is most reliable from start locations. The calibrating system sorts the non-thumb fingers into a series by their distances from the index finger or thumb, according to either their start or end locations, placing the index finger first in the series. The end locations may be more reliable for determining the order of the fingers because the squeezing action brings the fingers more in line.

Once the finger identities are known, the calibrating system can associate rest locations with the finger identities, such as by assigning the rest location for a finger identity to the end location for the finger having that identity. It is also an option to set the rest location of a finger to the midpoint between the finger's start and end locations, or even to designate a vector for the path of each finger of the squeeze gesture as a channel line segment. As previously explained for FIGS. 46A-46F, the calibrating system can also infer rest locations using fewer finger locations than finger identities.

In addition, the calibrating system can assign forward directions to each of the fingers. Being adjacent on a hand, the non-thumb fingers should all have travelled approximately in the same direction. Each non-thumb finger can be assigned a direction angle equaling the angle of the vector that starts at the finger's start location and ends at the finger's end location. These angles each indicate a backward direction for the finger, and the direction angle $\pi$ radians different from each backward direction provides a forward angle for the finger, indicating its forward direction. The calibrating system can include these forward angles in the hand calibration.

A squeeze gesture can also specify the orientation of the hand. One model for specifying the orientation is based on the observation that a hand can be oriented in a particular direction on a tablet so that the fingers generally extend towards a specified "top" of the tablet. An analogous "top" direction for a squeeze gesture is called a "general direction of finger extension." There are multiple ways to select a general direction of finger extension. The forward angle of any non-thumb finger is a direction of finger extension for the hand and hence an estimate for the general direction of finger extension for the hand as a whole. The nearest average of the forward angles of the non-thumb fingers provides a more representative general direction for finger extension. It is not actually necessary to employ forward directions to estimate a general direction of finger extension for the hand, though. The user could be required to touch the thumb on one side of a line that a set of non-thumb finger locations approximate, and the direction of finger extension could then be the direction from the thumb location to any point on the line, such as the nearest point. An angle for the general direction of finger extension is called a "general extension angle."

The hand calibration may optionally include a left/right hand identity as well. There are several ways to make this determination, depending on the constraints of the calibrating system, but it can be done from the relative location of the thumb. A thumb that occurs to the left or right of a hand, according to a general extension angle, belongs to the right hand or the left hand, respectively. The hand identity can be determined by whether a location for the thumb occurs to the left or the right of a "general extension line." This is a line that has an angle equal to the general extension angle and that passes through a hand location. The general extension angle indicates the forward direction for purposes of determining which side is left and which side is right.

It is possible to mathematically determine the left/right hand identity. Imagine that the general extension line splits the plane of the gesture surface into two half-planes. The thumb ends up in the left half-plane or in the right half-plane, thus indicating the right or left hand, respectively. The "thumb vector" is the vector from a chosen hand location to a location for the thumb. The left or right identity of the hand can be determined by rotating the plane of the gesture surface around the chosen hand location through an angle equal to the negative of the general extension angle. The direction angle of the rotated thumb vector is now class equivalent to the subtraction of the general extension angle from the thumb vector's original direction angle. If the direction angle of the rotated thumb vector is negative, the hand is the left hand. Otherwise the hand is the right hand.

Figure 53A:
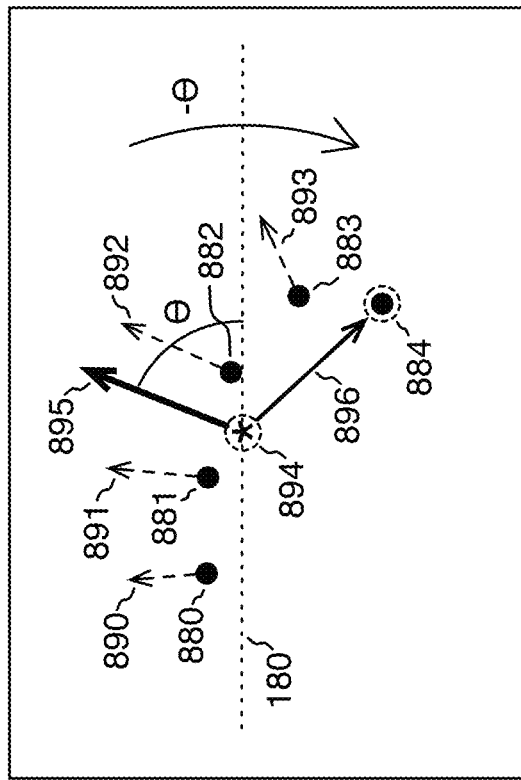
FIGS. 53A-53D depict the determination of a hand calibration from a squeeze calibration gesture.
Figure 53C:
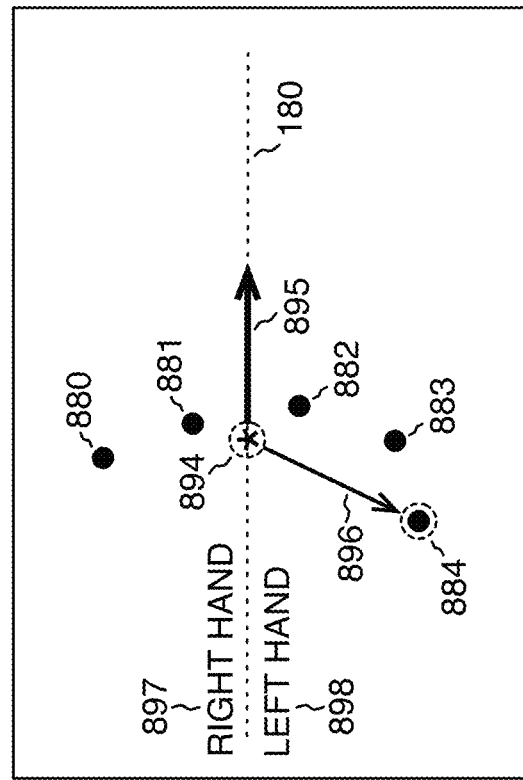
Figure 53B:
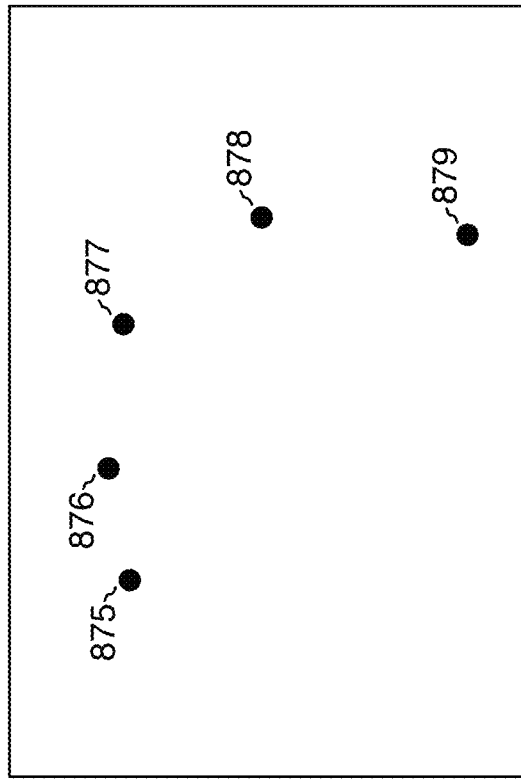
Figure 53D:
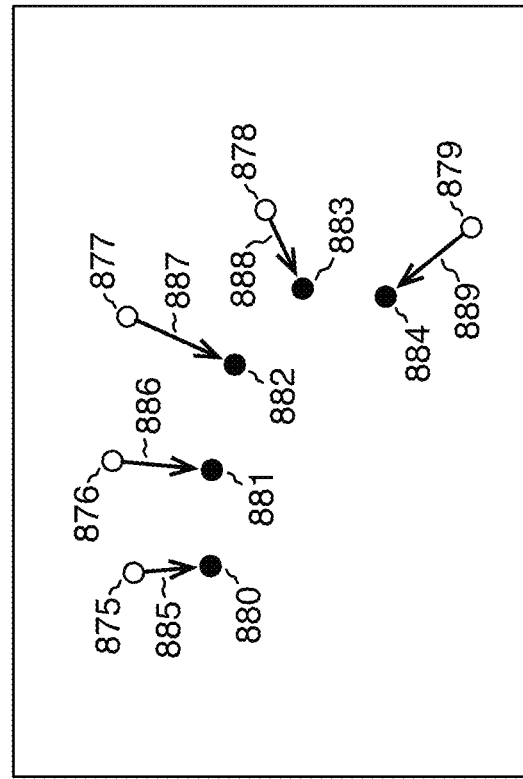
Figure 55C:
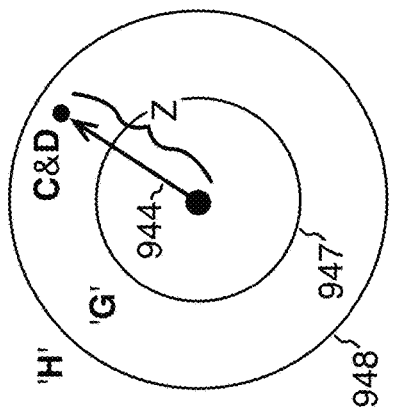
FIGS. 55A-55C depict evaluations of a stroke and a sweep performed on a divided finger map, potentially multiple facets, with all input regions in one division being calibrated.
Figure 55B:
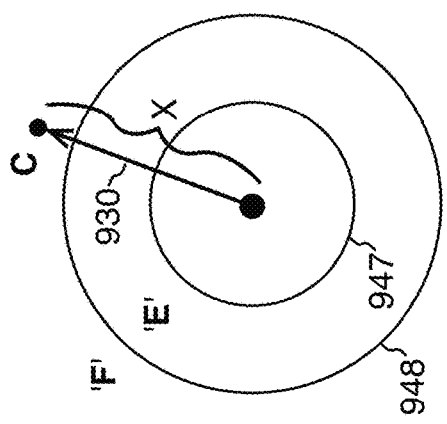

FIGS. 53A-53D illustrate a process for determining a hand calibration from a squeeze gesture. In FIG. 53A, five fingers have touched the gesture surface at locations 875-879. In FIG. 53B, these fingers each move to new locations 880-884, respectively. Assume that the gesture completes at this point. The arrows 885-889 indicate the backward directions for each finger. If the host does not provide finger identities for the fingers, the gesture system does so by first identifying the thumb by any of the various methods. These methods indicate that the finger at location 884 is the thumb. The fingers at locations 880-883 are then identified according to their relative distances from the thumb 884. FIG. 53C depicts properties derived from the squeeze gesture. It shows the thumb at location 884 as a circled dot. The dashed arrows 890-893 point in the reverse direction of the backward direction arrows 885-888, indicating the finger forward directions. The dotted line 180 indicates the horizontal, and the circled asterisk 894 is a hand location, which in this case is an average location for the fingers at locations 880-883. $\theta$ is the general extension angle, here computed as the nearest average of the finger forward angles. A heavy arrow 895 originating at the hand location 894 has direction angle $\theta$ and represents the general direction of finger extension. The second arrow 896 originating from the hand location 894 represents the thumb vector. FIG. 53D depicts the result of virtually rotating the plane of the gesture surface through an angle of $-\theta$ (negative $\theta$). The half-plane 897 above the horizontal line 180 indicates positive angles and hence the right hand, while the half-plane 898 below the horizontal line 180 indicates negative angles and hence the left hand. The thumb vector 896 falls within the half-plane of negative angles 898, indicating that the squeeze gesture was performed with the left hand.

Although the squeeze gesture provides a hand calibration with enough information to produce a finger map, the squeeze gesture is also useful on touch devices that directly provide finger identities. It may be that the touch device is only able to determine finger identities and not also able to determine which hand is gesturing or the orientation of the hand. The squeeze gesture can still provides this information. The general value of the squeeze gesture is actually in its ability to provide the information necessary to distinguish the left hand from the right hand.

7.11.4.3 Squeeze Gesture Properties

The squeeze gesture provides many properties that the gesture system can use to establish a hand calibration and interpret finger-mapped gestures. These properties derive from one or more paths that the fingers travel while performing the squeeze gesture. Properties of the squeeze gesture include the following, although they are not limited to the following:
1) The start or end locations of the fingers.
2) An average location for a set of fingers.
3) Relative locations of a set of fingers.
4) The path along which a finger travels.
5) The point at the center of a path along which a finger travels.
6) The distance along which a finger travels.
7) The direction in which a finger travels.
8) The average direction in which fingers travel.
9) Relative directions in which fingers travel.
10) The direction in which a finger travels relative to a location of another finger.
11) The order in which the fingers touch the gesture surface.
12) The number of fingers in the gesture.
13) The length of time that the fingers touch the gesture surface.

Properties of a squeeze gesture may also derive from these properties. One of the most useful properties employs information about the thumb. The presence of the thumb establishes an asymmetry in the gesture that the gesture system can use to identify the hand, its fingers, or its orientation. This asymmetry occurs in the positioning of the thumb relative to the rest of the hand. This property is a spatial-relationship called the "hand-relative positioning of the thumb." Identifying the index finger as the finger nearest to a location of the thumb is an example of employing the hand-relative positioning of the thumb. Another example is determining the identity of the hand according to the side of a general extension line on which a thumb location falls, as previously described. The direction in which the thumb moves can also employ the hand-relative positioning of a thumb if identifying the thumb entails comparing locations for the thumb with locations for other fingers or if the direction of the thumb is relative to directions or locations for other fingers. As these examples demonstrate, the hand-relative positioning of the thumb can be expressed as relative positions of locations for the thumb and non-thumb fingers, as differences between directions of movement for thumb and non-thumb fingers, and as comparisons of directions and relative positions determined from the paths of both thumb and non-thumb fingers.

7.11.4.4 Hand Distinction

A "hand distinction" is a collection of information that suffices to distinguish the left hand from the right hand. The squeeze gesture provides a hand distinction by virtue of providing all of the information that the calibrating system needs to identify the hand. For example, the hand-relative positioning of the thumb and the direction of finger extension together determine the hand. It is possible for a hand distinction to only require some information from the squeeze gesture, acquiring the remainder from the host, even if the squeeze gesture itself includes all of the information. In this latter case, the squeeze gesture may still be critical for providing missing information.

Consider a touch device that designates a top, bottom, left and right side of the gesture surface. Modern smart phones and touch tablets do this. These devices typically detect their orientations and assign top and bottom, left and right accordingly. The application, including the gesture system, then employs this designated orientation. When abiding by this orientation, the squeeze gesture does not arbitrarily establish directions of finger extension, nor does it arbitrarily establish left and right sides for the user. Instead, directions of finger extension are towards the top of the touch device, and the left and right sides of the device also correspond to the left and right sides of the user. The pre-designated general direction of finger extension establishes the orientation of the hand, but it does not distinguish the hands. For a given hand orientation, the hand-relative positioning of the thumb suffices to determine whether the hand is the left hand or the right hand.

If the host both provides finger identities and designates the device orientation, there may be no need for the user to perform a squeeze gesture, unless the gesture system assigns different user requests to the different hands. In this case, any means for indicating the hand identity suffices, and the squeeze gesture is certainly one means for doing that. On a system for which the host provides finger identities, once the calibrating system has identified a squeeze gesture, the calibrating system can use the hand-relative positioning of the thumb to identify the hand. It is sufficient to use the direction in which the thumb moves during the gesture to identify the hand, because in this scenario the direction of the thumb with respect to the designated device orientation differs by hand.

Now consider a touch device that does not designate a top, bottom, left, and right. Assume that it also does not provide finger identities. In this scenario, the host provides no information for distinguishing the hands or determining the hand orientations. The user provides all of this information, and the squeeze gesture is a simple, convenient method for doing so. A user can gesture on the device with either hand in any orientation. If the gesture surface is large enough, multiple users can approach the device from any direction to gesture from where they stand. A community touchscreen table would be an example of such a device. From any position around the table, a user need only touch the table with a squeeze gesture to establish a hand calibration at the user's location and orientation, with the particular hand that the user chose. In this scenario, the gesture system generates a finger map from properties of the squeeze gesture. As previously explained, these properties are also sufficient to distinguish the left and right hands.

Finally, suppose that the host does not designate an orientation but that it does provide finger identities. A user can approach the device to gesture from any direction. The host knows the finger identities of the gesturing fingers, but it may not be able to determine which hand is gesturing when user requests are different for the left and right hands. Even if the host is able to determine which hand is gesturing, it may not know the orientation of the hand, in which case it would be unable to determine whether any finger is moving forward or backward. Consider that five fingers in an approximate line on the gesture surface can represent either the left hand with fingers directed in one direction or the right hand with fingers directed in the opposite direction. A gesture system that determines gesture direction would need to know the hand's orientation. As before, the squeeze gesture can provide this information. Under previous scenarios, the calibrating system used the hand-relative positioning of the thumb to distinguish the left and right hand, but the calibrating system need not do so in the present scenario. The host has already provided a series of finger identities, so the calibrating system can identify the hand by a direction of finger extension that the squeeze gesture indicates.

In some scenarios, the hand-relative positioning of the thumb is sufficient to complete a hand distinction. In other scenarios, identifying the forward or backward direction of finger movement is sufficient to complete a hand distinction because this restricts the possible orientations of the hand. Some scenarios require both of these properties to provide a hand distinction. The properties required for a hand distinction depend on the properties that the host already provides.

7.11.4.5 Reverse Squeeze

It is possible to input a hand calibration by performing the squeeze gesture in reverse. This alternative calibration gesture is called a "reverse squeeze." The fingers of a reverse squeeze start at the end locations of the analogous squeeze and end at the start locations of the analogous squeeze. FIG. 52B shows a hand performing a reverse squeeze, with arrows (e.g. arrows 867-868) exemplifying the directions in which the fingers may move. The hand would likely need to start the gesture with fingers more flexed than shown in the illustration. As with the standard squeeze gesture, the direction angles of adjacent non-thumb fingers are roughly parallel. These are angles $\theta_{A2}$, $\theta_{B2}$, $\theta_{C2}$, and $\theta_{D2}$ in the figure. The direction angle of the thumb $\theta_{E2}$ can reasonably be expected to differ from the direction angles of the other fingers by at least $\pi/3$ radians by class equivalence. The thumb moves away from the hand in the reverse squeeze, indicating the position of the thumb relative to the hand and thus a hand-relative positioning of the thumb.

The process for determining a hand calibration from a reverse squeeze is the same as for a standard squeeze gesture, except that all references to start locations are exchanged with references to end locations. However, the start locations of a reverse squeeze should serve as the finger rest locations, unless the paths of the fingers in the reverse squeeze represent channel line segments, in which case the midpoint of these line segments could serve as the rest locations. Although the reverse squeeze does not end with the fingers in their rest locations, the reverse squeeze does have an advantage over the standard squeeze gesture: when using the start locations as the rest locations, the reverse squeeze can be recognized the instant that all of the necessary fingers have exceeded a gesturing threshold, without waiting for gesture completion. The standard squeeze gesture does not have reliable rest locations until the gesture is complete. It may still be beneficial to wait for the fingers to finish gesturing in order to more accurate assign forward directions, at least with calibrating systems that need directions of finger extension. The standard squeeze and the reverse squeeze are variants of a general class of gesture called a "general squeeze gesture."

7.11.4.6 General Squeeze Procedure

Figure 51:
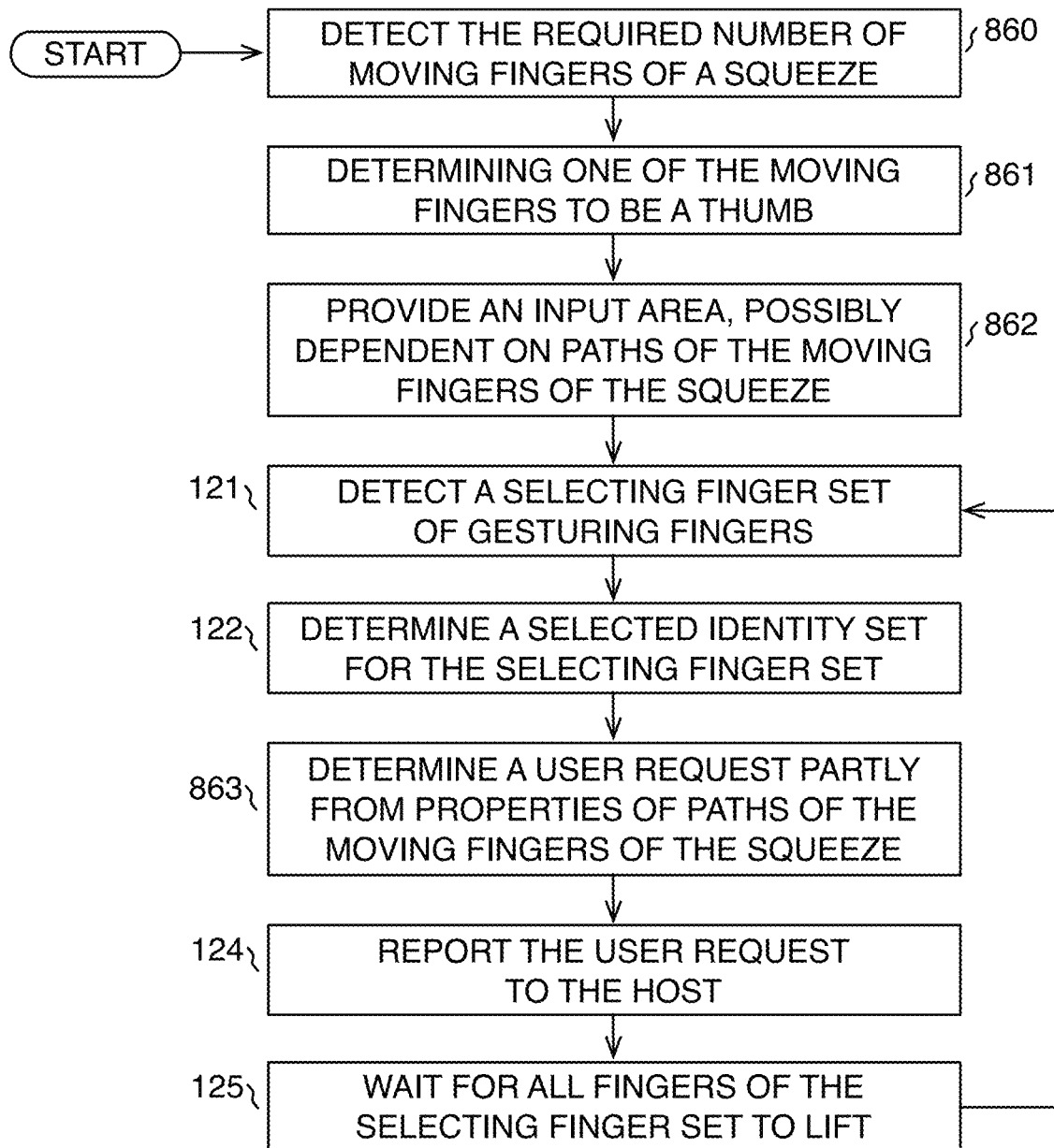
FIG. 51 depicts the procedure for receiving a general squeeze gesture and for processing finger-mapped gestures according to properties of the squeeze gesture.

The procedure for detecting a standard squeeze is generally the same as that for detecting a reverse squeeze. FIG. 51 illustrates this procedure in the context of inputting a finger-mapped gesture. In step 860, the calibrating system first detects the required number of fingers moving to perform the gesture. If this number exceeds the number of fingers required for any finger-mapped gesture, there may not be a need to check the fingers to determine whether they are moving. Ideally, the calibrating system would look for at least a certain number of fingers exceeding a gesturing threshold. In step 861, the calibrating system determines that one of the fingers has characteristics on the basis of which it will be treated as a thumb, such as by making the determination using any of the previously described techniques. The attempt to identify a thumb may fail if the calibrating system enforces limitations on the characteristics of squeeze gestures. Upon identifying the thumb, the calibrating system may check for any other constraints that a squeeze gesture must satisfy and only proceed with recognizing the gesture if the constraints are met.

Once the gesture is determined to be a squeeze gesture, in step 862, the calibrating system may establish or redefine an input area. It may be that the input area pre-existed the squeeze gesture and is only slightly reconfigured by the squeeze gesture. For example, if the host provides finger identities and a left-right orientation for the gesture surface, the only additional information that the squeeze gesture provides is the hand identity. It may also be that the squeeze gesture entirely defines the input area, such as by establishing the locations and orientations of geometric elements for input regions, along with indicating forward directions for each finger and perhaps also the lengths of the regions according to the lengths that the fingers gestured during the squeeze. Finally, it may be that the squeeze gesture provides an intermediate specification of the input area, such as by indicating the orientation of a finger map or the directions of finger extension. The dependency that the input area has on the squeeze gesture can vary greatly by gesture system.

Upon establishing the input area, the gesture system is able to receive gestures via steps 121 and 122. As usual, in step 863, each user request is a function of the selected identity set and the gesture parameters. However, as described in step 863, the user request is also a function of at least one property of the general squeeze gesture. More specifically, the user request is a property derived from one or more paths of the fingers that participated in the gesture. If the squeeze gesture provided a finger map or indicated the hand identity, the selected identity set will be a function of the properties of the squeeze gesture that provided this information. It may be that the host provides finger identities, in which case the selected identity set need not be a function of properties of the squeeze gesture. Even so, the squeeze gesture may provide forward directions for the fingers or the hand identity, and if any of the gesture parameters depend on these properties, the gesture parameters will themselves be dependent on properties of the squeeze gesture. There are many ways for the user request to depend on properties of the squeeze gesture, whether through dependence on the input area defined according to a hand calibration based on the squeeze gesture or through dependence on properties of the squeeze gesture that gesture parameters employ.

7.11.5 Repositioning Gestures

When a calibration gesture gets to a state where a hand calibration is associated with the gesture but the fingers remain touching the gesture surface, the gesture can transform into a repositioning gesture. A "repositioning gesture" is a calibration gesture in which a user positions, orients, and scales an existing hand calibration by moving fingers that are touching the gesture surface to new locations on the gesture surface. The touching fingers have finger identities and locations by virtue of having performed a calibration gesture. Moving these fingers moves the rest locations for the finger identities, thus moving the hand calibration. Rotating the fingers relative to each other reorients the rest locations and thus rotates the hand calibration. Bringing the fingers closer together or farther apart spaces the rest locations and thus scales the hand calibration. In calibrating systems that support repositioning, the user can fine-tune and relocate the hand calibration after performing a calibration gesture and before lifting the fingers.

For example, assuming that the calibrating system supports repositioning after drumming, upon performing a drumming gesture to place a hand calibration, a user can leave the fingers on the gesture surface and move them around to adjust the hand calibration. Each finger of the drumming gesture has a finger identity by virtue of having performed a drumming gesture, and each has a location by virtue of touching the gesture surface. The user may even lift fingers and still reposition the hand calibration, provided that at least one finger is still touching. If only one finger is touching the calibrating system can only reposition the hand calibration without rotating or scaling it, but even if only two fingers are touching, their relative positions allow for rotating and scaling as well, because their finger identities are known. The calibrating system may even allow fingers to accidentally lift and touch again by deducing the newly touched finger identities from the previously touching finger identities. The sample implementation of the invention included with this specification describes a "calibration detector" that supports accidental lifting during repositioning, allowing the user to touch again to continue repositioning.

To reposition a hand calibration after a squeeze gesture, the user would have to signal completion of the squeeze gesture before dynamically relocating the fingers. For example, the user would have to first hold the fingers for a timeout period or lift and touch a finger again. Dynamic repositioning behavior is thereafter the same as with repositioning the drumming gesture.

It is also possible to perform a repositioning gesture on an existing finger map without first performing a gesture that inputs a new hand calibration. To perform this repositioning gesture, the user places one finger in each input region of the finger map, placing them in any order, thus assigning an identity and a location to each finger. The user can then move the fingers around to reposition the hand calibration exactly as if the gesture had first specified the hand calibration, with the new finger locations becoming the new rest locations. However, this repositioning gesture potentially conflicts with drumming and may be most useful on systems that employ squeeze gestures rather than drumming gestures.

7.11.6 The Tickling Gesture

Like the repositioning gesture, the "tickling" gesture is a calibration gesture that must be performed on an existing finger map. It requires an existing finger map because it does not itself associate fingers with finger identities. The tickling gesture is performed by each finger individually, but multiple fingers can perform it simultaneously. A finger that is performing the tickling gesture is said to be "tickling." A finger tickles by touching an input region and moving rapidly backward and forward in roughly opposite directions—an action that actually looks like tickling. The tickling gesture establishes a channel line segment for the region tickled, also defining a rest location and a forward direction for repositioning and shaping the region. The gesture system can periodically update the finger map as the user tickles. Because tickling only acts on an existing finger map, it is most usefully implemented by the gesture system.

Recall that the gesture surface abstracts finger positions to a common coordinate system, enabling finger identities to be generically determined via finger maps. If the device directly reports finger identities, the gesture system need not actually implement a finger map because the finger identities are already known. Tickling is clearly also possible in this case as well. While this scenario does not use tickling to further refine a finger map, tickling is still useful in this scenario for defining forward directions for each finger identity.

A finger roughly traces line segments as it moves backward and forward to tickle. Each line segment is a vector in the sense that it has a start location and an end location. Each vector also has at least a minimum expected length. Vectors can be detected by monitoring each finger's path for reversals in direction. Monitoring for extent vectors accomplishes this. A finger is considered to start tickling if it traces at least a number of extent vectors equal to a "minimum tickling vector count" in at most an amount of time equal to the "maximum start-of-tickling time." Once a finger starts tickling, the gesture system can become more lenient and allow the user to slow the rate of tickling without the gesture system ceasing to detect tickling. A tickling gesture ends when the finger lifts or when the finger tickles a number of vectors equal to the minimum tickling vector count or fewer in an amount of time greater than the minimum end-of-tickling time.

As a finger with a particular finger identity tickles, the gesture system collects the tickling vectors that the finger inputs. The gesture system never keeps more than a maximum number of the most recent tickling vectors for any given finger, thus maintaining a window of recent tickling vectors. This number is the "tickling vector window." Periodically during collection, the gesture system averages together the vectors currently in the finger's tickling vector window to produce an average vector. In a gesture system with designated top and bottom sides, a collection of vectors can be averaged by averaging the top vector termini together to produce an average top location and the bottom vector termini together to produce an average bottom location. The "average vector" is the vector that starts at the average bottom location and ends at the average top location. This vector has two end points and is also a line segment. In gesture systems that do not have designated top and bottom sides, top and bottom can be determined relative to the existing hand calibration, with the average known forward direction of the fingers indicating the "top" direction, such as the average of forward directions given by the forward angles of the existing finger calibrations. In this case, the indicated "top" direction can evolve as the hand calibration evolves with tickling.

After averaging the tickling vectors for a finger of a particular finger identity, the gesture system creates a new finger calibration for the finger identity. The average vector becomes the new channel line segment, and the midpoint of this line segment becomes the new rest location for the finger. The finger's new forward angle is the angle of the channel line coincident with the line segment directed towards the top of the device. The new finger calibration replaces the previous finger calibration for the finger identity, changing the hand calibration and consequently the finger map that derives from it. If the gesture system supports different gesture level threshold distances for different fingers, the threshold distance for each gesture level of a finger can be set as a constant multiple of the length of the finger's average tickling vector. It is also an option for the gesture system to average the lengths of the average tickling vectors and set the threshold distances from this average. Alternatively, the gesture levels can be a function of a determined hand breadth.

The gesture system periodically updates the hand calibration for tickling vectors at a recurring timeout interval that runs while the user is tickling. The gesture system updates both the finger calibrations and the finger map at each timeout interval. After updating the finger map, subsequent newly tickling fingers should derive their finger identities from the latest finger map. This way the finger map gradually evolves as the user tickles, and the user receives feedback during the process, enabling better finger calibrations.

The gesture system continues to collect vectors for a tickling finger for as long as the finger tickles. The finger calibration only reflects the average of the tickling vectors in the finger's recent tickling vector window. This allows the user to keep tickling until finding a comfortable finger map, without forcing the user to have to live with a finger map constrained by all past tickling gestures.

FIG. 43C, described previously, illustrates vectors potentially input by tickling fingers. It depicts an average location (e.g. location 737) for the top locations of the line segments and an average location (e.g. location 738) for the bottom locations of the line segments. The dashed lines 713-715 through these average locations serve as channel lines that the line segments specify. Rest locations are not shown and are not needed in this particular finger map because the channel lines are used to fully partition the containing surface allocation into input regions 701-703.

Figure 44C:
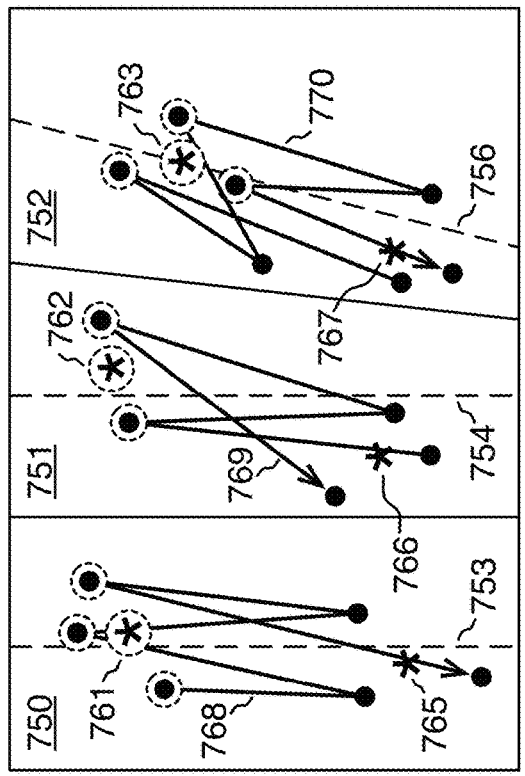
FIGS. 44A-44D depict a sequence in which fingers establish finger maps by tickling.
Figure 44D:
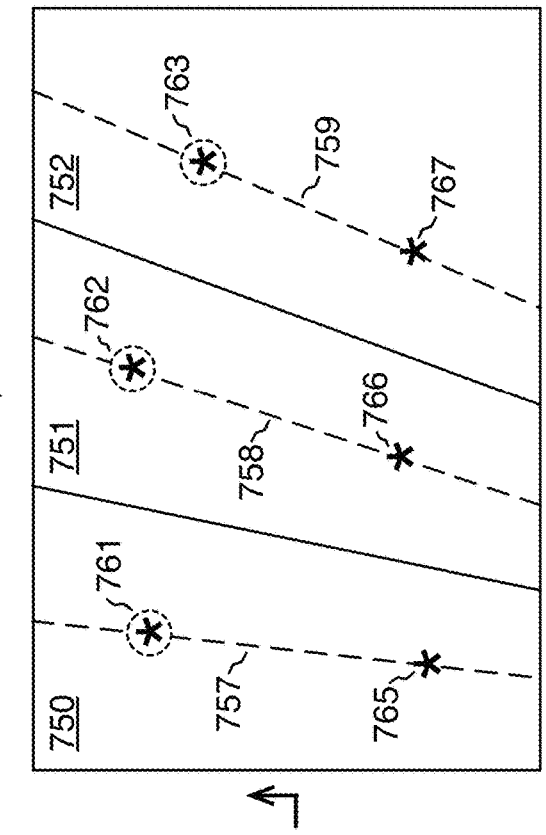
Figure 44A:
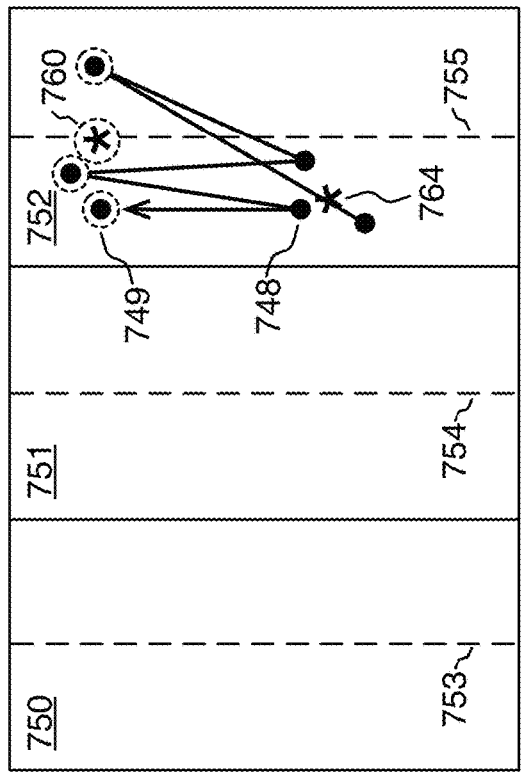
Figure 44B:
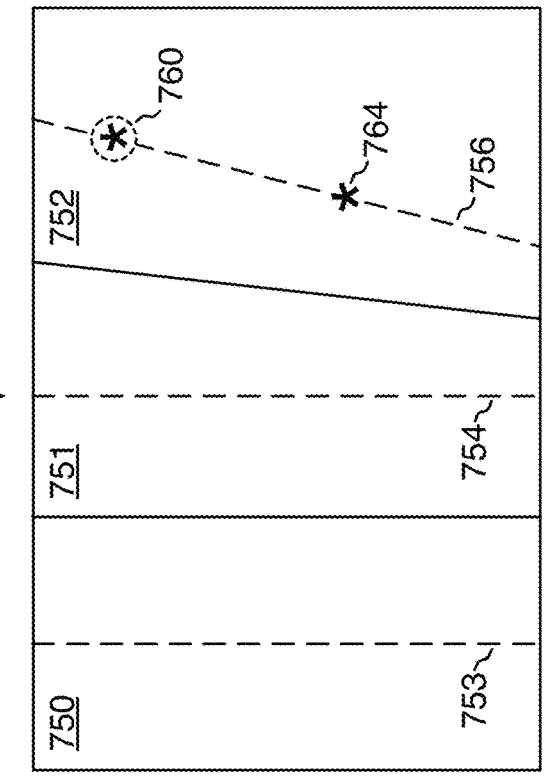

FIGS. 44A-44D show some examples of modifying a hand calibration and its associated finger map through tickling. Each figure shows an input area that covers the entire surface allocation, partitioning it into input regions 750-752. Dashed lines 753-759 depict channel lines for the input regions 750-752, taken from the finger calibrations in the underlying hand calibration. The connected dots (e.g. dots 748-749) represent locations on the paths of fingers as they input tickling vectors (e.g. vectors 768-770). Although each series of tickling vectors is shown entirely contained within a region, the vectors can cross region boundaries, because the gesture system associates each collection of tickling vectors with the finger identity for the region in which the finger originated. Circled dots (e.g. dot 749) represent the locations on the vectors that are closer to an indicated top side of the gesture surface. Each circled asterisk 760-763 indicates the average top location of series of tickling vectors, and each asterisk not circled 764-767 indicates the average bottom location. The transition from FIG. 44A to 44B shows how tickling performed for one finger identity can remake the hand calibration and the finger map. The new channel line 756 for region 752 passes through the average top location 760 and the average bottom location 764 determined for the tickling vectors, which is also through an average tickling vector. In a channel-based finger map, this reshapes regions 751 and 752. FIG. 44C shows tickling on all three regions 750-752 of this newly formed finger map. When the gesture system updates the hand calibration and the finger map again, the result is the finger map with new channel lines 757-759 shown in FIG. 44D.

Note that the tickling gesture is not generally compatible with multi-reversal gestures. To support both tickling and multi-reversal gestures, the gesture system can provide a mode in which it does not recognize multi-reversal gestures, such as by using an escape hold. For example, double-touching the thumb could escape the user from finger mapping so that the fingers can perform a tickling gesture that the calibrating system would unambiguously recognize.

7.11.7 Calibration Reservation

In order to allow users to dynamically place finger maps on the gesture surface, the calibrating system should remove outdated finger maps. One way to manage finger maps is to allow only one finger map at a time and to remove a previous finger map when a new finger map is provided, such as each time the user performs a new calibration gesture. However, a calibrating system may support a person gesturing simultaneously from multiple locations, and it may support multiple people gesturing from multiple locations, whether simultaneously or not. To support finger maps in multiple locations, it should be possible for users to intentionally add and remove finger maps from the gesture surface. The calibrating system can leave finger maps around and require a user to explicitly perform an action to remove a finger map, but the calibrating system can also be intelligent about removing finger maps automatically. For example, the calibrating system can remove a finger map after a timeout period during which no gestures are received, or it could leave a finger map in place until another is input elsewhere for the same user.

An effective technique for controlling the lifetime of a finger map is to leave it in place only for as long as the user keeps at least one finger in contact with it or with the input area. Once the fingers have lifted, after a short timeout period, the calibrating system removes the finger map. Gesturing is sufficient to continue to reserve a finger map, but the user can also reserve the finger map during pauses in gesturing simply by letting fingers rest on the finger map or input area. These fingers would not register as gestures unless they exceed a gesturing threshold. Some calibration gestures allow the thumb to rest on the input area during the gesture, and under this approach it is an option for the user to continue reserving the finger map after performing a calibration gesture simply by leaving the thumb in place. If there is another finger that the gesture system does not normally use, that finger can also reserve the finger map while it touches.

Calibration reservation techniques also apply to devices that provide finger identities without requiring the gesture system to implement finger maps. At minimum, when a calibration gesture identifies the left or right hand, the user can perform the calibration gesture simply to inform the calibrating system of the hand now in use. The user could also perform a calibration gesture to locate a hand on the gesture surface, such as to establish a localized input area for the hand. This technique is helpful for enabling a calibrating system to distinguish the finger-mapped gesturing of multiple people on a single gesture surface. For example, the user could perform a drumming gesture or a squeeze gesture to position an input area. Although rest locations, orientation lines, and forward directions are primarily used for establishing finger maps, they can also be used for sizing and orienting an input area according to its associated calibration gesture. Once an input area that does not have a finger map has been established, it can be reserved using the techniques described for reserving input areas with finger maps.

7.12 Home Position Drift

As the user inputs finger-mapped gestures over a period of time, the hand is likely to gradually drift across the touch device. When the hand drifts too far from the home position, the gesture system can start producing unexpected results, forcing the user either to move the hand back to the proper position or to perform a calibration gesture at the new position. It is an alternative for the gesture system to instead detect the hand drifting and dynamically move the finger map to stay with the hand. This process is called "dynamic recalibration." The gesture system can also help prevent excessive drift by warning the user with "guard borders." This section describes these two approaches to handling drift. The approaches can be used in combination.

7.12.1 Dynamic Recalibration

As a user's hand drifts, the rest locations of the fingers, the forward directions of the fingers, and the hand's orientation may change. The gesture system can optionally detect these changes and automatically revise the hand calibration and finger map to accommodate them. This process is called "dynamic recalibration." Dynamic recalibration updates the hand calibration based on the paths that the fingers travel as they input finger-mapped gestures.

7.12.1.1 The Recalibration Process

Dynamic recalibration can update finger rest location or finger forward directions or both. Updating either is sufficient for updating the hand's orientation. The process is best performed by monitoring fingers for longitudinal movement, although there is no need to do so if the user or the device restricts fingers to just longitudinal movement. The process is as follows:

1) The gesture system records descriptions of at least the finger-mapped gestures that the user performs longitudinally. If dynamic recalibration is only updating rest locations, the gesture system need only record the initial touch location of each finger of the selecting finger set. If the gesture system is to update the finger forward directions, such as finger forward angles, it can collect the first extent vector that each finger inputs during a gesture. The second extent vector of a gesture is the backbrush vector and is not necessary for the recalibration. Each description of a gesture includes a description for each finger of the gesture, associating that description with the finger identity assigned to the finger.

2) The gesture system keeps a list of descriptions of the most recently input finger-mapped gestures. The list can be limited to at most a maximum number of gesture descriptions, or it can be limited to just the gesture descriptions produced within a certain amount of time in the past. Descriptions for gestures that exceed the established limit can be discarded.

3) The gesture system periodically updates the hand calibration and the finger map according to the list of recent gesture descriptions. The gesture system updates the finger calibration of each finger identity for which at least a minimum update count of finger descriptions have been collected. The new finger calibration is derived from the finger descriptions and may also be derived in part from the previous finger calibration. The recurring period over which the gesture system performs this update is either a certain interval of time or every so many finger-mapped gestures. The gesture system may also monitor an interval separately for each finger, in which case it is an option to update a finger calibration after every certain number of finger descriptions collected for the finger identity. Depending on the number of gesture descriptions collected and the update interval, the gesture system may use aging finger descriptions in multiple successive recalibrations.

7.12.1.2 Updating Finger Calibrations

There are several approaches to updating a finger calibration from the finger descriptions collected for a particular finger identity. Some of these approaches follow:

1) The initial touch locations of the fingers are averaged together to produce a new rest location for the finger. This approach may produce an inaccurate result if the majority of fingers go in the same direction. For example, if the user only gestures backward by starting at the top of the input region, the rest location may be improperly moved to the top of the input region. If fingers had also gestured forward starting from the bottom of the input region, the new rest location would more accurately be located midway between where the forward and backward gestures began.

2) The initial touch locations are averaged together separately for each discrete direction that the fingers travelled. This yields one average location for each discrete direction represented among the finger descriptions. The average locations for which both opposing directions are represented are then averaged together, and this final average location is the new rest location. For example, if the series of finger descriptions includes fingers that gestured forward, backward, and left, but never right, the initial touch locations for the forward and backward finger calibrations are averaged separately, and then these separate averages are averaged together. The average for the left direction is not included because there are no gestures for the right direction.

3) The initial touch locations are averaged together separately for each discrete direction, and opposing average locations are then averaged together, as in the previous approach, but with an additional constraint. The additional constraint is that each discrete direction to be included in the average must be represented by a minimum number of finger descriptions. For example, if the minimum number of finger descriptions for a direction is 10, and if there are 12 forward gestures, 9 backward gestures, 10 left gestures, and 2 right gestures, no initial touch locations are averaged together, and no new finger calibration is computed. This is because no direction and its opposite both achieved the minimum number of finger descriptions required. In this case, the gesture system keeps collecting gesture descriptions for testing at the next update interval. This approach ensures that new rest locations are only computed when sufficient data is available.

4) The gesture system averages the first extent vectors for fingers travelling in the forward and backward directions and uses this average vector as the channel line segment of the finger calibration. Extent vectors are averaged together by averaging the top termini together to produce a new average top terminus and by averaging the bottom termini together to produce a new average bottom terminus. "Top" and "bottom" termini are determined either relative to a top and bottom of the device, perhaps as assigned by the host, or relative to the current hand calibration, as described previously. Since the gesture system may also be collecting gestures having directions other than forward and backward, it is possible that there are few or no forward and backward finger calibrations to use. The gesture system may opt to increase accuracy by only computing a new finger calibration when a minimum number of forward and backward gestures are available.

5) The previous approach of simply averaging forward and backward finger descriptions may prove inaccurate when the majority of gestures are all in one direction. The channel line segments of the previous approach can be made more accurate by requiring a minimum number of forward gestures and a minimum number of backward gestures.

6) Perhaps the most accurate finger calibration results from a hybrid of an initial touch location approach and an average extent vector approach. The average rest location for a particular finger identity is determined according to one of the above approaches for determining the new rest location from initial touch locations. The new forward direction for the finger is computed as an average of the angles of the forward and backward extent vectors, including each backward extent vector angle in the average only after adding it to it to direct it in its implied forward direction. This approach may also be best when only computing channel lines, where rest locations are not needed. The gesture system may require a minimum number of forward gestures and a minimum number of backward gestures to ensure an accurate forward direction calculation.

7) It is possible that a hybrid approach that separately computes rest locations and average extent vectors ends up determining a rest location that does not coincide with the channel line through the average extent vector. In this case, it may be useful to approximate the new average rest location as the location on the channel line nearest to the computed average rest location. Determining the nearest point on a line to another point is standard geometry. This approach gives precedence to channel lines over rest locations.

7.12.1.3 Optional Recalibration Features

Dynamic recalibration can benefit from any of the following additional features, each of which is optional:

1) The gesture system may restrict itself to collecting only gesture descriptions for gestures with fingers that move longitudinally. This prevents lateral gestures from affecting the finger map, which is primarily intended to accommodate longitudinal movement.

2) Users may take breaks during gesture input, and during these breaks the hands are likely to reposition a little. When the hands reposition, the gesture history collected prior to the break likely does not apply to the new hand position and so should not be included in any further dynamic recalibration. The gesture system can preclude old gestures by implementing a staleness period. Gesture descriptions for gestures older than the staleness period are discarded from the list of gesture descriptions used for dynamically computing new hand calibrations.

3) Because a hand may be in a slightly new position after the user takes a break, it may be helpful to reduce the number of finger descriptions required to produce the first update to the hand calibration, in order to more quickly register the hand's new position. After the first update, the update interval returns to the normal, longer period.

4) A user may not actually wish for the hand to move much during the gesture and may prefer that the gesture system help enforce the hand's location on the gesture surface. The gesture system can accommodate this user while still providing some dynamic recalibration by only adjusting the hand calibration slightly towards the newly computed rest location or forward direction. Upon computing a new rest location or forward direction for a finger, the gesture system also has the finger's previous rest location or forward direction. Instead of changing the rest location to the newly computed value, the gesture system can change it to a location between the newly computed rest location and the previous rest location, such as halfway between them. Likewise, the gesture system can change the forward direction to a direction between the newly computed forward direction and the previous forward direction, such as to the nearest average of the finger's forward angles.

5) The user's hand may drift so much that the user is improperly entering gestures. Because these gestures do not represent the user's intent, their descriptions should not be used to generate new hand calibrations. The gesture system can avoid computing new hand calibrations for improper gestures by recognizing user requests to undo previous gestures and dropping the gesture descriptions for those gestures. The user request to undo a gesture need not actually be input as a finger-mapped gesture; the gesture system recognizes the user request however it is input. The gesture system either designates a certain number of the most recent gesture descriptions as tentative or designates all gestures younger than a certain age as tentative. When it periodically calculates the new hand calibration, it only uses gesture descriptions it has collected older than these tentative descriptions. For example, the gesture system may keep the six most recent gestures as tentative. This allows up to six sequential input mistakes that will not affect the dynamically computed hand calibration, provided that the user undoes the gestures before entering a seventh gesture. When the gestures represent inserted characters, a gesture to delete the preceding character would be an undo gesture, as would a gesture to delete the previous word.

7.12.2 Guard Borders

The input area may be located on the touch device near portions of the device that the user should be careful not to touch while inputting finger-mapped gestures. For example, the input area might appear on a touch-sensitive surface immediately below user interface elements, and accidentally touching those user interface elements could have unintentional consequences. As another example, consider the "Google Now" feature of phones running the Android operating system. The "Google Now" screen can be opened by dragging the finger from below the keyboard area of the screen onto the keyboard area. If the keyboard area instead supports finger-mapped gestures, the user may accidentally brush a finger up from below the keyboard area and open up the "Google Now" feature while intending to input a finger-mapped gesture. These accidents become more likely to happen as the user's hand drifts while gesturing. The gesture system can implement "guard borders" to help prevent these potential problems.

A "guard border" is a region at the periphery of the input area on the sides of the input area where sensitive user interface is located. When the user touches the guard border, the user is alerted to this fact. The alert can be a sound or a flash of color on a screen or some sort of tactile feedback, such as vibration or haptic feedback. The alert informs the user to adjust gesturing to prevent fingers from accidentally touching past the guard border. The guard border can be implemented so that an alert is only issued when a finger's initial touch location occurs within the border, or it can be implemented so that an alert is issued whenever a finger ventures into the border.

If the guard border is strictly between the input area and the sensitive user interface, either the host or the gesture system can implement it. The guard border may also be placed on the input area proper, at its periphery, in which case the gesture system implements the guard border. In this case, when the user touches the guard border, the gesture system both alerts the user and processes the gesture normally. This is the least disruptive approach, as instead of suddenly refusing to recognize gestures as the hand drifts, the gesture system warns the user that the hand is drifting too far while still recognizing gestures. It is sufficient to only reports alerts when a finger's initial touch location occurs in a guard border, due to the touchscreen convention whereby user interface elements only receive input events for fingers that originate on them.

The two approaches can also be combined, with a guard border on the input area, and just outside it, a guard border off the input area. The gesture system can place the guard border on any side of the input area or on any combination of sides of the input area. It may also be useful to make the presence and behavior of the guard border user-configurable.

7.13 Outcome Determination

A user employs a finger-mapped gesture system to input user requests to a host by performing finger-mapped gestures. The user selects the user request by parameterizing the gesture. The parameterization is a collection of parameter values that includes a selected combination of finger identities and at least one additional gesture parameter. When the host does not provide finger identities, the finger identities correspond to input regions of the input area, although the gesture system may re-associate finger identities to resolve ambiguity conflicts. The gesture system reports the gesture to the host as a user request. The user request may be a characterization of the gesture's parameterization, in which case the host translates the parameterization into a behavior. However, the gesture system may instead attempt to translate the parameterization into an identifier that names a behavior and report that identifier to the host. In some cases it may be that the parameterization cannot be associated with such an identifier and the attempt fails, in which case the gesture system can either ignore the gesture or report to the host the occurrence of an unrecognized gesture.

A finger-mapped gesture implements at least one path-dependent gesture parameter in addition to implementing a gesture parameter for finger identities. To take advantage of the efficiencies available to finger-mapped gesturing, the path-dependent parameters should be both longitudinally selectable and form-dependent. This specification defines gesture parameters for gesture level, gesture direction, shift holds, touch counts, backbrush level, and multi-reversal. Other gesture parameters are possible too, such as whether fingers perform a quick change of direction before lifting or whether fingers remain touching for a period of time before lifting.

Although this specification has defined gesture parameters that are independent of each other, it is also possible make the determination of some parameters a function of the values of other parameters. Any parameter value that applies a function to information about a gesture in order to determine the parameter value can choose the function applied according to the values of one or more other parameters. For example, the gesture level and the backbrush level can each apply a function to translate a distance measure to a particular range of distances. The function employed can be selected as a function of the selected identity set, the shift hold in effect, the touch count, or the gesture direction. As another example, the gesture system can choose a directional partitioning as a function of the selected identity set for use in determining a gesture's discrete direction.

A system that produces a result from a set of input values is mathematically a function. A gesture parameterization serves as a set of input values and a gesture outcome serves as a computed result. A gesture system therefore behaves as a function that maps gesture parameterizations into gesture outcomes. The gesture system selects a user request as a function of the gesture's parameters even as parameter values become fixed, or determined, during the gesture. Some parameter values may become fixed as a user performs a gesture, although which become fixed depends in part on the dependencies among parameters. Finger identities should become fixed before determining gesture parameters that vary by finger identity. The touch count should become fixed once the fingers start gesturing. Depending on the implementation, the gesture's discrete direction may become fixed once the fingers have travelled a certain distance, and the gesture level may become fixed once the user begins backbrushing. Each time a parameter value becomes fixed during a gesture, the set of possible user requests that the gesture may yield becomes further restricted. Each step of the way, while a user is performing a gesture, the gesture system may report to the host the subset of user requests to which the gesture may still correspond. The host can report the remaining possibilities to the user, such as to implement a tutorial program that helps the user learn the gestures.

7.14 Example Gesture Combinations

Figure 54C:
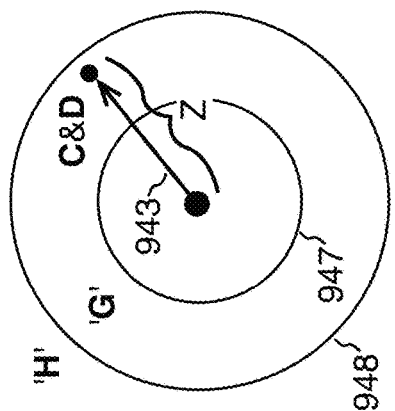
FIGS. 54A-54C depict evaluations of a stroke and a sweep performed on a finger map that contains a single calibrated input region.
Figure 54B:
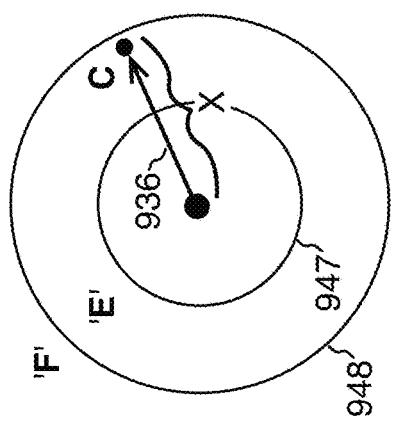
Figure 54A:
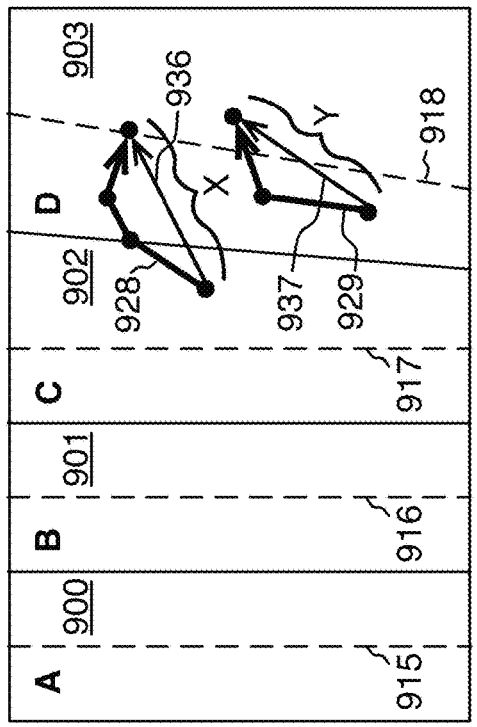
Figure 55A:
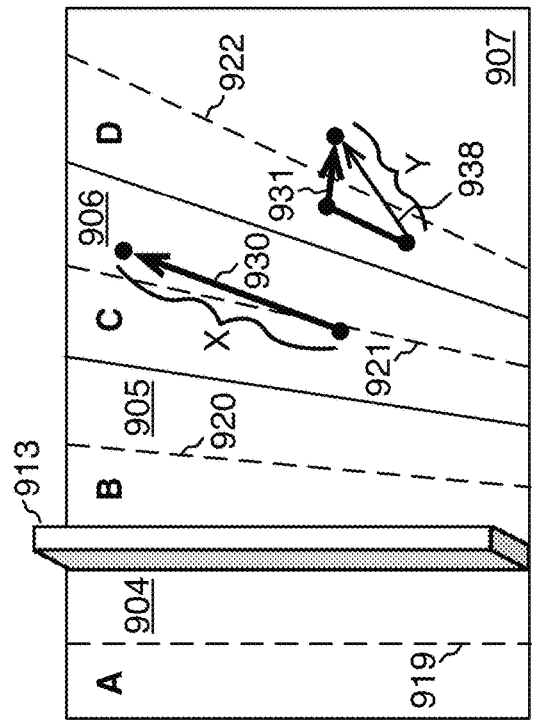

The groups of FIGS. 54A-54C, 55A-55C, 56A-56C, and 57A-57C each represent a user performing two distinct gestures on a finger map. In each group of figures, one of the gestures is a stroke and the other is a two-fingered sweep. FIGS. 54A, 55A, 56A, and 57A each depict an input area with the two finger paths 928-935 under consideration for the stroke or sweep of the example. The arrow at one end of each path indicates the direction in which the finger travels along the path, shown with a distance vector 936-942 extending from the path's measurement origin to the finger's lift location. In each group, one distance vector has length X and the other length Y. FIGS. 54B, 55B, 56B, and 57B each depict a concentric-circle "target" illustrating the evaluation of a stroke gesture that uses only one of the finger paths shown on the input area. FIGS. 54C, 55C, 56C, and 57C each depict a target illustrating the evaluation of a sweep gesture that uses both of the finger paths shown on the input area. In FIGS. 54A, 55A, and 56A, the input area is partitioned into input regions 900-910. Each of these input regions is derived from a channel line 915-925. The capital bold letter in each region represents the finger identity of the region. FIGS. 55A and 57A show a barrier 913-914 dividing the input area into two facets, representing either a barrier on a single facet or a barrier between facets.

The concentric circle "targets" are analogous to those described for FIGS. 35A-35D and 36A-36D, here representing the translation of gestures into user requests using an average distance vector. The center of each target represents a measurement origin. The solid vector that extends from the measurement origin, which is one of vectors 930, 936, 940, 941, and 943-946, represents a distance vector for the gesture as a whole. Each concentric circle 947-950 represents a gesture level threshold length from the measurement origin. The innermost circle 947 or 949 represents a gesturing threshold distance, below which gestures are not recognized and there is no gesture level. Each dashed crosshair 953-956 centered on a target represents an oriented partitioning oriented to a reference direction. The reference directions are shown as dashed vectors 925, 926, 951, and 952. The concentric circles 947-950 partition the target into concentric rings, and when present, the oriented partitioning further partitions the concentric rings by discrete direction. Each partitioning of the target contains a single quoted character representing a user request for inputting that character. The user request that a target indicates for a gesture is the character located in the partition of the target that contains the ending location of the gesture's distance vector, which is one of vectors 930, 936, 940, 941, and 943-946. The length of the distance vector for the sweep gesture is given by Z and is equal to the average of lengths X and Y.

FIG. 54A depicts four input regions 900-903. Input regions 900-902 have fixed channel lines 915-917. The channel line 918 for region 903 is determined from a hand calibration and is not parallel to the other channel lines 915-917. Computing the channel-based finger map results in regions 902 and 903 taking forms distinct from those of regions 900 and 901. According to the stroke interpretation of this figure, a finger touches input region 902 and gestures into region 903 yielding a selected distance of X. No other finger gestures in this first interpretation, so there is no finger gesturing from region 903. According to the target in FIG. 54B, the stroke gesture is not parameterized by direction, only by fingers selected and gesture level. The target shows the distance vector 936 for finger C having length X. The distance X designates the character 'E', so the stroke gesture results in a user request to input the character 'E'. Under the sweep interpretation of this figure, the user is gesturing a two-fingered stroke with fingers C and D. According to the target in FIG. 54C, the average of the distance vectors 936 and 937 is distance vector 943 having length Z. Although both the stroke and the sweep landed in the same ring of the target, the sweep indicates a different character—the character 'G'—because the combination of finger identities C and D is different from that of just C as used in the stroke.

FIG. 55A also depicts four input regions 904-907, but region 904 is on its own facet. The other three regions 905-907 share a facet. This figure is analogous to FIG. 54A, except that the regions 905-907 are each based on channel lines 920-922 that are at distinct angles. Computing a channel-based finger map results in each of these regions 905-907 having a unique form. Under the stroke interpretation of this figure, a single finger gestures in region 906; the finger path depicted in region 907 is assumed not present for this interpretation. The target in FIG. 55B indicates that the distance vector 930 for finger C selects the character 'F'. Under the sweep interpretation, the fingers depicted in regions 906 and 907 together perform the gesture, indicating fingers C and D. Vector 944 of the sweep target is the average of the two fingers' distance vectors 930 and 938. Because the combination of fingers C and D of the sweep is different from the combination containing only finger C as used in the stroke, the indicated gesture level selects from a different set of possible user requests. In this case, the average distance vector 944 indicates the character 'G'.

FIGS. 56A-56C and 57A-57C illustrate finger-mapped gestures that are further parameterized by gesture direction according to the directions in which the individual fingers gesture. In these figures, $\phi_A$, $\phi_B$, and $\phi_C$, indicate the angles of the distance vectors for finger identities A, B, and C, respectively. Under the sweep interpretation of these figures, the gesture angle $\phi$ is the angle of the average distance vector and can be computed as the nearest average of the angles of the distance vectors for the fingers that participate in the gesture. The angle $\phi$ selects a discrete direction from the oriented partitioning, and the sweep length Z selects a gesture level. In both the stroke interpretation and the sweep interpretation, the combination of fingers gesturing, discrete direction, and gesture level together indicate the user request being selected.

FIG. 56A depicts fingers gesturing on input regions 908-910 that are derived from geometric elements determined according to a hand. The channel lines 923-925 depicted may be thought of as those geometric elements, but the channel lines may also have been derived from more complex geometric elements. Each circled asterisk (e.g. asterisk 957) represents the average forward location of the underlying complex geometric element, and each asterisk that is not circled (e.g. asterisk 958) represents the average backward location of the underlying geometric element. In this example, each channel line is derived from the geometric element as the line passing through these two points, such as channel line 923 being derived from the points 957 and 958.

The angles $\theta_A$, $\theta_B$, and $\theta_C$ are forward angles for the channel lines 923, 924, and 925, respectively. Under the stroke interpretation of this figure, only finger C gestures, completing with length Y and a direction angle of $\phi_C$. The target in FIG. 56B is for a stroke with finger C. The oriented partitioning 953 of this target is oriented to the forward angle $\theta_C$ for region 910. The stroke thus indicates a request input the character 'B'. As shown in FIG. 56C, the sweep interpretation of this figure uses an oriented partitioning 954 oriented to the forward direction 951, given as reference angle θ, which is computed specifically for the combination of the gesturing fingers A and C. θ equals the nearest average of the angles $\theta_A$ and $\theta_C$. Vector 945 is the average of the distance vectors 939 and 940, having direction angle φ and length Z. The discrete direction at angle φ, the gesture level at length Z, and the fingers identities A and C together indicate a request to input the character 'J'.

FIG. 57A is analogous to FIG. 56A, except that the means for determining finger identities is not shown. For example, the touch device could directly provide finger identities. A forward direction is still associated with each finger identity, however, and is set via a hand calibration. The vectors 926 and 927 represent forward directions for fingers B and C. A barrier 914 divides the gesture surface into two halves 911-912. Each half 911-912 could represent its own facet with its own coordinate system, or the two halves 911-912 could be part of the same facet by sharing a coordinate system. This example assumes that there are at least three possible finger identities given as fingers A, B, and C, even though finger A is not participating in the gestures shown here. Under the stroke interpretation for the figure, only finger B gestures in half 911. As shown in FIG. 57B, a directional partitioning 955 is oriented to the forward angle $\theta_B$ associated with finger B. The distance vector 941 for finger B provides a sampling angle $\phi_B$ and a gesture length X for determining the user request. This particular stroke indicates a request to input the character 'B'. Under the sweep interpretation of this figure, both fingers B and C gesture, and the target in FIG. 57C represents a determination of the user request indicated, doing so from a sweep vector 946, which could be computed as the nearest average of the vectors 941 and 942. However, if the two halves 911-912 represent distinct facets with distinct coordinate systems, vector 946 can instead be computed as a vector with length Z and an angle φ equal to the nearest average of the angles $\phi_B$ and $\phi_C$. Here the directional partitioning 956 is oriented to the forward direction 952, whose forward angle θ is the nearest average of the forward angles for fingers B and C, which are angles $\theta_B$ and $\theta_C$. FIG. 57C depicts θ happening to be vertical and equal to φ. According to this gesture level and directional partitioning, the sweep indicates a request to input the character 'I'.

FIGS. 58A-58C, 59A-59C, and 60A-60B borrow notation from FIGS. 54A-54D and together depict three series of gestures that include both sweeps and strokes. The first series is given by FIGS. 58A-58C. This series depicts a finger map with four regions 960-963 corresponding to finger identities A, B, C, and D, with region 960 on its own facet. The channel lines 971-973 are varyingly separated, creating varyingly sized regions 961-963. Gestures in this finger map are not parameterized by gesture direction. In FIG. 58A, a user gestures two fingers along paths 966 and 967 to input a sweep. The fingers originate on regions 961 and 962, indicating finger identities B and C. The gesture system evaluates the sweep via an interpolated distance vector 970. According to the discussion of this notation in previous figures, the gesture indicates a request to input the character 'F'. The user lifts the fingers and next gestures a stroke in FIG. 58B along path 968 starting in region 961, indicating finger B. This stroke indicates a request to input the character 'J'. The user lifts finger B and in FIG. 58C performs another stroke along path 969 on facet 960, indicating finger identity A. This new stroke indicates a request to input the character 'L'.

Figure 59A:
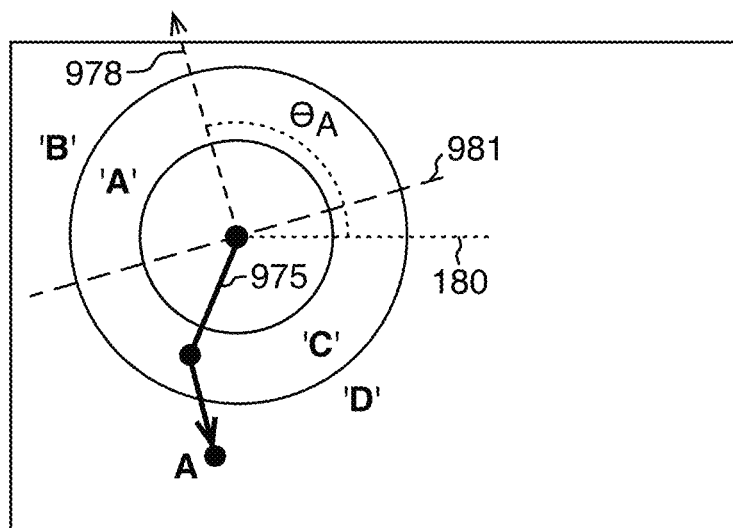
FIGS. 59A-59C depict a series of gestures showing that finger paths identical in form can produce different user requests when used in combination.
Figure 59B:
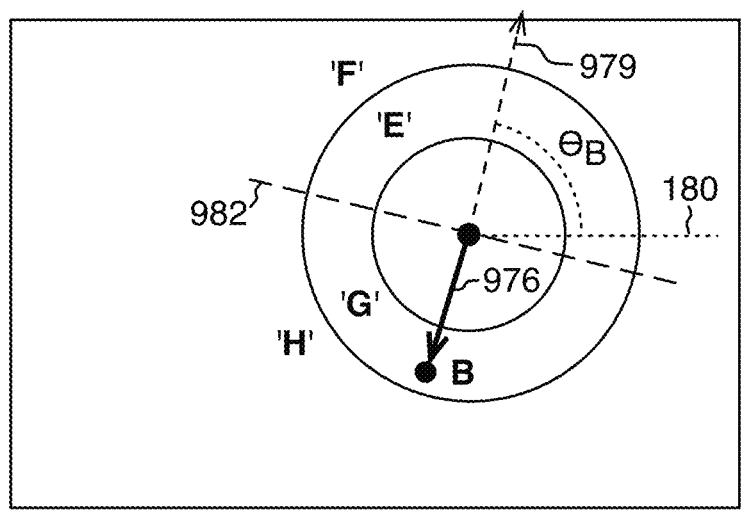
Figure 59C:
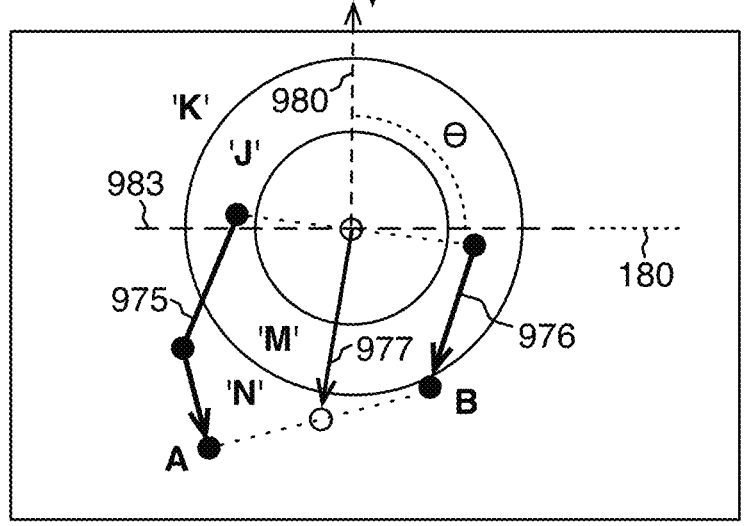

FIGS. 59A-59C depict another series of gestures. The figures do not show how finger identities are determined, but the touch device could directly provide the identities. A gesture level and a gesture direction parameterize each gesture. Gesture direction is determined from a half-plane partitioning that is oriented according to the identities of the gesturing fingers. In FIG. 59A, the user performs a backward gesture level 2 stroke along path 975 with finger A, indicating a request to input the character 'D'. In FIG. 59B, the user performs a backward gesture level 1 stroke along path 976 with finger B, indicating a request to input the character 'G'. The figure depicts different forward directions 978 and 979 for fingers A and B, given as forward angles $\theta_A$ and $\theta_B$, relative to which the respective half-plane partitionings 981 and 982 are oriented. In FIG. 59C, fingers A and B travel paths identical in form to the paths that they traveled in FIGS. 59A and 59B, except that they do so as part of a two-fingered sweep gesture. Although paths 975 and 976 start at different locations in FIG. 59C, the figure numbers the paths identically to their numbers in FIGS. 59A and 59B to emphasize their identical forms. FIG. 59C combines paths 975 and 976 into a single gesture using an interpolated distance vector 977. The sweep is here using a half-plane partitioning 983 that is oriented to a forward angle θ that is specific to the sweep. Here θ is the nearest average of angles $\theta_A$ and $\theta_B$. θ happens to be vertical, partitioning the two available discrete directions along the horizontal 180. The interpolated distance vector 977 has gesture level 2 and indicates a request to input the character 'N'.

Figure 60A:
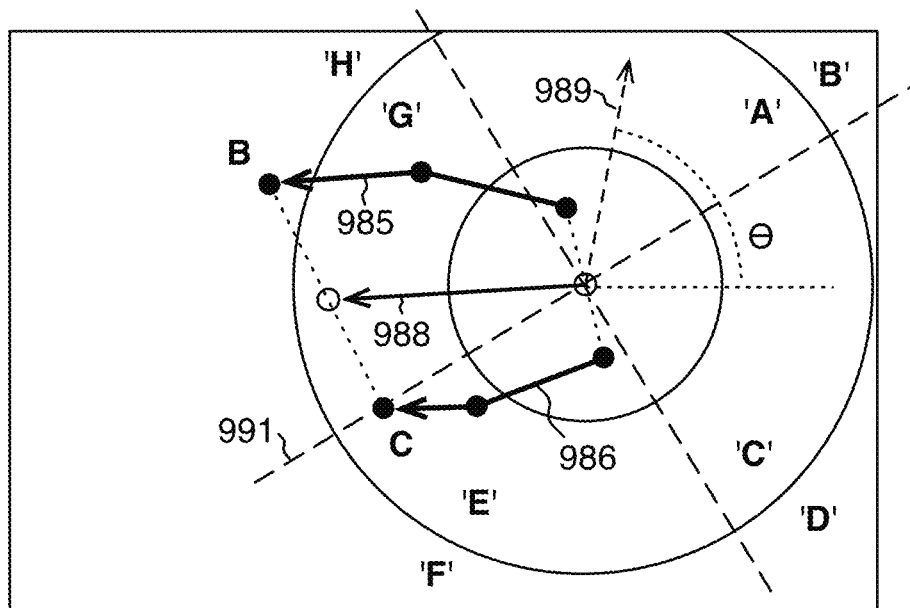
FIGS. 60A-60B depict a series of strokes and sweeps performed on a single-faceted device that does not use a finger map but does use gesture direction.
Figure 60B:
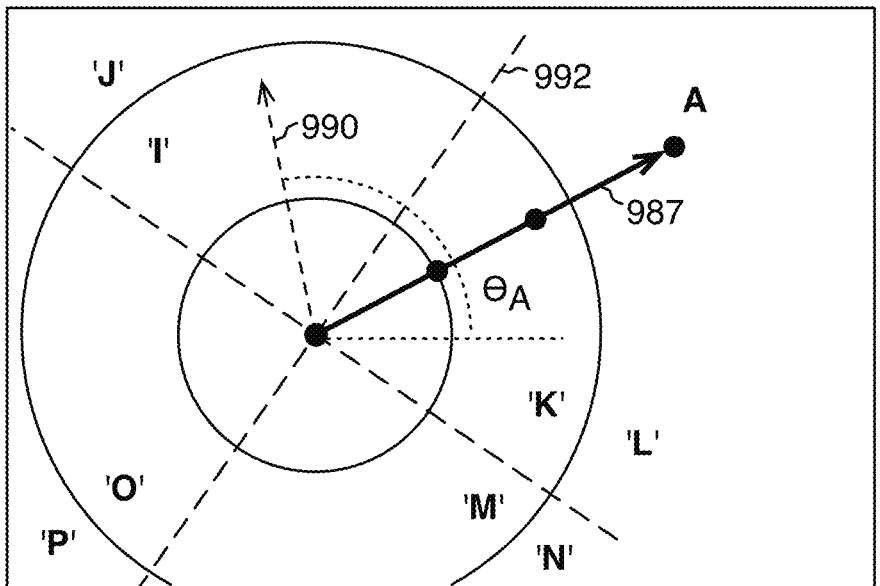

FIGS. 60A and 60B depict a final series of gestures. As with the previous series, no regions are depicted and the figures do not show how finger identities are determined. The gesture system in this example further parameterizes gestures with a gesture direction and supports a correspondence series of three fingers, identified as A, B, and C. The gesture system associates a distinct forward angle with each finger. Finger A has a forward angle $\theta_A$ equal to $7\pi/12$ radians, finger B a forward angle $\theta_B$ equal to $\pi/2$ radians, and finger C a forward angle $\theta_C$ equal to $\pi/3$ radians. In FIG. 60A, the user performs a two-fingered sweep along paths 985 and 986 with fingers B and C. The forward angles for fingers B and C—angles $\theta_B$ and $\theta_C$, which are not depicted—are averaged to produce a reference angle θ for orienting a directional partitioning 991. θ equals $5\pi/12$. The user request can then be determined for an interpolated distance vector 988. It is a request to input the character 'G'. The user lifts both fingers and then in FIG. 60B performs a stroke along path 987 with finger A. The oriented partitioning 992 is oriented to the forward direction 990 of finger A, which is given as forward angle $\theta_A$. The gesture indicates a request to input the character 'L'.

8 SAMPLE IMPLEMENTATION OF THE INVENTION

The "sample implementation" provided herein summarizes the design of a working implementation of a finger-mapped gesture system, although the assignment of gesture parameterizations to characters is here shown with improvements over the assignments used in the working implementation. The design depicts one way to integrate some of the finger-mapped gesturing options. Not all possible options are implemented. Much of the design is relegated to detailed state-transition diagrams. See the section "State-Transition Diagrams" at the end of the sample implementation for an explanation of how to read the state-transition diagrams.

8.1 Design Characterization

Here are some of the design decisions that characterize the sample implementation:

1) Touch Device—The sample implementation is written for a single-facet touchscreen device such as a tablet or a smartphone. The implementation displays the boundaries between input regions on the touchscreen, even dynamically moving the boundaries during repositioning. However, it does not need to display anything, so it would work equally well on a touch-sensitive surface not capable of display.

2) Host—The host is either an application or the touch device operating system. The host does not detect calibration gestures but instead relegates that to the gesture system, which is therefore limited to receiving calibration gestures only on the provided surface allocation.

3) Surface Allocation—The system is designed to work on a rectangular surface allocation such as the one a touchscreen device normally designates for a virtual keyboard. An application may designate the rectangular area instead. One side of the surface allocation is designated left and the other side is designated right, one side top and the other side bottom. The x-coordinate increases from left to right, y-coordinates from bottom to top (contrary to the device for which it was implemented, requiring adjustments to the input events).

4) Gesture Session—The gesture session persists until the surface allocation is closed. Finger maps may be dynamically relocated and re-calibrated on the surface allocation during a gesturing session. The session monitors for both finger-mapped gestures and non-finger-mapped gestures using the same architecture. This is an alternative to having the host simultaneously monitor the surface allocation for non-finger-mapped gestures. It also makes for a more flexible gesturing engine.

5) Input Area—The input area partitions the entire surface allocation into regions.

6) Hand Calibration—The system uses a channel-based hand calibration that always contains four finger calibrations, representing forward directions as forward angles. It is capable of representing arbitrary channel lines, as long as all forward angles are exclusively between 0 and $\pi$ radians (that is, directed towards the "top" of the device). However, the system may deduce finger calibrations from finger calibrations for just the index and pinky fingers. The hand calibration specifies whether it is for the left or right hand.

7) Finger Map—The finger map has four regions, one for each non-thumb finger. The boundary between adjacent regions bisects the area between adjacent channel lines. The outside boundaries of the end-of-series input regions are the boundaries of the surface allocation. The finger map can orient in any direction compatible with the forward angle constraint. The constraint on forward angles guarantees that the leftmost region always belongs to either the index or pinky finger, depending on the hand in use.

8) Gesturing Threshold—The gesturing threshold is an initial slide with a user-configurable gesturing threshold distance and minimum speed. The minimum speed is given as the maximum amount of time it takes the finger to travel the gesturing threshold distance.

9) Distance Measure—The starting point of the initial slide is used as the measurement origin. The distance measure is the length of a line segment that extends from the measurement origin to the sampling point.

10) Lockstep Gesturing—The only finger-mapped gestures recognized are strokes and two-fingered sweeps. The gesture system establishes a discrete direction for the gesture as a whole once all fingers have travelled a minimum distance. The gesture must have the same discrete direction at the time the selecting finger set is determined. The distance vectors of the two fingers of a sweep cannot have angles that differ by more than $\pi/2$ radians by class equivalence. The gesture level integers of the individual fingers of a sweep are allowed to differ by at most 1, ensuring that the distances that the fingers of a sweep travel are not too different. The gesture system does not limit the directions of movement available.

11) Retraction and Revocation—The sample implementation supports neither retraction nor revocation, which appear to have limited value.

12) Region Selection—The gesture system calculates region boundaries from channel lines and compares finger initial touch locations to these boundaries, associating each finger with its originating region. If both fingers of a sweep fall within the same region, the gesture system identifies the region closest to the midpoint between the two fingers' initial touch locations and reassigns one of the fingers to another region according to the midpoint determination process described in the detailed description of the invention.

13) Touch Counts—The gesture system supports multi-tapping for arbitrary touch counts. A repeat touch is given by either touching the same input region or by touching within a vicinity of the original touch, which is in its originating region. The touch counts of the fingers of a sweep may not differ by more than one in order for the sweep to be recognized. The touch count of the sweep gesture is the greater of the two touch counts.

14) Gesture Level—The gesture system supports three gesture levels, the first of which it designates level 0. Level 0 was intended to provide a minimum threshold distance for recognizing gestures, but in practice it proved best to set this distance to the minimum slide length, making it impossible to select gesture level 0. The distance that a finger must travel to indicate the other gesture levels is user-configurable. When no backbrush is performed, a finger's level selection point is determined for the locations of the fingers at the time the selecting finger set is defined. If the finger performs a backbrush, the gesture level is determined from the lengths of the first extent vectors of the fingers in the selecting finger set. The gesture level of a two-fingered sweep is the greater of the gesture levels of the two fingers.

15) Holds—Residual holds are implemented with a user-configurable timeout. The thumb may rest on the input region for either the index finger or the middle finger without affecting finger-mapped gesturing. The thumb may perform an escape hold by preceding a hold on either of these regions with a multi-tap touch count of 2 or higher, but this puts the gesture system into a mode of accepting non-finger-mapped gestures for the duration of the hold. The touch count selects the particular set of non-finger-mapped gestures enabled. The pinky may also perform a shift hold to allow the remaining fingers to gesture numbers and other characters. Hold locks are implemented for the thumb anchor, the thumb escape, and the pinky finger shift.

16) Long-Down Feedback—The gesture system detects a finger that has been placed on the gesture surface for an extended period of time without gesturing and reports this to the gesture detectors, which may use this information for specialized gestures and to provide the user with feedback. The autorepeat gesture described later is an example of such a specialized gesture. The gesture system may also use this feature to provide the user with mid-gesture feedback. If the user touches one or more fingers for the long-down timeout period, the gesture system can fix the finger identities and touch counts of the fingers to identify the set of possible user requests available to these fingers. The gesture system can report the long-down to the host, which may then inform the user of the user requests available to those fingers.

17) Gesture Direction—All finger-mapped gestures indicate one of four discrete directions, FORWARD, BACKWARD, LEFT, and RIGHT, according to a quarter-plane partitioning that orients separately to each finger's forward angle. In a two-fingered sweep, the reference angle is chosen as the average of the forward angles for the fingers gesturing, and the sampling angle is compared to the same quarter-plane partitioning oriented to this reference angle. If sweep does not include a backbrush, the sampling angle of a sweep is the nearest average of the angles of the distance vectors for the two fingers at the time the selecting finger set is determined. If the sweep includes a backbrush, the sampling angle is the nearest average of the angles of the fingers' first extent vectors.

18) Backbrushing—The gesture system supports two-level backbrushing, with the distance necessary to travel to select the second backbrush level user configurable. In a two-fingered sweep, the backbrush level of the gesture is the greater of the backbrush levels of the two fingers, and in order for the gesture to be recognized, the backbrush level integers of the two fingers cannot differ by more than 1. The tables below that assign gesture parameterizations to characters include a third backbrush level to illustrate the potential for extending the sample implementation to use additional backbrush levels.

19) Selecting Finger Set—The selecting finger set is determined at the time the first gesturing finger lifts. The user request is also selected at this time, employing the shift holds in effect at this time to further select the user request. The fingers of a sweep must be adjacent. This constraint is enforced to prevent conflicts with spaced-finger non-finger-mapped gestures that the gesture system allows the user to perform on top of the input area to close the input area or select alternate modes of operation. The gesture system does not issue the user request until all fingers of the selecting finger set have lifted, and if any finger continues to gesture for more than a certain amount of time after the first gesturing finger lifts, the gesture is treated as an error and the user request is not reported.

20) Extent Vectors—The sample implementation monitors for extent vectors during both finger-mapped gestures and tickling calibration. The gesture system records the first and the second extent vectors for use in determining the gesture and backbrush levels. The calibration gesture logic collects detected extent vectors over a period of time.

21) User Requests—The user requests are identifiers indicating requests to input characters and to perform other text editing functions. The gesture system looks up each gesture's parameterization in a set of structured tables to retrieve the indicated user request.

22) Status Reports—The gesture system reports occurrences of unrecognized gestures to the host. It also reports occurrences of hand calibration gestures, shift holds, shift hold releases, and a variety of non-finger-mapped gestures to the host.

23) Home Position Drift—The sample implementation does not handle home position drift, implementing neither dynamic recalibration nor guard borders.

8.2 User Request Gestures Supported

The gesture system supports three modes of operation on the surface allocation. The modes are cursoring, highlighting, and character entry. Only the character entry mode supports finger-mapped gestures. The cursoring and highlighting modes receive gestures for moving the cursor and for highlighting text. The design for this sample implementation supports all of these modes with the same gesture system; the session manager, finger tracker, and session engine implement finger-mapped and non-finger-mapped gestures alike. The gesture system simply includes a gesture detector specialized for each class of gesture. The gesture system also monitors for drumming, tickling, and repositioning calibration gestures. This section describes the supported gestures that result in user requests being issued to the host. A gesture detector is also used to detect calibration gestures, but calibration gesture support is described in the "Calibration Detector" section.

8.2.1 Recognized Finger-Mapped Gestures

The implementation translates finger-mapped gestures into text editing requests. Most of the gestures yield requests to insert characters, and some are requests to edit previously entered text. The tables in this section correlate gesture parameterizations with user requests. The tables are designed specifically for American English and were largely produced using principles such as the following:

1) The tables only use gesture levels 1 and 2. Gesture level 1 is called a "short" gesture, and gesture level 2 is called a "long" gesture. It appears to be easy to learn two gesture levels.

2) The most frequently entered letters are generally assigned to the gestures that are the fastest and easiest to enter. In English, the seven most frequently occurring letters are A, E, I, O, N, S, and T. They are assigned to short single-finger strokes not parameterized by multi-tapping or backbrushing. Gesturing backward is more natural than gesturing forward, so these are given to the most common letters, the vowels.

3) Second in precedence to assigning the most common letters to easy gestures is grouping gestures alphabetically. The fastest possible finger map would prioritize assignments by frequency of entry throughout, but the system would be too intimidating to learn. By grouping series of gestures alphabetically, the user need only remember the gesture for the first letter, making the gestures for the remaining letters of the alphabetical sequence clear.

4) Where possible, letters are assigned to gestures that approximate the form of the character. For example, a double-touch long stroke up of the pinky indicates an exclamation point, which can be drawn by tapping once and lifting for the dot and touching again and stroking up for the line, exactly as this gesture is performed. This helps users to remember the assignments of characters to gestures. Sometimes the only similarity is the number of pen/finger strokes common to the character and the gesture.
5) Similar characters are generally assigned similar gestures. For example, the question mark gesture is the gesture for the exclamation point with a level 1 backbrush added. A dash is a short stroke to the right, and an em-dash is a long stroke to the right.
6) A number of non-letter symbols are assigned gestures that differ from the gesture for a letter by only one parameter. The similarity of the gesture to the letter allows the letter to serve as a mnemonic for the gesture. For example, single-touch short strokes forward and backward produce the letters 'n' and 'a', while double-touch short strokes forward and backward produce the symbols '&' and '@', respectively.
7) Left and right gesturing fingers produce identical user requests for the index and middle fingers and identical requests for the ring and pinky fingers. This allows the user to select whether to gesture a finger from its rest location region toward another region or from another region toward its rest location region. This also helps users learn to gesture with either the left or the right hand.
8) Virtually all assignments are made to fingers moving forward and backward. Fingers moving forward and backward do not have to leave the home position, enabling more rapid input. When the hand leaves home position to move a finger left or right, the hand must first move back to home position to continue gesturing, slowing down input and potentially introducing error by not properly returning.
9) No sweeps are assigned left or right movement. This allows the gesture system to interpret all sweep-like movement left and right as gestures other than finger-mapped gestures, such as for opening a virtual keyboard or help screens on the surface allocation.
10) All sweeps are for adjacent fingers only. This allows the gesture system to provide a special interpretation for gestures that move forward or backward with fingers spaced apart at least a minimum distance; these gestures are not finger-mapped. Sweeps that are restricted to adjacent fingers also appear to take less dexterity for a user to perform, making them easier to learn and faster to input. Moreover, two-finger sweeps have an intuitive left-to-right ordering, which the gesture system takes advantage of to make it easier for the user to associate characters with the combinations of fingers involved in the sweeps.
11) Some characters are accessible via several gestures. This allows the user to pick the mnemonic that works best for the user.
12) The number characters are made available via a pinky shift hold. The pinky shift is analogous to a numeric keypad.
13) A letter case mode toggle is available by double-touching two fingers in input regions that are not adjacent. This reverses the case of the letters in the tables—lower case mode becomes upper case mode and upper case mode become lower case mode. Performing a new calibration gesture resets to lower case mode.

The tables below express gesture parameterizations using a shorthand notation. 1×, 2×, and 3× identify touch counts of 1, 2, and 3, respectively. "Short" is gesture level 1, and "long" is gesture level 2. F, B, L, and R identify the discrete direction assigned to the gesture and indicate FORWARD, BACKWARD, LEFT, and RIGHT, respectively. +0, +1, and +2 indicate no backbrushing, backbrush level 1, and backbrush level 2, respectively. Each cell shows the indicated user request. The occurrence of just a character in a cell indicates a request to insert that character. The tables are modified from the inventor's implementation to demonstrate the variety gesture translations possible. Blank cells indicate gestures that do not translate to user requests. The rows for many parameterizations are not shown because they are empty. Glancing through the table conveys an idea of the magnitude of user requests that finger-mapped gestured makes possible. Although the table columns are arrayed left-to-right from index finger to pinky finger, each table applies to both the left and right hands. That is, each finger named produces the same user requests regardless of which hand is gesturing. This facilitates learning to gesture with both the left and the right hand.

| Strokes | Index Finger | Middle Finger | Ring Finger | Pinky Finger |
| --- | --- | --- | --- | --- |
| 1x long F +0 | j | k | l | m |
| 1x short F +0 | n | s | t | . (period) |
| 1x short B +0 | a | e | i | o |
| 1x long B +0 | b | c | d | (space) |
| 1x short L +0 | (delete char left) | (delete char left) | | |
| 1x short R +0 | (space) | (space) | - (dash) | - (dash) |
| 1x long R +0 | (space) | (space) | — (em dash) | — (em dash) |
| 1x long F +1 | J | K | L | M |
| 1x short F +1 | N | S | T | , (comma) |
| 1x short B +1 | A | E | I | O |
| 1x long B +1 | B | C | D | (backspace) |
| 2x long F +0 | / | { | £ | ! |
| 2x short F +0 | & | [ | ~ | : |
| 2x short B +0 | @ | ) | ' (s. quote) | ° (degree) |
| 2x long B +0 | \ | < | $ | - (dash) |
| 2x short L +0 | (del. word left) | (del. word left) | | |
| 2x short R +0 | (del. char right) | (del. char right) | _(underscore) | _(underscore) |
| 2x long F +1 | | } | | ? |
| 2x short F +1 | | ] | ˆ | : |
| 2x short B +1 | | ) | `(back tick) | |

-continued

| Strokes | Index Finger | Middle Finger | Ring Finger | Pinky Finger |
|---|---|---|---|---|
| 2x long B +1 |  | > | ́ | + |
| 2x short B +2 | á | e | Í | ó |
| 2x long B +2 | ã |  | Ĭ | ŏ |
| 3x short B +0 |  |  |  |  |
| 3x long B +0 |  |  |  | — (em dash) |

| Sweeps | Index + Middle | Middle + Ring | Ring + Pinky |
|---|---|---|---|
| 1x long F +0 | x | y | z |
| 1x short F +0 | u | v | w |
| 1x short B +0 | f | g | h |
| 1x long B +0 | p | q | r |
| 1x long F +1 | X | Y | Z |
| 1x short F +1 | U | V | W |
| 1x short B +1 | F | G | H |
| 1x long B +1 | P | Q | R |
| 1x long F +2 |  |  |  |
| 1x short F +2 | ¨ (modifier) | ˇ (modifier) | ˜ (modifier) |
| 2x long F +0 | * |  | (tab) |
| 2x short F +0 | _ (underscore) | \| (vertical bar) |  |
| 2x short B +0 | ° (degree) |  | " (d. quote) |
| 2x long B +0 | % | = | (new line) |
| 2x long F +1 |  |  | (back tab) |
| 2x short F +1 |  | ^ |  |
| 2x short B +1 |  |  |  |
| 2x long B +1 | # | # | (line break) |
| 2x long F +2 | ù |  |  |
| 2x short F +2 | ú |  |  |

| Pinky Shift Strokes | Index Finger | Middle Finger | Ring Finger |
|---|---|---|---|
| 1x long F +0 | 7 | 8 | 9 |
| 1x short F +0 | 4 | 5 | 6 |
| 1x short B +0 | 1 | 2 | 3 |
| 1x long B +0 | 0 | . (period) | (space) |
| 1x short F +1 |  |  | , (comma) |
| 1x long B +1 |  |  | (backspace) |
| 2x long F +0 | / |  |  |
| 2x long B +0 |  |  | - (dash) |
| 2x short B +1 |  |  |  |
| 2x long B +1 |  |  | + |

| Pinky Shift Sweeps | Index + Middle Finger | Middle + Ring Finger |
|---|---|---|
| 1x long F +0 | * |  |
| 1x short F +0 |  |  |
| 1x short B +0 |  |  |
| 1x long B +0 | % | = |
| 1x short F +1 |  | (tab) |
| 1x long B +1 |  | (new line) |
| 2x long F +0 |  | (back tab) |
| 2x long B +0 |  | (line break) |

FIGS. 61A and 61B serve as cheat sheets for inputting letters and numbers according to the above tables. FIG. 61A is a finger map whose four input regions 994-997 are parallel and positioned relative to each other according to a hand calibration. FIG. 61B is a finger map whose four input regions 994-997 are equivalent to the input regions of FIG. 61A but shaped to accommodate channel lines along which the fingers move. In both finger maps, adjacent input regions are alternately shaded from one side of the finger map to the other. The dotted lines 998-999 and dashed lines 1000 do not represent boundaries within the regions 994-997, instead providing a mnemonic depiction of the gesture parameterizations available. The dashed line 1000 separates characters that are input via forward gestures from those that are input via backward gestures. The characters shown in the top half 1001 of the finger map, above the dashed line 1000, are input via forward gestures, and the characters shown in the bottom half 1002 of the finger map, below the dashed line 1000, are input via backward gestures. In particular, the characters in the top half 1001 shown above the dotted line 998 are input via long forward gestures and those shown below the dotted line 998 are input via short forward gestures. The characters in the bottom half 1002 shown above the dotted line 999 are input via short backward gestures and those shown below the dotted line 999 are input via long backward gestures.

Each input region 994-997 in FIGS. 61A-61B is shown partitioned into four cells. Each cell represents a stroke input with a particular finger in a particular direction at a particular length. Were fingers to gesture starting on the dashed line 1000, they would move toward the cell that indicates the desired character. The cells are mnemonic only and do not functionally correspond to areas on the input region. Most cells have a top character and a bottom character, although cells in the pinky finger region 997 only have bottom characters. The bottom character is the character that the corresponding gesture normally inputs. For example, a long stroke forward with a finger anywhere in the ring finger region 996 indicates the letter 'l', and a long stroke backward with a finger anywhere in the ring finger region 996 indicates the letter 'd'. The character at the top of the cell indicates the character that the corresponding gesture inputs when performed using a pinky shift. For example, holding the pinky finger down while gesturing the middle finger forward a short distance indicates a '5'. The characters that span boundaries between the cells of adjacent regions represent sweep gestures input in the given direction for the indicated length. For example, a long sweep of the middle and ring fingers backward indicates the letter 'q'. These figures do not show the results of sweeping one finger a short distance and another finger a long distance. In these cases, the sample implementation treats both fingers as having performed a long gesture.

8.2.2 Autorepeat Gestures

It is common for a user to need to repeatedly input the same character. A physical keyboard allows the user to do this by continuing to hold a key down. A finger-mapped gesture system should make this an easy operation too. The sample implementation provides a way to do this, but the detailed design is not included in this specification.

The obvious solution is to repeatedly report the user request for a gesture if the user keeps the fingers touching the gesture surface at length at the end of the gesture. The sample implementation only detects the end of the gesture with the lifting of a finger, so this does not work in the present context. An alternative implementation could detect a gesture ending when the user's fingers become stationary after gesturing, but this alternative is not suitable for users who are learning to gesture because they may often leave their fingers down in hesitation. This alternative is also potentially problematic should the host or the gesture system support non-finger-mapped gestures that might be ambiguous with gestures that are recognized before a finger lifts.

A better solution allows the user to complete the gesture with the lifting of a finger and requires that the user touch the fingers again right afterwards to induce autorepeat behavior. If the user touches the same fingers that produced the previous gesture and holds them down at length, the gesture system can detect this as a request to repeat the previous user request. However, under this approach, users are likely to hesitate their fingers as they learn to use the system, and this hesitation will likely be interpreted a request to autorepeat the previous user request.

A still more robust solution requires the user to complete the gesture, lift the fingers, and then double-touch or triple-touch the same fingers to induce an autorepeat. For example, the user may perform a long sweep forward with the index and middle fingers to issue an 'x' user request, lift both fingers, and then double tap both the index and middle fingers, holding them against the gesture surface. After a timeout period, the gesture system determines that these are the fingers of the selecting finger set of the most recently input gesture and therefore begins reporting the previous request at regular intervals, autorepeating the 'x' while the user holds the two fingers touching. If the user initiates the autorepeat with a triple-touch, the gesture system can autorepeat the previous user request at a faster rate, allowing the user to select the rate of the autorepeat.

Autorepeat functionality can be implemented with an autorepeat gesture detector, which is not depicted in this specification. It has a state machine having an Autorepeat Pending State and an Autorepeating State. The gesture system keeps track of the most-recently reported user request, along with the finger identities that gestured that user request. The Autorepeat Pending State listens for "long down" finger events and waits to receive one "long down" for each finger identity of the preceding user request. The gesture detector terminates with mismatch if a "long down" is reported for a finger identity that was not part of the previous user request. Upon detecting the required "long downs," the gesture system checks to see whether each finger has a touch count of at least 2. If so, the gesture detector changes to the Autorepeating State.

Upon entering the Autorepeating State, the gesture detector starts a timer with a timeout period. If the maximum touch count was 2, the timeout period is long (e.g. 333 ms), and if it is 3, the timeout period is short (e.g. 200 ms), making for slow and fast autorepeating, respectively. On each timeout, the detector reports the previously reported user request to the host again and restarts the timer for another timeout. The autorepeat detector terminates when at least one of the fingers lifts. It also terminates if one of the fingers begins sliding or if an additional finger touches for a long-down.

The gesture system can interpret any single-finger double- or triple-touch or any two-finger double- or triple-touch as a request to repeat the previous user request, provided that it is followed by a "long down" period to signal a request to autorepeat, and provided that this behavior is compatible with the non-finger-mapped gestures supported. This potentially generalizes autorepeating to support non-finger-mapped gestures as well.

8.2.3 Supported Non-Finger-Mapped Gestures

The cursoring and highlighting modes implement gestures without using a finger map. Their gestures are not technically finger-mapped gestures. The user may perform a calibration gesture while in the cursoring or highlighting mode to exit the mode, produce a finger map, and enter character entry mode. While in character entry mode, the user may double-touch the thumb to induce an escape hold in the cursoring mode and triple-touch the thumb to induce an escape hold in the highlighting mode. Double- or triple-touching the thumb in cursoring mode establishes highlighting mode.

The cursoring and highlighting modes provide the same gestures. These gestures use only a single finger and do not depend on the identity of the finger, except for the determination of highlighting mode. If a finger multi-taps but remains stationary while another gestures and completes, the first finger is deemed the thumb performing a hold to establishing highlighting mode. This hold locks. The gesturing finger moves in the FORWARD, BACKWARD, LEFT, or RIGHT ranges of directions to issue requests to move the cursor in these directions. The length of the gesture (that is, the gesture level) and the touch-count of the gesture together determine how far to move in that direction. The gestures move the fingers by one character, one word, one line, one paragraph, one page, or to the start or end of text. Moving the cursor in highlighting mode causes the characters between the cursor position at the start of highlighting and the current cursor position to be highlighted. This can be accomplished by having each cursoring user request indicate whether the cursoring movement was done with highlighting. The host manages the highlighting itself.

The gesture system also provides a set of gestures that are common to all three modes. In particular, they can be performed on top of a finger map without being confused with finger-mapped gestures. The gestures are designed to be distinguishable from finger-mapped strokes and finger-mapped adjacent two-fingered sweeps. The common gestures have two gesturing fingers coming together ("pinching"), going apart ("zooming"), spaced far apart (too far apart to be considered sweeps), or adjacent but moving left or right, and they can be parameterized by touch count, direction, and gesture level. The common gestures represent user requests such as cutting, copying, or pasting clipboard text, or issuing new lines, line breaks, tabs, or back tabs. The common gestures also represent requests to open a virtual keyboard or a table of symbol characters. A gesture can even terminate the gesture system, closing the surface allocation.

With a suitable touch count to designate the meaning of a pinch or zoom gesture, pinching and zooming can be used to dynamically adjust the gesture level threshold distances. For example, suppose the gesture system supports separate gesture threshold distances for determining gesture level according to the direction of the gesture. A triple-touch pinch or zoom oriented left and right can then change the threshold distances for determining gesture levels for left/right gestures in proportion to the change in distance between the fingers during the gesture. Likewise, a triple-touch pinch or zoom oriented forward and backward can also change the threshold distances for determining gesture levels for forward/backwards gestures in proportion to the change in distance between the fingers during the gesture.

The gesture system can also support a "scrubbing" gesture by limiting the range of direction angles recognized as tickling. This allows fingers that gesture at strong angles to the left or right to be interpreted as scrubbing gestures if they move left and right at a rapid pace. A gesture of at least three extent vectors is sufficient. Scrubbing can be single-fingered or multi-fingered. Scrubbing gestures are useful for representing user requests to undo and redo previous user requests, because the scrubbing gesture motion is similar to the motion of erasing with a pencil's eraser.

8.3 Architectural Overview

The sample implementation includes the following architectural components:

1) Session Manager—The session manager is a singleton object that manages the gesture system for the life of a gesture session. It receives input events from the host for the surface allocation, creates finger trackers as necessary to handle them, and forwards the events to the appropriate finger trackers. The session manager also manages the session configuration and the active hand calibration.

2) Finger Tracker—A finger tracker (also called a "tracker") manages a particular finger for the full time that the finger participates in a gesture. It receives raw input events, accumulates them and translates them into the simpler finger events that gesture detectors understand, sending finger events to the gesture detectors via the session engine. Each finger tracker also maintains finger-specific state, such as touch counts, the initial touch location, and extent vectors accumulated during a tickling calibration.

3) Slide Detector—A slide detector is an object that a finger tracker employs to monitor a finger's path for the initial slide. The finger tracker hands it each newly received point on a finger's path. The slide detector collects the points, checking them for the initial slide condition and informs the finger tracker whether the new point resulted in an initial slide. Once an initial slide occurs, the finger tracker considers the finger to be thereafter sliding, so the finger tracker discards the slide detector.

4) Session Engine—The session engine is a singleton state machine that receives events from the finger trackers, manages the life cycle of the gesture detectors, and forwards finger events to the gesture detectors. It is responsible for waiting for unrecognized gestures to complete before accepting new gestures.

5) Gesture Detector—A gesture detector monitors finger events for specific gestures. Each kind of gesture detector recognizes a specific set of gestures. Each gesture detector receives events from the session engine, attempts to find a matching gesture, and reports the results of the attempt back to the session engine. Upon finding a match, the gesture detector also identifies a user request for the gesture and reports the user request to the host when the gesture completes. This specification provides details for the stroke gesture detector, the sweep gesture detector, and the calibration gesture detector. The sample implementation includes other gesture detectors as well, such as a gesture detector for receiving autorepeat gestures, pinch and zoom gestures, and non-adjacent two-fingered gestures.

6) Hand Calibration—A hand calibration provides a channel-based characterization of a particular user's hand. The sample implementation maintains one hand calibration for the left hand and another for the right hand, employing the appropriate one for the hand in use. The hand calibration itself consists of four finger calibrations, some of which can be inferred from other finger calibrations during a calibration gesture. The drumming gesture switches between the left and right hand calibrations. The gesture system always draws the finger map for the current hand calibration.

8.4 Input Events

The sample implementation assumes that the host emits the following input events:

1) Finger Down—The user has just placed a finger on the input area. This event includes the coordinates of the location that the finger touched. "Finger down" must be the first event issued for a newly touching finger; it is issued for a finger prior to issuing any "finger moved" or "finger up" event for the finger.

2) Finger Moved—A finger currently on the input area has moved to a location different from its last reported location. This event includes the coordinates of the location to which the finger moved. It is up to the host whether to inform the gesture system of movements of a finger that leaves the input area. This event can only be issued for a finger that was previously reported via "finger down."

3) Finger Up—A finger that was previously placed on the input area has just lifted from the touchscreen. This event need not report coordinates. The event can only be issued for a finger previously reported via "finger down," but it must be reported for a finger regardless of where on the touchscreen the finger lifts.

Each input event also includes a host-assigned finger ID that enables the gesture system to associate multiple events with the same finger. This host finger ID is provided with the "finger down" event, remains constant across "finger moved" events, and is reported one last time at "finger up." "Finger up" releases the ID for possible reuse by the host in a subsequent "finger down." Note that a "finger ID" is different from a "finger identity." Finger IDs distinguish multiple touching fingers without regard to the identities that the fingers have on a hand. Each input event also includes a timestamp providing the time at which the event occurred. In the case of "finger moved," this is the time at which the finger arrived at the reported new location.

8.5 Session Manager

The session manager implements a gesture session. The host creates and destroys session managers as needed. The host may specify hand calibrations for the session manager upon creation, but it need not, because the user can input hand calibrations via the session manager. Other components of the sample implementation look to the session manager for the gesture system's configuration and active hand calibration.

8.5.1 Session Manager Configuration

The session manager keeps a hand calibration for both the left and right hands. The hand calibrations can be pre-configured when the session manager is created.

8.5.2 Session Manager State Values

The session manager keeps a list of the active finger trackers. This includes trackers for fingers that have recently lifted from the touchscreen if the system deems that those fingers may yet touch the input area again to extend their contributions to the gesture. The list also includes fingers that have recently lifted for their residual hold periods. The session manager also keeps track of which fingers are known to be performing holds.

Because this gesture system supports non-finger-mapping gestures, the session manager also maintains a session mode, indicating which class of gestures is in effect. Two modes are supported: character entry mode and cursoring mode, the second of which disables the finger map and enables gestures for moving the cursor. Cursoring mode effectively has two submodes: highlighting and not highlighting, depending on how cursoring mode was activated.

The session manager also indicates which hand calibration is the active one.

8.5.3 Session Manager Services

The session manager provides these services to other components of the system.

8.5.3.1 Process an Input Event

The session manager receives input events from the host, processing one event at a time. The inputs events are "finger down," "finger moved," and "finger up." Upon receipt of a "finger down" event, the session manager performs the following steps:

1) Scan the active finger trackers for a finger tracker having an ID equal to the host-provided finger ID. If a matching ID is found, the host is reusing an ID that it had used with a previous finger. In this case, re-assign the finger tracker to a different ID not already in use by another finger tracker. This conflict can arise because a finger tracker can remain active representing a finger for a brief period after the finger lifts, during residual holds.
2) Loop through the active finger trackers, asking each whether the newly down finger is actually an additional touch for a finger that lifted only moments ago. Each finger tracker bases the determination on the new "finger down" coordinates and on the input regions touched. If any finger tracker reports that the new "finger down" is an additional touch for its associated finger, reassign that finger tracker's ID to the ID that the host provided for the new "finger down." This resumes the finger tracker using the new finger ID. The finger is presumably the same finger that had previously produced the finger tracker. In this case, send the new "finger down" event to the resumed finger tracker and skip step (4).
3) Here the session manager has a newly participating finger. It sends a "new finger elsewhere" event to each finger tracker.
4) Finally, the session manager creates a new finger tracker for the newly down finger, initializing it with the provided host finger ID, event time, event coordinates, and input region touched.

For the "finger moved" and "finger up" events, the session manager just finds the active finger tracker having an ID that matches the provided host ID and sends that finger tracker the "finger moved" or "finger up" event.

8.5.3.2 Confirm Potential Hold Fingers

The session engine calls this service to have the session manager inform the finger trackers that any finger that was potentially serving as a hold was actually serving as a hold. The session manager loops through all of the active finger trackers and sends a "confirm hold" event to each. Each finger tracker's internal state indicates whether the tracker's associated finger was potentially performing a hold, allowing the finger trackers to handle "confirm hold" events appropriately.

8.5.3.3 Set Active Hand Calibration

Changes the active hand calibration to the one provided.

8.5.3.4 Set Active Session Mode

This service asks the session manager to change the active session mode. Because mode-specific gesture detectors may be in effect, the session mode can only be changed when no fingers are touching the input area. The session manager enforces this.

8.6 Finger Trackers

A finger tracker monitors a finger that touches the input area. It translates input events into finger events. Finger events are a distillation of input events into units that provide enough information for gesture detectors to make decisions. While finger events are intended for consumption by gesture detectors, they are sent to the gesture detectors via the session engine, which maintains the general state of the gesture. A finger tracker also represents a user's finger and the properties accumulated to characterize the finger and the history of its participation in the current gesture. A finger tracker represents a finger not only during the time it is in contact with the touchscreen, but also potentially for a brief time after it lifts from the touchscreen between touch counts or during a residual hold. Each finger tracker runs as an independent state machine, as depicted in FIGS. 62A-62B.

8.6.1 Finger Tracker Configuration

Each finger tracker has an ID that uniquely identifies the finger. The session manager may reassign the ID to resolve conflicts among finger IDs. The finger tracker is also configured with the finger's initial location and time.

8.6.2 Finger Tracker State Values

The finger tracker implements a state machine and so maintains a state name. It also keeps track of the finger's current location and touch count. It delegates responsibility to a slide detector for keeping track of points on the finger's path to detect the initial slide. It also keeps track of whether the finger is a thumb that is designated as an anchor.

The finger tracker also calculates each extent vector for the finger and makes the extent vectors available to the gesture detectors. The finger tracker itself records the first and second extent vectors for use in determining the gesture level and the backbrush level.

8.6.3 Finger Tracker Services

A finger tracker provides these services to other components of the system.

8.6.3.1 Process an Input Event

Once the session manager has identified or created the appropriate finger tracker to process an input event, it sends the event to the finger tracker for processing. The finger tracker processes each input event according to the current state of the state machine.

8.6.3.2 Determine Whether Finger has Additionally Touched

This service determines whether a "new finger" event represents an additional touch for the finger. The service reports a finger to have additionally touched if the finger tracker is in the "Possible Intertap" superstate and the finger either touches the input region that the finger touched on its first touch or it touches the input area within a certain radius of the finger's most recent touch location. The radius is user-configurable.

8.6.3.3 Process a "Confirm Hold" Event

A "confirm hold" event informs the finger tracker that if it is in a state that allows the finger to potentially serve as a hold, the finger is actually serving as a hold. The finger tracker passes this event to its state machine to lock the finger in the hold state.

8.6.3.4 Process a "New Finger Elsewhere" Event

A "new finger elsewhere" event informs the finger tracker that another finger has newly touched the input area, a finger for which no finger tracker previously existed. The finger tracker passes this event to its state machine, which terminates the finger tracker if it was in a state waiting for the finger to touch the input area again. If the user begins a new gesture, the gesture that the current finger was contributing to must be done.

8.6.4 Finger Events

The finger tracker's state machine translates input events into finger events that the gesture detectors understand. Each finger event describes an action of the finger that the finger tracker monitors. The state machine sends finger events to the session engine to forward to the gesture detectors. The finger events are as follows:

1) New Touch—Reports that the finger has touched the input area, possibly again if the finger had previously lifted to subsequently increase the touch count.
2) Long Down—Reports that the finger has been touching the input area for an extended period of time without gesturing.
3) Slide—Reports that the finger has moved in a way determined to be intentional. Upon performing an initial slide, the initial slide is reported as a slide, and each subsequent movement of the finger is reported as a slide.
4) End Touch—Reports that the finger has lifted from the input area. This event does not preclude the finger from subsequently reporting a New Touch.
5) End Hold—Reports that a finger is no longer capable of serving as a hold. The finger has lifted, and the residual hold period has expired.

8.6.5 Finger Tracker State Machine

FIGS. 62A-62B depict a state-transition diagram for the finger tracker's state machine. The transition from the initial state to the Finger Touch state represents the session manager creating a finger tracker. The diagram depicts this as a "new finger" event. The actions of this transition initialize the state machine. The transitions to the final state represent inactivating or destroying the finger tracker.

8.6.5.1 Finger Tracker States

The state machine employs the following states:

Potential Hold or Slide State 1015—Superstate in which the finger is on the touchscreen but hasn't yet begun gesturing.

Finger Touch State 1016—State in which the finger has recently touched the input area. The finger tracker starts in this state when the finger first begins to contribute to a gesture. This is the only state from which the finger may lift to touch again in order to increase the touch count. Lifting and touching again within the time constraints returns the finger tracker back to this state.

Tap Expiration State 1017—State in which the finger hasn't yet begun gesturing but has been in contact with the touchscreen for too long to be able to lift again to increase the touch count. Gesture detectors are generally still waiting for this finger to do something before identifying the gesture, but some gesture detectors may act on the length of time that the finger has been touching.

Known Hold State 1018—State in which the finger contributed to a previously completed gesture either by serving as a hold for the gesture or by serving as an anchor for the hand while the hand performed the gesture. (The only anchor that the sample implementation supports is the thumb anchor.) Once a finger tracker is in this state, the associated finger is free to move wildly about without breaking the hold or anchor.

Sliding State 1019—State in which the finger is considered to be sliding. A finger begins sliding when it performs an initial slide, moving a distance of at least the minimum initial slide length in no more than the maximum initial slide duration. Once a finger begins sliding it remains in the Sliding State 1019 until the end of the gesture.

Finger Lifted State 1020—Superstate in which the finger has lifted from the touchscreen but may still contribute to the gesture, either by touching again to increase the touch count or by briefly providing a residual hold.

Possible Intertap State 1021—Superstate in which the finger has lifted from the touchscreen and still has time to touch again to increase the touch count.

Intertap Residual Hold State 1022—State in which the finger has lifted from the touchscreen and still has time to touch again to increase the touch count. A finger in this state is also capable of serving as a residual hold.

Intertap Suspended Hold State 1023—State in which the finger has lifted from the touchscreen and still has time to touch again to increase the touch count but has been up too long to serve as a residual hold. This state exists distinctly from the Intertap Residual Hold State 1022 in order to allow the residual hold time and maximum multi-tap up time to be independent of each other.

Residual Hold State 1024—State in which the finger has lifted from the touchscreen and still has time to serve as a residual hold. The finger is not able to further increase the touch count from this state.

8.6.5.2 Finger Tracker Transitions

The state machine transitions employ the following symbols:

| Symbol | Meaning |
| --- | --- |
| $L$ | Current location of the finger |
| $L_0$ | Initial location of the finger |
| $C_T$ | Current touch count |
| $S_L$ | Minimum initial slide length |
| $S_T$ | Maximum initial slide duration (milliseconds) |
| $T_D$ | Multi-tap down timer, which once started, times out when the finger has been on the touchscreen too long to lift and touch again to increase the touch count. The duration of this timer is called the "maximum multi-tap down time." |
| $T_U$ | Multi-tap up timer, which once started, times out when the finger has been off of the touchscreen too long to touch again to increase the touch count. The duration of this timer is called the "maximum multi-tap up time." |
| $T_L$ | Long-down timer, which determines when the Long Down event should be reported. The duration of this timer is called the "minimum long-down time." |
| $T_R$ | Residual hold timer, which once started, times out after the finger has been lifted too long to be able to register as a hold. The duration of this timer is called the "residual hold time." |

The state machine employs the following transition text:

Transition 1025—"new finger/start $T_D$; $L_0=L$; $C_T=1$; if $(T_L>T_D)$ {start $T_L$}; send(new touch)"

Transition 1026—"$T_D$ T/O/if $(T_L=T_D)$ {send(long down)}"

Transition 1027—"finger up/clear $T_D,T_L$; start $T_U,T_R$; send(end touch)"

Transition 1028—"finger moved [t($S_L$)>$S_T$]"

Transition 1029—"$T_L$ T/O/send(long down)"

Transition 1030—"finger moved [t($S_L$)≤$S_T$]/clear $T_D,T_L$; beginSlide( ); send(slide, initial)"

Transition 1031—"confirm hold/clear $T_D,T_L$"

Transition 1032—"finger up/start $T_R$; clear $T_L$; send(end touch)"

Transition 1033—"confirm hold"

Transition 1034—"finger moved/continueSlide( ); send (slide)"

Transition 1035—"finger up/send(end touch)"

Transition 1036—"finger moved"

Transition 1037—"finger up/start $T_R$"

Transition 1038—"$T_R$ T/O"

Transition 1039—"$T_U$ T/O/send(end tap)"

Transition 1040—"finger down/clear $T_U,T_R$; $L_0=L$; $C_T=C_T+1$; start $T_D$; if $(T_L>T_D)$ {start $T_L$}; send(new touch)"

Transition 1041—"($T_R$ T/O or new finger elsewhere)/ clear $T_R$; send(end hold)"

Transition 1042—"$T_U$ T/O/send(end tap); send(end hold)"

Transition 1043—"new finger elsewhere/clear $T_U$,$T_R$; send(end tap); send(end hold)"

Transition 1044—"confirm hold"

Transition 1045—"new finger elsewhere"

8.6.6 Finger Tracker Functions

The finger tracker state machine uses the following support functions.

8.6.6.1 t(x)—Time Taken to Travel Distance x

This function returns the amount of time the finger took to travel to its current location from the most recent location on its path that is at least a distance of x from the current location. The state machine only uses this function for the value $S_L$, which is the minimum initial slide length. (Including $S_L$ in the transition text makes the nature of the t(x) function clearer.) If the finger has not yet travelled a distance of $S_L$, $t(S_L)$ evaluates to infinity for comparison purposes. In this case, the implementation could have t(x) return the maximum value of an integer.

8.6.6.2 beginSlide( )—Initiate Sliding

This function initiates sliding behavior. In particular, it establishes an estimated angle for the first extent vector and a half-plane oriented partitioning oriented to the estimated angle for monitoring for subsequent reversals of direction.

8.6.6.3 continueSlide( )—Continue Sliding

This function monitors for reversals of direction and collects extent vectors.

8.6.6.4 Send(e) or Send(e, i)—Send Finger Event

The two forms of this function send the finger event e to the session engine. The form "send(e, i)" also reports that the event represents an initial slide. The 'i' here is just a flag.

8.7 Session Engine

The session engine manages the gesture detectors. It creates a new set of gesture detectors to handle each new gesture and passes finger events to the gesture detectors until one of them recognizes the gesture. When a gesture detector finishes receiving the gesture, or when no gesture detectors recognize the gesture, the session engine deletes all of the gesture detectors and waits for the next gesture. The session engine is also responsible for waiting for an unrecognized gesture to complete before attempting to recognize a subsequent gesture.

8.7.1 Session Engine State Values

The session engine maintains an array of gesture detectors. It creates the array anew for each new gesture, selecting the kinds of gesture detectors according to the active session mode, and it removes gesture detectors from the array as they report failure to recognize the gesture that the session engine is currently in the process of receiving.

8.7.2 Session Engine State Machine

FIG. 63 depicts a state-transition diagram for the session engine state machine. Although it is not indicated, the state machine begins in the Accepting Gesture State 1050 and persists for the life of the session manager.

8.7.2.1 Session Engine States

The state machine employs the following states:

Accepting Gesture State 1050—State in which the gesture system is accepting gesturing input from the user. The session engine remains in this state waiting for new gestures to begin and waiting for existing gestures to complete.

Cleaning Up Gesture State 1051—State in which the gesture system is not accepting gesture input from the user. The session engine enters this state when none of the gesture detectors recognizes the gesture. It remains in this state until the user lifts all fingers that were gesturing. Hold fingers may remain touching, however.

8.7.2.2 Session Engine Conditionals

The state machine employs the following conditionals, which evaluate to their indicated functions:

Conditional 1052—"feed( )"

Conditional 1053—"noDetectors( )"

Conditional 1054—"noNonHolds( )"

Conditional 1055—"noNonHolds( )"

8.7.2.3 Session Engine Transitions

The state machine transitions employ the symbols IC, M, C, and X defined in the section titled "State-Transition Diagrams." It also employs the following transition text:

Transition 1056—"new touch/if (noDetectors( )) {activate( )}"

Transition 1057—"*"

Transition 1058—"C complete/clearDetectors( )"

Transition 1059—"IC incomplete or X mismatch"

Transition 1060—"true"

Transition 1061—"false"

Transition 1062—"false"

Transition 1063—"true/confirmHolds( )"

Transition 1064—"new touch"

Transition 1065—"end touch"

Transition 1066—"*"

Transition 1067—"true/clearDetectors( )"

Transition 1068—"false"

Transition 1069—"end hold [! noDetectors( )]"

Transition 1070—"end hold [noDetectors( )]"

Transition 1071—"M match/keepMatch( )"

8.7.3 Session Engine Functions

The session engine state machine uses the following support functions.

8.7.3.1 Activate( )—Activate Gesture Detectors

This function creates a new array of gesture detectors, selecting the detectors according to the session mode. The session mode that supports finger maps creates one instance of each of the following gesture detectors: stroke detector, sweep detector, and calibration detector. Additional non-finger-mapping detectors are added to the array to detect clipboard operations, cursor movement requests, and general state change requests, such as to change to cursoring mode or to close the session manager.

8.7.3.2 clearDetectors( )—Terminate Gesture Detectors

This function terminates all active gesture detectors. This function is never called in a context that terminates a gesture that a gesture detector has only partially matched a gesture; it is only called when gesture detectors have either reported a match or all mismatched.

8.7.3.3 confirmHolds( )—Confirm all Potential Holds

This function asks the session manager to confirm all potential hold fingers.

8.7.3.4 feed( )—Feed Finger Event to Gesture Detectors

This function iterates over the gesture detector array and sequentially passes to each gesture detector the finger event that was just sent to the session engine. Each gesture detector immediately processes the finger event and reports one of the following results: incomplete, match, complete, or mismatch. The function terminates each gesture detector that reports a mismatch, removing it from the array. It stops passing the finger event to gesture detectors the first time a gesture detector reports a match or a completion. The order in which the gesture detectors appear in the array is not significant for the gesture detectors that support finger mapping, but it can be significant when gesture detectors are included for other types of gestures.

8.7.3.5 keepMatch( )—Keep Only the Matched Detector

This function removes all gesture detectors from the array except for the one that just indicated a match.

8.7.3.6 noDetectors( )—Whether there are No Detectors

Returns true if the gesture detector array is empty and false otherwise.

8.7.3.7 noNonHolds( )—Whether at Most Holds Remain

Returns true if there are no fingers other than hold fingers in the session manager's list of active fingers, and returns false otherwise. In other words, returns true if either there are no active fingers or all active fingers are hold fingers, and returns false otherwise. In the context of this function, a hold finger is a locked hold finger or a finger that was serving as a hold in the present gesture at its completion according to the completing gesture detector, such as a finger that was touching the input area at completion without ever having performed an initial slide or a finger for which a residual hold was in effect.

8.8 Stroke Detector

A stroke detector detects a finger-mapped stroke gesture. It supports gesture direction and backbrushing. Only two backbrush levels are available. The gesture direction of a stroke evaluates to the discrete direction for the angle of the stroke's first extent vector as read from a quarter-plane partitioning oriented to the forward angle for the finger identity determined for the finger.

8.8.1 Stroke Detector State Machine

FIG. 64 depicts a state-transition diagram for the stroke detector state machine. The transition from the initial state 1010 represents the creation of the state machine, and the transitions to the final state 1011 represent its destruction.

8.8.1.1 Stroke Detector States

The state machine employs the following states:

Potential Stroke State 1075—Superstate representing any state of the state machine. The transitions 1083-1085 on this state could also have been drawn from the "any state" 1012.

Stroke State 1076—State in which the user is gesturing the first extent vector of the stroke. The transition 1081 to the Back-Brush State 1077 is more strict than necessary, as it could simply be based on the finger tracker detecting a second extent vector.

Back-Brush State 1077—State in which the user is gesturing the second extent vector of the stroke and hence backbrushing. The same-state transition 1082 for sliding is overly strict, as it could simply preclude the detection of a third extent vector. There is no additional need to constrain the direction of a backbrush.

8.8.1.2 Stroke Detector Transitions

The state machine transitions employ the following symbols, in addition to the symbols #A, #B, $\underline{IC}$, $\underline{M}$, $\underline{C}$, and $\underline{X}$ defined in the section titled "State-Transition Diagrams":

| Symbol | Meaning |
| --- | --- |
| D | Discrete direction of the vector that starts at the starting location of the finger's current extent vector and ends at the finger's most-recent location, according to a quarter-plane partitioning oriented to a reference angle equal to the forward angle for the finger's identity. |
| $D_0$ | Discrete direction of the gesture. A value of 0 means that it has not been assigned yet. |
| $L_D$ | Minimum direction determination length. |
| M | Distance measure for the finger's current location. |
| $r_0$ | Indicated user request, including a record of whether the thumb was interpreted as an anchor hold at the time the user request was determined. |

The state machine employs the following transition text. The notations #A and #B are "finger labels," as described in the section titled "State-Transition Diagrams." Note that according to this transition text, the first finger to slide matches #A. A second finger sliding would subsequently match #B and cause the state machine to terminate with a mismatch.

Transition 1078—"/$D_0$=0"

Transition 1079—"slide #A [$D_0$=0 or (M≤$L_D$ & D # op($D_0$))]/$D_0$=D; return($\underline{IC}$)"

Transition 1080—"slide #A [M>$L_D$ & D=$D_0$]/return($\underline{IC}$)"

Transition 1081—"slide #A [$D_0$≠0 & D=op($D_0$)]/return($\underline{IC}$)"

Transition 1082—"slide #A [D=op($D_0$)]/return($\underline{IC}$)"

Transition 1083—"end touch #A [sliding( ) & r( )≠0]/$r_0$=r( ); report ($r_0$); return ($\underline{C}$)"

Transition 1084—"end touch #A [sliding( ) & r( )=0]/return($\underline{X}$)"

Transition 1085—"slide #A/return($\underline{X}$)"

Transition 1086—"*/return($\underline{IC}$)"

Transition 1087—"slide #B/return($\underline{X}$)"

8.8.2 Stroke Detector Functions

The stroke detector state machine uses the following support functions.

8.8.2.1 op(base)—Opposite Direction

Returns the discrete direction opposite the indicated base direction in a quarter-plane partitioning.

8.8.2.2 r( )—Retrieve User Request

Returns a user request associated with the combination given by the selected finger identity, the discrete direction $D_0$, the gesture level of the first extent vector, the shift hold, if any, and whether the gesture backbrushed.

8.8.2.3 report(request)—Report User Request to Host

This function reports the indicated user request to the host. In addition, if the thumb was touching the input area at the time the request was determined, and if the thumb was ignored as an anchor rather than interpreted as a shift further selecting the user request, have the finger tracker for the associated finger designate the finger as an anchor.

8.8.2.4 return(result)—Return Result of Match Attempt

Returns to the session engine's feed( ) function the result of attempting to match a finger event to a gesture. The possible results are incomplete, match, complete, and mismatch.

8.8.2.5 sliding( )—Finger is Sliding

Returns true if the finger is sliding as a result of having performed an initial slide.

8.9 Sweep Detector

The sweep detector implements two-fingered sweeps in any of four directions. The two fingers must travel in directions not more than π/2 radians apart. The gesture level of the gesture is the higher of the gesture levels indicated for each finger separately, and the fingers may not differ by more than one gesture level. Only two backbrush levels are supported, and only one finger need backbrush to indicate backbrushing. The gesture direction of the sweep is determined from an oriented partitioning oriented to the average of the forward angles of the two fingers, sampled at an angle equal to the average of the angles of the fingers' first extent vectors

8.9.1 Sweep Detector State Machine

FIGS. 65A and 65B depict a state-transition diagram for the sweep detector state machine. The transition from the initial state 1010 represents the creation of the state machine, and the transitions to the final state 1011 represent its destruction.

8.9.1.1 Sweep Detector States

The state machine employs the following states:

Sweep Pending State 1090—State in which the gesture detector is waiting for a second finger to contribute to the gesture.

Sweep State 1091—State in which two fingers are in the process of tracing their first extent vectors.

Half Back-Brush State 1092—State in which one of the two fingers has begun backbrushing. This state waits for the second finger to begin backbrushing, but it does not require that the second finger do so.

Full Back-Brush State 1093—State in which both fingers are backbrushing.

Completing Sweep State 1094—State in which one of the two fingers has lifted. This state waits for the second finger to lift before reporting the user request.

Mismatch Pending State 1095—State in which the second finger did not lift soon after the first finger, indicating that the user may have been performing a gesture other than a sweep. The gesture detector enters this state on a timeout. It is an artifact of the sample implementation that this state is even necessary, as the very next finger event terminates the state. The diagram need not have included this state.

8.9.1.2 Sweep Detector Transitions

The state machine transitions employ the following symbols, in addition to the symbols #A, #B, #X, #Y, #n, IC, M, C, and X defined in the section titled "State-Transition Diagrams":

| Symbol | Meaning |
|---|---|
| D | Discrete direction of the vector that starts at the starting location of the finger's current extent vector and ends at the finger's most-recent location, according to a quarter-plane partitioning oriented to a reference angle equal to the forward angle for the finger's identity. |
| $C_{TA}$ | Current touch count for finger #A, which is determined by the finger tracker. |
| $C_{TB}$ | Current touch count for finger #B, which is determined by the finger tracker. |
| $D_{A0}$ | Discrete direction determined for #A, the first finger to slide. A value of 0 means that it has not been assigned yet. |
| $D_{B0}$ | Discrete direction determined for #B, the second finger to slide. A value of 0 means that it has not been assigned yet. |
| $D_{n0}$ | Discrete direction determined for the current finger, #A or #B. Equal to either $D_{A0}$ or $D_{B0}$. |
| $G_{FA}$ | Direction angle of the first extent vector for finger #A, as so far determined. |
| $G_{FB}$ | Direction angle of the first extent vector for finger #B, as so far determined. |
| $G_S$ | Maximum sweep angle difference - maximum difference allowed in the directions of the fingers' first extent vectors, by class equivalence, enforcing lockstep gesturing, set at 90°. |
| $L_D$ | Minimum direction determination length |
| $r_0$ | Indicated user request, including a record of whether the thumb was interpreted as an anchor hold at the time the user request was determined |
| $T_C$ | Sweep completion timer, limiting the amount of time the user has to lift the sweep finger that has not lifted yet. The period of time is called the "maximum completion time." |

The state machine employs the following transition text:

Transition 1096—"/$D_{A0}$=0; $D_{B0}$=0"

Transition 1097—"slide #A [$D_{A0}$=0 or (M≤$L_D$ & D≠op($D_{A0}$))]/$D_{A0}$=D; return(IC)"

Transition 1098—"slide #A [M>$L_D$ & D=$D_{A0}$]/return(IC)"

Transition 1099—"(slide #B) [|$C_{TA}$−$C_{TB}$|≤1 & validSweep( )]/$D_{B0}$=D; return(IC)"

Transition 1100—"end touch #A [sliding( )]/return(X)"

Transition 1101—"(slide #A or #B) (#n) [M≤$L_D$ & validSweep( )]/$D_{n0}$=D; return(IC)"

Transition 1102—"(slide #A or #B) (#n) [M>$L_D$ & D=$D_{n0}$ & validSweep( )]/return(IC)"

Transition 1103—"(slide #A or #B) (#n) [D=op($D_{n0}$)]/if (#n=#A) {#X=#B} else {#X=#A}; return(IC)"

Transition 1104—"slide #X (#n) [D=$D_{n0}$ & validSweep( )]/return(IC)"

Transition 1105—"(slide #X) (#n) [D=op($D_{n0}$)]/return(IC)"

Transition 1106—"(slide #A or #B) (#n) [D=op ($D_{n0}$)]/return(IC)"

Transition 1107—"(end touch #A or #B) (#n) [|$G_{FA}$−$G_{FB}$|≤$G_S$ & r( )≠0]/if (#n=#A) {#X=#B} else {#X=#A}; $r_0$=r( ); start $T_C$; return(IC)"

Transition 1108—"(end touch #A or #B) [|$G_{FA}$−$G_{FB}$|>$G_S$ or r( )=0]/return(X)"

Transition 1109—"slide #X/return (IC)"

Transition 1110—"new touch/clear $T_C$; return(X)"

Transition 1111—"end touch #X/clear $T_C$; report($r_0$); return(C)"

Transition 1112—"slide #Y/clear $T_C$; return(X)"

Transition 1113—"$T_C$ T/O"

Transition 1114—"*/return(X)"

Transition 1115—"*/return(IC)"

Transition 1116—"slide/return(X)"

8.9.2 Sweep Detector Functions

The sweep detector state machine uses the following support functions.

8.9.2.1 op(base)—Opposite Direction

Returns the discrete direction opposite the indicated base direction in a quarter-plane partitioning.

8.9.2.2 r( )—Retrieve User Request

Returns a user request associated with the combination given by the selected finger identities, the determined discrete direction, the gesture level of the first extent vector, the shift hold, if any, and whether at least one of the fingers backbrushed.

8.9.2.3 report(request)—Report User Request to Host

This function reports the indicated user request to the host. In addition, if the thumb was touching the input area at the time the request was determined, and if the thumb was ignored as an anchor rather than interpreted as a shift further selecting the user request, have the finger tracker for the associated finger designate the finger as an anchor.

8.9.2.4 return(result)—Return Result of Match Attempt

Returns to the session engine's feed( ) function the result of attempting to match a finger event to a gesture. The possible results are incomplete, match, complete, and mismatch.

8.9.2.5 validSweep( )—Validate Sweep Direction

This function performs input region conflict resolution, computes the current discrete direction for the sweep, and returns false if the sweep is not a lockstep gesture, returning true otherwise.

If both fingers are assigned to the same input region, the function reassigns one of them to an adjacent region, reassigning its corresponding finger identity as well. If they were assigned to an end-of-series region, one of the fingers is arbitrarily reassigned to the only adjacent region and to its finger identity as well. Otherwise, the finger nearest to an adjacent region is reassigned to that adjacent region and to its finger identity.

To compute the current discrete direction, the function establishes an oriented partitioning by orienting a quarter-plane partitioning to a reference angle that is calculated as the average of the forward angles associated with each finger of the sweep. The current discrete direction is the discrete direction indicated on this oriented partitioning at a sampling angle equal to the average of the angles of the both fingers' first extent vectors, as those angles are so far determined.

The function allows the current discrete direction to vary from call to call of validSweep) until both fingers have each travelled a distance greater than the minimum direction determination distance. After that, the function verifies that the current discrete direction is identical to the discrete direction that the function previously determined for the gesture. If the verification fails, the function returns false.

The function also returns false if the first extent vectors of the two fingers are ever found to differ by more than 90°.

In all other cases, the function returns true.

8.10 Calibration Detector

The calibration detector simultaneously monitors for drumming, repositioning, and tickling gestures. It detects tickling on any number of regions simultaneously at any time, but once one finger has tickled, the gesture detector is thereafter only able to receive tickling gestures. Before the user has performed any tickling, the user also has the option to perform a drumming gesture. After drumming, and while keeping the fingers touching, the user may move the fingers around to reposition, re-orient, and scale the active hand calibration. If all four non-thumb fingers are down, the hand calibration and finger map only update when the fingers become relatively stationary. The user may accidentally lift any number of the non-thumb fingers while repositioning, as long as at least one non-thumb finger remains touching, allowing the user to subsequently touch the fingers again to resume repositioning. The user may also reposition with just the index and pinky fingers, in which case the finger map updates in real time.

8.10.1 Default Hand Calibration

The calibration detector implements a default hand calibration. The default hand calibration applies when the user performs a drumming gesture before having performed a tickling gesture. Under this condition, the gesture system has rest locations for the fingers but does not have forward angles for the fingers. If the finger map is not configured to parallelize input regions, the gesture system assumes default forward angles for each finger.

The default forward angles are estimates of the average natural forward angles of fingers based on measurements of just a few people's hands. They likely require refinement by measuring the tendencies of many more people's hands. The defaults are as follows:

| Finger Identity | Forward Angle |
| --- | --- |
| left pinky | 100° |
| left ring | 90° |
| left middle | 85° |
| left index | 80° |
| right index | 100° |
| right middle | 95° |
| right ring | 90° |
| right pinky | 80° |

The default forward angles are relative to the angle of an orientation line. The angles given are the finger's actual forward angles for a hand calibration with a strictly horizontal orientation line, which has an angle of 0 radians. The actual forward angle given for a finger in a hand calibration is the class equivalent direction angle of the sum of the above angle and the orientation line angle.

The calibration gestures that the calibration detector recognizes provide rest locations for all of the fingers, so there is no need to infer rest locations. A gesture system that must infer rest locations, such as one that only inputs hand calibrations via hand selection slides, can reasonably assume rest locations that are evenly spaced apart.

8.10.2 Calibration Detector State Values

The calibration detector keeps track of the fingers that touch the surface allocation and associates information with them via "finger records." A "finger record" is a structure that indicates an identity for a finger, a past recorded location for the finger, and an averaged vector for the finger. The finger identities are THUMB, INDEX, MIDDLE, RING, PINKY, and UNKNOWN. Vectors are "added" to the averaged vector. The line segment of an averaged vector is an averaging of all of the vectors ever added to it. One end of the line segment is the average of all vector termini that have higher y-coordinate values, and the other end of the line segment is the average of all vector termini that have lower y-coordinate values. The approach requires that the finger map always be oriented in a vertical direction on the surface allocation, but the averaging could also have grouped termini in relation to an estimated orientation line having any orientation.

The calibration detector maintains two lists of finger records. The "active records" list contains one finger record for each finger that is currently touching. This list may include a record for the thumb. The other is a list of "archived records," which contains records for non-thumb fingers that input extent vectors by tickling and then subsequently lifted.

Because the thumb may optionally touch to anchor the hand while gesturing, the detector does not always know with certainty whether a particular active record is for the index finger or the thumb. To help deal with this ambiguity, the calibration detector also maintains a "thumb-or-index-finger-known" boolean indicating whether an active record has been assigned to either the thumb or the index finger with complete confidence.

8.10.3 Calibration Detector State Machine

FIGS. 66A and 66B depict a state-transition diagram for the calibration detector state machine. The transition from the initial state 1010 represents the creation of the state machine, and the transitions to the final state 1011 represent its destruction.

8.10.3.1 Calibration Detector States

The state machine employs the following states:

Calibration Pending State 1120—State in which the calibration detector is waiting for either a drumming gesture or a tickling gesture.

Positioning State 1121—State in which the user is actively positioning the finger map, with the finger map periodically updating. While in this state, either all four non-thumb fingers are touching, or only the index finger and the pinky finger are touching. The finger map updates continually when only the index and pinky fingers are touching; otherwise it updates only when the fingers pause the act of repositioning. This is a consequence of simultaneously monitoring for tickling, which allows the user to reposition a finger map and then adjust the region shapes and forward angles before lifting the fingers.

Suspended Positioning State 1122—State in which the user has lifted one or more fingers during the process of positioning the finger map, as may happen accidentally during gesturing. The state is able to detect and identify fingers that touch again to resume positioning, which may enable the user to be completely unaware that a finger necessary for positioning the finger map was temporarily lifted.

Tickling State 1123—State in which the user has tickled with at least one finger and in which the user may continue to tickle fingers until either all non-thumb fingers are lifted or the gesture detector cannot properly assign identities to the fingers.

8.10.3.2 Calibration Detector Transitions

The state machine transitions employ the following symbols, in addition to the symbols IC, M, C, and X defined in the section titled "State-Transition Diagrams":

| Symbol | Meaning |
|---|---|
| $C_M$ | The number of fingers mapped to non-thumb fingers. This is the number of active records assigned to finger identities other than THUMB and UNKNOWN. Maximum value is 4. |
| $T_P$ | Positioning timer, timing out after a number of milliseconds equal to the "positioning period." While the user is positioning a hand calibration, the calibration detector periodically checks finger positions to periodically update the position of the hand calibration. This allows the host or the gesture system to periodically draw the new finger map, if it draws them, so the user can see the finger map moving. It also allows the user to begin tickling at any time after positioning using the new position without having to first lift the fingers. |
| $T_T$ | Tickling report timer, timing out after a number of milliseconds equal to the "tickling report period." This timer is analogous to $T_P$, except that it is used to periodically update the hand calibration while the user is tickling. In addition to giving the user visual feedback during calibration, it gives the user the freedom to lift fingers, accidentally or on purpose, and place them again in the newly adjusted regions to continue tickling. |

The state machine employs the following transition text:

Transition 1124—"new touch [firstTouch( ) & atMostThumb( )]/if (anchored( )) {addAnchor( )}; addFromCal( ); return(IC)"

Transition 1125—"new touch [!firstTouch( ) & !drumming( )]/return(IC)"

Transition 1126—"new touch [!firstTouch( ) & drumming( ) & !badThumb( ) & firstRepos( )]/recordPos( ); start $T_P$; return(M)"

Transition 1127—"end touch/remove( ); return(IC)"

Transition 1128—"new touch [firstTouch( ) & !atMostThumb( )]/return(X)"

Transition 1129—"new touch [!firstTouch( ) & drumming( ) & (badThumb( ) or !firstRepos( ))]/return(X)"

Transition 1130—"slide [checkTickling( ) & !ticklable( )]/return(X)"

Transition 1131—"new touch [$C_M$<4 & reposition( ) & posAssign( )]/clear $T_P$; return(IC)"

Transition 1132—"new touch [$C_M$=4 & posAssign( )]/return(IC)"

Transition 1133—"$T_P$ T/O/if ($C_M$=2 or stationary( )) {reposition( )}; recordPos( ); start $T_P$"

Transition 1134—"end touch [!mapped( )]/remove( ); return(C)"

Transition 1135—"end touch [mapped( ) & reposition( )]/remove( ); return(IC)"

Transition 1136—"new touch [($C_M$=4 or ($C_M$<4 & reposition( ))) & !posAssign( )]/clear $T_P$; reportAnchor( ); return(C)"

Transition 1137—"end touch [$C_M$>1 & remove( ) & !positionable( )]/return(IC)"

Transition 1138—"end touch [($C_M$>1 & remove( ) & positionable( )]/recordPos( ); reposition( ); start $T_P$; return(IC)"

Transition 1139—"new touch [posAssign( ) & positionable( )]/recordPos( ); reposition( ); start $T_P$; return(IC)"

Transition 1140—"new touch [posAssign( ) & !positionable( )]/return(IC)"

Transition 1141—"slide [checkTickling( ) & !ticklable( )]/clear $T_P$; if ($C_M$=2 or stationary( )) {reposition( )}; reportAnchor( ); return(C)"

Transition 1142—"new touch [!posAssign( )]/reportAnchor( ); return(C)"

Transition 1143—"end touch [$C_M$=1 & mapped( )]/reportAnchor( ); return(C)"

Transition 1144—"slide [checkTickling( ) & !ticklable( )]/reportAnchor( ); return(C)"

Transition 1145—"slide [tickling( ) & !checkTickling( )]/resetAvg( ); return(IC)"

Transition 1146—"new touch/addFromCal( ); return(IC)"

Transition 1147—"slide [tickling( )=checkTickling( ) or !tickling( ) & checkTickling( ) & ticklable( )]/return(IC)"

Transition 1148—"$T_T$ T/O/calibrate( ); start $T_T$"

Transition 1149—"end touch [!mapped( )]/remove( ); return(IC)"

Transition 1150—"end touch [mapped( ) & $C_M$>1]/archiveAvg( ); remove( ); return(IC)"

Transition 1151—"slide [!tickling( ) & checkTickling( ) & !ticklable( )]/clear $T_T$; calibrate( ); reportAnchor( ); return(C)"

Transition 1152—"end touch [mapped( ) & $C_M$=1]/clear $T_T$; calibrate( ); reportAnchor( ); return(C)"

Transition 1153—"*/return(IC)"

Transition 1154—"slide [checkTickling( ) & ticklable( )]/clear $T_P$; start $T_T$; return(M)"

The transition text includes the following "macro" functions, which abbreviate the text:

positionable( ): "mapped( ) & ($C_M$=4 or ($C_M$=2 & haveIndex( ) & havePinky( )))"

ticklable( ): "!unknown( ) & (!thumb( ) or swap( ))"

8.10.4 Calibration Detector Functions

The calibration detector state machine uses the following support functions:

8.10.4.1 addAnchor( )—Record a Thumb Anchor

This function puts a thumb record in the list of active records, designating the finger unchangeably as a thumb. It also sets the thumb-or-index-finger-known boolean to true.

8.10.4.2 addFromCal( )—Record Finger from Finger Map if Possible

If there is a finger map on the surface allocation, this function identifies the gesturing finger according to its originating region. If the finger's initial touch location is not on an input region, or if no finger map has been established, the finger identity is assigned the name UNKNOWN. The function then puts a record of this finger identity in the list of active records.

8.10.4.3 anchored( )—Designated as an Anchor

Returns true if the current finger is designated as an anchor, according to the finger tracker, and returns false otherwise.

8.10.4.4 archiveAvg( )—Archive Tickling Average

Puts the active record for the present finger in the list of archived records. This makes the averaged tickling vectors available for incorporation into the hand calibration at the next tickling report timeout, even though the finger is no longer touching.

8.10.4.5 atMostThumb( )—No Holds or Just Thumb Hold

Returns true if there are no fingers performing holds or if the only hold is the thumb anchor, otherwise returns false.

8.10.4.6 badThumb( )—Bad Thumb Assignment

Returns true if any of the active records was previously designated unchangeably a thumb and yet is no longer assigned to a thumb identity. Otherwise it returns false.

8.10.4.7 calibrate( )—Revise Hand Calibration from Tickling

This function adjusts the active hand calibration with the fingers that the user has tickled during the current gesture. It first collects together the most recent averaged vectors available for each finger. If a finger has an active record, the averaged vectors are taken from there, but if not, the function uses averaged vectors from the archived records. The function uses the line segments of these averaged vectors as channel line segments for new finger calibrations. When averaged vectors are not available for a particular finger, the finger's previous finger calibration is used instead.

After computing the new hand calibration, the function makes it active, producing an associated finger map, and deletes all the archived records.

8.10.4.8 checkTickling( )—Check Tickling Status

This function returns true if it considers the finger to be tickling and false otherwise. If this function has already been called for the current finger event, it just returns the current tickling status. The function also just returns the finger's current tickling status if the finger tracker has not collected another extent vector for the finger since the last call to this function. Otherwise the function reevaluates the finger's tickling status.

Before reevaluating, the function appends the newest extent vector to the list of extent vectors that it is monitoring, dropping the oldest extent vector in the list if necessary to keep the list at a maximum number of vectors equal to the minimum tickling vector count.

If the finger was already tickling but the monitored extent vectors represent a span of more than a certain amount of time, tickling ceases and all but the most recent vector is removed from the list. This amount of time is reasonably twice the maximum tickling start time. If the finger was already tickling and remained tickling fast enough, the newest vector is added to the finger's averaged vector.

If the finger wasn't already tickling and if the number of monitored vectors equals the minimum tickling vector count and if the monitored vectors represent a span of less time than the maximum tickling start time, indicate the start of tickling, including all but the first monitored vector in the finger's averaged vector. The first vector is left out because it may not be representative of the intended tickling range.

8.10.4.9 drumming( )—Test for Drumming Gesture

This function returns true if it is able to recognize the gesture as a drumming gesture and false otherwise. The function makes the determination only once for a given finger event and returns that previous determination on subsequent calls to the function for the same finger event. (This result caching is an artifact of the state-transition diagram, allowing the diagram to call the function for multiple transition tests.)

When determining whether the gesture is a drumming gesture, the function first adds an active record for the latest finger via a call to addFromCal( ). After that, if the number of active records is neither 4 nor 5, the function aborts returning false.

Otherwise the function sets the active records to the result of getSortedRecords( ) and identifies the last (most recent) finger among the active records to touch the touchscreen. The relation of this finger to the fingers of the other active records determines whether the gesture is as drumming gesture and which hand—left or right—is being indicated.

If the finger for the fourth active record is the last (most recent) to touch, the gesture indicates a left hand with the first active record designating the pinky. If the finger for the first active record is the last to touch and there are four active records, the gesture indicates a right hand with the first active record designating the index finger. If the finger for the second active record is the last to touch and there are five active records, the gesture indicates a right hand with the first active record designating the thumb. Otherwise the function aborts returning false.

At this point the gesture is known to be a drumming gesture, the left or right handedness of the gesture is known, and the finger identity of the first active record is known, making it possible to deduce the finger identities of all the active records. The function does so and assigns these finger identities to the active records.

Finally, the function sets the thumb-or-index-finger-known boolean to true and returns a result of true.

8.10.4.10 firstRepos( )—Attempt to Reposition a Hand Calibration

This function returns true if it is able to successfully create a finger map from the locations of the index and pinky fingers and false otherwise. The function makes the determination only once for a given finger event and returns that previous determination on subsequent calls to the function for the same finger event. (This result caching is an artifact of the state-transition diagram, allowing the diagram to call the function for multiple transition tests.) Notice that this function is only ever called when finger identities have been established for all four non-thumb fingers and the left- or right-handedness of the gesture is known.

To generate a finger map from the index and pinky finger locations, the function first creates a new hand calibration. If a hand calibration is available for the particular hand that the user is using, the new hand calibration is based on the old hand calibration by scaling and reorienting the old one so that the new rest locations of the index and pinky fingers correspond to the current locations of the index and pinky fingers. If no base hand calibration is available, the function establishes a new hand calibration with index and pinky finger rest locations at the current index and pinky finger locations, either by evenly distributing the rest locations for the intervening fingers or by using the current locations of the intervening fingers as rest locations.

The system may opt to scale the gesture level ranges according to the hand breadth of the hand calibration. This is a way to automatically accommodate the smaller range of motion of fingers on smaller hands. On systems that do this, it is possible for the user to select a hand calibration having gesture level 2 at a shorter distance than the minimum initial slide distance, in which case it becomes impossible for a finger to select gesture level 1. Conflicts may also arise among values configured specifically for the user. When such conflicts arise, the function fails to produce a new hand calibration, leaves any preceding hand calibration in place, and returns false. Otherwise, the function reassigns the hand calibration for the indicated hand, makes the new hand calibration the active hand calibration, including generating a finger map for it, and returns true.

8.10.4.11 firstTouch( )—First Touch of Calibration Gesture

Returns true if there are no active records yet and false otherwise.

8.10.4.12 getSortedRecords( )—Return Sorted Active Records

This function returns a list containing the active records sorted from left to right on the surface allocation, leftmost first in the list, according to the current positions of the fingers that correspond to the records. To create the sorted list, the function calculates the distances between every two pairs of fingers in the active records, associating both fingers with each distance (via their active records). The two fingers associated with the greatest of these distances are compared (via their active records), and the one with the lower x-coordinate value is selected as the leftmost finger. All distances that are not relative to this leftmost finger are then discarded. The remaining distances are then sorted lowest-distance first. Finally, the function creates a new list, first adding the active record for the leftmost finger to the list and then adding the active records for each remaining finger to the list according to the order of their associated distances in the sort of distances, starting with the first distance in the sort.

8.10.4.13 haveIndex( )—have an Index Finger

Returns true if an active record is assigned to an index finger identity and false otherwise.

8.10.4.14 havePinky( )—have a Pinky Finger

Returns true if an active record is assigned to an pinky finger identity and false otherwise.

8.10.4.15 mapped( )—Mapped to a Non-Thumb Finger

Returns true if the active record for the current finger indicates a finger identity other than THUMB and UNKNOWN, and returns false otherwise.

8.10.4.16 posAssign( )—Attempt to Assign Missing Identities

This function attempts to assign finger identities to active records not yet having known identities. It returns false if unusual circumstances are encountered during the attempt and true otherwise. The function makes the determination only once for a given finger event and returns that previous determination on subsequent calls to the function for the same finger event. (This result caching is an artifact of the state-transition diagram, allowing the diagram to call the function for multiple transition tests.)

When attempting to determine the finger identities, this function first puts a new finger record with unknown identity into the list of active records. The function returns false if the resulting number of active records is 6 or greater.

This function is only called when the left- or right-handedness of the gesture is known and at least one active record is assigned the identity of a non-thumb finger. If some active records have unknown identities, it is possible to deduce known identities for them in certain circumstances. The process first entails calling getSortedRecords( ) to get a list of the active records sorted from left to right. The circumstances are as follows:

1) Five fingers are touching. In this case there is only one valid assignment for the fingers, and this assignment includes the thumb at one end.
2) The number of fingers touching on the pinky side of an active record with known identity is equal to the number of fingers that a hand actually has on the pinky side of the finger with that identity. In this case, all of the active records on the pinky side can be assigned finger identities. No equivalent circumstance exists for the thumb side of the hand because the thumb is optional when performing calibration gestures.
3) Finger identities are given for two active records, a series of one or more active records with unknown identities spans between them, and the number of active records in the series equals the number of fingers actually on a hand between fingers of the known two finger identities. In this case, all of the active records between the active records with known identities can be assigned finger identities.

This function determines all of the circumstances that apply and assign finger identities to the active records accordingly. It is possible that the finger identities given for some active records do not conform to any configuration of a hand with the indicated left- or right-handedness. This function may optionally return false in these situations. Otherwise the function returns true, regardless of whether any assignments were made.

The purpose of this function is to allow the user to accidentally lift fingers while moving them to reposition a finger map on the surface allocation. This way a user who accidentally lifts a finger does not have to lift all of the fingers to terminate the gesture and start again.

8.10.4.17 positionable( )—Whether Finger Map is Positionable

Returns true if active records have been assigned to all four non-thumb fingers or if the only non-thumb fingers assigned to active records are both the index finger and the pinky finger; otherwise returns false.

8.10.4.18 recordPos( )—Record Current Positions

This function iterates through all the active records and sets the past recorded location of each active record to the current position of the finger associated with the record.

8.10.4.19 remove( )—Remove Current Record

If this function has not yet been called for the current finger event, it removes the active record for the current finger from the list of active records and assigns the thumb-or-index-finger-known boolean to false if no active record is subsequently assigned to either the thumb or the index finger. Regardless, it always returns true, which allows the function to appear in conditional statements prior to subsequent conditional tests that require the active record to first have been removed.

8.10.4.20 reportAnchor( )—Report Anchor if Present

If there is an active record for the thumb, have the finger tracker for the associated finger designate the finger as an anchor.

8.10.4.21 reposition( )—Re-Attempt to Position a Hand Calibration

Calls firstRepos( ) but always returns true in order to allow it to appear in conditional statements prior to subsequent conditional tests that must follow it. In the circumstances where this function is called, a hand calibration is always available, regardless of whether the call to firstRepos ( ) succeeds.

8.10.4.22 resetAvg( )—Reset Averaged Vector

Clears the averaged vector for the current finger's active record so that no previous vectors are included in subsequent line segment determinations.

8.10.4.23 return(result)—Return Result of Match Attempt

Returns to the session engine's feed( ) function the result of attempting to match a finger event to a gesture. The possible results are incomplete, match, complete, and mismatch.

8.10.4.24 stationary( )—Whether the Fingers are Stationary

This function examines each active record to see whether the distance between the current location of the record's associated finger and the past recorded location for the finger is greater than a maximum stationary distance. If any active record indicates a greater distance, this function returns false; otherwise it returns true.

8.10.4.25 swap( )—Swap Thumb and Index Finger

This function returns true if it can swap the thumb and index finger active records, and it returns false otherwise. The function makes the determination only once for a given finger event and returns that previous determination on subsequent calls to the function for the same finger event. (This result caching is an artifact of the state-transition diagram, allowing the diagram to call the function for multiple transition tests.)

If the thumb-or-index-finger-known boolean is true, the function returns false. Otherwise, the function looks for an active record for the index finger, and if it finds one, it reassigns it to the thumb. Regardless of whether it finds an existing index finger record, it reassigns the current active record to an index finger, sets the thumb-or-index-finger-known boolean to true, and returns true.

8.10.4.26 thumb( )—Finger is a Thumb

Returns true if the active record for the current finger is assigned a thumb identity and returns false otherwise.

8.10.4.27 unknown( )—Whether Finger is Undetermined

Returns true if the finger's active record indicates a finger type of UNKNOWN and false otherwise.

8.11 Configuration Values

This specification has described numerous parameters for configuring gesture systems. Only rarely has it suggested values for those parameters. The specific values may depend on the characteristics of the touch device, on the preferences of the user, or on both. It is also possible that some values can be universal for all devices and users. Except for the values set by the calibration gestures, the inventor has not determined which values can be made independent of either device or user. Dependencies should become clearer as the gesture system is implemented across devices and as users provide feedback. Users may be better served by restricting some values to a small set of possibilities that users can select from, but these useful values have also not been determined. A gesture system may also implement calibration gestures that infer values instead of requiring that a user set them directly. This section presents values determined specifically for a Google Nexus 7 tablet and specifically for the inventor.

8.11.1 Length Values

These configuration values report lengths and distances. These numbers are necessarily a function of the touch device, though some may also be a function of the user. The values given here are in pixels for a device that has about 85 pixels per centimeter.

| Length Parameter | Value |
| --- | --- |
| Maximum tap radius - the maximum radius around the location of a previous touch in which a subsequent touch may be detected to increase the touch count | 40 |
| Maximum completion radius - the maximum distance a gesturing finger may travel after the first lifting of a finger of a selecting finger set; gestures exceeding this distance are unrecognized | 20 |
| Maximum adjacent separation - the maximum distance between adjacent fingers, used to distinguish sweeps from two-fingered gestures that are not finger-mapped | 240 |
| Gesture level 1 length - the minimum distance for gesture level 1, which is also the minimum initial slide length | 9 |
| Gesture level 2 length - minimum gesture level 2 distance, when not inferring from a calibrated hand breadth | 90 |
| Gesture level 3 length - minimum gesture level 3 distance, when not inferring from a calibrated hand breadth | 340 |
| Minimum slide level difference - when the gesture system automatically adjusts gesture levels according to the lengths of the average tickling vectors, deducing a difference between successive slide levels that is less than this value produces an error | 15 |
| Direction assignment distance - a finger is assigned a discrete direction after traveling this distance or greater | 18 |
| Maximum stationary distance - maximum distance that a finger may move while calibrating in order to be considered stationary during a single calibration positioning interval | 16 |
| Minimum extent vector length - minimum length of an extent vector | 9 |

8.11.2 Fractional Extent Values

The gesture system uses fractional extent configuration parameters to determine values as a function of values input via a calibration gesture. Calibration gesture values are multiplied by these values to determine the value that the gesture system uses.

| Fractional Extent Parameter | Value |
| --- | --- |
| Maximum finger extent fraction - multiple of the hand breadth that determines the distance forward and backward from the orientation line that input regions extend, when input regions are not filling the surface allocation | 0.6 |
| Gesture level 2 breadth fraction - multiple of the hand breadth yielding the minimum gesture level 2 length. Only applies when channel line segments are not available, such as from the hand calibration of a tickling gesture. | 0.16 |

8.11.3 Time Values

These parameter values specify time intervals and have units of milliseconds.

| Time Parameter | Value |
| --- | --- |
| Maximum multi-tap down time - the maximum amount of time a finger has to lift again to increase the touch count | 300 |
| Maximum multi-tap up time - the maximum amount of time a finger can be lifted before touching again to increase touch count | 200 |
| Maximum initial slide time - the maximum amount of time a finger has to slide the gesture level 1 length in order to perform an initial slide | 100 |
| Minimum long down time - the amount of time a finger must remain touching without sliding to induce a "long down" | 1000 |
| Residual hold period - the amount of time after a finger lifts during which it can be considered to be performing a residual hold | 200 |
| Maximum completion time - the maximum amount of time that the second finger of a sweep has to lift after the first finger lifts | 500 |
| Slow autorepeat period - interval between reissuing user requests during a slow autorepeat | 333 |
| Fast autorepeat period - interval between reissuing user requests during a fasts autorepeat | 200 |
| Positioning period - interval at which a calibration gesture is tested for being stationary | 150 |
| Tickling report period - interval at which a calibration gesture updates the hand calibration and the finger map while tickling. 0 turns off this dynamic updating | 1000 |
| Maximum start-of-tickling time - maximum amount of time in which to input the minimum number of tickling vectors at the minimum rate in order to start tickling, derived from control values as 1000 times the minimum tickling vector count divided by the minimum tickling vectors per second | 1250 |
| Minimum end-of-tickling time - minimum amount of time for the minimum tickling vectors to be input in order to end tickling, derived as twice the maximum start-of-tickling time | 2500 |

8.11.4 Control Values

Some configuration parameters control the behavior of the gesture system. Those with boolean values are necessarily assigned either according to user preferences or according to the constraints of the device. For example, some touch devices may not be able to represent finger maps with arbitrary input regions in arbitrary orientations, and some users may prefer to fix the forms of the input regions and their orientations despite the abilities of the device.

| Control Parameter | Value |
|---|---|
| Tickling vector window - the number of most recent tickling vectors that the gesture system averages together | 5 |
| Bounded finger map - whether to bound the finger map forward and backward of a calibrated orientation line by a distance derived from maximum finger extent fraction, thus freeing the surface allocation outside these boundaries for other uses, such as for use by the host | true or false |
| Verticalize finger map - whether to orient a finger map so that the nearest average of the forward angles of the fingers is equal to the angle for the forward vertical direction, which is the direction angle that points directly to the 'top' of the device. This option forces the hand to have a specific orientation with respect to the device. | true or false |
| Parallelize finger map - whether to based a finger map on a hand calibration that is derived from the actual hand calibration by setting all forward angles of the derived hand calibration to the nearest average of all forward angles of the actual calibration. This option makes the input regions parallel "swim lanes." When combined with verticalizing on a conventional tablet, the input regions become a series of rectangles whose edges are parallel to the sides of the tablet. | true or false |
| Center finger map horizontally - centers the finger map horizontally on the surface allocation midway between the 'left' and 'right' sides of the surface allocation | true or false |
| Center finger map vertically - centers the finger map vertically on the surface allocation midway between the 'top' and 'bottom' sides of the surface allocation | true or false |

8.12 State-Transition Diagrams

This specification includes state-transition diagrams for several state machines. This section explains the notation that these diagrams use. The notation is modified from Unified Modeling Language (UML) for clarity and economy of expression. In order to satisfy drafting requirements, text describing state transitions appears in the specification rather than in the diagrams.

8.12.1 Graphical Elements

The state-transition diagrams include the following graphical elements:

1) States—Rounded rectangles represent states of the state machine. The state machine is always in exactly one of the states other than the "any state." The large round black dots also represent states, but these are states in which the state machine is not running. The description of each state machine summarizes each state.

2) Transitions—A transition is an arrow that originates at a state and points to either the same state or to another state. It represents an event that causes an action to occur or the state of the state machine to change. Each transition is associated with "transition text" that describes the event along with actions performed. The transition text for each transition appears in the specification rather than in the diagram. Transition text has a particular format, as explained below.

3) Initial State—The initial state 1010 of a state machine is given by a large black dot that is not enclosed in a circle or a rounded rectangle. This represents the state of the state machine not yet existing. A transition that originates at the initial state 1010 indicates the creation of the state machine. The transition from the initial state may optionally perform actions, indicated by the portion of the transition text that follows a slash. Although the initial state 1010 is identically numbered in each state machine, each state machine comes into existence independently on its own transition.

4) Running States—A rounded box not containing a black dot is a "running state." The specification names and describes each running state.

5) Any State—The "any state" 1012 is the state given by two concentric rounded boxes. In the state machine to which it pertains, the "any state" 1012 provides default transitions for each of the state machine's running states. When both the "any state" 1012 and a running state provide a transition for the same event, the running state transition occurs and the "any state" transition does not. Although the "any state" is identically numbered 1012 in each state machine, the "any state" only applies to the state machine with which it is depicted.

6) Final State—The final state 1011 is given by a circle or rounded rectangle containing a large black dot. It represents the state of the state machine having been terminated. Some state machines never terminate and run forever or until destroyed by other means. These state machines do not have a final state. Some diagrams depict more than one final state 1011, but all final state elements within a state machine are equivalent.

7) Same-State Transitions—A transition that originates and ends on the same state is a same-state transition. This transition does not result in a state change. The function of the transition is clear when it performs actions in response to an event. However, a same-state transition need not perform an action, indicating instead that the event is to be ignored and neither to be interpreted as an error nor to be handled by an "any state" transition.

8) Superstates—A superstate is region that encloses two or more running states. The states contained within a superstate are the "substates" of the superstate. A transition that originates on a superstate indicates that the transition applies separately to each of the superstate's substates. The diagram could instead have been equivalently written with the superstate transition duplicated for each of its substates. However, when superstate and substate transitions conflict, the substate transition takes precedence; a superstate transition only applies when no substate transition applies for the same event. When a transition originates and ends on the same superstate, the transition is a same-state transition, not changing the state of the state machine.
9) Conditionals—The session engine state machine in FIG. 63 employs a custom notation for expressing complex state transitions. These are "conditionals," illustrated in the figure as diamonds 1052-1055. Each conditional corresponds to a function that performs a test. Transition arrows can point to conditionals, indicating that the conditional's test is to be performed during the transition. The test is a function call. This specification names the function associated with each conditional. The function returns a result, which serves as an event for transitions that originate on the conditional. Transition arrows originating on the conditional point to states or to other conditionals. The event indicated for a transition originating on a conditional identifies the function result to which the transition applies; when a conditional's function yields the result given for a particular transition out of the conditional, that particular transition occurs.

8.12.2 Transition Text

Each transition has "transition text" that describes the conditions under which the transition occurs and the actions that are performed when the transition occurs. Transition text has one of the following two general formats:

event name(#n)[conditions]/actions (event names)(#n)[conditions]/actions

The first segment in each format, providing one or more event names, is optional on the transition from the initial state 1010 but mandatory in all other transitions. The remaining segments may or may not appear in a transition. The segments are as follows:

1) event name—Name of the event that causes the transition. An event name of asterisk ('*') indicates that the event is matched if no other transition of the originating state matches. When the transition originates on a conditional, the event name identifies a return value of the test function that the conditional called.

2) (event names)—When the names of the events are listed in parentheses, several different events are each capable of causing the transition. The parentheses disambiguate the names from the rest of the transition text. A single event may also be represented in parentheses.

3) (#n)—When this segment occurs after an event name, #n becomes assigned to the "finger label" for the current finger. For example, if the transition text begins with "(slide #A or #B)(#n)", the first finger to slide is given the label #A and the second finger to slide is given the label #B. Regardless of which finger matches the event, #n indicates the finger label of the finger, whether it was #A or #B. See the "Finger Labels" notation, below.

4) [conditions]—Further constraints on when the transition occurs are given as conditions in brackets. The ampersand ('&') represents a boolean AND operator. The word 'or' indicates an inclusive boolean OR operator. The AND operator has higher precedence than the OR operator, as is conventional. An exclamation point ('!') indicates a logical NOT, negating the truth value of the immediately following term, as is conventional in C-like programming languages. Within a conditional expression, the '=' sign is an equality comparison, not an assignment. Vertical bars designate the mathematical absolute value operation on the value enclosed between the vertical bars.

5) /actions—Transitions are capable of performing actions in addition to changing the state of the state machine. Actions are listed after the slash and include variable assignments and function calls. Semi-colons delimit multiple sequential actions. Transitions may perform actions even if they are directed to conditionals. The '=' is a comparison when it appears in "if" statements and it is a variable assignment operation otherwise. The conditionally executed statements of "if" and "else" statements occur in curly braces ('{' and '}') after the associated "if" or "else" clause, as is conventional in C-like programming languages.

8.12.3 Shorthand Notation

The diagrams express the transition text in a shorthand notation. The notation helps to improve clarity by helping to reduce clutter. The notation is as follows:

1) Finger Labels—A "finger label" is given as a pound sign ('#') followed by a capital letter. Finger labels distinguishing detected fingers. "#A" and "#B" respectively signify the first finger and second fingers for which the state machine receives events. The expression "if(#n=#A)" tests the variable #n to see if it represents the finger with label #A. The notation "#X=#A" assigns "#X" the finger label "#A". After the "#X" assignment, "#Y" will identify the next finger, analogous to "#B" being the finger label that follows "#A". Think of the finger labels as binding to the fingers as they arrive.

2) Variables—Variables are given as capital letters with optional subscripts. Most variables are local to the state machine, so that multiple state machines may run concurrently without affecting each other's variable. However, a variable given in italics is shared among all instances of the same kind of state machine. A variable having a subscript that begins with a lower case 'n' represents another variable, with the value of "#n" in the transition text selecting that variable, selecting either subscript 'A' or 'B' for finger labels "#A" or "#B".

3) Recorded Variables—A recorded variable is a variable that records the current value of another variable for possible use later after the other variable has changed value. A recorded variable is given as the variable it records followed by the subscript zero. (For example, $L_0$ is a recorded value of the variable L.) If the variable being recorded already has a subscript, a zero is appended to that subscript. The transition text explicitly shows the assignments of recorded variables.

4) Functions—Functions are given as lower case letters followed by zero or more parenthesized parameters. Functions always include the parentheses, whether or not they have any parameters. Functions may also access variables not provided to them in parenthesis and not depicted on the state-transition diagram. Functions may also change object state other than the state of the state machine, even if called from within the conditions of state transition text. Functions may or may not return values for use in transition conditions and actions.

5) Enumerated Types—Enumerated types are given as capital letters that are bold and underlined. In particular, the state machines employ an enumerated type for the matching results of gesture detectors.

| Gesture Detector Matching Results | |
|---|---|
| IC | INCOMPLETE |
| M | MATCH |
| C | COMPLETE |
| X | MISMATCH |

6) Timers and Timeouts—A timer is represented as a capital bold italic T having a subscript. (For example, $T_D$.) The subscript is a letter that identifies the timer. State machines start and clear timers. When a timer is started, a timeout will occur a number of milliseconds later that depends on the timer started, unless the timer is canceled first. When a timeout occurs, an event is sent to the state machine to report the timeout. The event name is given as the symbol for the timer followed by the letters "T/O". (For example, "$T_D$ T/O".) If the timer is canceled before the timeout occurs, no timeout event is sent to the state machine for the most recent request to start the timer. Each instance of the state machine maintains its own timers, so that now two state machines can start or cancel each other's timers.

What is claimed is:

1. A method of user input on a touch device associated with a host that interprets user requests in response to user input, said method comprising the steps of:
   detecting a first calibrating finger at a first calibrating location on a surface allocation, with said surface allocation containing a calibrating geometric element;
   providing an input area on said surface allocation, with said input area implementing a non-subsumptive gesture basis set of independent gesture bases that is multi-selectable within said input area on a set of linear associations, with said gesture basis set having a series of available finger identities, and with each gesture basis of said gesture basis set including a path-dependent gesture parameter;
   subsequent to said steps of detecting a first calibrating finger and providing an input area, concluding processing of a first gesture;
   subsequent to said step of concluding processing of a first gesture, detecting a first selecting finger set of gesturing fingers, with each finger of said first selecting finger set having a gestured path with an initial touch location on said input area;
   determining a first selected identity set dependent on a relative position of said first calibrating location and said calibrating geometric element, with said first selected identity set comprising a distinct finger identity of said series of available finger identities for each finger of said first selecting finger set;
   determining a first user request as a function of each value of a first selectable parameterization of a first gesture basis of said gesture basis set, with said first selectable parameterization including a value for each gesture parameter of said first gesture basis, said value for said each gesture parameter being a function of the gestured path of at least one finger of said first selecting finger set, with said first selected identity set being identical to the characteristic identity set of said first gesture basis, with four selectable parameterizations of said first gesture basis (a) indicating distinct user requests and (b) each being selectable by a gesture having a set of simple linear associations that is a subset of said set of linear associations, and with said first selectable parameterization being one of said four selectable parameterizations; and
   reporting said first user request to said host.

2. A method of user input on a touch device associated with a host that interprets user requests in response to user input, said method comprising the steps of:
   detecting a first calibrating finger at a first calibrating location on a surface allocation, with said surface allocation containing a calibrating geometric element;
   providing an input area on said surface allocation, with said input area implementing a non-subsumptive gesture basis set of independent gesture bases, with said gesture basis set having a series of available finger identities, and with each gesture basis of said gesture basis set including a path-dependent gesture parameter;
   subsequent to said steps of detecting a first calibrating finger and providing an input area, concluding processing of a first gesture;
   subsequent to said step of concluding processing of a first gesture, detecting a first selecting finger set of at least two gesturing fingers, with each finger of said first selecting finger set having a gestured path with an initial touch location on said input area;
   determining a first selected identity set dependent on a relative position of said first calibrating location and said calibrating geometric element, with said first selected identity set comprising a distinct finger identity of said series of available finger identities for each finger of said first selecting finger set;
   determining a first user request as a function of said first selected identity set and as a function of a value for each gesture parameter of a first gesture basis of said gesture basis set, said value for said each gesture parameter being a function of the gestured path of at least one finger of said first selecting finger set, with said first selected identity set being identical to the characteristic identity set of said first gesture basis; and
   reporting said first user request to said host.

3. A method according to claim 1, wherein each gesture basis of said gesture basis set includes a gesture level parameter.

4. A method according to claim 3,
   wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;
   wherein for each finger of said first selecting finger set, said step of determining a first selected identity set (a) determines the nearest geometric element of said series of geometric elements to the gestured path of said each finger and (b) includes in said first selected identity set the finger identity with which said nearest geometric element is associated; and
   wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element, said first geometric element being the nearest geometric element to the gestured path of a finger of said first selecting finger set.

5. A method according to claim 4,
wherein prior to said step of concluding processing of a first gesture, said method further comprises the step of establishing at least one direction; and
wherein the region form of said first geometric element differs from the region form of a second geometric element of said series of geometric elements, with at least one difference between a property of the region form of said first geometric element and a property of the region form of said second geometric element being dependent on said at least one direction.

6. A method according to claim 4, wherein prior to said step of concluding processing of a first gesture, said method further comprises the step of detecting a second calibrating finger at a second calibrating location, with said calibrating geometric element being said second calibrating location.

7. A method according to claim 6,
wherein said first gesture basis includes a gesture direction parameter; and
wherein said first selectable parameterization includes a discrete direction for a range of directions that is dependent on a relative position of said first calibrating location and said second calibrating location.

8. A method according to claim 2, wherein each gesture basis of said gesture basis set includes a gesture level parameter.

9. A method according to claim 8,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;
wherein for each finger of said first selecting finger set, said step of determining a first selected identity set (a) determines the nearest geometric element of said series of geometric elements to the gestured path of said each finger and (b) includes in said first selected identity set the finger identity with which said nearest geometric element is associated; and
wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element, said first geometric element being the nearest geometric element to the gestured path of a finger of said first selecting finger set.

10. A method according to claim 8,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;
wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element; and
wherein said step of determining a first selected identity set comprises the substeps of:
determining that said first geometric element is the nearest geometric element of said series of geometric elements to the gestured path of a first finger of said first selecting finger set;
determining that the gestured path of a second finger of said first selecting finger set is nearest to a second geometric element of said series of geometric elements, with said second finger being distinct from said first finger;
determining that said first geometric element is said second geometric element;
including in said first selected identity set the finger identity with which said first geometric element is associated; and
including in said first selected identity set the finger identity with which an adjacent geometric element is associated, said adjacent geometric element being adjacent to said first geometric element in said series of geometric elements.

11. A method according to claim 9, wherein prior to said step of concluding processing of a first gesture, said method further comprises the step of detecting a second calibrating finger at a second calibrating location, with said calibrating geometric element being said second calibrating location.

12. A method according to claim 10, wherein
if said first geometric element is an end-of-series geometric element of said series of geometric elements, said adjacent geometric element is the geometric element adjacent in said series of geometric elements to said first geometric element; and
if said first geometric element is not an end-of-series geometric element of said series of geometric elements, said adjacent geometric element is the geometric element that is adjacent in said series of geometric elements to said first geometric element nearest to a midpoint between a location in the gestured path of said first finger and a location in the gestured path of said second finger.

13. A system for user input on a touch device associated with a host that interprets user requests in response to user input, said system comprising:
a calibrating system that detects a first calibrating finger at a first calibrating location on a surface allocation, with said surface allocation containing a calibrating geometric element;
an input area on said surface allocation, with said input area implementing a non-subsumptive gesture basis set of independent gesture bases that is multi-selectable within said input area on a set of linear associations, with said gesture basis set having a series of available finger identities, and with each gesture basis of said gesture basis set including a path-dependent gesture parameter; and
a gesture system that:
(i) subsequent to said step that detects a first calibrating finger, concludes processing of a first gesture;
(ii) subsequent to said step that concludes processing of a first gesture, detects a first selecting finger set of gesturing fingers, with each finger of said first selecting finger set having a gestured path with an initial touch location on said input area;

(iii) determines a first selected identity set dependent on a relative position of said first calibrating location and said calibrating geometric element, with said first selected identity set comprising a distinct finger identity of said series of available finger identities for each finger of said first selecting finger set;

(iv) determines a first user request as a function of each value of a first selectable parameterization of a first gesture basis of said gesture basis set, with said first selectable parameterization including a value for each gesture parameter of said first gesture basis, said value for said each gesture parameter being a function of the gestured path of at least one finger of said first selecting finger set, with said first selected identity set being identical to the characteristic identity set of said first gesture basis, with four selectable parameterizations of said first gesture basis (a) indicating distinct user requests and (b) each being selectable by a gesture having a set of simple linear associations that is a subset of said set of linear associations, and with said first selectable parameterization being one of said four selectable parameterizations; and (v) reports said first user request to said host.

14. A system for user input on a touch device associated with a host that interprets user requests in response to user input, said system comprising:

a calibrating system that detects a first calibrating finger at a first calibrating location on a surface allocation, with said surface allocation containing a calibrating geometric element;

an input area on said surface allocation, with said input area implementing a non-subsumptive gesture basis set of independent gesture bases, with said gesture basis set having a series of available finger identities, and with each gesture basis of said gesture basis set including a path-dependent gesture parameter; and a gesture system that:
(i) subsequent to said step that detects a first calibrating finger, concludes processing of a first gesture;
(ii) subsequent to said step that concludes processing of a first gesture, detects a first selecting finger set of at least two gesturing fingers, with each finger of said first selecting finger set having a gestured path with an initial touch location on said input area;
(iii) determines a first selected identity set dependent on a relative position of said first calibrating location and said calibrating geometric element, with said first selected identity set comprising a distinct finger identity of said series of available finger identities for each finger of said first selecting finger set;
(iv) determines a first user request as a function of said first selected identity set and as a function of a value for each gesture parameter of a first gesture basis of said gesture basis set, said value for said each gesture parameter being a function of the gestured path of at least one finger of said first selecting finger set, with said first selected identity set being identical to the characteristic identity set of said first gesture basis; and
(v) reports said first user request to said host.

15. A system according to claim 13, wherein each gesture basis of said gesture basis set includes a gesture level parameter.

16. A system according to claim 15,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;
wherein for each finger of said first selecting finger set, said gesture system (a) determines the nearest geometric element of said series of geometric elements to the gestured path of said each finger and (b) includes in said first selected identity set the finger identity with which said nearest geometric element is associated; and
wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element, said first geometric element being the nearest geometric element to the gestured path of a finger of said first selecting finger set.

17. A system according to claim 16,
wherein prior to said step that concludes processing of a first gesture, said calibrating system further establishes at least one direction; and
wherein the region form of said first geometric element differs from the region form of a second geometric element of said series of geometric elements, with at least one difference between a property of the region form of said first geometric element and a property of the region form of said second geometric element being dependent on said at least one direction.

18. A system according to claim 16, wherein prior to said step that concludes processing of a first gesture, said calibrating system further detects a second calibrating finger at a second calibrating location, with said calibrating geometric element being said second calibrating location.

19. A system according to claim 18,
wherein said first gesture basis includes a gesture direction parameter; and
wherein said first selectable parameterization includes a discrete direction for a range of directions that is dependent on a relative position of said first calibrating location and said second calibrating location.

20. A system according to claim 14, wherein each gesture basis of said gesture basis set includes a gesture level parameter.

21. A system according to claim 20,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;
wherein for each finger of said first selecting finger set, said gesture system (a) determines the nearest geometric element of said series of geometric elements to the gestured path of said each finger and (b) includes in said first selected identity set the finger identity with which said nearest geometric element is associated; and
wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element, said first geometric element being the nearest geometric element to the gestured path of a finger of said first selecting finger set.

22. A system according to claim 20,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;
wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element; and
wherein said gesture system:
determines that said first geometric element is the nearest geometric element of said series of geometric elements to the gestured path of a first finger of said first selecting finger set;
determines that the gestured path of a second finger of said first selecting finger set is nearest to a second geometric element of said series of geometric elements, with said second finger being distinct from said first finger;
determines that said first geometric element is said second geometric element;
includes in said first selected identity set the finger identity with which said first geometric element is associated; and
includes in said first selected identity set the finger identity with which an adjacent geometric element is associated, said adjacent geometric element being adjacent to said first geometric element in said series of geometric elements.

23. A system according to claim 21, wherein prior to said step that concludes processing of a first gesture, said calibrating system further detects a second calibrating finger at a second calibrating location, with said calibrating geometric element being said second calibrating location.

24. A system according to claim 22, wherein
if said first geometric element is an end-of-series geometric element of said series of geometric elements, said adjacent geometric element is the geometric element adjacent in said series of geometric elements to said first geometric element; and
if said first geometric element is not an end-of-series geometric element of said series of geometric elements, said adjacent geometric element is the geometric element that is adjacent in said series of geometric elements to said first geometric element nearest to a midpoint between a location in the gestured path of said first finger and a location in the gestured path of said second finger.

25. A system according to claim 13, wherein said calibrating system is said gesture system.

26. A system according to claim 14, wherein said calibrating system is said gesture system.

27. A non-transitory computer-readable medium carrying thereon instructions which when executed by a processor perform a method of user input on a touch device associated with a host that interprets user requests in response to user input, said method comprising the steps of:
detecting a first calibrating finger at a first calibrating location on a surface allocation, with said surface allocation containing a calibrating geometric element;
providing an input area on said surface allocation, with said input area implementing a non-subsumptive gesture basis set of independent gesture bases that is multi-selectable within said input area on a set of linear associations, with said gesture basis set having a series of available finger identities, and with each gesture basis of said gesture basis set including a path-dependent gesture parameter;
subsequent to said steps of detecting a first calibrating finger and providing an input area, concluding processing of a first gesture;
subsequent to said step of concluding processing of a first gesture, detecting a first selecting finger set of gesturing fingers, with each finger of said first selecting finger set having a gestured path with an initial touch location on said input area;
determining a first selected identity set dependent on a relative position of said first calibrating location and said calibrating geometric element, with said first selected identity set comprising a distinct finger identity of said series of available finger identities for each finger of said first selecting finger set;
determining a first user request as a function of each value of a first selectable parameterization of a first gesture basis of said gesture basis set, with said first selectable parameterization including a value for each gesture parameter of said first gesture basis, said value for said each gesture parameter being a function of the gestured path of at least one finger of said first selecting finger set, with said first selected identity set being identical to the characteristic identity set of said first gesture basis, with four selectable parameterizations of said first gesture basis (a) indicating distinct user requests and (b) each being selectable by a gesture having a set of simple linear associations that is a subset of said set of linear associations, and with said first selectable parameterization being one of said four selectable parameterizations; and
reporting said first user request to said host.

28. A non-transitory computer-readable medium carrying thereon instructions which when executed by a processor perform a method of user input on a touch device associated with a host that interprets user requests in response to user input, said method comprising the steps of:
detecting a first calibrating finger at a first calibrating location on a surface allocation, with said surface allocation containing a calibrating geometric element;
providing an input area on said surface allocation, with said input area implementing a non-subsumptive gesture basis set of independent gesture bases, with said gesture basis set having a series of available finger identities, and with each gesture basis of said gesture basis set including a path-dependent gesture parameter;
subsequent to said steps of detecting a first calibrating finger and providing an input area, concluding processing of a first gesture;
subsequent to said step of concluding processing of a first gesture, detecting a first selecting finger set of at least two gesturing fingers, with each finger of said first selecting finger set having a gestured path with an initial touch location on said input area;

determining a first selected identity set dependent on a relative position of said first calibrating location and said calibrating geometric element, with said first selected identity set comprising a distinct finger identity of said series of available finger identities for each finger of said first selecting finger set;

determining a first user request as a function of said first selected identity set and as a function of a value for each gesture parameter of a first gesture basis of said gesture basis set, said value for said each gesture parameter being a function of the gestured path of at least one finger of said first selecting finger set, with said first selected identity set being identical to the characteristic identity set of said first gesture basis; and reporting said first user request to said host.

29. A non-transitory computer-readable medium according to claim 27, wherein each gesture basis of said gesture basis set includes a gesture level parameter.

30. A non-transitory computer-readable medium according to claim 29,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;

wherein for each finger of said first selecting finger set, said step of determining a first selected identity set (a) determines the nearest geometric element of said series of geometric elements to the gestured path of said each finger and (b) includes in said first selected identity set the finger identity with which said nearest geometric element is associated; and wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element, said first geometric element being the nearest geometric element to the gestured path of a finger of said first selecting finger set.

31. A non-transitory computer-readable medium according to claim 30,
wherein prior to said step of concluding processing of a first gesture, said method further comprises the step of establishing at least one direction; and
wherein the region form of said first geometric element differs from the region form of a second geometric element of said series of geometric elements, with at least one difference between a property of the region form of said first geometric element and a property of the region form of said second geometric element being dependent on said at least one direction.

32. A non-transitory computer-readable medium according to claim 30, wherein prior to said step of concluding processing of a first gesture, said method further comprises the step of detecting a second calibrating finger at a second calibrating location, with said calibrating geometric element being said second calibrating location.

33. A non-transitory computer-readable medium according to claim 32,
wherein said first gesture basis includes a gesture direction parameter; and wherein said first selectable parameterization includes a discrete direction for a range of directions that is dependent on a relative position of said first calibrating location and said second calibrating location.

34. A non-transitory computer-readable medium according to claim 28, wherein each gesture basis of said gesture basis set includes a gesture level parameter.

35. A non-transitory computer-readable medium according to claim 34,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;

wherein for each finger of said first selecting finger set, said step of determining a first selected identity set (a) determines the nearest geometric element of said series of geometric elements to the gestured path of said each finger and (b) includes in said first selected identity set the finger identity with which said nearest geometric element is associated; and wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element, said first geometric element being the nearest geometric element to the gestured path of a finger of said first selecting finger set.

36. A non-transitory computer-readable medium according to claim 34,
wherein said input area comprises all regions of all geometric elements of a series of geometric elements, with each geometric element of said series of geometric elements being associated with a distinct finger identity of said series of available finger identities, and with said series of available finger identities comprising all finger identities with which a geometric element of said series of geometric elements is associated;

wherein for each of multiple geometric elements of said series of geometric elements other than a first geometric element of said series of geometric elements, a relative position of said each of multiple geometric elements and said first geometric element is dependent on said relative position of said first calibrating location and said calibrating geometric element; and wherein said step of determining a first selected identity set comprises the substeps of:
determining that said first geometric element is the nearest geometric element of said series of geometric elements to the gestured path of a first finger of said first selecting finger set;

determining that the gestured path of a second finger of said first selecting finger set is nearest to a second geometric element of said series of geometric elements, with said second finger being distinct from said first finger;

determining that said first geometric element is said second geometric element;

including in said first selected identity set the finger identity with which said first geometric element is associated; and including in said first selected identity set the finger identity with which an adjacent geometric element is associated, said adjacent geometric element being adjacent to said first geometric element in said series of geometric elements.

37. A non-transitory computer-readable medium according to claim 35, wherein prior to said step of concluding processing of a first gesture, said method further comprises the step of detecting a second calibrating finger at a second calibrating location, with said calibrating geometric element being said second calibrating location.

38. A non-transitory computer-readable medium according to claim 36, wherein
   if said first geometric element is an end-of-series geometric element of said series of geometric elements, said adjacent geometric element is the geometric element adjacent in said series of geometric elements to said first geometric element; and
   if said first geometric element is not an end-of-series geometric element of said series of geometric elements, said adjacent geometric element is the geometric element that is adjacent in said series of geometric elements to said first geometric element nearest to a midpoint between a location in the gestured path of said first finger and a location in the gestured path of said second finger.

* * * * *